United States Patent [19]

Sybert et al.

[11] Patent Number: 4,772,678

[45] Date of Patent: * Sep. 20, 1988

[54] LIQUID CRYSTALLINE POLYMER COMPOSITIONS, PROCESS, AND PRODUCTS

[75] Inventors: Joanne R. Sybert, Cohoes, N.Y.; James F. Wolfe, Redwood City, Calif.; Paul D. Sybert, Cohoes, N.Y.; Blake Wilson, Belmont, Calif.

[73] Assignee: CommTech International Management Corporation, Menlo Park, Calif.

[*] Notice: The portion of the term of this patent subsequent to Aug. 6, 2002 has been disclaimed.

[21] Appl. No.: 762,750

[22] Filed: Aug. 5, 1985

Related U.S. Application Data

[63] Continuation-in-part of Ser. No. 616,469, Sep. 15, 1983, Pat. No. 4,533,693, which is a continuation-in-part of Ser. No. 433,831, Sep. 17, 1982, Pat. No. 4,533,692.

[51] Int. Cl.[4] .............................................. C08G 73/22
[52] U.S. Cl. ................................... 528/179; 528/183; 528/188; 528/327; 528/330; 528/331; 528/337; 528/341; 528/342; 528/346; 528/347; 528/348; 528/352; 528/353; 528/364; 524/417
[58] Field of Search ................ 524/417; 528/183, 179, 528/337, 188, 327, 330, 331, 341, 342, 346, 347, 348, 352, 353, 364

[56] References Cited

U.S. PATENT DOCUMENTS

| | | | |
|---|---|---|---|
| 3,424,720 | 1/1969 | Rudner et al. | 528/377 |
| 3,449,296 | 6/1969 | Angelo et al. | 528/339 |
| 3,632,414 | 1/1972 | Arnold et al. | 427/353 |
| 4,054,633 | 10/1977 | Richardson | 528/336 |
| 4,131,748 | 12/1978 | Arnold et al. | 528/183 |
| 4,225,700 | 9/1980 | Wolfe et al. | 528/336 |
| 4,359,567 | 11/1982 | Evers | 528/336 |
| 4,423,202 | 12/1983 | Choe | 528/286 |
| 4,487,735 | 12/1984 | Chenevey et al. | 264/85 |
| 4,533,692 | 8/1985 | Wolfe et al. | 528/183 |
| 4,533,693 | 8/1985 | Wolfe et al. | 528/183 |
| 4,533,724 | 8/1985 | Wolfe et al. | 528/331 |
| 4,554,119 | 11/1985 | Chenevey | 264/85 |
| 4,606,875 | 8/1986 | Chenevey | 264/85 |

FOREIGN PATENT DOCUMENTS 1363757 5/1964 France .
4219270 7/1964 Japan .

OTHER PUBLICATIONS

J. Wolfe et al–Macromolecules 14, 909–915 and 915–920 (1981).
Choe et al–Macromolecules 14, 920–924 (1981).
Evers et al–Macromolecules 14, 925–930 (1981).
Cotts et al–Macromolecules 14, 930–934 (1981).
Taylor et al–Macromolecules 14, 1134–1135.
S. R. Allen et al., *Macromolecules*, 14: 1135–1138 (1981).

*Primary Examiner*—Veronica P. Hoke
*Attorney, Agent, or Firm*—Ciotti & Murashige; Irell & Manella

[57] ABSTRACT

Novel liquid crystalline extended chain polymer compositions comprising a high concentration of one or more extended chain homopolymer(s), copolymer(s), or block polymer(s) and certain strong acids are prepared by admixing a high concentration of one or more selected homo- or hetero-bifunctional monomer(s) with or without oxidation protecting atoms or groups and one or more of a substantially non-oxidizing strong acid(s) having a high or low $P_2O_5$ content. Such compositions are capable of exhibiting excellent cohesive strength, and are especially suited to the production of high molecular weight ordered polymer fibers by dry-jet wet spinning. These liquid crystalline compositions are capable of being drawn through long air gap distances and spun at exceptionally high spin draw ratios. Fibers, films and other articles formed from these liquid crystalline compositions exhibit exceptionally high physical and heat resistant properties.

114 Claims, 20 Drawing Sheets

ISOTHERMAL AGING OF A S SPUN POLYMER FIBER IN CIRCULATING AIR AT 371° C

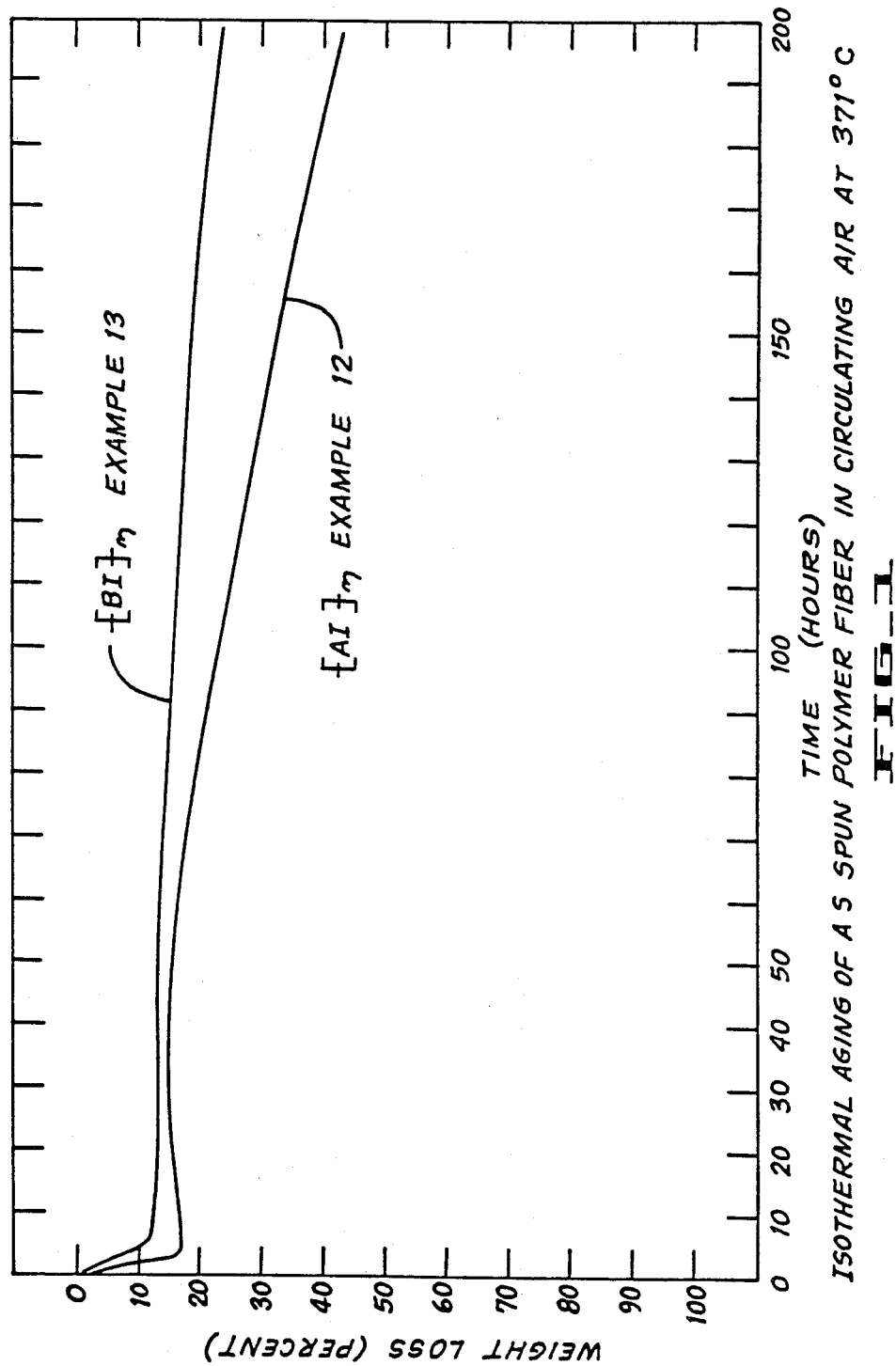

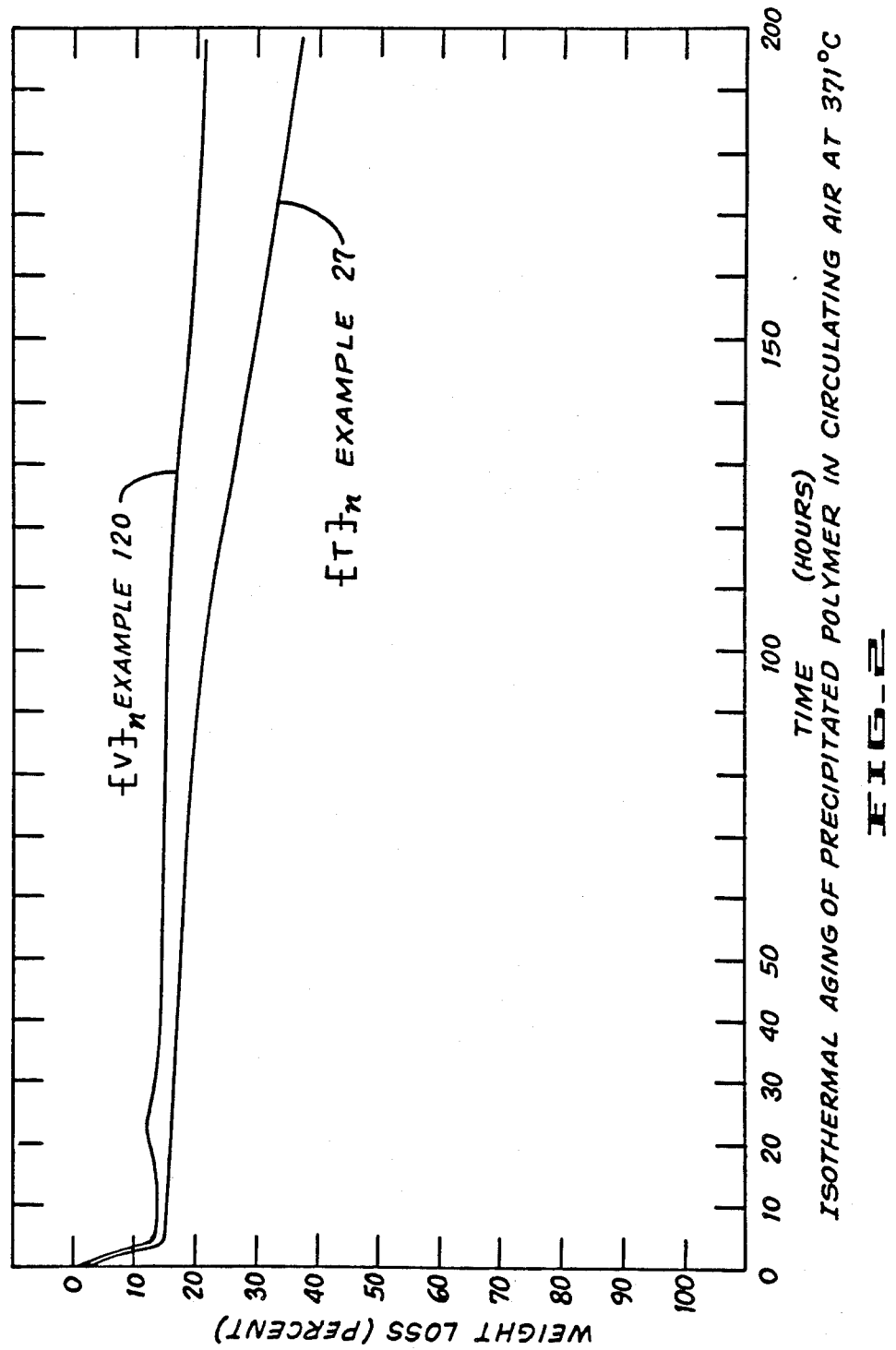

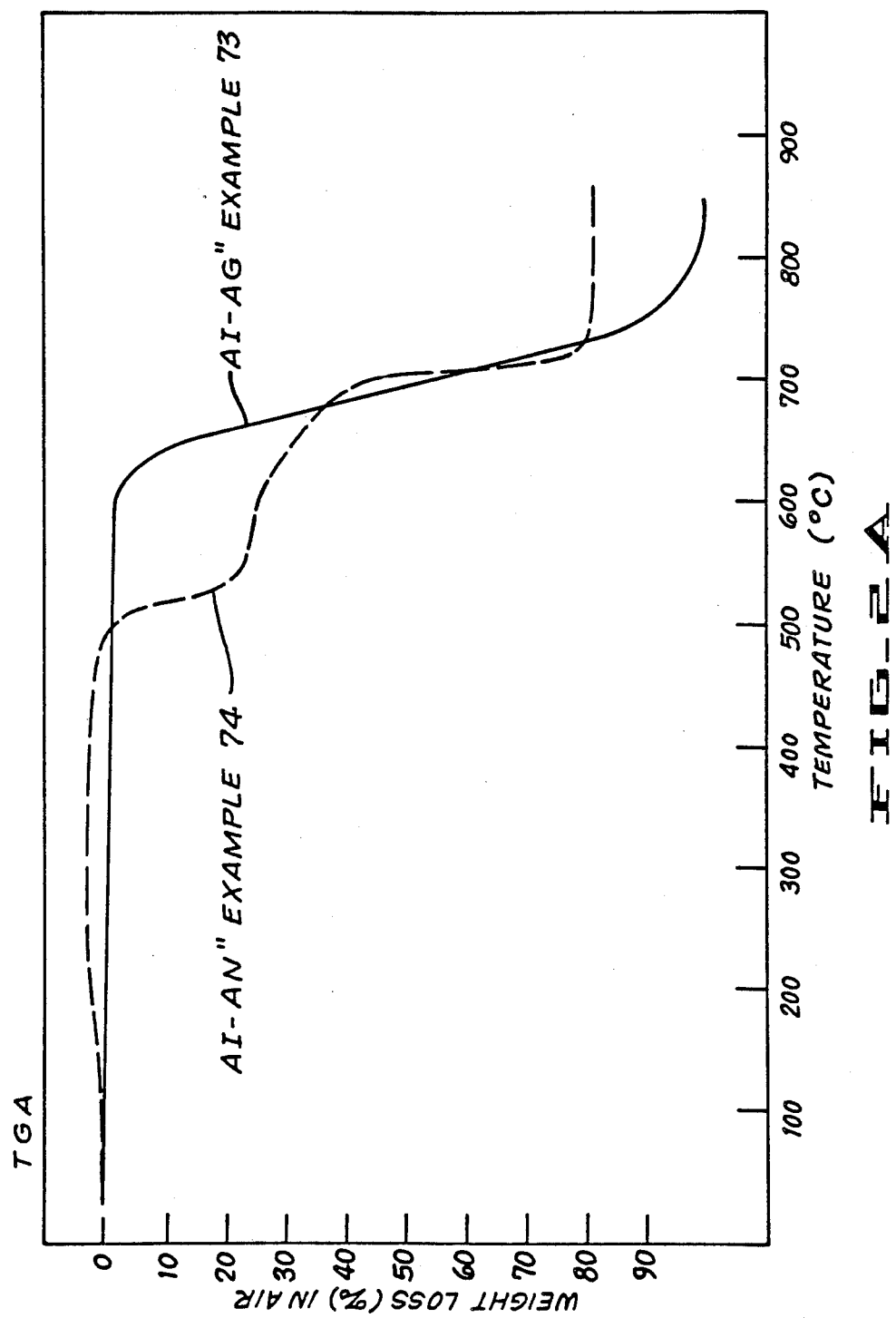

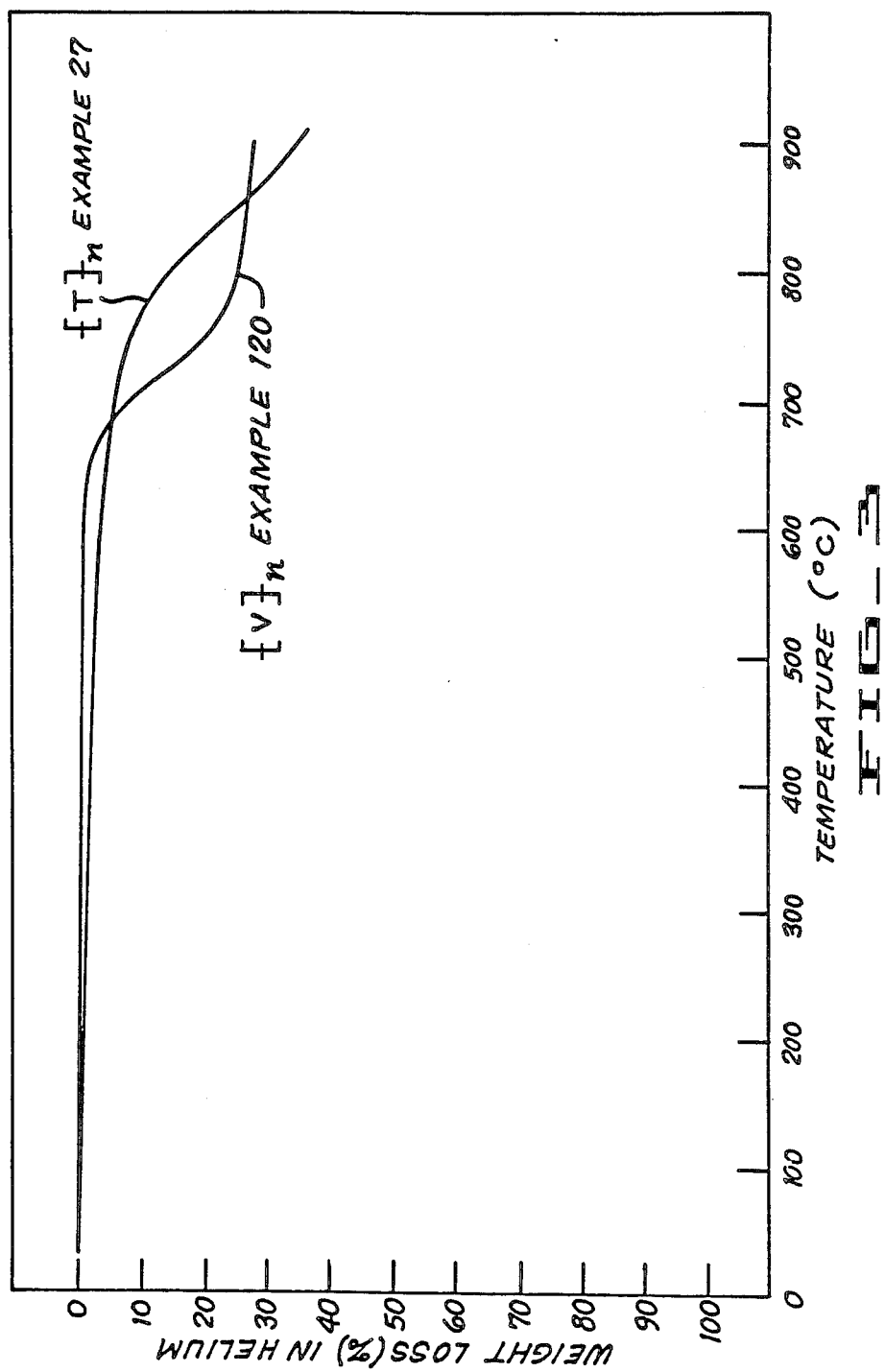

FIG_5

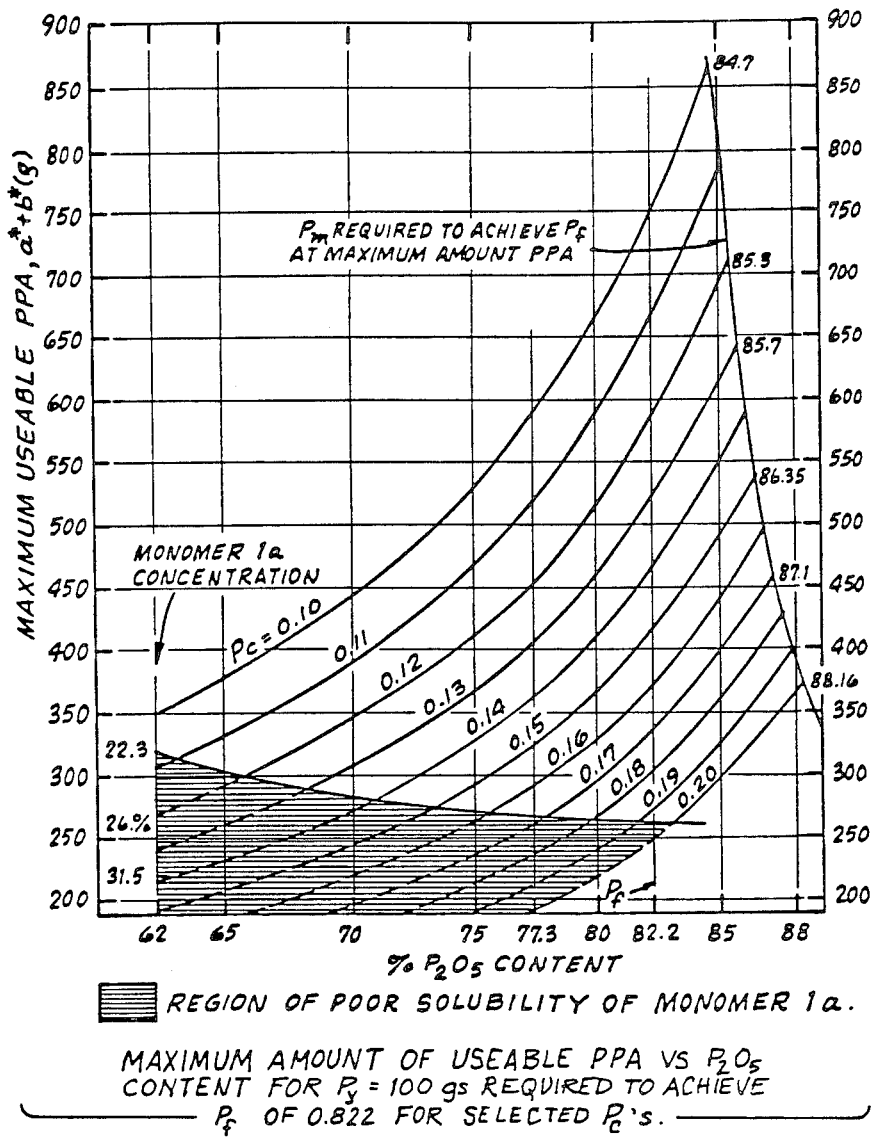
MAXIMUM AMOUNT OF USEABLE PPA VS $P_2O_5$ CONTENT FOR $P_y = 100$ gs REQUIRED TO ACHIEVE $P_f$ OF 0.822 FOR SELECTED $P_c$'s.
FIG_7

FIG_10

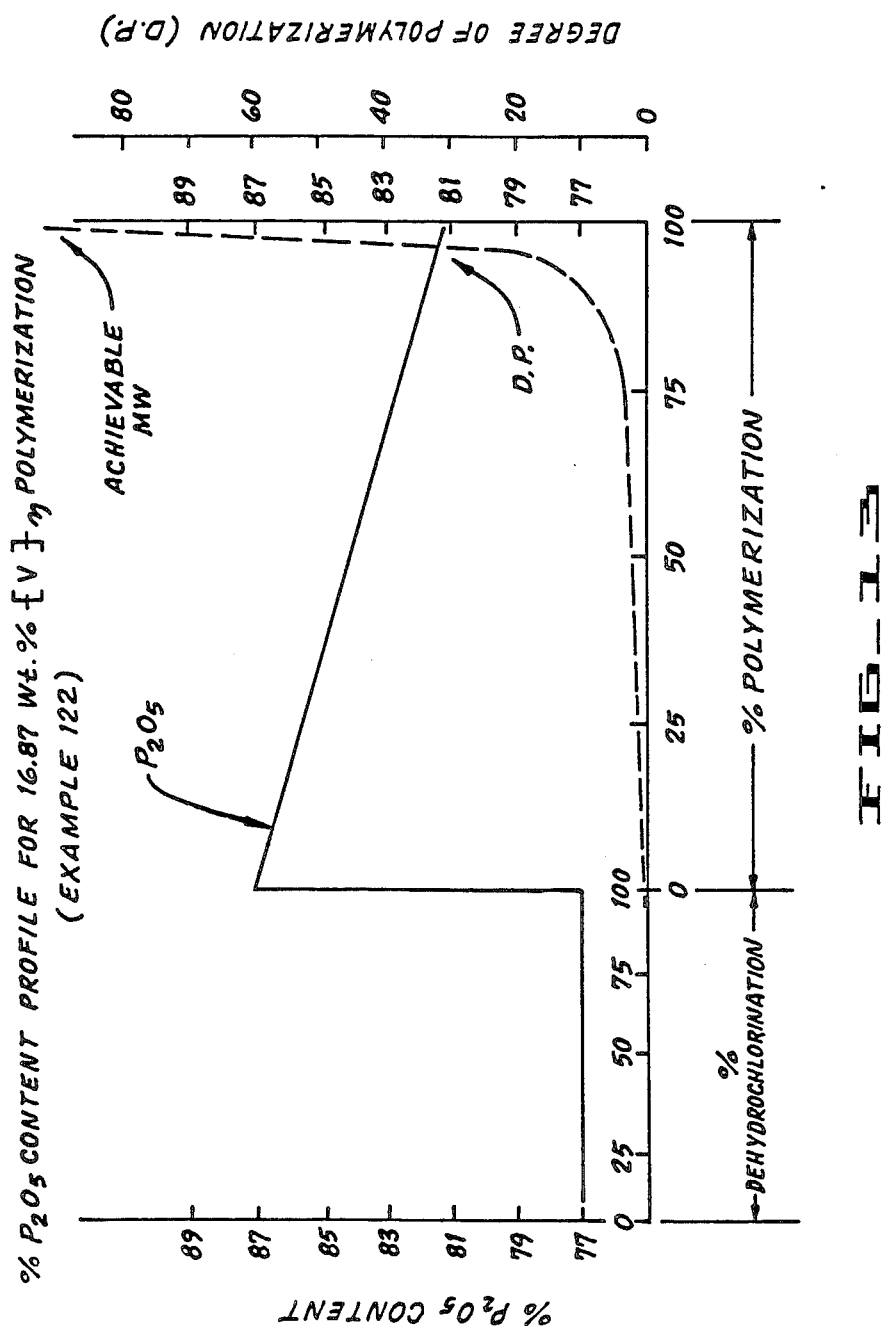
FIG_13

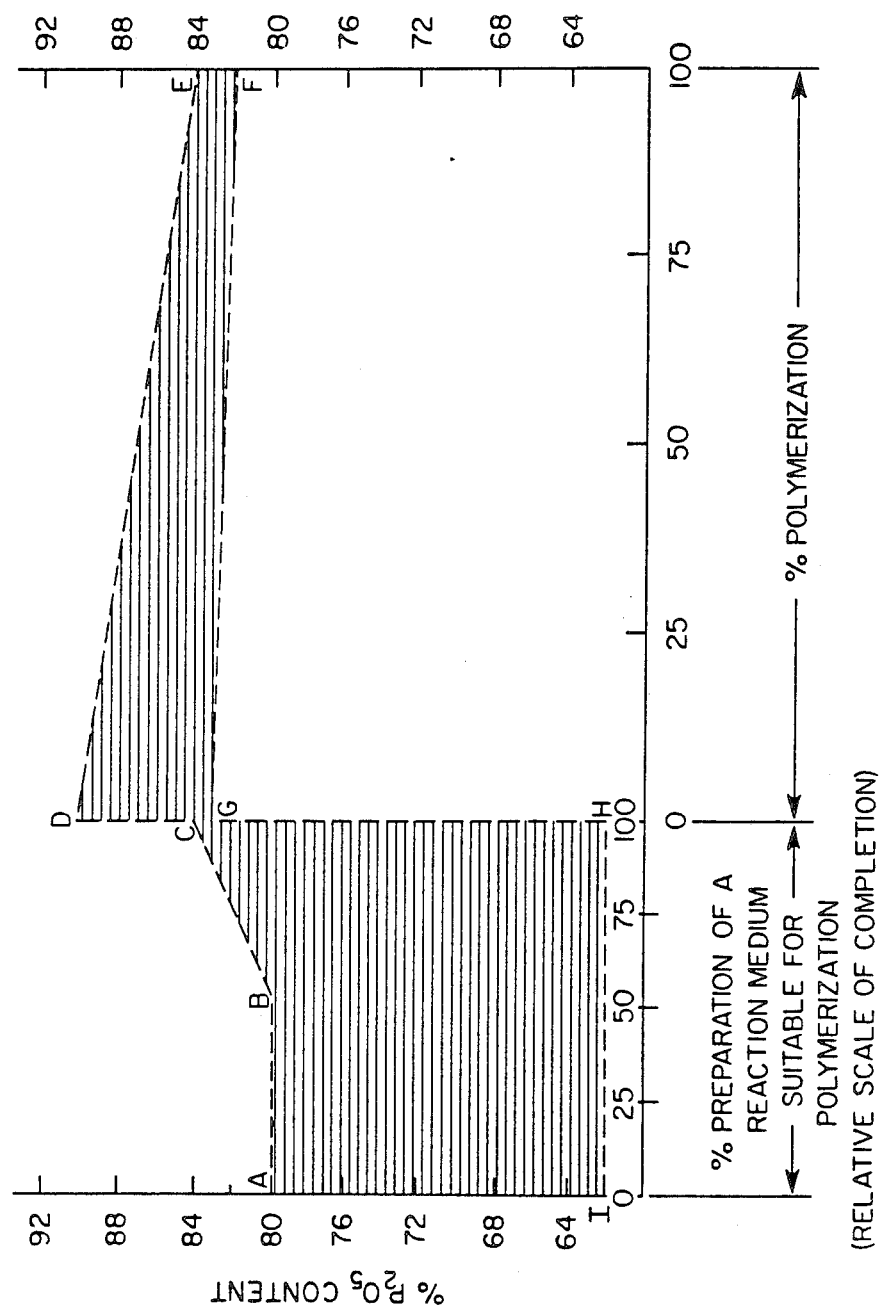

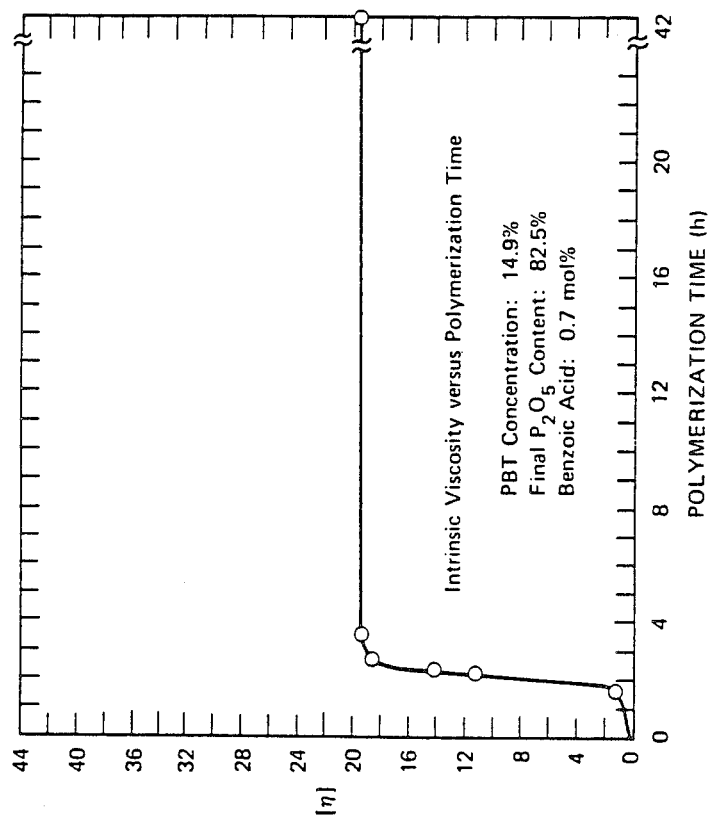
FIG_15

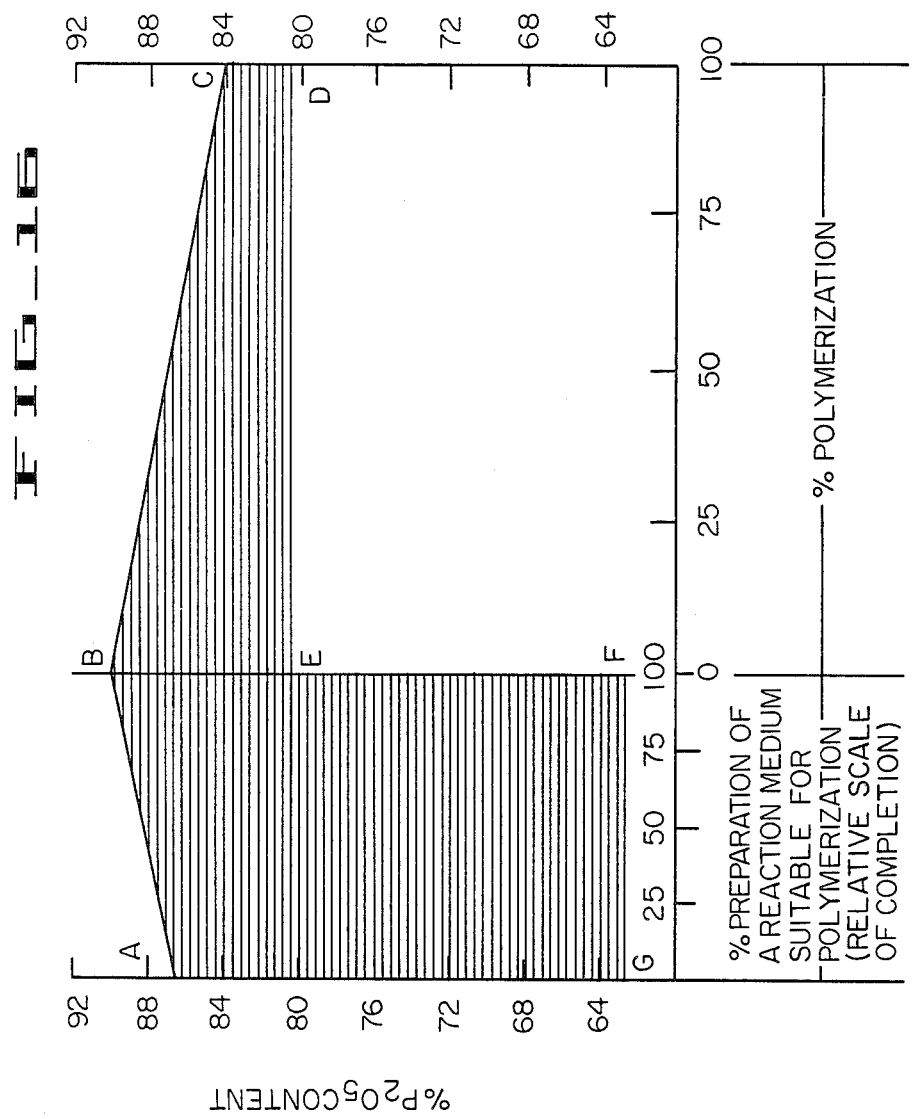

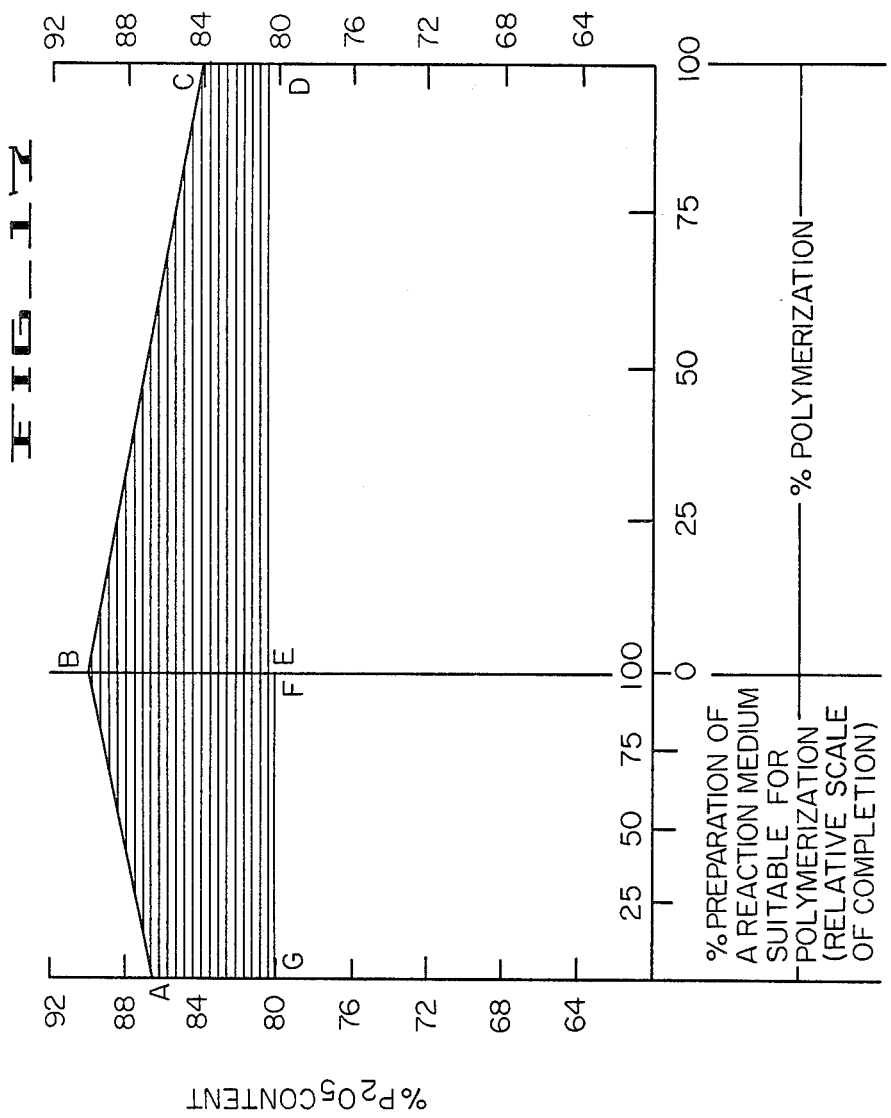

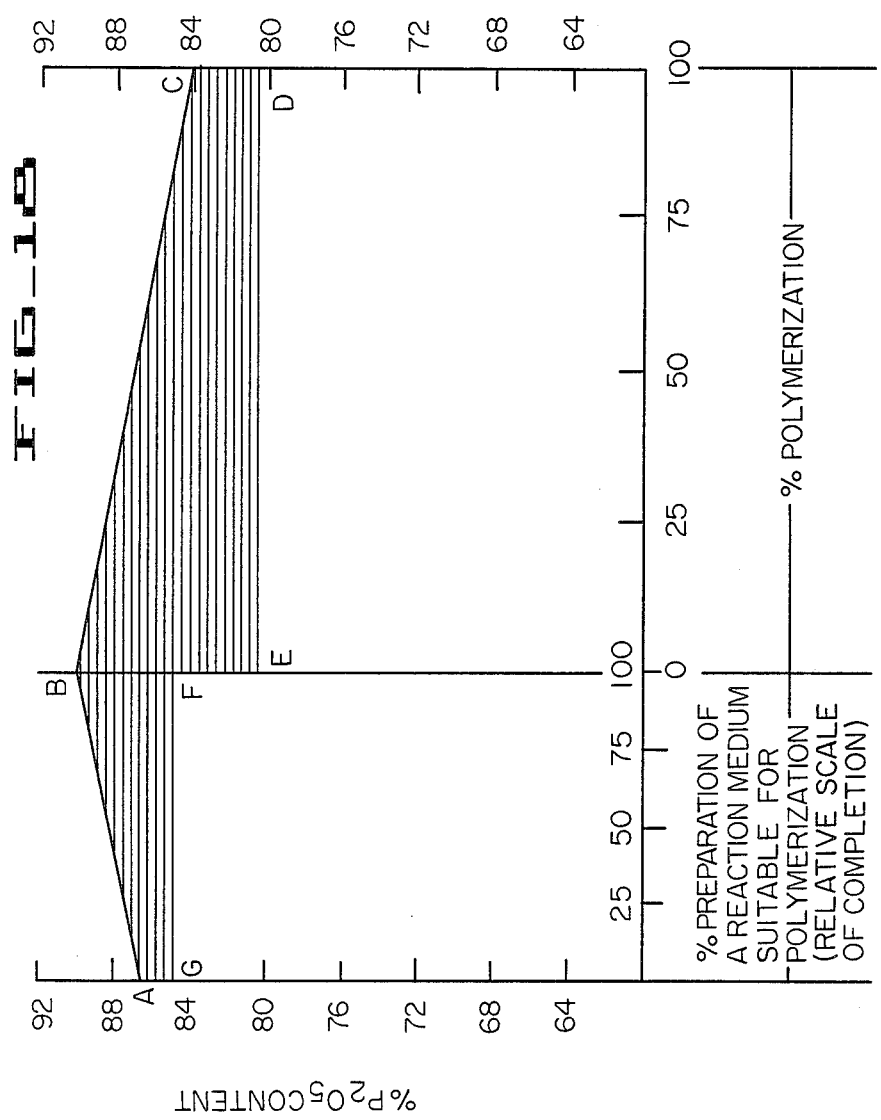

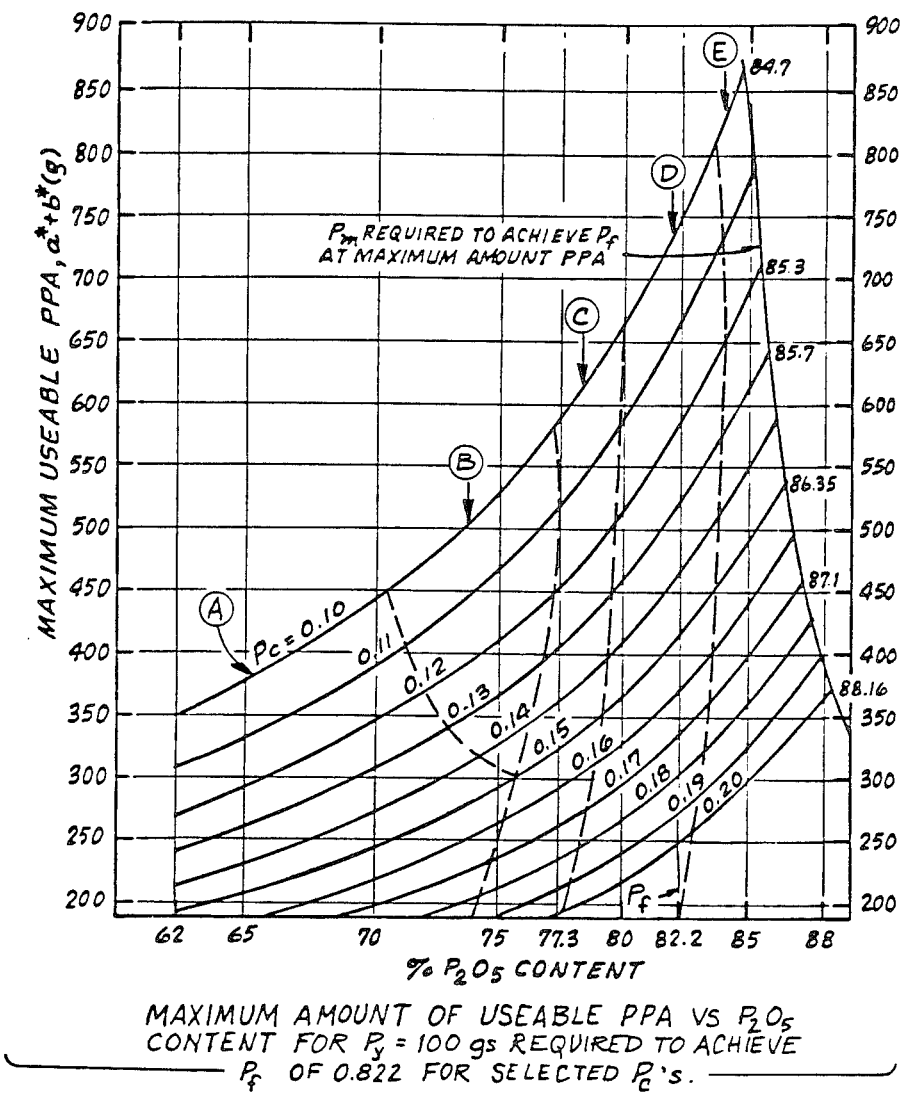
FIG_19

LIQUID CRYSTALLINE POLYMER COMPOSITIONS, PROCESS, AND PRODUCTS

ORIGIN OF INVENTION

The invention described herein was made with Government support under U.S. Department of Defense contract Nos. F33615-81-K-5070, F49620-81-K-0003, F33615-82-C-5079, F49620-83-K-0036, and/or F33615-84-C-5005 awarded by the United States Air Force. The Government has certain rights in this invention.

REFERENCE TO RELATED APPLICATIONS

The present application is a continuation-in-part of application Ser. No. 616,469 filed Sept. 15, 1983 now issued as U.S. Pat. No. 4,533,693, originally filed as PCT application No. PCT/US83/01437 on Sept. 15, 1983 and published as WO 84/01162 on Mar. 29, 1984. Ser. No. 616,469 in turn is a continuation-in-part of Ser. No. 433,831 filed as PCT 83/012285 Sept. 17, 1982, now U.S. Pat. No. 4,533,692, published as WO 84/01160 on Mar. 29, 1984, Section 102(e) date Sept. 17, 1982.

TECHNICAL FIELD OF INVENTION

The present invention relates to a process for the synthesis of high molecular weight extended chain crystalline polymers, to the preparation of novel liquid-crystalline extended chain polymer-strong acid compositions, and to the production of industrially useful polymeric articles such as fibers, fibrids, films and the like.

BACKGROUND OF INVENTION

Reference is made to other co-pending PCT International and corresponding United States patent applications, all assigned to SRI International and having as one of their inventors James F. Wolfe. Said other PCT applications are entitled: "Liquid Crystalline Poly(2,6-benzothiazole) Compositions, Process, and Products", No. PCT/US82/01286, publication No. W084/01161, published with international search report, corresponding U.S. Pat. No. 4,533,724 to issue Aug. 6, 1985; "Liquid Crystalline Polymer Compositions, Process, and Products", No. PCT/US82/01285, publication No. W084/01160, published with international search report, corresponding U.S. Pat. No. 4,533,692 to issue Aug. 6, 1985; "Liquid Crystalline Polymer Compositions, Process, and Products", No. PCT/US83/01437, publication No. W084/01162 published with international search report (in addition, a supplementary European Search Report conducted at The Hague was completed on July 2, 1985), corresponding U.S. Pat. No. 4,533,693 to issue Aug. 6, 1985; "Liquid Crystalline Polymer Compositions, Process, and Products", No. PCT/US85/00258, U.S. application Ser. No. 590,292 having a filing date of Mar. 16, 1984; and "Liquid Crystalline Polymer Compositions, Process, and Products", U.S. application Ser. No. 733,424 having a filing date of Mar. 13, 1985.

The co-pending published PCT International patent applications, accompanying international search reports and the supplementary EPO search report are herein incorporated by reference.

BACKGROUND ART

It is believed that the following references are the nearest known prior art: (1) Choe, U.S. Pat. No. 4,423,202; (2) E. W. Choe, et al., *Macromolecules* 1981, 14, pp 920–924; (3) Wolfe et al., "Rigid-Rod Polymers 2", *Macromolecules* 1981, 14, pp 915–920; (4) Wolfe et al., "Rigid-Rod Polymers 1", *Macromolecules* 1981, 14, pp 909–914; (5) Wolfe et al., U.S. Pat. No. 4,225,700; (6) Cotts et al., *Macromolecules*, 14, pp. 930–934, 1981; (7) Arnold et al., U.S. Pat. No. 3,632,414; (8) Arnold et al., U.S. Pat. No. 4,131,748; (9) Arnold et al., U.S. Pat. No. 4,108,835; (10) Helminiak et al., U.S. Pat. No. 4,207,407; (11) Angelo et al., U.S. Pat. No. 3,449,296; (12) Evers, U.S. Pat. No. 4,359,567; (13) Rudner et al., U.S. Pat. No. 3,424,720; (14) S. R. Allen, et al., *Macromolecules* 1981, 14, pp. 1135–1138; (15) Teijin, Japanese Pat. No. 4,219,270; (16) Teijin, Franch Pat. No. 1,363,757; and (17) Richardson, J. C., U.S. Pat. No. 4,054,633.

The aforementioned publications and patents are herein incorporated by reference.

In general, the class of aromatic heterocyclic extended chain polymers are well-known for their outstanding thermal, physical, and chemical properties. Unfortunately, these polymers are essentially non-melting and have proven very difficult to economically process into articles. In order to fashion such polymers into desired articles of commerce, for example fibers, films, fibrids, and the like, it is necessary that they be in solution or dope form. Although such polymers can be dissolved in various acidic solvents, such as sulfuric acid (SA), methanesulfonic acid (MSA), chlorosulfonic acid (CSA), polyphosphoric acid (PPA), and the like, difficulty is often experienced in preparing and using the polymer-acid compositions or dopes because of poor polymer-acid solubility.

Normally, a precipitated or dried particulate form of the polymer is dissolved in a strong acidic solvent by mixing the (isolated) polymer particles at elevated temperatures and/or under high pressures for a period from several hours to several days. If the polymer is insoluble in the particular solvent, other solvents or various solvent mixtures are employed. Usually, heating and cooling cycles are applied and repeated to obtain a useful dope. The resulting dopes often contain undissolved polymer and must be filtered before further processing into articles.

It is most desirable, therefore, to be able to polymerize this class of polymers in the liquid crystalline state starting from monomer solutions. With the exception of the polymerization of polybenzobisthiazole (PBT) as reported in (3) and (5), it has not been heretofore possible to polymerize this class of polymers in the liquid crystalline state using prior art processes. The polymers and dopes produced by prior art methods (with the exception of PBT dopes) can be characterized as being low molecular weight and in some instances lacking full chain-extension (assuming a flexible coil conformation). With the mentioned exception, all polymer dopes produced by prior art polymerization methods are of low polymer concentration, and isotropic in character.

Insofar as PBT is concerned it is possible to synthesize this polymer in the liquid crystalline state from monomers to give a resultant polymer concentration in the final polymerization mixture near 10% with intrinsic viscosity equal to 26 dL/g (see (3)). The synthesis of high molecular weight PBT at 10% or greater polymer concentration was, however, unknown. High molecular weight PBT could only be synthesized at low monomer levels. One difficulty encountered is that the solution of the 2,5-diamino-1,4-benzenedithiol monomer in polyphosphoric acid with the $P_3O_5$ content described in (5) is very viscous and dehydrohalogenation is difficult and resulted in considerable foaming. Attempts by those skilled in the art to synthesize PBT at high monomer levels resulted in low molecular weight PBT.

In practical terms, prior art polymers and dopes are severely limited in their potential usefulness for the production of highly ordered high molecular weight crystalline polymeric articles.

DISCLOSURE OF THE INVENTION

1. Objects of Invention

Accordingly, it is an object of the present invention to prepare extended chain crystalline polymers, liquid crystalline compositions of such polymers, and crystalline polymeric articles such as fibers, fibrids, films and the like, by a process substantially free of one or more of the disadvantages of prior art.

Another object is to provide a process for preparing liquid crystalline extended chain polymer compositions of high phosphorus pentoxide content from one or more selected monomers.

A further object is to provide a process for preparing high solids content liquid crystalline extended chain polymer compositions exhibiting excellent properties for fiber spinning.

Another object is to provide a process for preparing high solids content liquid crystalline extended chain homopolymer, copolymer, and block polymer compositions.

Yet another object is to provide a process for preparing high molecular weight extended chain crystalline homopolymers, copolymers, and block polymers which are substantially free of amorphous regions.

A still further object is to provide a method whereby the dehydrohalogenation of one or more hydrohalide monomer(s) in a substantially non-oxidizing strong acid can be carried out more easily and rapidly.

Another object is to provide a method for the dehydrohalogenation of a high concentration of one or more hydrohalide monomer(s) in the presence of a substantially non-oxidizing strong acid having high phosphorus pentoxide content.

A still further object is to provide a method whereby the dehydrohalogenation of a highly viscous admixture of one or more hydrohalide monomer(s) and one or more of a substantially non-oxidizing strong acid(s) can be carried out in a controlled manner.

Another object is to alleviate the foaming difficulties encountered previously in the art.

Another object is to provide a method for stabilizing certain monomer(s) in a substantially non-oxidizing strong acid during dehydrohalogenation at elevated temperatures.

A further object is to provide a method for controlling the viscosity of an admixture of one or more hydrohalide monomer(s) in a substantially non-oxidizing strong acid while increasing the phosphorus pentoxide content of the admixture.

Still another object is to provide a method for controllably removing monomer oxidation protecting atoms or groups under selected dehydrohalogenation conditions.

A further object is to provide a process for the continuous production of extended chain homopolymer, copolymer, and block polymer articles such as fibers and films starting with selected monomers.

2. Statement of Invention

In accordance with our discovery, the process of this invention now makes it possible to prepare high molecular weight extended chain crystalline polymers, liquid-crystalline compositions of such polymers, and crystalline polymeric articles from viscous solutions of monomer(s). In general, the solutions are prepared by admixing a high concentration of one or more selected homo- or hetero-bifunctional monomer(s) with oxidation protecting atoms or groups and one or more of a substantially non-oxidizing strong acid(s) having a high or low $P_2O_5$ content. The process involves preparing the admixture at a preselected surface-to-volume ratio and under conditions suitable for the controlled removal of any volatilized oxidation protecting atoms or groups so as to provide a reaction medium suitable for polymerization. The monomer(s) of the admixture are then caused to polymerize to a desired degree by adjusting reaction parameters.

The crystalline polymers and liquid crystalline polymer compositions of the invention are generally produced by the process comprising the following steps:

(a) mixing at least one of a selected first homo- or heterobifunctional monomer(s) with or without oxidation protecting atoms or groups with a preliminary solvent of a substantially non-oxidizing strong acid having a high phosphorus pentoxide content, (b) heating and optionally placing the resulting mixture under reduced pressure to promote the removal of any volatilized protecting atoms or groups present and to provide a first mixture of the first monomer(s) in the preliminary solvent, said mixing and heating steps (a) and (b) being performed sequentially or simultaneously at a selected same or different surface-to-volume ratio(s), said steps (a) and (b) being performed under a selected same or different set of conditions of time, temperature, pressure, rate and amount of said monomer(s) addition, and rate and amount of phosphorus pentoxide addition, said temperature(s) of steps (a) and (b) being sufficient to maintain said mixture at a workable viscosity under said selected set of conditions, said selected surface-to-volume ratio(s) of steps (a) and (b) being sufficient to control the removal of said volatilized protecting atoms or groups under said selected set of conditions, said selected surface-to-volume ratio being greater than $0.2 \text{ cm}^{-1}$, said rate and amount of said monomer(s) addition of steps (a) and (b) being controlled to facilitate the removal of said volatilized protecting atoms or groups under said selected set of conditions, said rate and amount of phosphorus pentoxide addition being controlled to facilitate the removal of said volatilized protecting atoms or groups and prevent decomposition of said monomer(s) due to heating under said selected set of conditions, (c) adding at least one of a selected second monomer(s) in the resulting mixture of step (b) when said selected first monomer(s) is a homo-bifunctional monomer so as to provide a first mixture of the first and second monomers in the preliminary solvent while maintaining said first mixture of the first and second monomers at a workable viscosity, (d) then adjusting the phosphorus pentoxide content of the mixture resulting from step (b) or (c) as necessary to provide a first or a first and second monomer reaction medium of sufficient phosphorus pentoxide content suitable for polymerization and for achieving a degree of polymerization greater than about 40 while maintaining said reaction medium at a workable viscosity, (e) causing polymerization of the first or the first and second monomer(s) at a temperature sufficient to effect reaction at a rate to form a first homo-oligomeric product or a first co-oligomeric product having a preselected intrinsic viscosity, or (f) causing polymerization of the first or the first and second monomer(s) at a temperature sufficient to effect reaction at a rate to form a first homo-polymeric product or a first copolymeric product, (g) mixing a selecting amount of the first homo-oligomeric product with a selected amount of at least one of a selected second homo-oligomeric product so as to form a first poly-oligomeric product, said second homo-oligomeric product being formed by like steps (a) and (b) followed by:

(1g) adding at least one of a selected second monomer(s) in the resulting mixture of step (b) when said selected first monomer is a homo-bifunctional monomer so as to provide a mixture of a first and second monomers in the preliminary solvent, (2g) then adjusting the phosphorus pentoxide content of the mixture resulting from step (b) or (1g) to provide a first or a first and second monomer reaction medium of sufficient phosphorus pentoxide content suitable for polymerization, (3g) causing polymerization of the first or first and second monomer(s) at a temperature sufficient to effect reaction at a rate to form said second homo-oligomeric product having a preselected intrinsic viscosity, with the overall proviso that at least one of the selected monomer(s) of step (a) or (1g) which forms the second homo-oligomeric product be different from at least one of the selected monomer(s) of step (a) or (c) which forms the first homo-oligomeric product, or (h) mixing a selected amount of the first homo-oligomeric product with a selected amount of a second mixture of at least one of a selected first monomer(s) or a first and second monomers in the preliminary solvent so as to form a monomer-oligomer mixture, and then adjusting the phosphorus pentoxide content of said monomer-oligomer mixture as necessary to provide a monomer-oligomer reaction medium of sufficient phosphorus pentoxide content suitable for polymerization, said first monomer of said second mixture being formed by like steps (a) and (b) and said first and second monomer of said second mixture being formed by like steps (a), (b) and (c), with the overall proviso that at least one of the selected monomer of step (a) or (c) which forms the first or first and second monomer(s) of said second mixture be different from at least one of the selected monomer(s) of step (a) or (c) which forms the first homo-oligomeric product, (i) causing polymerization of the poly-oligomeric product resulting from step (g) or the monomer-oligomer resulting from step (h) at a temperature sufficient to effect reaction at a rate to form a first block-oligomeric product having a preselected intrinsic viscosity or a first blockpolymeric product, (j) spinning, drawing, extruding, or casting an article from said first homo-oligomeric product, said first co-oligomeric product, said first homopolymeric product, said first copolymeric product, said first poly-oligomeric product, said second homo-oligomeric product, said first block-oligomeric product, said first block-polymeric product, or mixtures thereof.

In another embodiment of the invention, the molecular weight (characterized by intrinsic viscosity) of said first homo-oligomeric product, said first co-oligomeric product, said first homopolymeric product, said first copolymeric product, said first poly-oligomeric product, said second homo-oligomeric product, said first block-oligomeric product, and said first block-polymeric product is controlled by discontinuing steps (e), (f), (3g), and (i) (which forms said respective products) at an early stage of reaction so as to achieve a preselected low intrinsic viscosity or said steps are continued at a temperature sufficient to effect further reaction to obtain a preselected higher intrinsic viscosity or further heating said products to achieve an intrinsic viscosity closer to the maximum attainable.

In yet a further embodiment of the invention, the molecular weight (characterized by intrinsic viscosity) of those said first homo-oligomeric product, said first co-oligomeric product, said first homopolymeric product, said first copolymeric product, said first poly-oligomeric product, said second homo-oligomeric product, said first block-oligomeric product, and said first block-polymeric product which are formed by the respective reaction steps (e), (f), (3g), and (i) involving the reaction of a selected first and second monomer is controlled by adding a selected excess molar amount of said selected second monomer or more preferably a selected excess molar amount of said selected first monomer or allowing the loss of a small proportion of said selected first or said selected second monomer during said polymerization steps thereby off-balancing the stoichiometry of the monomers to obtain a desired intrinsic viscosity value less than the maximum attainable.

In still another embodiment of the invention, the molecular weight (characterized by intrinsic viscosity) of said first homo-oligomeric product, said first co-oligomeric product, said first homopolymeric product, said first copolymeric product, said first poly-oligomeric product, said second homo-oligomeric product, said first block-oligomeric product, and said first block-polymeric product is controlled by adding of one or more selected monofunctional reactants (as described hereinafter) having a single functional group in steps (a), (b), (c), and (1g) to achieve an intrinsic viscosity less than the maximum attainable.

FIGURES

The invention will be more fully explained with reference to the Figures wherein:

FIG. 1 graphically illustrates the weight stability of as spun polymer fibers of $\{BI\}_n$ (Example 13) and $\{AI\}_n$ (Example 12) with time during isothermal aging in circulating air at 371° C.;

FIG. 2 graphically illustrates the weight stability of precipitated polymers of $\{V\}_n$ (Example 120) and $\{T\}_n$ (Example 27) with time during isothermal aging in circulating air at 371° C.;

FIG. 2a graphically illustrates the weight stability by TGA of block copolymers AI-AN″ (Example 74) and AI-AG″ (Example 73) with temperature in air at a heating rate of 371° C. per minute;

FIG. 3 graphically illustrates the weight stability by TGA of polymers $\{T\}_n$ (Example 27) and $\{V\}_n$ (Example 120) with temperature in helium at a heating rate of 5° C. per minute;

FIG. 4 graphically illustrates the weight stability by TGA of polymers $\text{\textemdash BI\textemdash}_n$ (Example 13) and $\text{\textemdash AI\textemdash}_n$ (Example 12) with temperature in helium at a heating rate of 5° C. per minute;

FIG. 5 graphically illustrates the weight stability by TGA of polymers $\text{\textemdash T\textemdash}_n$ (Example 27) and $\text{\textemdash V\textemdash}_n$ (Example 120) with temperature in air at a heating rate of 5° C. per minute;

FIG. 6 graphically illustrates the weight stability by TGA of polymers $\text{\textemdash BI\textemdash}_n$ (Example 13) and $\text{\textemdash AI\textemdash}_n$ (Example 12) with temperature in air at a heating rate of 5° C. per minute;

FIG. 7 graphically illustrates the relationship of the maximum amount of useable PPA and $P_2O_5$ content for $P_y = 100$ grams required to achieve $P_f$ of 0.822 for selected polymer concentrations (plot of equation a*) showing a region (shaded dash area) of poor solubility for monomer 1a;

FIG. 8 graphically illustrates the %$P_2O_5$ content profile for a 14.8 wt% $\text{\textemdash AI\textemdash}_n$ polymerization (Example 2) showing the limits of achievable molecular weight when starting with a high $P_2O_5$ content preliminary solvent;

FIG. 9 graphically illustrates the %$P_2O_5$ content profile for a 8.6 wt% $\text{\textemdash T\textemdash}_n$ polymerization showing the limits of achievable degree of polymerization when starting with a high $P_2O_5$ content preliminary solvent;

FIG. 10 graphically illustrates a typical %$P_2O_5$ content profile for a 14.5 wt% $\text{\textemdash AI\textemdash}_n$ polymerization (Example 12) showing the advantages of the invention when starting with a low $P_2O_5$ content preliminary solvent followed by an increase of $P_2O_5$ content at the start of polymerization;

FIG. 11 graphically illustrates a typical %$P_2O_5$ content profile for a 14.5 wt% $\text{\textemdash AI\textemdash}_n$ polymerization (Example 12) showing the advantages of the invention when starting with a low $P_2O_5$ content preliminary solvent followed by an increase of $P_2O_5$ content at the start of polymerization;

FIG. 12 graphically illustrates a typical %$P_2O_5$ content profile for a 20.3 wt% $\text{\textemdash T\textemdash}_n$ polymerization (Example 27) showing the advantages of the invention when starting with a low $P_2O_5$ content preliminary solvent followed by an increase of $P_2O_5$ content at the start of polymerization;

FIG. 3 graphically illustrates a typical %$P_2O_5$ content profile for a 16.87 wt% $\text{\textemdash V\textemdash}_n$ polymerization (Example 122) showing the advantages of the invention when starting with a low $P_2O_5$ content preliminary solvent followed by an increase of $P_2O_5$ content at the start of polymerization;

FIG. 14 is a %$P_2O_5$ content profile diagram giving the profile area bounded by ABCDEFGHI of %$P_2O_5$ for achieving the advantages of this invention;

FIG. 15 graphically illustrates the intrinsic viscosity of the end-capped $\text{\textemdash AI\textemdash}$ component of the reaction product as a function of polymerization time showing the advantage of the invention of obtaining a stabilized molecular weight after short polymerization time;

FIG. 16 is a %$P_2O_5$ content profile diagram giving the profile area bounded by ABCDEFGH of %$P_2O_5$ for achieving the advantages of this invention;

FIG. 17 is a %$P_2O_5$ content profile diagram giving the profile area bounded by ABCDEFGH of %$P_2O_5$ for achieving the advantages of this invention;

FIG. 18 is a %$P_2O_5$ content profile diagram giving the profile area bounded by ABCDEFGH of %$P_2O_5$ for achieving the advantages of this invention;

Figure 4:
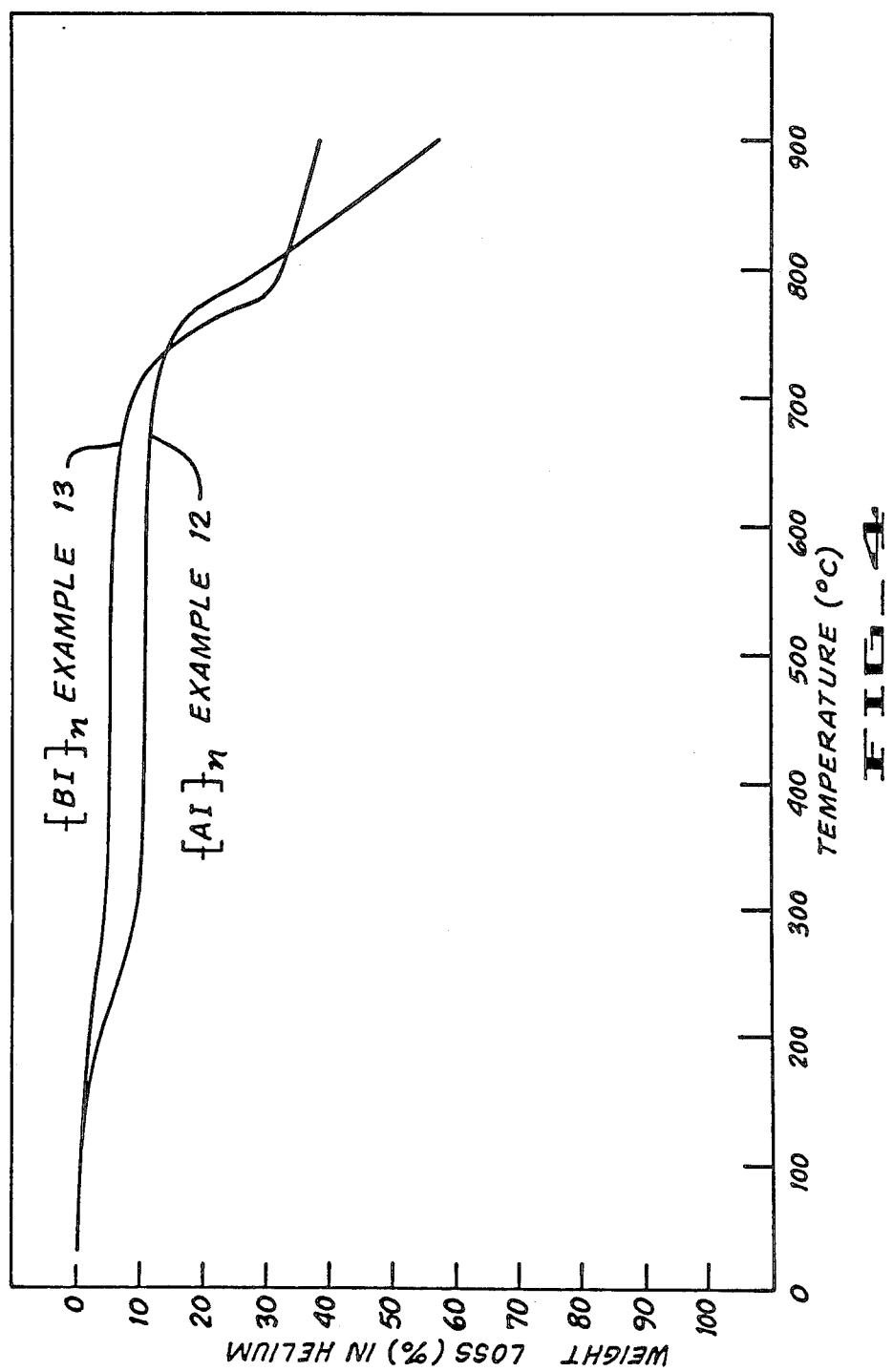
Figure 5:
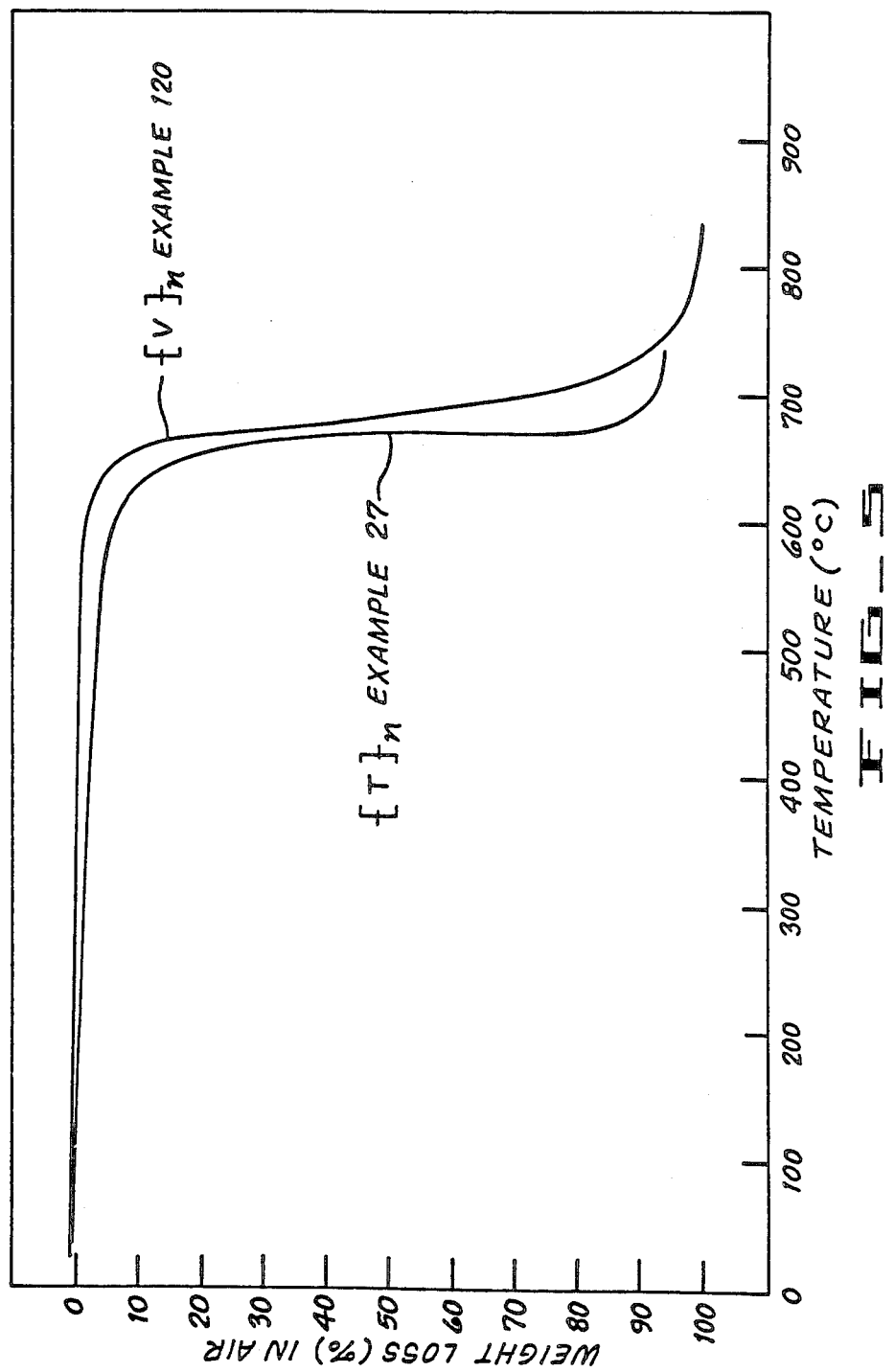
Figure 6:
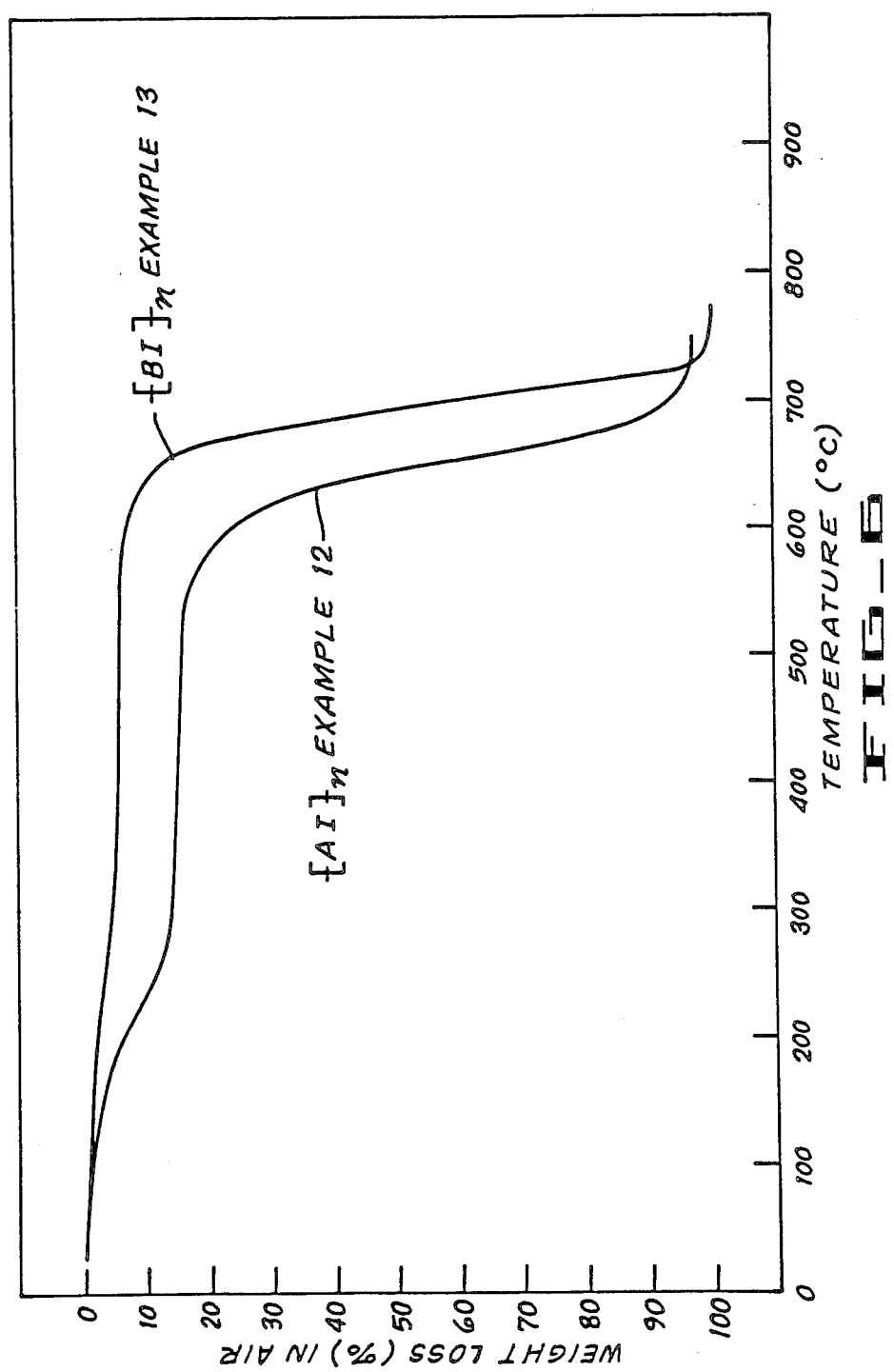

FIG. 19 graphically illustrates various regions (A through E requiring consideration of process parameters) over a family of curves of maximum amount of useable PPA vs. $P_2O_5$ content for $P_y = 100$ grams required to achieve $P_f$ of 0.822 for selected polymer concentrations ($P_c$'s);

MODE(S) FOR CARRYING OUT THE INVENTION

The extended chain polymers of the compositions of the present invention are a class of polymers that can obtain a substantial degree of shape anisotropy in the liquid state due to restricted rotation of bonds in the polymer backbone and/or appropriate catenation geometry of rigid backbone segments. The degree of shape anisotropy is generally defined by the axial ratio, $\rho/d$, where $\rho$ is the persistence length of the chain and d is the diameter of the chain. For extended chain polymers, $\rho$ may be substantially the same as or greater than the contour length l of the polymer. In the case of a rigid rod polymer, $\rho$ is essentially infinite and the axial ratio is l/d.

By the method of the present invention, it is possible to prepare liquid crystalline compositions of extended chain homopolymers, copolymers, or block polymers containing 15 percent or more of polymer. As will appear, the invention is applicable to the preparation of liquid crystalline extended chain polymer compositions of lower polymer concentration but there are special advantages to preparing compositions of high concentration.

Extended chain polymer-strong acid compositions of such higher polymer concentration are advantageous.

For example, if the polymer is one, such as polybenzobisthiazole, polybenzobisoxazole, and polybenzimidazole, capable of forming liquid crystalline compositions at low concentration (e.g., 5–10%), that is, if the critical concentration necessary for formation of the anisotropic phase is low, compositions of even higher polymer concentration can be spun to produce a better quality, higher strength fiber. We believe this results, in part at least, from a more fully anisotropic composition and improved composition integrity. These improvements allow greater drawing in the air-gap, improve the coagulation characteristics, which leads to fewer flaws, and increase polymer throughput when a liquid crystalline composition is spun by a dry-jet-wet spinning technique into a polyphosphoric acid-solvent/polymer-nonsolvent such as methanol, water, or dilute aqueous acid(s).

If the polymer is one, such as poly(2,6-benzothiazole) that is less rodlike in structure than polybenzobisthiazole or polybenzobisoxazole and thus possesses a critical concentration for anisotropic phase formation greater than 10% and in the region of concentrations of this invention, extruding of these heretofore unattainable solutions produces a dramatic increase in strength and modulus because of the ordering of the polymer during this fabrication.

These advantages result in a more highly ordered, lower-defect fiber than results from spinning a less concentrated composition of polymers.

Another advantage of preparation of these polymers in the anisotropic phase is a considerable increase in the molecular weight of the polymer obtained.

In instances where extended chain polymers have a preselected low molecular weight, medium molecular weight, or ultra-high molecular weight (up to the maximum obtainable) are desired, the present invention is most advantageous. Extended chain polymers of essentially any desired molecular weight (characterized by intrinsic viscosity) up to the maximum attainable can be prepared in the liquid crystalline phase without substantial difficulty.

Preferrably, molecular weight is controlled by discontinuing said polymerization at a selected degree of polymerization, more preferrably, by off-balancing the stoichiometric proportion of monomers (i.e., adding a selected excess amount of one bifunctional reactant AA or BB) at a selected stage of polymerization, and most preferrably, by the addition of one or more suitable monofunctional reactants in selected amounts and at a selected stage of polymerization.

The following convention is utilized to characterize the molecular weights (in terms of intrinsic viscosity) of polymers produced by the process of the invention:

| intrinsic viscosity in MSA at 30° C. | molecular weight |
| --- | --- |
| <4 dL/g | very low |
| 4 to <10 dL/g | low |
| 10 to <20 dL/g | medium |
| 20 to <25 dL/g | high |
| 25 to 50 dL/g | very high |
| <50 dL/g | Ultra-high |

In instance where the extended chain polymer molecular weight must be maintained at a level below the maximum attainable, for example, if additional heating is necessary to effect storage and/or transfer of polymer dope from reactor to spinning lines or to carry out procedures such as filtering, degassing, and the like and that such heating will induce further polymerization which may be undesirable, then preparation of such polymers in accordance with the practice of the invention is advantageous.

The liquid crystalline compositions prepared by the process of the invention exhibit special properties which make them very useful as dopes in the production of fibers, films, fibrids, and the like. In addition, the compositions have novel combination of properties including unexpectedly high spin-stretchability and excellent cohesive strength, as well as having the capability of being drawn through short, as well as extremely long, air-gap distances, and spun at low, as well as exceptionally high, draw ratios. It is believed that these properties can be attributed to the combination of high polymer concentration, substantially high polymer molecular weight, and a high phosphorus pentoxide content. The polymer concentration of the compositions of the invention can range from about 10% or less to about 30% or more based on the weight of the composition. The process can be use to prepare liquid crystalline compositions of any desired viscosity.

In accordance with the practice of the invention, the liquid crystalline compositions (depending on polymer concentration and molecular weight) can have (bulk) viscosities over a wide range from about 3,000 to about 1,500,000 poise, preferably from about 10,000 to about 150,000 poise, more preferrably from about 20,000 to about 80,000, and most preferrably between about 20,000 to about 40,000 poise.

The bulk viscosities of the compositions of the invention can be measured, over a broad range, using a RMS-605 Mechanical Spectrometer with a 2.5-cm Hastelloy cone and plate under N2 in a suitable oven, modified to prevent the introduction of water vapor. The modified cone and plate can be utilized to measure viscosities from 0.1 poise to 5,000,000 poise. The cone and plate includes a "moat" containing silicone oil built into the plate, onto which a concentric ring is attached to the cone assembly. The torque generated by viscous drag on the vapor barrier is less than 1 g cm. Measurement of the viscosity of neat PPA using the modified cone and plate shows no change over an 8 h period, confirming that this device does successfully exclude moisture when the sample is introduced anhydrously. Steady-state and dynamic viscosity measurements can be made over a range of shear rates.

Strong acids are generally characterized as highly polar solvents. Although various strong acids may be used as solvents to carry out the dehydrohalogenation of some of the monomers of the process, the resultant acid-monomer solutions, in most instances, can not be converted or converted with great difficulty into reaction mediums suitable for polymerization.

As a practical matter and an essential aspects of the invention, the strong acids selected for use in the process of the invention must not only be effective as a dehydrohalogenation solvent but also can be converted into an effective reaction medium suitable for polymerization. Polyphosphoric acid has been found to be suitable for the process of the invention and is the most preferred because of its compatability with the preferred monomers, its effectiveness as solvent for carrying out the various steps of the invention, and its substantially non-oxidative nature for the preferred monomers and resultant polymers of polycondensation.

Preliminarily it is helpful to describe the chemistry of phosphoric acids and strong phosphoric acids or polyphosphoric acids as follows:

As used herein the term "phosphoric acid(s)" means commercial phosphoric acid(s) containing 85–86% $H_3PO_4$.

The strong phosphoric acids, or polyphosphoric acids referred to as PPA (polyphosphoric acid) are members of a continuous series of amorphous condensed phosphoric acid mixtures given by the formula

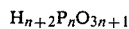

or

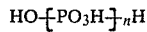

where the value of n depends on the molar ratio of water to phosphorus pentoxide present.

Characterization and methods of forming various polyphosphoric acids and examples of such strong acids useful in accordance with the practice of the present invention can be found in the following papers: A. L. Huhti and P. A. Gartaganis, "The Composition of the Strong Phosphoric Acids", Can. J. Chem., 34: 785–797, 1956; and J. E. Such, "Linear Polyphosphoric Acids", Mellar's Comprehensive Treatise on Inorganic and Theoretical Chemistry, vol. VIII, Supp. III, (Sections X–XXVII) pp. 387–759, 1971; and Kirk-Othmer's "Encyclopedia of Chemical Technology", 3rd ed., vol. 17, pp. 428–451, 1982; Pizey, J. S., "Synthetic Reagents"-/Vol. 6, Ch. 3, 1985. The subject matter of these articles are specifically incorporated herein by reference.

In its most general definition, polyphosphoric acid composition can range from distributions where the average value of n is less than unity, giving rise to a mobile liquid, to high values of n, where the polyphosphoric acid is a glass at normal temperatures. Because the species of polyphosphoric acid are in a mobile equilibrium, a given equilibrium composition can be prepared in many ways. For instance, the same distribution or polyphosphoric acid composition could be prepared by either starting with concentrated orthophosphoric acid ($H_3PO_4$, n=1) and driving off water or by starting with phosphorus pentoxide ($P_2O_5$) and adding an appropriate amount of water.

All polyphosphoric acid compositions can be described as a ratio of $P_2O_5$ and water by reducing the various species present (on paper) to $P_2O_5$ and water. We will then use the convention that polyphosphoric acid composition will be expressed in terms of a $P_2O_5$ content (as a percentage) defined as $P_2O_5$ content $$= \frac{\text{weight of } P_2O_5}{\text{weight of } P_2O_5 + \text{weight of } H_2O} \times 100$$

Thus, the $P_2O_5$ content of pure orthophosphoric acid could be derived by reducing one mole of $H_3PO_4$ to 0.5 moles $P_2O_5$ + 1.5 moles $H_2O$. Converting to weights gives the $P_2O_5$ content as $$\frac{0.5(142)}{0.5(142) + 1.5(18.01)} \times 100 = 72.4\%$$

Similarly, the $P_2O_5$ content of commercial polyphosphoric acid can be derived in the following way. Polyphosphoric acid is available commercially in two grades, 105% and 115%. These percentages refer to $H_3PO_4$ content, which means that 100 g of the two grades contain 105 and 115 grams of $H_3PO_4$. The $P_2O_5$ content of 115% polyphosphoric acid can then be calculated knowing the $P_2O_5$ content of 100% $H_3PO_4$.

$$\frac{115(0.724)}{100} \times 100 = 83.3\%$$

Freshly prepared polyphosphoric acid as described by Wolfe and Loo U.S. Pat. No. 4,225,700 employed 1.52×g of $P_2O_5$ to x grams of 85.6% $H_3PO_4$, thus the $P_2O_5$ content of that mixture is $$\frac{(1.52X) + (0.856)(0.724)X}{2.52X} \times 100 = 84.9\%$$

Thus, polyphosphoric acid compositions, by our definition, equivalent to these three examples could be prepared in principle by starting with $P_2O_5$ and adding 27.6, 14.8, and 15.1% by weight of water.

In certain instances one or more alkanesulfonic acids (e.g., methanesulfonic acid, ethanesulfonic acid, propanesulfonic acid, butanesulfonic acid, pentanesulfonic acid, hexanesulfonic acid, trifluoromethanesulfonic acid and the like) will work as a suitable dehydrohalogenation solvent. We have found, however, that before the alkanesulfonic acids can be converted into a reaction medium and utilized, phosphorus pentoxide must be added in sufficient amounts for polycondensation.

We have found that when any of the alkanesulfonic acids are employed, the proportion of phosphorus pentoxide should be at least about 30% by weight of the alkanesulfonic acid(s) and may range from between about 30% to about 70%, preferably between about 35% to about 60%, more preferably between about 35% to about 50% and most preferably between about 35% to about 45%. Alkanesulfonic acids are especially suited for use in the polymerization of some of the more oxidation resistant monomers of the invention.

The use of alkanesulfonic acids should be avoided when polymerizing certain monomers such as 2,5-diamino-1,4-benzenedithiol dihydrochloride and the like. These monomers are highly susceptible to thermal oxidation in the presence of a major amount of alkanesulfonic acids when heated above 100° C. When preparing a reaction medium of a heat sensitive monomer, the amount of any of the alkanesulfonic acids present should be less than about 10%, preferably less than 5%, and most preferably less than 2%.

Solvent mixtures of one or more alkanesulfonic acid(s) and polyphosphoric acid having an effective $P_2O_5$ content are also contemplated as useful in the present process.

The alkanesulfonic acids employed in the process of the invention are available from various sources such as Stepan Chemical Co., Onyx Chemical Co., Conoco Chemical Co., Richardson Co., Kodak Laboratory Chemicals, etc. The chemistry for making these acids are well known to those skilled in the art (e.g., Kirk-Othmer, "Encyclopedia of Chemical Technology", 3rd Ed., Vol. 22, pp. 45–63, 1982.). The alkanesulfonic acids should be technical grade, preferrably reagent grade and should be distilled before use. Distillation under vacuum is especially preferred to avoid thermal decomposition at high temperatures.

In using alkanesulfonic acids, the volatility of these acids must be must be controlled during polymerization, but can be of advantage in the spinning of fibers and the extrusion of films. The alkanesulfonic acids can be removed, for example, during dry spinning before coagulation is initiated (i.e., in the air gap). The two-stage removal of the solvent can improve the skin-core formation to begin before the fiber enters the coagulation bath and accelerate the collapse of the polymer on itself, which would give better mechanical properties such as compressive strength, and would provide a method to recycle the acids.

A common factor of the (suitable) strong acids "systems" (i.e., (1) polyphosphoric acid/alkanesulfonic acids, (2) alkanesulfonic acid(s)-$P_2O_5$, and (3) polyphosphoric acid) employed in the process of the invention which makes them effective as solvents for carrying out the various steps of the invention is the "total" concentration of solvent reactive species and monomer reactive species; they must be high enough to give a rate of polymerization that can effectively compete with side reactions.

In the absence of side reactions lower concentrations of the solvent reactive species leads to a lower rate of polymerization and longer times to achieve the desired polymer molecular weight. In all three systems, dehydrohalogenation (which activates the monomer reactive spcecies) can take place irrespective of the $P_2O_5$ content of the solvent. The preliminary solvent, however, must be converted in situ to a reaction medium suitable for polymerization in which there is a sufficient concentration of the solvent reactive species.

From a theoretical point of view, the relationship of $P_2O_5$ content on the effectiveness of the three systems to carry out polymerization is not well understood. This difficulty, we believe, is due in part to the differences in solvent reactive species presence in the three systems. The three systems undoubtedly have different rate constants for the polymerization step and have to different side reactions (such as oxidation of sensitive monomers in alkanesulfonic acids) with different reaction rates.

We have found, however, PPA must have a concentration of solvent reactive species (i.e., triphosphoric acid and higher oligomers such as tetra-, penta-, hexa-, heptaphosphoric acid etc.) of greater than 60% at the end of polymerization in order to obtain sufficient reaction rate. PPA loses its solvent power at a higher $P_2O_5$ content than does alkanesuflfonic acid/$P_2O_5$ (e.g., MSA/$P_2O_5$) because $H_3PO_4$ is not a good solvent for polymers of the invention whereas MSA is. If we assume that the reactive species in MSA/$P_2O_5$ is a mixed anhydride of $P_2O_5$ and MSA with a molecular weight of 334.16 then a 30–40 wt % $P_2O_5$ in MSA mixture contains 70 to 94% of the solvent reactive species at the beginning of the reaction and with the water of condensation this goes to comparable levels of the solvent reactive species at the end of the polymerization.

In any case, there must be a sufficiently high level of solvent reactive species at the end of the polymerization, and that level is near about 60 wt %.

Any monomeric material or mixture of monomeric materials having the ability to react in polyphosphoric acid and mixtures of polyphosphoric acid or $P_2O_5$ and alkanesulfonic acids to form the extended chain polymers (i.e., the above formulas I-VIII homopolymers, and the various formulas IX-XIX copolymers and block polymers herein defined in the specification) of this invention can be utilized.

In general, suitable monomeric materials selected for use in forming liquid-crystalline extended chain polymer compositions of the present invention are of nine types as described below. Type 1, 2, 4, 6, 7, and 8 are homo-bifunctional monomers. Type 3, 5, and 9 are heterobifunctional monomers.

Type 1 monomers has the general formula

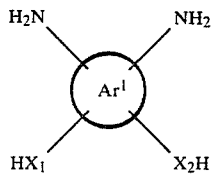

wherein $Ar^1$ is an aromatic moiety; $X_1$ and $X_2$ are the same or different atoms or groups selected from the class O, S, and NR; R is hydrogen or an organic group attached to N; the R's on the two nitrogen atoms where both $X_1$ and $X_2$ are NR may be the same or different; $NH_2$, $X_1H$ and $X_2H$ are bonded to aromatic carbon atoms of $Ar^1$; the groups on the left side of $Ar^1$ are ortho with respect to one another and the groups on the right side of $Ar^1$ are ortho with respect to one another.

The two sets of $NH_2$ and XH are each considered a functional group and are positioned on $Ar^1$ such that they do not both interact partially with the appropriate condensing moiety of another monomer. Monomer 1 is typically isolated as a hydrohalide salt of the monomer. Type 1 monomers are homobifunctiional, by definition, whether or not $X_1$ and $X_2$ are the same of different.

In general, $Ar^1$ may be any aromatic moiety (carbocyclic or heterocyclic) and it may be a single ring such as

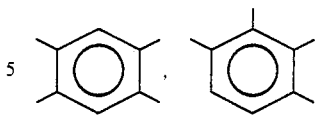

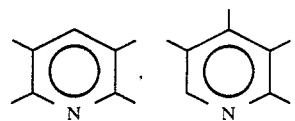

or it may comprise a plurality of aromatic rings connected by valence bonds or by linking atoms or groups such as

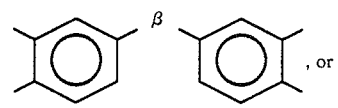

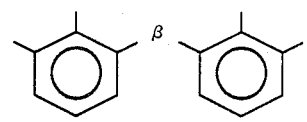

where $\beta$ is a valence bond (as in diphenyl) or a divalent atom (—O— or —S—) or group such as —NR—(R=H or an organic group), —(CH$_2$)$_n$— (N=1 or a higher integer). Specific examples of $Ar^1$ are as follows:

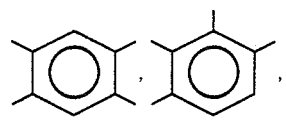

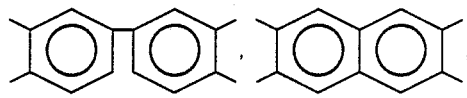

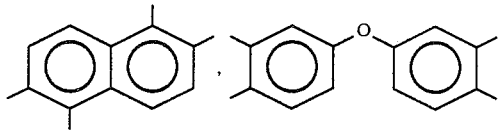

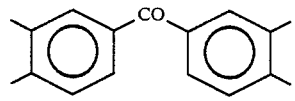

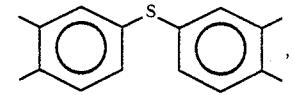

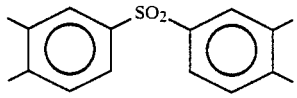

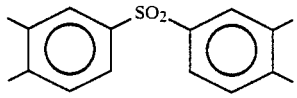

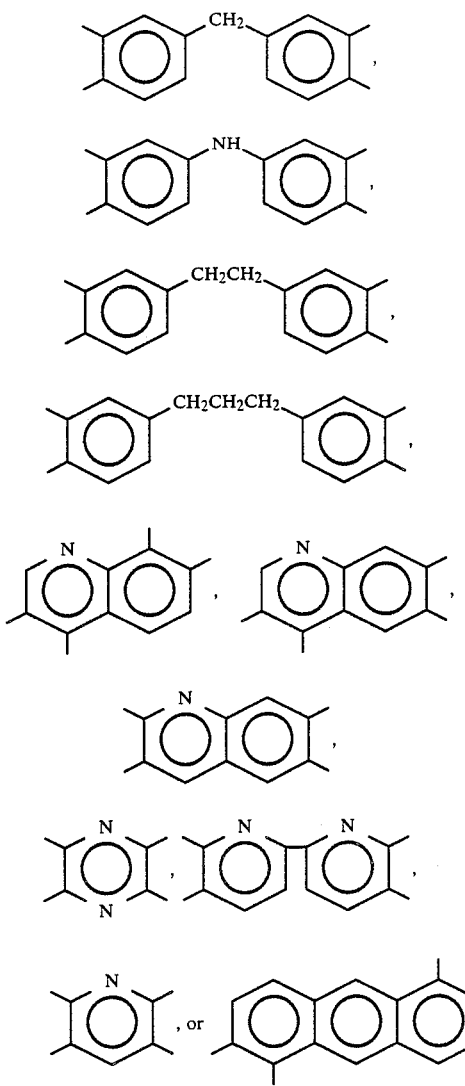

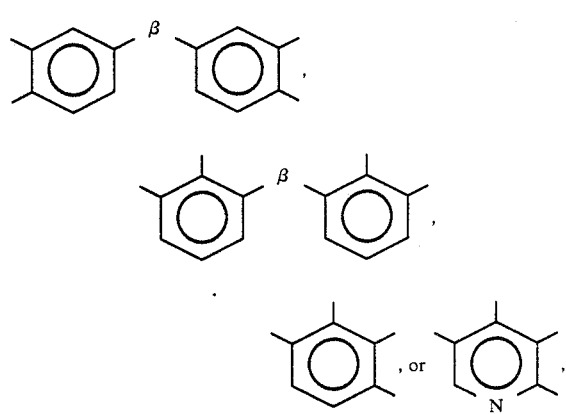

The aromatic ring or rings of $Ar^1$, such as those described above and others, may bear one or more substituent. These substituents, which may be organic or inorganic may be or may contain hetero atoms, may be any atom or group which is compatible with the reactant, the solvent, the polycondensation reaction and the resulting oligomer or polymer. Substituents which are chemically reactive with Types 2 thru 9 monomers (see below), with the solvent (PPA) or with the oligomeric or polymeric products are to be avoided. Also, substituents which offer steric hindrance to the polycondensation are to be avoided.

Among permissible hydrocarbon substituents are alkyl (e.g., $C_1$ to $C_{10}$ straight chain and branched chain alkyl, benzyl, etc.), phenyl, chloro substituted alkyl, phenyl and benzyl. Among permissible hetero substituents are chloro, bromo, nitro, alkoxy, aryloxy, $SO_3H$, SR, and $-NR_1R_2$ ($R_1$ and $R_2$ being organic groups).

Formula 1 monomers useful in preparing the extended chain polymers and novel liquid-crystalline compositions of the instant invention may also further be classified into three groups: Class 1 (1,1), Class 2 (1,2), and Class 3 (1,3). The first number of the number pairs denotes the monomer type and the second number of the pairs denotes the monomer class.

The preferred (1,1) monomers are those wherein $Ar^1$ is a six-membered aromatic ring with the four valence positions being on carbon atoms having a 1,2,4,5 relationship to each other, such as 1,2,4,5-benzene 2,3,5,6-pyridine; R is H or a monovalent aromatic radical, such as phenyl, or a monovalent heteroaromatic radical, such as 2-pyridyl, or a monovalent aliphatic radical, such as methyl. Monomers (1,1) which when reacted with a diacid or a diacid derivative give two substantially collinear bonds are most preferred.

The preferred (1,2) monomers are those wherein $Ar^1$ is two six-membered aromatic rings attached by a covalent carbon-carbon bond each with valences on carbon atoms in the 3 and 4 positions, such as 3,3',4,4'-biphenyl or 4,4',5,5'-(2,2'-bipyridyl), or $Ar^1$ is two fused six-membered rings with valence positions being on carbon atoms and having a 1,2,5,6 relationship to each other, such as 1,2,5,6-naphthalene. The four functional groups attached to the valence positions of $Ar^1$ by covalent bonds comprise two amino groups and the groups $-X_1H$ and $-X_2H$ such that one amino group is ortho to $-X_1H$ and the other amino group is ortho to $X_2H$ and $X_1H$ is attached to either the 3 or 4 position in the first case or the 1 or 2 position in the second case and $-X_2H$ is attached to either the 3' or 4' position in the first case and the 5 or 6 position in the second case. $X_1$ and $X_2$ are defined as above.

The preferred (1,3) monomers are those wherein $Ar^1$ is any aromatic moiety with two sets of ortho-valences at carbon atoms, such as wherein $\beta$ is a bivalent aromatic or heteroaromatic moiety, O, S, $SO_2$, C=O, $-CH_2CH_2-$, etc.

The four functional groups attached to the valence positions of $Ar^1$ are divided into two sets ($NH_2$ and $X_1H$) and ($NH_2$ and $X_2H$) with the functional groups within each set being positioned ortho to each other and the two sets positioned on $Ar^1$ such that they cannot simultaneously react with the same functional group of another monomer. $X_1$ and $X_2$ are defined as above.

Type 2 monomers have the general formula $$Z_1-Y_2-Z_2 \qquad 2$$

wherein $Y_2$ is a bivalent organic group and $Z_1$ and $Z_2$ are electron-deficient carbon groups and may be the same or different groups selected from the following class:

| | | | |
|---|---|---|---|
| —COOH | —CSSH | —COBr | —CSI |
| —CSOH | —COCl | —CSBr | —CONHR₁ |
| —COSH | —CSCl | —COI | —CSNHR₁ |
| | | | —CN |

5

($R_1$=H or an organic group bonded to N by a carbon atom)

The only requirement of $Z_1$ and $Z_2$ is that they react with the $X_1H$ and $X_2H$ and with the two hydrogen atoms of the primary amino groups of Type 1 monomers to form suitable leaving entities, such as water, hydrogen sulfide, hydrogen halide, ammonia, etc. Type two monomers are homobifunctional, by definition, whether or not $Z_1$ and $Z_2$ are the same or different. The bivalent group $Y^2$ may be an aromatic group, an acyclic aliphatic group, or a cycloaliphatic group, and such groups may be substituted by hydrocarbon groups (aliphatic or aromatic) and by hetero atoms and groups. In general any of groups described above as substituents of the aromatic ring or rings of $Ar^1$ may be used subject to the same restrictions.

Formula 2 monomers useful in preparing the extended chain polymers and novel liquid-crystalline compositions of the instant invention may also further be classified into three groups: Class 1 (2,1), Class 2 (2,2), and Class 3 (2,3). The first number of the number pairs denotes the monomer type and the second number of the pairs denotes the monomer class.

The preferred (2,1) monomers are those wherein $Y^2$ is nil, or $Y^2$ comprise at least two carbon atoms to which are attached $Z_1$ and $Z_2$ such that the two exocyclic bonds between $Y^2$ and $Z_1$ and between $Y^2$ and $Z_2$ have a rigid and fixed relationship to each other and are substantially collinear, or $Y^2$ may also be a cycloaliphatic group that has at least two carbon atoms to which are attached $Z_1$ and $Z_2$ such that the two bonds between $Y^2$ and $Z_1$ and between $Y^2$ and $Z_2$ have a highly preferred relationship to each other that is substantially collinear. Carboxylic acid derivatives of 2j-2q and 2z (as herein described below) such as COOH that decarboxylate at temperatures below that required for polycondensation with Type 1 monomers are less preferred.

The preferred (2,2) monomers are those wherein $Y^2$ comprise two six-membered rings attached by a covalent carbon-carbon bond each with valences on the 4-position or each with valences on the 3-position, such as 4,4'-biphenyl or 3,3'-biphenyl, or $Y^2$ comprise two fused six-membered rings with valence positions being on carbon atoms and having a 1,5 relationship to each other, such as 2,6-naphthalene or 2,6-quinoline, or $Y^2$ is a cycloaliphatic divalent moiety with valences on carbon atoms and in a 1,2-trans configuration, or $Y^2$ is a variety of condensed aromatic and heteroaromatic ring systems attached only by carbon-carbon bonds and having 2 valences, $Z_1$ and $Z_2$ are the same as defined above.

The preferred (2,3) monomers are those wherein $Y^2$ may be any aromatic, heteroaromatic and aliphatic divalent species not previously described.

Type 3 monomers have the general formula

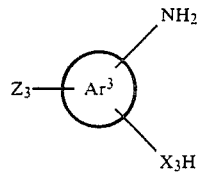

3 wherein $Ar^3$ is a trivalent aromatic or heteroaromatic moiety, and $X_3$ is O, S, or N—R (R=H or an organic group). Type 3 monomers are heterobifunctional, by definition.

Formula 3 monomers useful in preparing the extended chain polymers and novel liquid-crystalline compositions of the instant invention may also further be classified into two groups: Class 1 (3,1) and Class 2 (3,2). The first number of the number pairs denotes the monomer type and the second number of the pairs denotes the monomer class.

The preferred (3,1) monomers are those wherein $Z_3$ is the same as defined for $Z_1$, $Ar^3$ is a trivalent aromatic or heteroaromatic moiety with the three valence positions being on carbon atoms and having the relationship that the valence bond between $Z_3$ and $Ar^3$ is nearly collinear with the same valence bond in subsequently condensed monomers, and $X_3$ is defined as for $X_1$ in Table 1. $X_3$ and $NH_2$ are positioned ortho to each other on $Ar^3$.

The preferred (3,2) monomers are those wherein $Z_3$, $Ar^3$, and $X_3$ are defined as above. The bonds that are formed in homopolymerization of (3,2) monomers are defined in their spatial relationship having an angle of catenation of less than about 150° to about 180°.

Type 4 monomers have the general formula

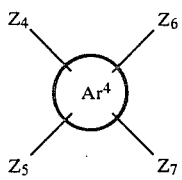

4 wherein $Z_4$, $Z_5$, $Z_6$, and $Z_7$ are the same or different and are chosen from the list of carboxylic acid derivatives given for $Z_1$ in Table 4. $Z_4$ and $Z_5$, or $Z_6$ and $Z_7$, or both sets can also be carboxylic acid anhydride groups. $Z_4$ and $Z_5$ are defined as one functional group (as are $Z_6$ and $Z_7$) and thus Type 4 monomers are homobifunctional by definition, whether or not $Z_4$, $Z_5$, $Z_6$ and $Z_7$ are the same or different. $Ar^4$ is an aromatic or aromatic heterocyclic moiety having four valence positions at carbon atoms. $Ar^4$ can be a six-member ring with the valence positions having 1,2,4,5 relationship, or $Ar^4$ can be two condensed six-member rings, such as naphthalene. $Z_4$ and $Z_5$ as one set and $Z_6$ and $Z_7$ as another set must either be ortho-positioned within each set or bear a 1,4,5,8 relationahip to each other. An (imaginary) line perpendicular to the bond between the valence carbons attached to $Z_4$ and $Z_5$ must be collinear with the corresponding (imaginary) line for $Z_6$ and $Z_7$.

Formula 4 monomers useful in preparing the extended chain polymers and novel liquid-crystalline compositions of the instant invention are classified as Class 1 (4,1). The first number of the number pairs denotes the monomer type and the second number of the pairs denotes the monomer class.

Type 5 monomers have the general formula

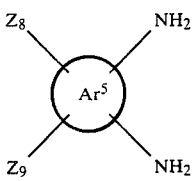

wherein $Z_8$ and $Z_9$ are defined as for $Z_4$ and $Z_5$ in Table 9, $Ar^5$ is defined as in Table 9, the two amino groups are ortho to each other, and $Z_8$, $Z_9$, and the two amino groups are positioned such that two imaginary lines drawn perpendicular to the bonds between their valence carbons are collinear. Type 5 monomers are heterobifunctional, by definition.

Formula 5 monomers useful in preparing the extended chain polymers and novel liquid-crystalline compositions of the instant invention are classified as Class 1 (5,1). The number pair (5,1) has the same significance as above.

Type 6 monomers have the general formula

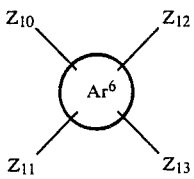

wherein $Ar^6$ represents an aromatic moiety and is a tetrahydroxy fused ring system, $Z_{10}$, $Z_{11}$, $Z_{12}$, $Z_{16}$ are the same HO atoms bonded to carbon atoms of $Ar^6$. Type 6 monomers are defined as homobifunctional monomers.

In general, $Ar^6$ may comprise a single or a plurality of aromatic rings in the center of a completely conjugated fused ring system. The center aromatic ring or rings of the completely conjugated fused ring system can be any of those described above, and others.

Formula 6 monomers useful in preparing the extended chain polymers and novel liquid-crystalline compositions of the instant invention may also be further classified into two groups: Class 1 (6,1), and Class 2 (6,2). The number pairs have the same significance as above.

The preferred (6,1) monomers are those wherein $Ar^6$ comprise a single center aromatic ring in the center of the fused ring system.

The preferred (6,2) monomers are those wherein $Ar^6$ comprise at least two center aromatic rings in the center of the fused ring system.

Type 7 monomer has the general formula

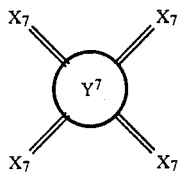

wherein $Y^7$ represents an aromatic or heteroaromatic moiety and is a fused ring carbon group, the $X_7$'s are double bonded to carbon atoms of $Y^7$. Type 7 monomers are homobifunctional, by definition.

Formula 7 monomers useful in preparing the extended chain polymers and novel liquid-crystalline compositions of the instant invention can be classified as Class 1 (7,1). The number pair (7,1) has the same significance as above.

Type 8 monomer has the general formula

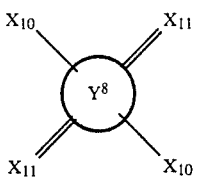

wherein $Y^8$ is a single carbon cyclic moiety, $X_{10}$ and $X_{11}$ are HO and O atoms respectively, bonded to carbon atoms of $Y^8$. Type 8 monomers are homobifunctional, by definition.

Formula 8 monomers useful in preparing the extended chain polymers and novel liquid-crystalline compositions of the instant invention can be classified as Class 1 (8,1). The number pair (8,1) has the same significance as above.

Type 9 monomer has the general formula

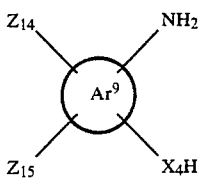

wherein $Ar^9$ represents an aromatic moiety and is a partially fused ring system, $Z_{14}$ and $Z_{15}$ are OH atoms, $X_4$ are selected from the class O, S, and NR; R is H or an organic group attached to N; $NH_2$, $X_4H$, $Z_{14}$, and $Z_{15}$ are bonded to carbon atoms of $Ar^9$; $NH_2$ and $X_4H$ are positioned ortho; $Z_{14}$ and $Z_{15}$ are positioned ortho. Type 9 monomers are heterofunctional, by definition.

Formula 9 monomers useful in preparing the extended chain polymers and novel liquid-crystalline compositions of the present invention can be classified as Class 1 (9,1). The number pair (9,1) has the same significance as above.

The preferred (2,3) monomers are those wherein $Y_2$ may be any aromatic heteroaromatic and aliphatic divalent species not previously described.

The preferred (3,2) monomers are those wherein $Z_3$, $Ar_3$, and $X_3$ are defined above. The bonds that are formed in homopolymerization of (3,2) monomers are defined in their spatial relationship as having an angle of catenation of less than about 150° to 180°.

Specific examples of preferred (1,1), (1,2), (1,3), (2,1), (2,2), (2,3), (3,1), (3,2), (4,1), (5,1), (6,1), (6,2), (7,1), (8,1), and (9,1) monomers suitable for use in the process of the invention include:

(1a) 2,5-diamino-1,4-benzenedithiol dihydrochloride,
(1b) 4,6-diamino-1,3-benzenediol dihydrochloride,
(1c) 1,2,4,5-tetraaminobenzene tetrahydrochloride,
(1d) 2,5-diamino-1,4-benzenediol dihydrochloride,
(1e) 2,3,5,6-tetraaminopyridine trihydrochloride,
(1f) 3,5-diamino-2,6-pyridinediol trihydrochloride,
(1g) 3,6-diamino-2,5-pyridinedithiol dihydrochloride,
(1h) N1,N5-diphenyl-1,2,4,5-tetraaminobenzene dihydrochloride,
(1i) 3,3'-dimercaptobenzidine dihydrochloride,
(1j) 3,3'-dihydroxybenzidine dihydrochloride, (1k) 3,3'-diamino-4,4'-dihydroxybiphenyl dihydrochloride,
(1l) 3,3'-diaminobenzidine tetrahydrochloride dihydrate,
(1m) 3,3'-diamino-4,4'-dianilinobiphenyl dihydrochloride,
(1n) 1,5-diamino-2,6-naphthalenedithiol dihydrochloride,
(1o) 1,5-diamino-2,6-naphthalenediol dihydrochloride,
(1p) 1,2,5,6-tetraminonaphthalene tetrahydrochloride,
(1q) 3,3'-dimercapto-4,4'-diaminodiphenyl ether dihydrochloride,
(1r) 3,3',4,4'-tetraaminodiphenyl ether tetrahydrochloride,
(1s) 3,3'-dihydroxy-4,4'-diaminodiphenyl ether,
(1t) 3,3'-diamino-4,4'-dihydroxydiphenyl ether,
(1u) 3,3',4,4'-tetraaminodiphenyl sulfone,
(1v) 3,3'-dimercapto-4,4'-diaminodiphenyl sulfone,
(1w) 3,3'-dihydroxy-4,4'-diaminodiphenyl sulfone,
(1x) 3,3'-diamino-4,4'-dihydroxydiphenyl sulfone,
(1y) 3,3',4,4'-tetraaminobenzophenone,
(1z) 3,6-diamino-1,2-benzenedithiol dihydrochloride,
(2a) terephthalic acid, (2b) terephthaloyl chloride,
(2c) 1,4-benzenedicarboxamide, (2d) terephthalonitrile,
(2e) trans-1,4-cyclohexanedicarboxylic acid,
(2f) trans-1,4-cyclohexanedicarboxylic acid chloride,
(2g) trans-1,4-cyclohexanedicarboxamide,
(2h) trans-1,4-dicyanocyclohexane,
(2i) 2,5-pyridinedicarboxylic acid,
(2j) 2,6-benzo[1,2-d:4,5-d']bisthiazoledinitrile,
(2k) 2,6-benzo[1,2-d:5,4-d']bisoxazoledinitrile,
(2l) 2,6-benzobisimidazoledinitrile,
(2m) 2,6-benzo[1,2-d:4,5-d']bisoxazoledinitrile,
(2n) 2,6-pyridobisimidazoledinitrile,
(2o) 2,6-pyrido[2,3-d:6,5-d']bisoxazoledinitrile,
(2p) 2,6-pyrido[2,3-d:5,6-d']bisthiazoleinitrile,
(2q) 1,7-diphenyl-2,6-benzobisimidazoledinitrile,
(2r) 2,6-bis(4-carboxyphenyl)benzo[1,2-d:4,5-d']bisthiazole,
(2s) 2,6-bis(4-carboxyphenyl)benzo[1,2-d:5,4-d']bisoxazole,
(2t) 2,6-bis(4-carboxyphenyl)benzobisimidazole,
(2u) 2,6-bis(4-carboxyphenyl)benzo[1,2-d:4,5-d']bisoxazole,
(2v) 2,6-bis(4-carboxyphenyl)pyridobisimidazole,
(2w) 2,6-bis(4-carboxyphenyl)pyrido[2,3-d:6,5-d']bisoxazole,
(2x) 2,6-bis(4-carboxyphenyl)pyrido[2,3-d:6,5-d']bisthiazole,
(2y) 1,7-diphenyl-2,6-bi(4-carboxyphenyl)benzobisimidazole,
(2z) oxamide, (2aa) 4,4'-biphenyldicarboxylic acid,
(2bb) 4,4'-biphenyldicarboxylic acid chloride,
(2cc) 2,6-naphthalenedicarboxylic acid,
(2dd) 2,6-naphthalenedicarboxylic acid chloride,
(2ee) 2,6-quinolinedicarboxylic acid,
(2ff) 3,3'-biphenyldicarboxylic acid,
(2gg) trans-1,2-cyclohexanedicarboxylic acid,
(2hh) 1,4-bis(5-carboxybenzoxazole-2-yl)benzene,
(2ii) 1,4-bis(6-carboxybenzothiazole-2-yl)benzene,
(2jj) 2,5-bis(6-carboxybenzothiazole-2-yl)pyridine,
(2kk) 4,4'-bis(p-phenylenedioxy)dibenzoyl chloride,
(2ll) 4,4'-bis(p-phenylenedioxy)dibenzonitrile,
(2mm) 4,4'-bis(m-phenylenedioxy)dibenzoic acid,
(2nn) 4,4'-bis(m-phenylenedioxy)dibenzoyl chloride,
(2oo) 4,4'-bis(m-phenylenedioxy)dibenzonitril,
(2pp) 3,3'-bis(m-phenylenedioxy)dibenzoyl chloride,
(2qq) 3,3'-bis(p-phenylenedioxy)dibenzonitrile,
(2rr) 4,4'-bis(o-phenylenedioxy)dibenzonitrile,
(2ss) isophthalic acid, (2tt) 4,4'-dicarboxydiphenyl ether,
(2uu) 3,3'-dicarboxydiphenyl ether, (2vv) succinic acid,
(2ww) glutaric acid, (2xx) adipic acid, (2yy) pimelic acid,
(2zz) sebacic acid,
(3a) 3-mercapto-4-aminobenzoic acid hydrochloride,
(3b) 3-mercapto-4-aminobenzoic acid,
(3c) 3-hydroxy-4-aminobenzoic acid hydrochloride,
(3d) 3-amino-4-hydroxybenzoic acid hydrochloride,
(3e) 3,4-diaminobenzoic acid,
(3f) N3-phenyl-3,4-diaminobenzoic acid,
(3g) N4-phenyl-3,4-diaminobenzoic acid,
(3h) 4-carboxy-3'-mercapto-4'-aminobiphenyl,
(3i) 4-carboxy-3'-amino-4'-hydroxybiphenyl,
(3j) 4-carboxy-3',4'-diaminobiphenyl,
(3k) 2(4-carboxyphenyl)-5,6-diaminobenzimidazole dihydrochloride,
(4a) pyromellitic dianhydride,
(4b) 1,4,5,8-naphthalenetetracarboxylic dianhydride,
(5a) 4,5-diaminonaphthalene-1,8-dicarboxylic anhydride,
(6a) 2,3,7,8-tetrahydroxy-1,4,6,9-tetraazaanthracene,
(6b) 2,2',3,3'-tetrahydroxy-6,6'-biquinoxaline,
(7a) 1,2,6,7-tetraketopyrene,
(8a) 2,5-dihydroxy-1,4-benzoquinone,
(9a) 2,3-dihydroxy-6,7-diaminoquinoxaline dihydrochloride,
and the like.

These monomers, their structure, and method of preparation are desclosed in applicants' above-cited published patent applications, which are herein incorporated by reference in its entirety.

Any monofunctional reactant or mixture of monofunctional reactants having the ability to react in polyphosphoric acid to form the heterocyclic ring structures of this invention can be utilized. Monofunctional reactants may be used in the amounts of 0.025 mole percent or less to about 3 mole percent or more. Amounts substantially greater than 3 mole percent should be avoided in order to prevent formation of low molecular weight polymer and/or the formation of isotropic solutions. Polymers that have chain ends made non-reactive by reaction of a monofunctional reactant are called end-capped or chain-terminated polymers.

In general, suitable monofunctional reactants selected for use in controlling the molecular weight of the extended chain polymers of the present invention are of three types as described below.

Type 10 monofunctional reactants have the general formula

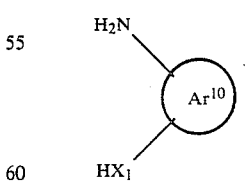

wherein $Ar^{10}$ is an aromatic moiety; $X_1$ is selected from the class O, S, and NR; R is hydrogen or an organic group attached to N; $NH_2$, and $X_1H$ are bonded to aromatic carbon atoms of $Ar^{10}$; the groups on $Ar^{10}$ are ortho with respect to one another.

Monofunctional reactant 10 is typically isolated as a hydrohalide salt.

In general, Ar$^{10}$ may be any aromatic moiety (carbocyclic or heterocyclic) and it may be a single ring such as

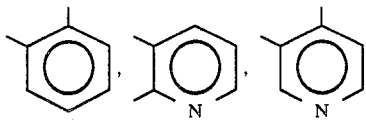

or it may comprise a plurality of aromatic rings connected by valence bonds or by linking atoms or groups such as

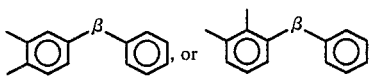

where β is a valence bond (as in diphenyl) or a divalent atom (—O— or —S—) or group such as —NR—(R=H or an organic group), —(CH$_2$)$_n$— (n=1 or a higher integer). Specific examples or Ar$^{10}$ are as follows:

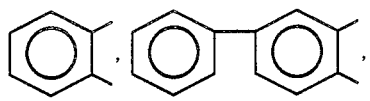

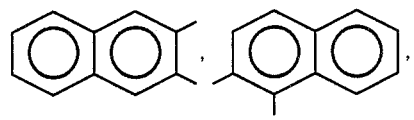

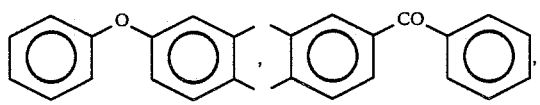

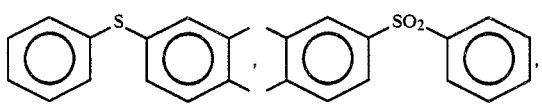

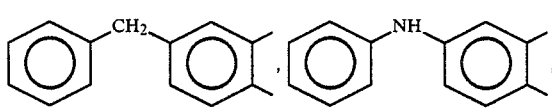

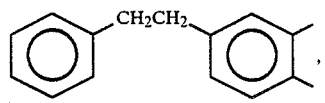

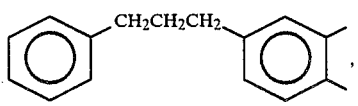

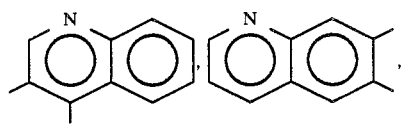

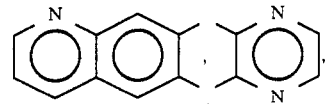

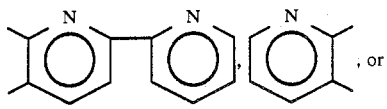

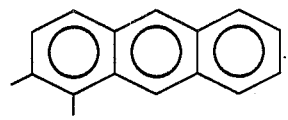

The aromatic ring or rings of Ar$^{10}$, such as those described above and others, may bear one or more substituent. These substituents, which may be organic or inorganic may be or may contain hetero atoms, may be any atom or group which is compatible with the reactant, the solvent, the polycondensation reaction and the resulting oligomer or polymer. Substituents which are chemically reactive with Types 2 thru 9 monomers (see above), with the solvent (PPA) or with the oligomeric or polymeric products are to be avoided.

Among permissible hydrocarbon substituents are alkyl (e.g., C$_1$ to C$_{10}$ straight chain and branched chain alkyl, benzyl, etc.), phenyl, chloro substituted alkyl, phenyl and benzyl. Among permissible hetero substituents are chloro, bromo, nitro, alkoxy, aryloxy, SO$_3$H, SR, and —NR$_1$R$_2$ (R$_1$ and R$_2$ being organic groups).

Specific examples of Type 10 monofunctional reactants preferred for use in the invention include those compounds (shown as free amines or hydrohalides) in Table 15a below.

TABLE 15a

Monofunctional Reactants of Type 10

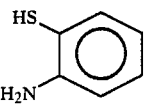

10a 2-aminothiophenol obtained from Aldrich Chemical Co. and purified by distillation under reduced pressure.

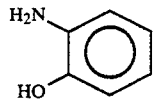

10b o-aminophenol obtained from Aldrich Chemical Co. and purified by distillation under reduced pressure.

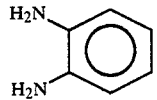

10c o-phenylenediamine obtained from Aldrich Chemical Co. and purified by sublimation.

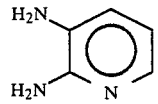

10d 2,3-diaminopyridine obtained Aldrich Chemical Co. and purified by recrystallization from benzene.

TABLE 15a-continued
Monofunctional Reactants of Type 10

10e

4-amino-3-mercaptobiphenyl prepared from 4-aminobiphenyl by methods analogous to Monomers 1a and 1i.

10f

3-amino-4-hydroxybiphenyl was obtained from CTC Organics and used as obtained.

10g

1-amino-2-naphthalenethiol prepared by methods analogous to Monomers 1a and 1i.

10h

1-amino-2-naphthol obtained from Aldrich Chemical Co. and purified by recrystallization from dilute HCl containing stannous chloride by adding concentrated HCl.

10i

2,3-diaminonaphthalene was obtained from Aldrich Chemical Co. and purified by recrystallization from water.

10j

3,4-diaminobenzophenone obtained from Aldrich Chemical Co. and was purified by recrystallization from dilute HCl containing stannous chloride by adding concentrated HCl.

Type 11 monofunctional reactants have the general formula $$Y^9-Z_1 \qquad 11\ PS$$

wherein $Y^9$ is a monovalent organic group and $Z_1$ is an electron-deficient carbon group selected from the following class:

| | | | |
|---|---|---|---|
| —COOH | —CSSH | —COBr | —CSI |
| —CSOH | —COCl | —CSBr | —CONHR$_1$ |
| —COSH | —CSCl | —COI | —CSNHR$_1$ |
| | | | —CN |

($R_1$ = H or an organic group bonded to N by a carbon atom)

The only requirement of $Z_1$ is that it react with the $X_1H$ and $X_2H$ and with the two hydrogen atoms of the primary amino groups of Type 1 monomers to form suitable leaving entities, such as water, hydrogen sulfide, hydrogen halide, ammonia, etc.

The monovalent group $Y^9$ may be an aromatic group, an acyclic aliphatic group, or a cycloaliphatic group, and such groups may be substituted by hydrocarbon groups (aliphatic or aromatic) and by hetero atoms and groups. In general any of groups described above as substituents of the aromatic ring or rings of $Ar^1$ may be used subject to the same restrictions.

Specific examples of Type 11 monofunctional reactants preferred for use in the invention include those compounds in Table 15b below.

TABLE 15b
Monofunctional Reactants of Type 11

11a benzoic acid, Matheson primary standard grade

11b benzoyl chloride obtained from Aldrich Chemical Co. and purified by distillation.

11c benzonitrile obtained from Aldrich Chemical Co. and purified by distillation.

11d cyclohexanecarboxylic acid obtained from Aldrich Chemical Co. and purified by recrystallization from water.

11e cyclohexanecarboxylic acid chloride obtained from Aldrich Chemical Co. and purified by distillation.

11f picolinic acid obtained from Aldrich Chemical Co. and purified by sublimation.

11g

4-biphenylcarboxylic acid obtained from Aldrich Chemical Co.

11h

2-naphthoic acid obtained from Aldrich Chemical Co.

11i

$CH_3CO_2H$ glacial acetic acid obtained from Aldrich Chemical Co.

11j

$CH_3COCl$ acetyl chloride obtained from Aldrich Chemical Co.

11k

$CH_3CH_2CO_2H$ propionic acid obtained from Aldrich Chemical Co.

TABLE 15b-continued
Monofunctional Reactants of Type 11

CH₃$\pm$CH₂$\frac{}{2}$CO₂H  11l n-butyric acid obtained from Aldrich Chemical Co.

CH₃$\pm$CH₂$\frac{}{3}$CO₂H  11m valeric acid obtained from Aldrich Chemical Co.

CH₃$\pm$CH₂$\frac{}{4}$CO₂H  11n caproic acid obtained from Aldrich Chemical Co.

Type 12 monofunctional reactants have the general formula

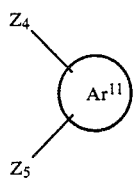

wherein $Z_4$ and $Z_5$, are chosen from the list of carboxylic acid derivatives given for $Z_1$ as defined for monomers of Type 2. $Z_4$ and $Z_5$, can also be a carboxylic acid anhydride group. $Ar^{11}$ is an aromatic or aromatic heterocyclic moiety having two valence positions at carbon atoms. $Ar^{11}$ can be a six-member ring or $Ar^{11}$ can be two condensed six-member rings, such as naphthalene. $Z_4$ and $Z_5$ must either be ortho-positioned within each set or bear a 1,8-relationship (if $Ar^{11}$ is a naphthalene nucleus) to each other.

Specific examples of Type 12 monofunctional reactants preferred for use in the invention include those compounds in Table 15c below.

TABLE 15c
Monofunctional Reactants of Type 12

12a phthalic anhydride obtained from Aldrich Chemical Co.

12b 1,3-naphthalic anhydride obtained from Aldrich Chemical Co.

HOMOPOLYMERIC COMPOSITIONS AND THEIR PREPARATION

In accordance with one aspect of the invention, there is provided a liquid-crystalline composition useful in the preparation of fibers and films comprising a polycondensation product consisting essentially of a blend of certain polyphosphoric acids and a high concentration of at least one extended chain homopolymer having a substantially stabilized molecular weight (characterized by intrinsic viscosity) said homopolymer having recurring units of the general formulas:

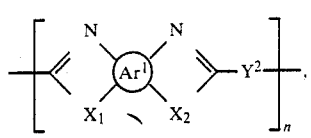

wherein $Ar^1$ represents an aromatic moiety and is XX as defined below, $X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or represents a bivalent organic radical and is XXI as defined below, n being a positive integer;

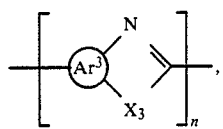

wherein $Ar^3$ represents an aromatic moiety and is XXII as defined below, $X_3$ is sulfur, oxygen, or NR (R being hydrogen or an organic group), the nitrogen atoms and $X_3$ being bonded to aromatic carbon atoms of $Ar^3$, N and $X_3$ of each hetero ring are disposed ortho to one another, n being a positive integer;

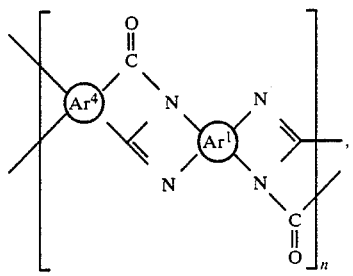

wherein $Ar^1$ represents an aromatic moiety and is XX as defined below, and $Ar^4$ represents an aromatic moiety and is XXIII as defined below, the nitrogen atoms being bonded to aromatic carbon atoms of $Ar^1$ and the carbon atoms being bonded to aromatic carbon atoms of $Ar^4$, n being a positive integer;

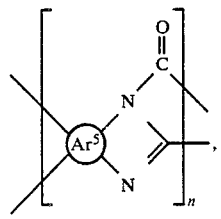

wherein $Ar^5$ represents an aromatic moiety and is XXIV as defined below, the nitrogen atoms being bonded to $Ar^5$, n being a positive integer;

V

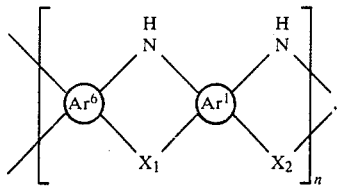

wherein $Ar^6$ represents an aromatic moiety and is XXV as defined below, $Ar^1$ represents a different aromatic moiety and is XX as defined below, $X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hetero ring are disposed ortho to one another, n being a positive integer;

VI

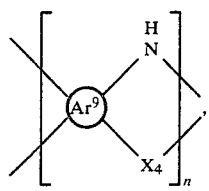

wherein $Ar^9$ represents an aromatic moiety and is XXVI as defined below, $X_4$ is sulfur, oxygen, or NR (R being hydrogen or an organic group), the NH groups and $X_4$ being bonded to aromatic carbon atoms of $Ar^9$, n being a positive integer;

VII

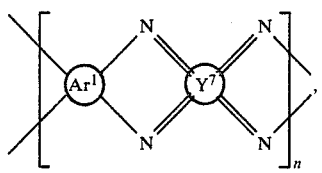

wherein $Ar^1$ represents an aromatic moiety and is XXVII as defined below, $Y^7$ represents an aromatic moiety and is XXVIII as defined below, the nitrogen atoms being bonded to aromatic carbon atoms of $Ar^1$ and bonded to adjacent carbon atoms of $Y^7$, n being a positive integer;

VIII

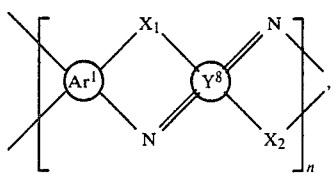

wherein $Ar^1$ represents an aromatic moiety and is XX as defined below, $Y^8$ is XXIX as defined below, $X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$ and adjacent carbon atoms of $Y^8$, N and $X_1$ or $X_2$ of each hetero ring are disposed ortho to one another, n being a positive integer.

The aromatic moieties $Ar^1$, $Ar^3$, $Ar^4$, $Ar^5$, $Ar_6$, $Ar^9$, and $Y^2$, $Y^7$, and $Y^8$ of the extended chain polymer formulas above are defined as follows:

XX is

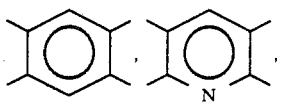

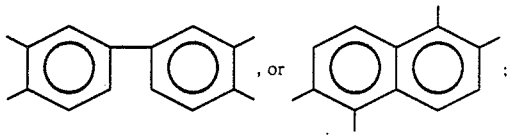

XXI is

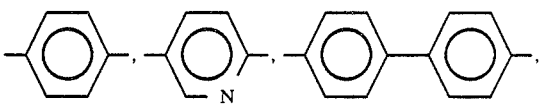

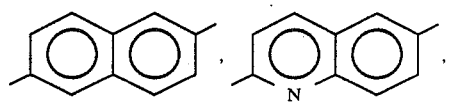

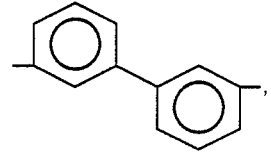

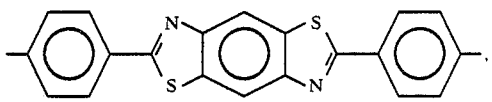

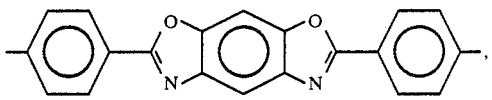

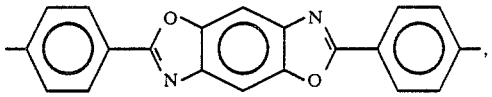

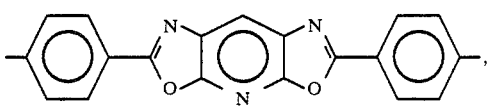

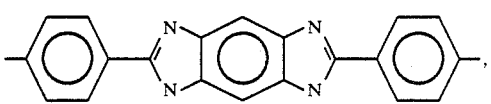

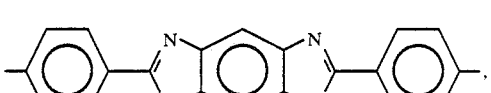

-continued
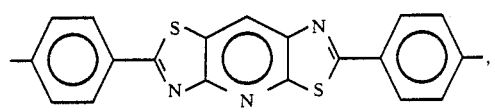
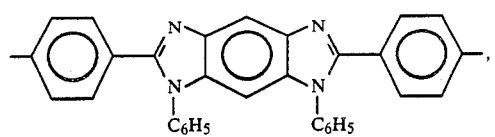
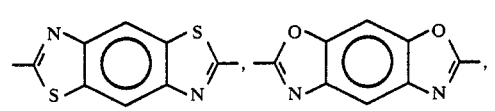
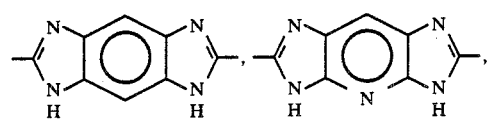
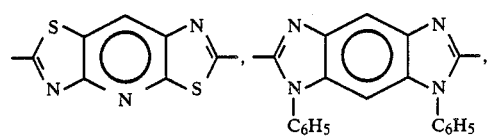
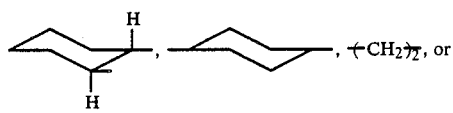, $+CH_2)_2$, or
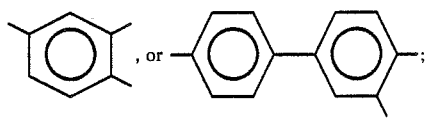
XXII is
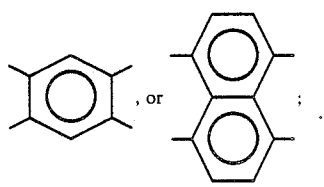
XXIII is
, or 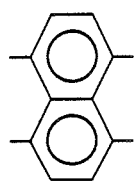
XXIV is
XXV is
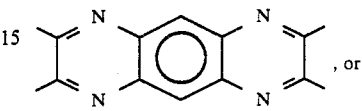, or
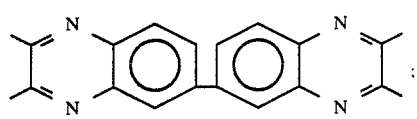
XXVI is
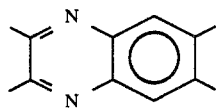;
XXVII is
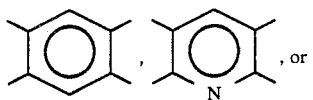, or
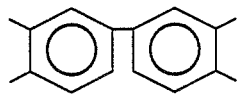;
XXVIII is
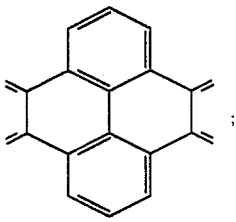;
XXIX is
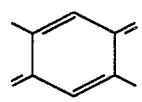;
XXX is

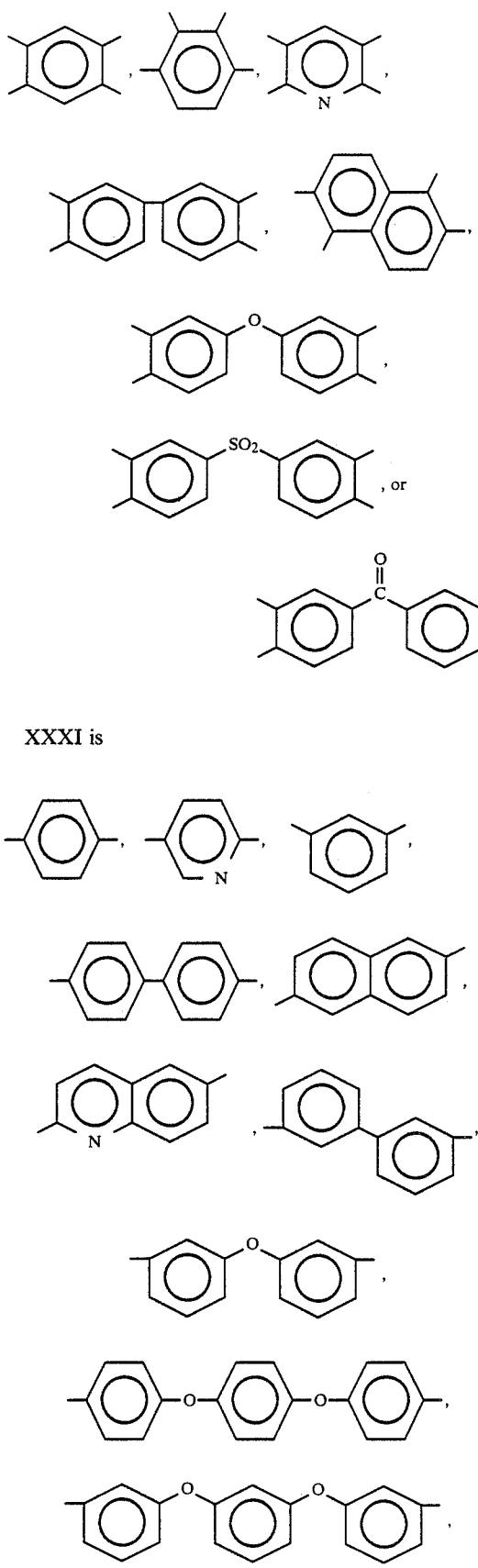
XXXI is
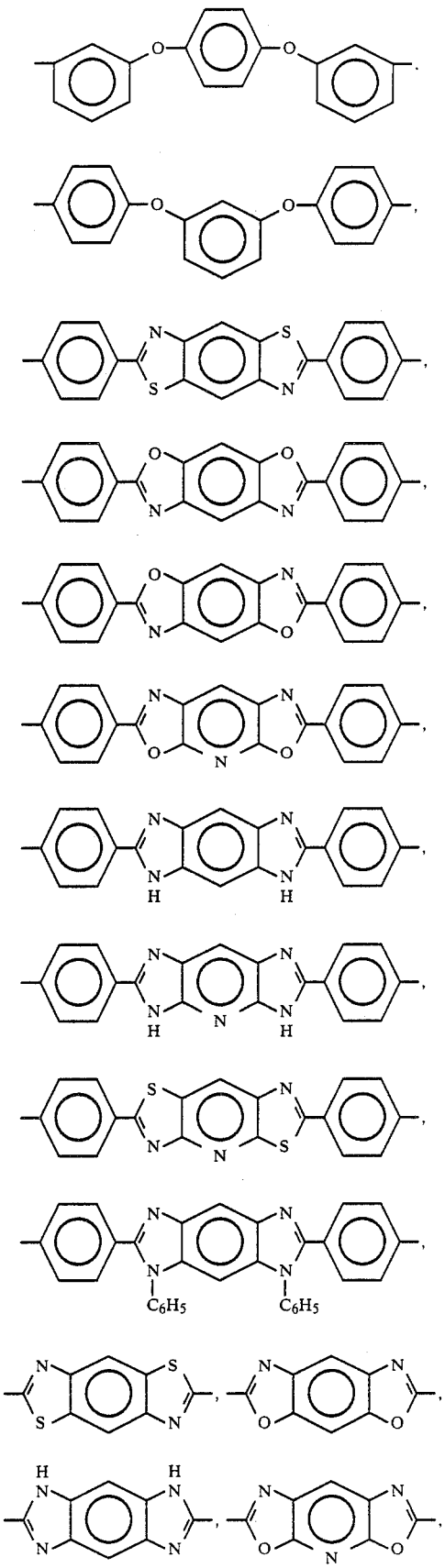

-continued

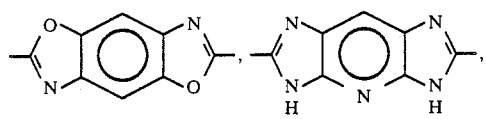

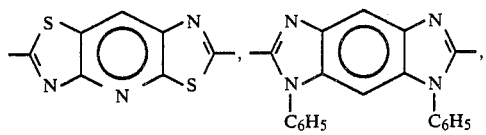

$+CH_2 \rightarrow_2$, $+CH_2 \rightarrow_4$, $+CH_2 \rightarrow_5$, $+CH_2 \rightarrow_8$,

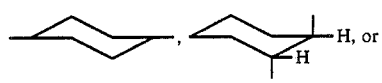

XXXII is

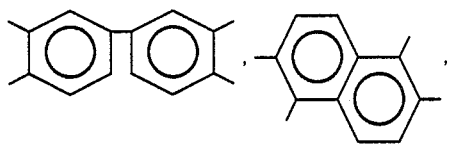

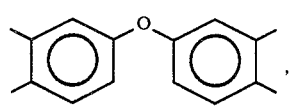

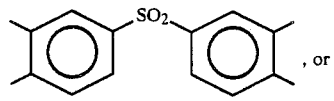, or

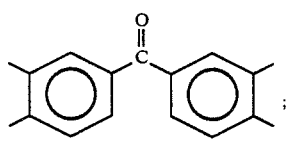;

In accordance with the practice of the present invention, the synthesis of the aforementioned formulas I-VIII homopolymers may be illustrated by the following general reaction system:

REACTION MECHANISM

Formation of formula I homopolymer

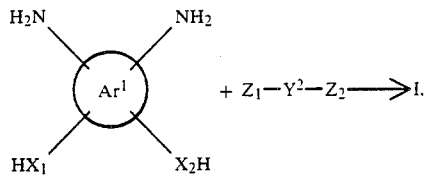

Formation of formula II homopolymer

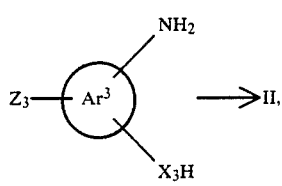

Formation of formula III homopolymer

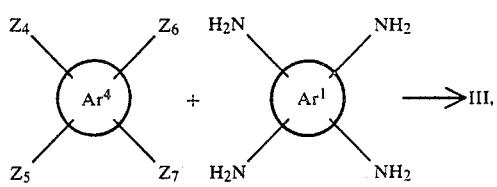

Formation of formula IV homopolymer

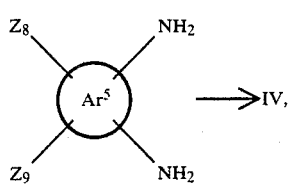

Formation of formula V homopolymer

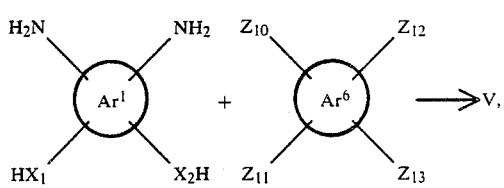

Formation of formula VI homopolymer

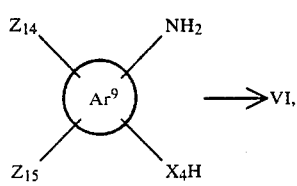

Formation of formula VII homopolymer

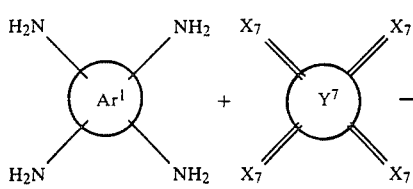

Formation of formula VIII homopolymer

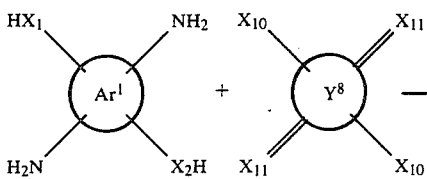

Representative examples of suitable homopolymers forming liquid crystalline homopolymer compositions in accordance with the practice of the present invention (provided they fall within the above-defined general formulas I–VIII) include the following polymers. For the sake of convenience, polymer formulas are hereinbelow shown in simplified representation. As an example, $-AI-_n$ is

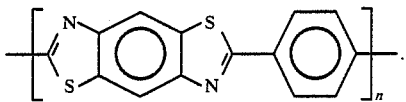

The structure representing $\{AI\}$ are defined in the Appendix $\{A\}$ has the structure

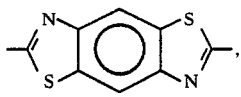

and $\{I\}$ has the structure

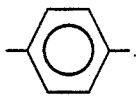

Their sequential combination is therefore

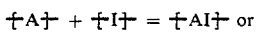

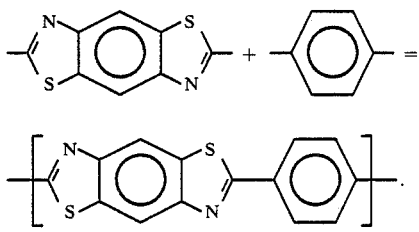

All simplified polymer formula representations appearing in the specification may be readily interpreted by reference to the Appendix. $\{AI\}_n$, $\{AIBI\}_n$, $\{BI\}_n$, and $\{T\}_n$, $\{AIDI\}_n$, $\{AIEI\}_n$, $\{AIFI\}_n$, $\{AILI\}_n$, $\{AIMI\}_n$, $\{AINI\}_n$, $\{ATI-T'\}_n$, $\{ATKT'\}_n$, $\{BIDI\}_n$, $\{BIEI\}_n$, $\{BIFI\}_n$, $\{BILI\}_n$, $\{BIMI\}_n$, $\{BINI\}_n$, $\{BTIT'\}_n$, $\{BTKT'\}_n$, $\{EILI\}_n$, $\{FILI\}_n$, $\{LI\}_n$, $\{TI\}_n$, $\{U\}_n$, and $\{V\}_n$, $\{A\}_n$, $\{AB\}_n$, $\{AC\}_n$, $\{AE\}_n$, $\{AF\}_n$, $\{AICI\}_n$, $\{AIOI\}_n$, $\{AIQI\}_n$, $\{AJ\}_n$, $\{AL\}_n$, $\{AM\}_n$, $\{AN\}_n$, $\{AQ\}_n$, $\{AVIV'\}_n$, $\{B\}_n$, $\{BC\}_n$, $\{BD\}_n$, $\{BE\}_n$, $\{BF\}_n$, $\{BICI\}_n$, $\{BIOI\}_n$, $\{BIQI\}_n$, $\{BJ\}_n$, $\{BL\}_n$, $\{BM\}_n$, $\{BN\}_n$, $\{BQ\}_n$, $\{BVIV'\}_n$, $\{B'A'B'Z\}_n$, $\{B'A'F'Z\}_n$, $\{B'H'\}_n^*$ (*denotes oxygens always meta on B') $\{B'I'\}_n$, $\{B'P'\}_n$, $\{B'Q'\}_n$, $\{B'S'\}_n^*$, $\{C\}_n$, $\{CE\}_n$, $\{CF\}_n$, $\{CI\}_n$, $\{CIEI\}_n$, $\{CIFI\}_n$, $\{CILI\}_n$, $\{CIMI\}_n$, $\{CINI\}_n$, $\{CIOI\}_n$, $\{CJ\}_n$, $\{CL\}_n$, $\{CM\}_n$, $\{CN\}_n$, $\{CTIT'\}_n$, $\{CTKT'\}_n$, $\{C'A'B'Z\}_n$, $\{C'A'F'Z\}_n$, $\{D'A'B'Z\}_n$, $\{D'A'F'Z\}_n$, $\{E\}_n$, $\{EF\}_n$, $\{EI\}_n$, $\{EIFI\}_n$, $\{EIMI\}_n$, $\{EINI\}_n$, $\{EIOI\}_n$, $\{EIQI\}_n$, $\{EJ\}_n$, $\{EL\}_n$, $\{EM\}_n$, $\{EN\}_n$, $\{ETIT'\}_n$, $\{ETKT'\}_n$, $\{E'A'B'Z\}_n$, $\{E'A'F'Z\}_n$, $\{F\}_n$, $\{FI\}_n$, $\{FIMI\}_n$, $\{FINI\}_n$, $\{FIOI\}_n$, $\{FJ\}_n$, $\{FL\}_n$, $\{FM\}_n$, $\{FN\}_n$, $\{F'A'\}_n$, $\{L\}_n$, $\{LJ\}_n$, $\{LTIT'\}_n$, $\{LTKT'\}_n$, $\{M\}_n$, $\{MI\}_n$, $\{MTIT'\}_n$, $\{MTKT'\}_n$, $\{N\}_n$, $\{NI\}_n$, $\{NTIT'\}_n$, $\{NTKT'\}_n$, $\{QI\}_n$, $\{QJ\}_n$, $\{RI\}_n$, $\{RJ\}_n$, and $\{UI\}_n$, $\{AD\}_n$, $\{AG\}_n$, $\{AH\}_n$, $\{AIGI\}_n$, $\{AIHI\}_n$, $\{AIPI\}_n$, $\{AIRI\}_n$, $\{AISI\}_n$, $\{AK\}_n$, $\{AO\}_n$, $\{AP\}_n$, $\{AR\}_n$, $\{AS\}_n$, $\{BG\}_n$, $\{BIGI\}_n$, $\{BH\}_n$, $\{BIHI\}_n$, $\{BIPI\}_n$, $\{BIRI\}_n$, $\{BISI\}_n$, $\{BK\}_n$, $\{BO\}_n$, $\{BP\}_n$, $\{BR\}_n$, $\{BS\}_n$, $\{B'G'\}_n$, $\{B'H'\}_n^{}$ ( denotes oxygens always para on B'), $\{B'J'\}_n$, $\{B'K'\}_n^*$ (* denotes oxygens always meta on B'), $\{B'K'\}_n^{}$, $\{B'L'\}_n$, $\{B'M'\}_n$, $\{B'N'\}_n$, $\{B'O'\}_n$, $\{B'R'\}_n$, $\{B'S'\}_n^{}$, $\{B'U'\}_n$, $\{CD\}_n$, $\{CG\}_n$, $\{CH\}_n$, $\{CIDI\}_n$, $\{CIGI\}_n$, $\{CIHI\}_n$, $\{CIPI\}_n$, $\{CIQI\}_n$, $\{CIRI\}_n$, $\{CISI\}_n$, $\{CK\}_n$, $\{CO\}_n$, $\{CP\}_n$, $\{CQ\}_n$, $\{CR\}_n$, $\{CS\}_n$, $\{CVIV'\}_n$, $\{C'G'\}_n$, $\{C'H'\}_n$, $\{C'I'\}_n$, $\{C'J'\}_n$, $\{C'K'\}_n$, $\{C'L'\}_n$, $\{C'O'\}_n$, $\{C'Q'\}_n$, $\{C'R'\}_n$, $\{C'S'\}_n$, $\{D\}_n$, $\{DE\}_n$, $\{HD\}_n$, $\{DF\}_n$, $\{DG\}_n$, $\{DH\}_n$, $\{DI\}_n$, $\{DIEI\}_n$, $\{DIFI\}_n$, $\{DIGI\}_n$, $\{DIHI\}_n$, $\{DILI\}_n$, $\{DIMI\}_n$, $\{DINI\}_n$, $\{DIOI\}_n$, $\{DIPI\}_n$, $\{DIQI\}_n$, $\{DIRI\}_n$, $\{DISI\}_n$, $\{DJ\}_n$, $\{DK\}_n$, $\{DL\}_n$, $\{DM\}_n$, $\{DN\}_n$, $\{DO\}_n$, $\{DP\}_n$, $\{DQ\}_n$, $\{DR\}_n$, $\{DS\}_n$, $\{DTIT'\}_n$, $\{DTKT'\}_n$, $\{DVIV'\}_n$, $\{D'G'\}_n$, $\{D'H'\}_n^*$ (* denotes oxygen always in 3,3'-positions on D'), $\{D'H'\}_n^{}$ ( denotes oxygen always in 4,4'-positions on D'), $\{D'I'\}_n$, $\{D'J'\}_n$, $\{D'K'\}_n^*$, $\{D'K'\}_n^{**}$, $\{D'L'\}_n$, $\{D'M'\}_n$, $\{D'N'\}_n$, $\{D'O'\}_n$, $\{D'Q'\}_n$, $\{D'R'\}_n$, $\{D'S'\}_n^*$, $\{D'S'\}_n^{**}$, $\{D'U'\}_n$, $\{EG\}_n$, $\{EH\}_n$, $\{EIGI\}_n$, $\{EIHI\}_n$, $\{EIPI\}_n$, $\{EIRI\}_n$, $\{EISI\}_n$, $\{EK\}_n$, $\{EO\}_n$, $\{EP\}_n$, $\{EQ\}_n$, $\{ER\}_n$, $\{ES\}_n$, $\{EVIV'\}_n$, $\{E'G'\}_n$, $\{E'H'\}_n$, $\{E'I'\}_n$, $\{E'J'\}_n$, $\{E'K'\}_n$, $\{E'L'\}_n$, $\{E'O'\}_n$, $\{E'Q'\}_n$, $\{E'R'\}_n$, $\{E'S'\}_n$, $\{FG\}_n$, $\{FH\}_n$, $\{FIGI\}_n$, $\{FIHI\}_n$, $\{FIPI\}_n$, $\{FIQI\}_n$, $\{FIRI\}_n$, $\{FISI\}_n$, $\{FK\}_n$, $\{FO\}_n$, $\{FP\}_n$, $\{FQ\}_n$, $\{FR\}_n$, $\{FS\}_n$, $\{FTIT'\}_n$, $\{FTKT'\}_n$, $\{FVIV'\}_n$, $\{G\}_n$, $\{GH\}_n$, $\{GI\}_n$, $\{GIHI\}_n$, $\{GILI\}_n$, $\{GIMI\}_n$, $\{GINI\}_n$, $\{GIOI\}_n$, $\{GIPI\}_n$, $\{GIQI\}_n$, $\{GIRI\}_n$, $\{GISI\}_n$, $\{GJ\}_n$, $\{GK\}_n$, $\{GL\}_n$, $\{GM\}_n$, $\{GN\}_n$, $\{GO\}_n$, $\{GP\}_n$, $\{GQ\}_n$, $\{GR\}_n$, $\{GS\}_n$, $\{GTIT'\}_n$, $\{GTKT'\}_n$, $\{G-$ VIV'$\}_n$, $\{H\}_n$, $\{HI\}_n$, $\{HILI\}_n$, $\{HIMI\}_n$, $\{HINI\}_n$, $\{HIOI\}_n$, $\{HIPI\}_n$, $\{HIQI\}_n$, $\{HIRI\}_n$, $\{HISI\}_n$, $\{HJ\}_n$, $\{HK\}_n$, $\{HL\}_n$, $\{HM\}_n$, $\{HN\}_n$, $\{HO\}_n$, $\{HP\}_n$, $\{HQ\}_n$, $\{HR\}_n$, $\{HS\}_n$, $\{HTIT'\}_n$, $\{HTKT'\}_n$, $\{HVIV'\}_n$, $\{LK\}_n$, $\{LVIV'\}_n$, $\{MJ\}_n$, $\{MK\}_n$, $\{MVIV'\}_n$, $\{NJ\}_n$, $\{NK\}_n$, $\{NVIV'\}_n$, $\{OI\}_n$, $\{OJ\}_n$, $\{OK\}_n$, $\{OTIT'\}_n$, $\{OTKT'\}_n$, $\{OVIV'\}_n$, $\{PI\}_n$, $\{PJ\}_n$, $\{PK\}_n$, $\{PTIT'\}_n$, $\{PTKT'\}_n$, $\{PVIV'\}_n$, $\{Q\}_n$, $\{QK\}_n$, $\{QTIT'\}_n$, $\{QTKT'\}_n$, $\{QVIV'\}_n$, $\{R\}_n$, $\{RK\}_n$, $\{RTIT'\}_n$, $\{RTKT'\}_n$, $\{RVIV'\}_n$, $\{SI\}_n$, $\{SJ\}_n$, $\{SK\}_n$, $\{STIT'\}_n$, $\{STKT'\}_n$, $\{SVIV'\}_n$, $\{W\}_n$, $\{X\}_n$, and $\{Y\}_n$.

The most preferred extended chain homopolymers in accordance with the practice of the present invention include $\{AI\}_n$, $\{AIBI\}_n$, $\{BI\}_n$, and $\{T\}_n$.

The especially preferred extended chain homopolymers in accordance with the practice of the present invention include $\{AIDI\}_n$, $\{AIEI\}_n$, $\{AIFI\}_n$, $\{AILI\}_n$, $\{AIMI\}_n$, $\{AINI\}_n$, $\{ATIT'\}_n$, $\{ATKT'\}_n$, $\{BIDI\}_n$, $\{BIEI\}_n$, $\{BIFI\}_n$, $\{BILI\}_n$, $\{BIMI\}_n$, $\{BINI\}_n$, $\{BTIT'\}_n$, $\{BTKT'\}_n$, $\{EILI\}_n$, $\{FILI\}_n$, $\{LI\}_n$, $\{TI\}_n$, $\{U\}_n$, and $\{V\}_n$.

The preferred extended chain homopolymers in accordance with the practice of the present invention include $\{A\}_n$, $\{AB\}_n$, $\{AC\}_n$, $\{AE\}_n$, $\{AF\}_n$, $\{AICI\}_n$, $\{AIOI\}_n$, $\{AIQI\}_n$, $\{AJ\}_n$, $\{AL\}_n$, $\{AM\}_n$, $\{AN\}_n$, $\{AQ\}_n$, $\{AVIV'\}_n$, $\{B\}_n$, $\{BC\}_n$, $\{BD\}_n$, $\{BE\}_n$, $\{BF\}_n$, $\{BICI\}_n$, $\{BIOI\}_n$, $\{BIQI\}_n$, $\{BJ\}_n$, $\{BL\}_n$, $\{BM\}_n$, $\{BN\}_n$, $\{BQ\}_n$, $\{BVIV'\}_n$, $\{B'A'B'Z\}_n$, $\{B'A'F'Z\}_n$, $\{B'H'\}_n$*, (* denotes oxygens always meta on B') $\{B'I'\}_n$, $\{B'P'\}_n$, $\{B'Q'\}_n$, $\{B'S'\}$*, $\{C\}_n$, $\{CE\}_n$, $\{CF\}_n$, $\{CI\}_n$, $\{CIEI\}_n$, $\{CIFI\}_n$, $\{CILI\}_n$, $\{CIMI\}_n$, $\{CINI\}_n$, $\{CIOI\}_n$, $\{CJ\}_n$, $\{CL\}_n$, $\{CM\}_n$, $\{CN\}_n$, $\{CTIT'\}_n$, $\{CTKT'\}_n$, $\{C'A'B'Z\}_n$, $\{C'A'F'Z\}_n$, $\{D'A'B'Z\}_n$, $\{D'A'F'Z\}_n$, $\{E\}_n$, $\{EF\}_n$, $\{EI\}_n$, $\{EIFI\}_n$, $\{EIMI\}_n$, $\{EINI\}_n$, $\{EIOI\}_n$, $\{EIQI\}_n$, $\{EJ\}_n$, $\{EL\}_n$, $\{EM\}_n$, $\{EN\}_n$, $\{ETIT'\}_n$, $\{ETKT'\}_n$, $\{E'A'B'Z\}_n$, $\{E'A'F'Z\}_n$, $\{F\}_n$, $\{FI\}_n$, $\{FIMI\}_n$, $\{FINI\}_n$, $\{FIOI\}_n$, $\{FJ\}_n$, $\{FL\}_n$, $\{FM\}_n$, $\{FN\}_n$, $\{F'A'\}_n$, $\{L\}_n$, $\{LJ\}_n$, $\{LTIT'\}_n$, $\{LTKT'\}_n$, $\{M\}_n$, $\{MI\}_n$, $\{MTIT'\}_n$, $\{MTKT'\}_n$, $\{N\}_n$, $\{NI\}_n$, $\{NTIT'\}_n$, $\{NTKT'\}_n$, $\{QI\}_n$, $\{QJ\}_n$, $\{RI\}_n$, $\{RJ\}_n$, and $\{UI\}_n$.

It is helpful to define the $P_2O_5$ contents, operative at the various stages of the process, that must be controlled in order to optimize the synthesis procedure of the present invention especially in strong acid system (3) (i.e., PPA). We will define the initial $P_2O_5$ content $P_i$, as the $P_2O_5$ content of the polyphosphoric acid operative during dehydrohalogenation. The initial $P_2O_5$ content in accordance with the practice of the invention should be below about 88%, and can range from between about 63% to about 88%, preferrably from about 63% to about 86%, more preferrably from about 72% to about 86%, and most preferrably from about 72% to about 85%.

For the sake of clarity and the reader's convience, the following designations as it appears in applicants' earlier filed copending applications have been changed to read:

| in Parent Applications | | in This Application |
|---|---|---|
| $m_o$ | = | $P_i$ |
| intermediate $P_2O_5$ content | = | $P_m$ |
| f | = | $P_f$ |

The earlier and current designations should be read as equivalent where they appear in the present application.

The intermediate $P_2O_5$ content, $P_m$, is operative at the initiation of polycondensation and is calculated so as to give a third (or final) $P_2O_5$ content, $P_f$, that accounts for polyphosphoric acid hydrolysis by 100% of the theoretical water of polycondensation. The intermediate $P_2O_5$ content, $P_m$, in accordance with the practice with the instant invention may range between about 82% and about 90%. The final $P_2O_5$ content, $P_f$, must be above some minimum value if the solution is to maintain its effectiveness as a reaction medium at the late stages of polymerization. The final $P_2O_5$ content should be between about 80.5% to about 86%, preferably between about 82% to about 86%, and most preferably between about 82% to about 84%.

In accordance with the present invention a liquid crystalline extended chain polymer composition of any desired polymer concentration and intrinsic viscosity (e.g., between 10-20% and 7 dL/g-18 dL/g) can be obtained by selecting and controlling the conditions under which the process is carried out (batch, semi-continuous, continuous or intermittent-continuous). The various important general process steps for preparing liquid crystalline polymer compositions of the present invention may include one or more of the following stages which are considered to be within the process parameters described above. These stages are:

Stage One—One or more of a selected first monomers selected from the group consisting of (amino-group-containing) monomer(s) 1, 3, 5, or 9 is added to a specified initial weight in grams (given by a*) of a polyphosphoric acid with a $P_2O_5$ content $m_o$ according to the empirical equation $$a^* = \{[1-f]([P_y/P_c]-P_y) - [n_o(18.02)/M_w]P_y\}(1-m_o)^{-1}$$

where $P_y$ is the weight in grams of the theoretical yield of polymer, $P_c$ is the weight fraction of polymer in the total weight of the final liquid crystalline polymer composition (and is chosen to be above the critical concentration of the polymer necessary for liquid crystalline phase formation in the resulting polymer-polyphosphoric acid composition), $n_o$ is an integer giving the number of moles of condensation by-product per mole of polymer repeating unit. The number 18.02 is the molecular weight of the condensation by-product, $M_w$ is molecular weight of the polymer repeating unit, and f is the final $P_2O_5$ content that must be above a minimum value as defined by this invention.

Stage Two—Once the first monomer(s) are combined with polyphosphoric acid, and protecting groups, if present, released, (optionally, depending on the particular polymer and reaction mechanism chosen) a stoichiometric amount of one or more of a selected second monomer selected from the group consisting of 2, 4, 6, 7 or 8 is next added and the chosen value of f is achieved by adding b* (an intermediate weight in grams of $P_2O_5$) to the mixture according to the equation.

$$b^* = [P_y/P_c] - P_y - [\{n_0(18.02)/M_w\}]P_y - a^*$$

Stage Three—The resulting mixture (containing the first monomer(s) and/or the second monomer(s)) is then heated to a temperature suitable for polycondensation and maintained for a time to achieve the desired molecular weight (characterized by intrinsic viscosity).

Optionally, where the resultant extended chain polymer is formed from a selected first and second monomer, a selected excess molar amount (from 0.025 molar or less to 3 molar or more percent) of said selected second monomer can be added in Stage Two or more preferably a selected excess molar amount of said selected first monomer can be added in Stage One or allowing the loss of a small proportion of said selected first or said selected second monomer during polymerization Stage Three thereby off-balancing the stoichiometry of the monomers to obtain a desired intrinsic viscosity value less than the maximum attainable. Alternatively, one or more monofunctional reactants selected from Tables 15a, 15b, and 15c can be added during Stage One thereby limiting the maximum intrinsic viscosity attainable at Stage Three. The monofunctional reactants described herein are effective when added at the beginning of the polymerization Stage.

The reaction temperature may range from about 100° C. to about 210° C., preferably about 160° C. to about 190° C., and most preferably about 185° C.

The $P_2O_5$ content, $m_o$, should be low enough to:
(1) achieve efficient dehydrohalogenation and/or
(2) achieve sufficient monomer loading to achieve desired $P_c$ without foaming problem or unusually high bulk viscosity. f should be high enough to:
  (2a) maintain a polyphosphoric acid composition that is an effective reaction medium at late stages of polycondensation.
  (2b) provide an effective phosphorylating medium as described in N. Yoda and M. Kurihara, "New Polymers of Aromatic Heterocycles by Polyphosphoric Acid Solution Methods", J. Polymer Science, Macromolecular Reviews, Volume 5, (1971), p. 159 at initial stage of polymerization. The subject matter of the paper by Yoda and et. al., is specifically incorporated herein by reference.
  (2c) provide an effective solvent for the polymer at the end of polycondensation.

For purpose of illustration, a plot of equation a* is presented in FIG. 7 showing regions (shaded dash area) of poor monomer 1a solubility. In the case of polymer $-\!\!+\!\!AI\!\!+\!\!_n$, the family of $P_c$ curves can be utilized as follows:

1. choose a $-\!\!+\!\!AI\!\!+\!\!_n$ polymer concentration, $P_c$, as an example 0.16;
2. select a point on the curve $P_c = 0.16$ above the shaded dash area indicating poor monomer 1a solubility;
3. from that point selected, the weight in grams of PPA (a*) of the corresponding $P_2O_5$ content ($m_o$) that should be added to 92.06 g of monomer 1a can be determined;
4. after dehydrochlorination is complete, the amount of monomer 2a to be added is 62.38 g; and
5. if the final $P_2O_5$ content (f) has been chosen to be 82.2%, then the amount of $P_2O_5$ to be added (b*) is the difference between the amount of PPA used in step 3 above and the weight of PPA at the end of the curve for $P_c = 0.16$.

The choice of the optical $m_o$ is dependent on the desired polymer concentration and the solubility limits of the first monomer. The region of poor solubility for monomer 1a is shown in FIG. 7. Other monomers exhibit different solubility limits. Solubility rankings of some representative monomers are listed below.
monomers with solubilities greater than 1a;
1f, 1g, 3a, 3b, 3c, and 3d;
monomers with solubilities comparable to 1a:
1d, and 3e;
monomers with solubilities less than 1a:
1b, 1c, 1e, 1i, 1k, 3f, 3g, 3h, 3i, and 3j;
and monomers with solubilities much less than 1a:
1h, 1l, 1m, 1n, 1o, 1p, 5a, and 9a.

Some process and product benefits as a result of better control of certain process parameters such as shear and temperature in a continuous process are: (1) a more homogeneous products of reaction as a result of a much higher order of magnitude of mixing; (2) higher throughputs; (3) and improved economics.

Another advantage of continuous processing is that the resulting reaction products can be blended in essentially all portions with other reaction products of different polymer type and/or reaction products at different stages of reaction.

In a continuous process, the aforementioned dehydrochlorination step of "Stage One" and monomer-$P_2O_5$ addition of "Stage Two" are conducted at a temperature not to exceed about 100° C. in a batch reactor preferably of the type described in Example 131. "Stage Three" of the invention can be conducted in a motionless (static) mixer. Such mixers for paste and very viscous materials are described in "Chemical Engineers' Handbook", R. H. Perry et al., McGraw-Hill Kogakusha, LTD., International Student Edition, pp. 19–24, (1973); "Fluid Mixing Technology", by James Y. Oldshue, McGraw-Hill Publishing Company, pp. 431–438, (1983); and Grout et al., U.S. Pat. No. 3,800,985. These publications and patent are incorporated herein by reference. The reaction mixture of "Stage Two" is fed from an outlet of the batch reactor through a constant displacement pump to a static mixer (tubular reactor) preferably of the type described in U.S. Pat. No. 3,800,985 where the first mixing element is heated at a temperature between about 140° C. to about 185° C. The second and subsequent intermediate mixing elements are heated at temperatures between about 165° C. and about 200° C. The last mixing elements are heated at temperatures between about 80° C. and about 200° C. depending on the desired temperature selected for spinning the particular extended chain polymer employed.

In order to avoid interruptions in the continuous process, two or more batch reactors (for conducting "Stage One" and "Stage Two") are connected to the static mixer (tubular reactor) in parallel array fashion so as to feed said tubular reactor in time-wise sequence. Preferably, "Stage One" and "Stage Two" can be conducted in an emptied batch reactor without the need for clean-up. The volume requirement of the tubular reactor is a function of the size and number of the batch reactor array, the desired (mixing elements) residence time, and the desired flow rate.

Such a continuous process is especially suitable for the preparation of block copolymers of the present invention. Block copolymers can be made by admixing a second reaction mixture after the first reaction mixture has passed through an intermediate number of mixing elements. A very important aspect of the continuous process as well as for the batch process which must be emphasized is that "Stage One", "Stage Two", and "Stage Three" of the invention must be conducted within the shaded phosphorus pentoxide content profile area bounded by ABCDEFGHI of FIG. 14. This is unrealized by the art.

In accordance with the process of the invention, it is possible to dehydrohalogenate a high concentration of selected hydrohalide monomers more rapidly in extremely high $P_2O_5$ content (viscous and highly viscous) strong acid solutions. In addition, the process is applicable to the dehydrohalogenation of monomers more rapidly in a solution of lesser $P_2O_5$ content than that of U.S. Pat. No. 4,225,700. Further, a solution of selected monomers in PPA of considerably higher concentration is possible and a reaction product containing a much higher concentration of polymer is possible.

While the process of this invention can be used to prepare any of the class of extended chain polymers described herein, the process steps can be varied depending on the composition and polymer properties desired. The monomer(s) and strong acid(s) of stages One and Two as set forth above can be combined and the protecting atoms or groups released by:

(1) admixing a high concentration of monomer(s) in a strong acid such as polyphosphoric acid having a low $P_2O_5$ content followed by dehydrohalogenation, or (2) admixing a high concentration of monomer(s) in a strong acid such as polyphosphoric acid having a high $P_2O_5$ content followed by dehydrohalogenation at a sufficiently high surface-to-volume ratio (S/V).

Both methods (1) and (2) of dehydrohalogenation will avoid the uncontrollable (runaway) foaming inherent in prior art processes and provide reaction mediums suitable for polymerization.

The effect of various parameters such as temperature, surface-to-volume ratio, $P_2O_5$ content, agitation (stir rate), and reduced pressure on monomer dehydrohalogenation is shown in the table below. In the table ↑ means increases, ↓ means decreases, and NC means no change.

TABLE

| (Monomer Dehydrohalogenation) | | | | | |
| --- | --- | --- | --- | --- | --- |
|  | A↑ | B↑ | C↑ | D↑ | E↓ |
| Gas(HCL) evolution | ↑ | ↑ | ↓ | ↑ | ↑ |
| Monomer-acid viscosity | ↓ | NC | ↑ | NC | NC |
| Monomer decomposition | ↑ | NC | ↓ | NC | NC |

A = Temperature
B = Surface-to-Volume Ratio
C = $P_2O_5$ Content
D = Stir Rate
E = Pressure The empirical relationship:

$$\min S/V = \{[2 \exp((P_c/0.5) - 1)] \exp (P_i/0.9)^{15} + 3(100 \exp [a^*/(a^*+b^*) - 1]) + 10(P_i/0.9)^{15}\} - 1$$

is used to estimate the size of resin kettle required to give an efficient and manageable dehydrochlorination when conducted at 100° C. and under reduced pressure. The relationship shows the strong dependency of required S/V on the $P_2O_5$ content of medium, which follows mainly from the strong dependency of the bulk viscosity on the $P_2O_5$ content. When the value of the radius required exceeds the practical limit, cylindrical resin kettles cannot be used and a reactor of higher S/V should be used.

Standard laboratory resin kettles have a cylindrical configuration and may range in capacity from 50 cubic centimeters to many hundreds of cubic meters. However, as the capacity is increased the surface area does not increase proportionally. This results in a decrease of the surface-to-volume ratio.

Laboratory kettles have a fairly constant ratio of depth to diameter, which generally lies between 1.2 and 1.4. A 100-gallon stirred reactor filled to capacity has a surface-to-volume ratio of only about 0.012 $cm^{-1}$, but this could be effectively increased to about 0.048 $cm^{-1}$ if the reactor were filled to only one-quarter capacity. It is impractical to use less than about one-fourth of the capacity of a standard laboratory resin kettle due to the inefficient stirring which results and due to the high percentage of material which is effectively lost on the sides of the vessel. The process of the invention can be performed in any reactor, properly equipped with a stirrer, thermometer, inert gas inlet, and inlet points for the introduction of reactants. The configurations of suitable batch and continuous reactors that can be engineered are many and are well known to those skilled in the art. Reactors and process equiptment suitable for use in the process of the invention should have the following requirements:

(1) the mixing apparatus of whatever engineering arrangement selected, is made from a material which is nonreactive with the reaction medium of the process, (2) the apparatus must be able to withstand the temperatures required at the various stages of the process, (3) the mixing mechanism must be able to operate under the conditions of high bulk viscosity of the reaction medium, (4) the mixing must be conducted within a closed system so that no external reactants may intrude upon the reaction, and (5) the procedure must be conducted under an atmosphere of inert gases.

Examples of various reactors and mixing devices suitable for increasing the efficiency of dehydrohalogenation and polymerization of polymers of the invention include: vessels of various shapes, crucibles, flasks, resin kettles, tumblers, tubes, vented or unvented, baffled or unbaffled apparatus utilizing gas or mechanical agitation, agitated lines or vessels, extruders, film wiping devices, flow or line mixers, injector devices, multiwiping overlapping, packed tubes, shaker mechanisms, spraying, mixing and/or blending devices including bulk blenders; change-can, cone, countercurrent, elevator, or gate mixers; intensive mixers, such as the Banbury, Prodex-Henschel and Welex-Papenmeir mixers; jet, kneading, laminarflow, motionless, Muller, nozzle, orifice, perforated plate, or pipeline mixers; pug mills; ribbon blenders; single or multiple roll mills; rotofeed, screw, shear-bar, spiral, static, or stationary-tank mixers; single or multiplescrew extruders; tumbler mixers, blades, single or multiple, including anchor, helical, axial or radial flowimpellers; dispersion, kneader, paddle, propeller, screw or sigma blades; turbines, and the like.

Specific examples of the above include: the Kneader Extruder available through Charles Ross & Son Co.; the Viscon(r) and Filmtruder(r) evaporators available through Luwa Corp.; the Hikon VL Evaporator available through Knotro Co., Inc.; the Glasteel Wiped Film Evaporator available through Pfaudler Co.; and the FC of VRC evaporator systems available through Buflovak, glassware available through Roth Glass Co. or Emsco, Inc., Double Planetary Mixer, and Kneader Extruder available through Charles Ross & Son Co.; the Komax Mixer, available through Komax Systems, Inc.; the Scott Horizontal Mixer from Scott Equipment Co.; the Kenics static mixer available through Chemineer, Inc.; the Model S-5 Paddle Mixer from H. C. Davis Sons, Inc.; the VV, RV, KV and BV-type conical screwmixers, Jaygo Model JRB Ribbon Blender, and the Polymix Sigma Blade Mixer available through Jaygo, Inc.; kneaders and sigma-arm mixers available through Peerless.

In accordance with the present invention, the various process considerations for controlling the conditions under which Stages One, Two, and Three of the process are carried out are described below. The process steps, in more detail, are as follows:

Step 1: Preparation of monomer for mixing with PPA

Step 2: Admix a first monomer with PPA having an initial $P_2O_5$ content of $P_i$ (in accordance with dehydrohalogenation method (1) or (2))

Step 3: Dehydrohalogenation in a reactor of sufficient surface-to-volume ratio

Step 4: Addition of second monomer to the product of Step 3 (omitted in the case of AB-type polymers)

Step 5: Addition of $P_2O_5$ to the product of Step 4 (or 3) to raise the $P_2O_5$ content to a value of $P_m$ so as to achieve a final $P_2O_5$ content, $P_f$, above about 0.805 (method (2))

Step 6: Addition of mono-functional reagent to control molecular weight of the resulting polymer (omitted in the case of block copolymers)

Step 7: Polymerization to completion for the production of homopolymers and copolymers; or, for the production of block polymers, two sets of monomers mixtures are prepared by conducting Steps 1-5 twice and the two reaction mixtures are allowed to react to predetermined values of molecular weight before they are mixed and further polymerized to join the two blocks together Step 8: Processing into articles such as fiber, film, fibrids, and the like The major process consideration involving steps 1-8 are as follows:

Step 1—The purity of monomers is essential for the quality control necessary to achieve reproducibility in polymer molecular weight and the resulting dope rheology. If the monomer contains any water of crystallization this must be taken into account in the following step by adding the term $W_c$ to the a* equation:

$$a^* = P_y\{[1-P_f][(1/P_c)-1]-(n_o 18.02/M_w)\} - W_c/(1-P_i)$$

where $W_c$ is the water of crystallization in grams and is calculated from the assay of the monomer and the amount of monomer added in Step 2.

Step 2—$P_i$, $P_y$, $P_c$, and $P_f$ are selected at the beginning of this step and a* is calculated using the a* equation above. FIG. 19 graphically illustrates various regions (A-E) for a $P_f$ value of 0.822 and a $P_y$ of 100 g. The regions being A-less preferred, B-preferred, C-most preferred, D-less preferred (for different reasons than A), and E-least preferred.

Region A—An advantage of selecting a $P_i$ in this region is the low bulk viscosity of the PPA which ranges from approximately $10_{100}$–$50_{20}$ centipoise (Cp) (where the subscript is the temperature in °C.) at 62% $P_2O_5$ content to $50_{100}$–$1000_{20}$ Cp at a $P_2O_5$ content of 76%. The disadvantage of this region is that as the choice of $P_c$ increases the monomer concentration required becomes so high that monomer insolubility becomes a problem. There are further disadvantages that the viscosity of the mixture becomes high because of the high solids content and relatively large quantities of $P_2O_5$ must be added after dehydrochlorination (Step 5).

Region B—The bulk viscosity of the PPAs in this region are in the range of 10–1,200 Cp in the temperature range of 20°–100° C. and are thus advantageous in providing a workable viscosity for the dehydrochlorination mixture.

Region C—Selections of $P_i$ in this region are most desirable because of the low viscosity of the PPA ($50_{100}$–$1500_{20}$ Cp) and the remaining $P_2O_5$ to be added (b*) is a convenient ratio to the amount of the preliminary solvent (a*). If the $P_c$ is high such that the monomer is difficultly soluble then the dehydrochlorination can be initiated at an $P_i$ in this region and $P_2O_5$ added before the dehydrochlorination is complete (This applies for all regions, but is most applicable for Regions A, B, and C).

Region D—The S/V of the reactor must be increased if a $P_i$ in region D is selected. The bulk viscosity of the medium is dramatically increased over region C.

Region E—For a $P_i$ to be selected in this region requires the use of very high S/V reactors so that high temperatures may be employed in the dehydrochlorination step.

The following general guidelines should be followed in order to select an appropriate reactor in which to conduct Steps 2 and 3. When any of the following conditions exist, it is advantageous and necessary to increase the surface-to-volume ratio (S/V) above that obtained by using a practical percentage of the capacity of a normal resin kettle:

Condition 1
Final Polymer concentration, $P_c$, is above about 15 wt % and the initial $P_2O_5$ content, $P_i$, is above about 77%.

Condition 2
Final Polymer concentration, $P_c$, is above about 10 wt % and the initial $P_2O_5$ content, $P_i$, is above about 80%.

Condition 3
Final Polymer concentration, $P_c$, is above about 8 wt % and the initial $P_2O_5$ content, $P_i$, is above about 84%.

Condition 4
The polymer yield, $P_y$, is above about 50 kg.

The appropriate amount of monomer to give the desired polymer yield, $P_y$, is mixed with a* grams of the initial PPA having a $P_2O_5$ content of $P_i$. $P_i$ is selected to be a convenient value that is above 62% and below $P_m$, where $P_m$ is the maximum intermediate $P_2O_5$ content allowable by the a* equation if the value of $P_f$ is to be achieved.

$P_m$ can be calculated by setting b* equal to zero, solving for a*, substituting the term obtained for a*, which is $P_y\{[(1/P_c)-1]-(n_o 18.02/M_w)\}$, into the a* equation for a*, and solving for $P_i$, which is now $P_m$.

$$P_m = 1 - \{\{[1-P_f][(1/P_c)-1]-x\}/[(1/P_c)-1]-x\}$$

where x is $(n_o 18.02/M_w)$, which is equal to the moles of water of condensation per gram of polymer.

FIG. 19 shows that the $P_m$'s for $P_c$'s of 0.10, 0.12, 0.13, 0.15, 0.17, and 0.20 are 0.847, 0.853, 0.857, 0.8635, 0.871, and 0.8816, respectively.

Mineral acids such as any of the alkanesulfonic acids that do not oxidize the monomer may be added at this point to lower the viscosity and decrease the time required for dehydrohalogenation. The preferred method for this addition is to treat the mineral acid as an inert diluent by calculating the values of a* and b* for a selected value of $P_c$ that is 3 to 10% higher than the actual desired $P_c$ and then add the acid in the amount necessary to bring the actual value of the concentration (once b* is also added) to this desired value. The rate of the polymerization (Step 7) will be substantially decreased as the amount of the inert diluent is increased.

Step 3—Although the S/V must be above some minimum value for this step, it is preferred that the dehydrohalogenation be conducted at a maximum S/V by using one of the following two procedures:
(1) Passing the dehydrochlorination mixture through a mechanically agitated thin film evaporator
(2) Sparging the dehydrochlorination mixture with an inert gas (thereby creating a foam) and passing the resulting foam through a static mixer into a evacuated chamber where the foam can settle.

Procedure 1—Use of an agitated thin film evaporator (ATFE) The first monomer is mixed with the preliminary solvent (i.e., a PPA of $P_2O_5$ content between 62 and 84%) and heated at a temperature between 50° and 100° C. until dehydrohalogenation is substantially complete. The product is then metered into a stirred vessel to conduct Step 4 by a pseudo-batch method.

The above-mentioned formulas I, III, V, VII, and VIII homopolymer compositions may be prepared in accordance with the above process parameters by:
(a) mixing a selected first monomer (for example, a selected first monomer selected from the group consisting of (1,1), (1,2), or (1,3) with or without oxidation protecting atoms or groups with a preliminary solvent of phosphoric acid having a relatively low phosphorus pentoxide content,
(b) heating and optionally placing the resulting mixture under reduced pressure to remove any volatilized protecting atoms or groups present and provide a solution of the first monomer in the preliminary solvent,
(c) adding a selected second monomer (for example, a second monomer selected from the group consisting of (2,1), (2,2), (2,3), (4,1), (6,1), (6,2), (7,1) or (8,1)) in the resulting solution of step (b) to provide a mixture of the first and second monomer in the preliminary solvent,
(d) then increasing the phosphorus pentoxide content of the mixture resulting from step (c) to provide a first and second monomer reaction medium of greater phosphorus pentoxide content suitable for polymerization,
(e) causing polymerization of the first and second monomer at a temperature sufficient to effect reaction at a rate to form a first homo-oligomeric product having a preselected intrinsic viscosity or a first homopolymeric product,
(f) optionally adding a preselected excess molar amount of said selected first monomer in step (a) thereby off-balancing the stoichiometry proportion of said selected first and second monomers in said first and second monomer reaction medium so as to provide a said first homo-oligomeric product or a said first homopolymeric product following polymerization step (e) having a predetermined intrinsic viscosity less than the maximum attainable for a stoichiometric equivalent amount of both said selected first and second monomers,
(g) optionally adding a preselected excess molar amount of said selected second monomer in step (c) thereby off-balancing the stoichiometry proportion of said selected first and second monomers in said first and second monomer reaction medium so as to provide a said first homo-oligomeric product or a said first homopolymeric product following polymerization step (e) having a predetermined intrinsic viscosity less than the maximum attainable for a stoichiometric equivalent amount of both said selected first and second monomers,
(h) optionally adding one or more of a selected monofunctional reactants in step (a) so as to provide a said first homo-oligomeric product or a said first homopolymeric product following polymerization step (e) having a predetermined intrinsic viscosity less than the maximum attainable in the absence of said selected monofunctional reactants.

Formulas II, IV, and VI homopolymer compositions may be prepared by:
(a) mixing a selected first monomer (for example, a selected first monomer selected from the group consisting of (3,1), (3,2), (5,1), or (9,1)) with or without oxidation protecting atoms or groups with a preliminary solvent of phosphoric acid having a relatively low phosphorus pentoxide content,
(b) heating and optionally placing the resulting mixture under reduced pressure to remove any volatilized protecting atoms or groups present and provide a solution of the first monomer in the preliminary solvent,
(c) then increasing the phosphorus pentoxide content of the mixture resulting from step (b) to provide a first monomer reaction medium of greater phosphorus pentoxide content suitable for polymerization,
(d) causing polymerization of the first monomer at a temperature sufficient to effect reaction at a rate to form a first homo-oligomeric product having a preselected intrinsic iscosity or a first homopolymeric product,
(e) optionally adding one or more of a selected monofunctional reactants in step (a) so as to provide a said first homo-oligomeric product or a said first homopolymeric product following polymerization step (d) having a predetermined intrinsic viscosity less than the maximum attainable in the absence of said selected monofunctional reactants.

COPOLYMERIC COMPOSITIONS AND THEIR PREPARATION

In accordance with a further aspect of the invention, there is provided a liquid-crystalline composition useful in the preparation of fibers and films comprising a polycondensation product consisting essentially of a blend of certain polyphosphoric acids and a high concentration of at least one high molecular weight extended chain copolymer selected from the group consisting of recurring units of the general formulas:

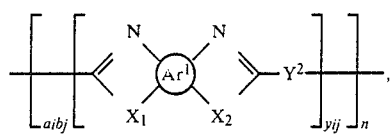

IX

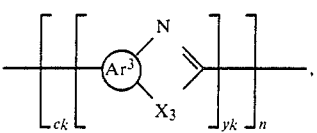

XI wherein $Ar^1$ represents an aromatic moiety and is XXX as defined above, $X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another, and $Y^2$ is nil or represents a bivalent organic radical and is XXXI as defined above, $a_ib_j$ represents the molar proportions of the respective different recurring units present in said copolymer, $y_{ij}$ represents an average number of the respective different sequential recurring units present in said copolymer, n being a positive integer;

wherein $Ar^3$ represents an aromatic moiety and is XXII as defined above, $X_3$ is sulfur, oxygen, or NR (R being hydrogen or an organic group), the nitrogen atoms and $X_3$ being bonded to aromatic carbon atoms of $Ar^3$, N and $X_3$ of each hetero ring are disposed ortho to one another, $c_k$ represents the molar proportions of the respective different recurring units present in said copolymer, $y_k$ represents an average number of the respective different sequential recurring units present in said copolymer, n being a positive integer;

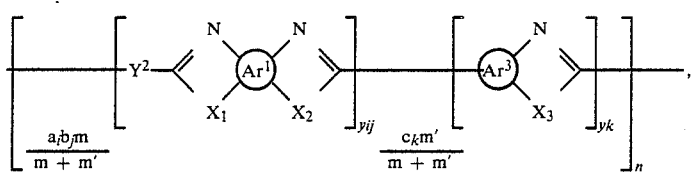

X wherein $Ar^1$ represents an aromatic moiety and is XXX as defined above, $X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ represents a bivalent organic radical and is XXXI as defined above, $a_ib_jm/m+m'$ represents the molar proportions of the respective different recurring units present in said copolymer, $y_{ij}$ represents an average number of the respective different sequential recurring units present in said copolymer, $Ar^3$ represents a different aromatic moiety and is XXII as defined above, the nitrogen atom and $X_3$ being bonded to aromatic carbon atoms of $Ar^3$, $c_km'/m+m'$ represents the molar proportions of the respective different recurring units present in said copolymer, $y_k$ represents an average number of the respective different sequential recurring units present in said copolymer, n being a positive integer;

XII

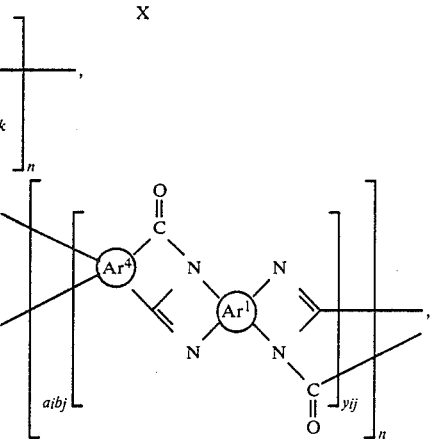

wherein $Ar^1$ represents an aromatic moiety and is XXXII as defined above, $Ar^4$ represents a different aromatic moiety and is XXIII as defined above, the nitrogen atoms being bonded to $Ar^1$ and the carbon atoms being bonded to $Ar^4$, $a_ib_j$ represents the molar proportions of the respective different recurring units present in said copolymer, $y_{ij}$ represents an average number of the respective different sequential recurring units present in said copolymer, n being a positive integer;

XV

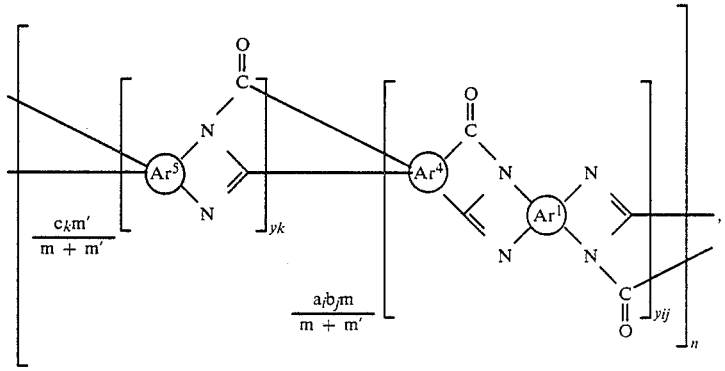

wherein $Ar^4$ represents a different aromatic moiety and is XXIII as defined above, $Ar^1$ represents an aromatic moiety and is XXXII as defined above, and $Ar^5$ represents an aromatic moiety different from $Ar^4$ and $Ar^1$ and is XXIV as defined above, the carbon atoms being bonded to $Ar^4$ and $Ar^5$ and the nitrogen atoms being bonded to $Ar^1$ and $Ar^5$, n being a positive integer; $c_k m'/m+m'$ represents the molar proportions of the respective different recurring units present in said copolymer, $y_k$ represents an average number of the respective different sequential recurring units present in said copolymer, $a_i b_j m/m+m'$ represents the molar proportions of the respective different recurring units present in said copolymer, $y_{ij}$ represents an average number of the respective different sequential recurring units present in said copolymer, n being a positive integer;

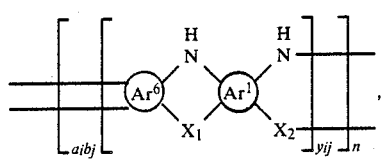

XVI wherein $Ar^1$ represents an aromatic moiety and is XXX as defined above, $Ar^6$ represents a different aromatic moiety and is XXV as defined above, $X_1$ and $X_2$ are the same or different and are sulfur, oxygen, or NR (R being hydrogen or an organic group), the NH groups and $X_4$ and $X_1$ being bonded to aromatic carbon atoms of $Ar^6$ and $Ar^1$, NH and $X_1$ or $X_2$ of each hetero ring are disposed ortho to one another, $a_i b_j$ represents the molar proportions of the respective different recurring units present in said copolymer, $y_{ij}$ represents an average number of the respective different sequential recurring units present in said copolymer, n being a positive integer;

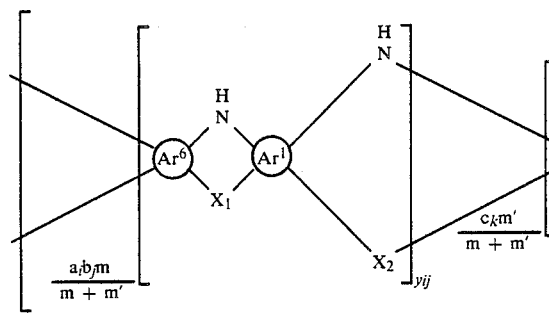

wherein $Ar^1$ represents an aromatic moiety and is XXX as defined above, $Ar^6$ represents a different aromatic moiety and is XXV as defined above, $X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hetero ring are disposed ortho to one another, $a_i b_j m/m+m'$ represents the molar proportions of the respective different recurring units present in said copolymer, $y_{ij}$ represents an average number of the respective different sequential recurring units present in said copolymer, $Ar^9$ represents an aromatic moiety different from $Ar^6$ and $Ar^1$ and is XXVI as defined above, $X_4$ is sulfur, oxygen, or NR (R being hydrogen or an aromatic group), the NH groups and $X_4$ being bonded to aromatic carbon atoms of $Ar^6$ and $Ar^9$, $c_k m'/m+m'$ represents the molar proportions of the respective different recurring units present in said copolymer, $y_k$ represents an average number of the respective different sequential recurring units present in said copolymer, n being a positive integer;

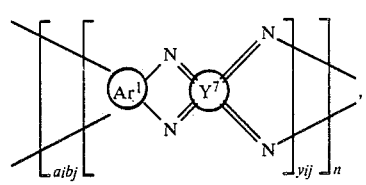

XVIII wherein $Ar^1$ represents an aromatic moiety and is XXXII as defined above, $Y^7$ represents an aromatic or heteroaromatic moiety and is XXVIII as defined above, the nitrogen atoms being bonded to aromatic carbon atoms of $Ar^1$ and bonded to adjacent carbon atoms of $Y^7$, $a_i b_j$ represents the molar proportions of the respective different recurring units present in said copolymer, $y_{ij}$ represents an average number of the respective different sequential recurring units present in said copolymer, n being a positive integer.

In accordance with the practice of the present invention, the synthesis of the aforementioned formulas IX--XVIII copolymers may be illustrated by the following general reaction system:

REACTION MECHANISM

Formation of formula IX copolymer

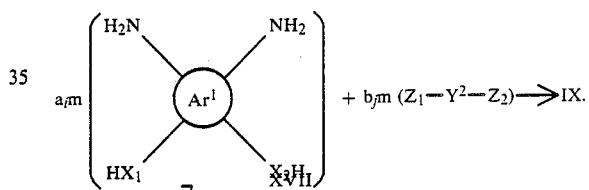

Formation of formula X copolymer $$a_i m \begin{pmatrix} H_2N & NH_2 \\ & Ar^1 & \\ HX_1 & X_2H \end{pmatrix} + b_j m(Z_1-Y^2-Z_2) +$$

4,772,678
-continued
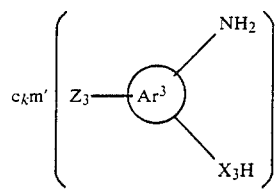
→X.
Formation of formula XI copolymer
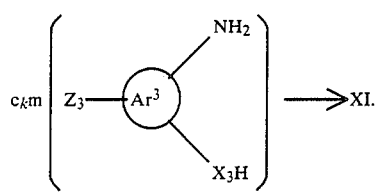
→XI.
Formation of formula XII copolymer
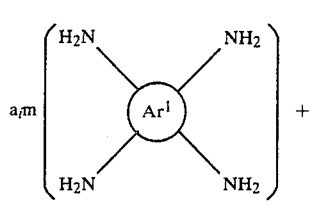
+
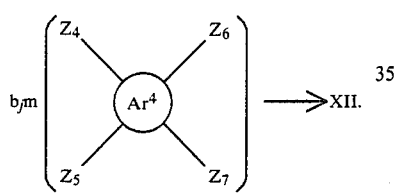
→XII.
Formation of formula XV copolymer
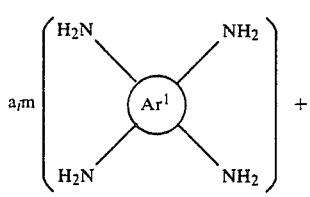
+
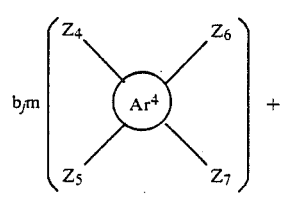
+
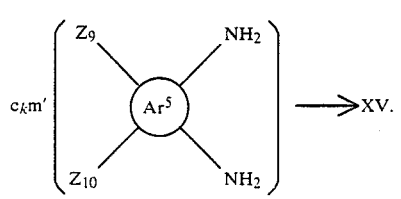
→XV.
Formation of formula XVI copolymer
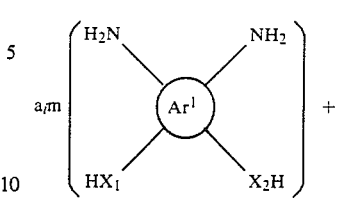
+
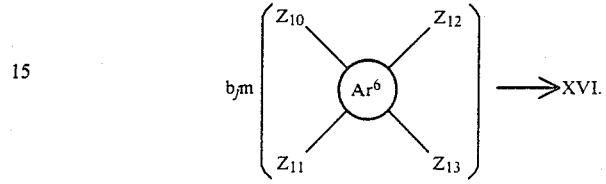
→XVI.
Formation of formula XVII copolymer
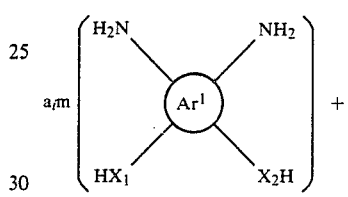
+
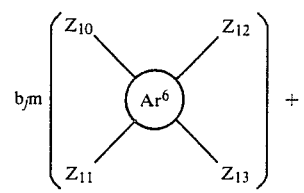
+
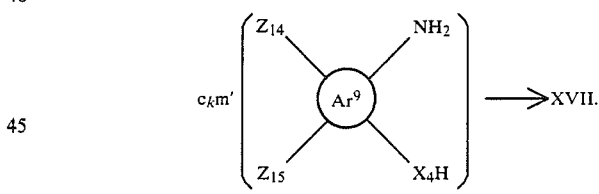
→XVII.
Formation of formula XVIII copolymer
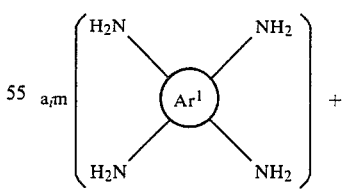
+
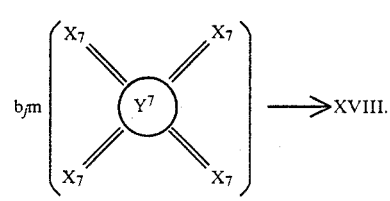
→XVIII.

The above-mentioned formulas IX, X, XII, XV, XVI, XVII, and XVIII copolymer compositions can be prepared in accordance with the above process parameters by:

(a) mixing at least two of a selected first monomers (for example, two or more of a monomer selected from the group consisting of (1,1), (1,2), (1,3), (3,1), (3,2), (5,1), or (9,1)) with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a solution of the first monomer in the preliminary solvent, (c) adding at least one of a selected second monomers (for example, one or more of a monomer selected from the group consisting of (2,1), (2,2), (2,3), (4,1), (6,1), (6,2), (7,1) or (8,1)) in the resulting solution of step (b) to provide a mixture of the first and second monomer in the preliminary solvent, (d) then increasing the phosphorus pentoxide content of the mixture resulting from step (c) to provide a first and second monomer reaction medium of greater phosphorus pentoxide content suitable for polymerization, (e) causing polymerization of the first and second monomer at a temperature sufficient to effect reaction at a rate to form a first co-oligomeric product having a preselected intrinsic viscosity or a first copolymeric product, (f) optionally adding a preselected excess molar amount of said selected first monomer in step (a) thereby off-balancing the stoichiometry proportion of said selected first and second monomers in said first and second monomer reaction medium so as to provide a said first co-oligomeric product or a said first copolymeric product following polymerization step (e) having a predetermined intrinsic viscosity less than the maximum attainable for a stoichiometric equivalent amount of both said selected first and second monomers, (g) optionally adding a preselected excess molar amount of said selected second monomer in step (c) thereby off-balancing the stoichiometry proportion of said selected first and second monomers in said first and second monomer reaction medium so as to provide a said first co-oligometric product or a said first copolymeric product following polymerization step (e) having a predetermined intrinsic viscosity less than the maximum attainable for a stoichiometric equivalent amount of both said selected first and second monomers, (h) optionally adding one or more of a selected monofunctional reactants in step (a) so as to provide a said first co-oligomeric product or a said first copolymeric product following polymerization step (e) having a predetermined intrinsic viscosity less than the maximum attainable in the absence of said selected monofunctional reactants.

Similarly formulas IX, XII, XVI, and XVIII copolymer compositions can be prepared by:

(a) mixing at least one of a selected first monomers (for example, one or more of a monomer selected from the group consisting of (1,1), (1,2), (1,3), (3,1), (3,2), (5,1), or (9,1)) with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a solution of the first monomer in the preliminary solvent, (c) adding at least two of a selected second monomers (for example, one or more of a monomer selected from the group consisting of (2,1), (2,2), (2,3), (4,1), (6,1), (6,2), (7,1) or (8,1)) in the resulting solution of step (b) to provide a mixture of the first and second monomer in the preliminary solvent, (d) then increasing the phosphorus pentoxide content of the mixture resulting from step (c) to provide a first and second monomer reaction medium of greater phosphorus pentoxide content suitable for polymerization, (e) causing polymerization of the first and second monomer at a temperature sufficient to effect reaction at a rate to form a first co-oligomeric product having a preselected intrinsic viscosity or a first copolymeric product, (f) optionally adding a preselected excess molar amount of said selected first monomer in step (a) thereby off-balancing the stoichiometry proportion of said selected first and second monomers in said first and second monomer reaction medium so as to provide a said first co-oligomeric product or a said first copolymeric product following polymerization step (e) having a predetermined intrinsic viscosity less than the maximum attainable for a stoichiometric equivalent amount of both said selected first and second monomers, (g) optionally adding one or more of a selected monofunctional reactants in step (a) so as to provide a said first co-oligomeric product or a said first copolymeric product following polymerization step (e) having a predetermined intrinsic viscosity less than the maximum attainable in the absence of said selected monofunctional reactants.

Preferred formulas IX, X, XI, XII, XV, XVI, XVII, and XVIII copolymers forming liquid crystalline copolymer compositions of the instant invention are those wherein $a_i$ is the mole fraction of the ith monomer selected from Type 1, $b_j$ is the mole fraction of the jth monomer selected from Types 2, 4, 6, 7, or 8, $c_k$ is the mole fraction of the kth monomer selected from Types 3, 5, or 9, m and m' are appropriate molar quantities based on desired yield, $a_ib_j$ and $a_ib_jm/m+m'$ are the molar proportions of the recurring units resulting from the condensation of the ith monomer of Type 1 and the jth monomer of Type 2, 4, 6, 7, or 8, $c_k$ and $c_km'/m+m'$ are the molar proportions of the recurring unit resulting from the condensation of the kth monomer of Type 3, 5, or 9, $y_{ij}$ is the average block length (i.e., the average number of sequential recurring units unbroken by a different recurring unit) of the recurring unit formed from the ith monomer of Type 1 and the jth monomer of Type 2, 4, 6, 7, or 8, $y_k$ is the average block length of the recurring unit formed by self-condensation of the kth monomer of Type 3, 5, or 9, and n is the average overall length of the copolymer (i.e., the average total number of recurring units independent of structure). The number of recurring units in the copolymer may be the product of the highest i and the highest j or may be the product of the highest i and the highest j plus the highest k. i, j and k can be as high as is practical, but may have certain minimal values if copolymers, rather than homopolymers, are to be obtained.

Selected molar quantities ($a_1m, a_2m, \ldots a_im$) of monomers of Type 1 may be mixed with a phosphoric acid having a phosphorus pentoxide content of from about 63% to about 78%, preferably greater than about 68%, most preferably about 78%, and the protecting groups, such as hydrogen halide, if present, may be substantially removed by heating, and applying reduced pressure if desired. The quantity of the phosphoric acid is most desirably determined in accordance with equation a* above, making the necessary calculations for addition of monomers of possibly different molecular weights and different proportions. A stoichiometric quantity (i.e., $b_1m + b_2m + \ldots b_jm = m$) of monomer selected from Type 2, 4, 6, 7, or 8 may then be added to the resulting solution. The phosphorus pentoxide content of the resulting mixture may then be raised in accordance with equation b* above, so as to raise the final phosphorus pentoxide content of the substantially copolymerized mixture to a value preferably within the range between about 81% to about 84% and most preferably between about 82% to about 83.5%. The resulting mixture may then be heated to a temperature preferably about 100° C. to about 210° C. most preferably to about 170° C. to about 185° C. within a practical time period, from less than about one hour to greater than about 5 hours, preferably within about 1 to about 3 hours. The temperature may be maintained for a sufficient time, which may range from less than about 1 hour to about 48 hours or more, most preferably between from about 1 to about 23 hours, to achieve the desired n value. The practice of the present invention as it relates to the production of novel liquid-crystalline compositions comprising copolymers with the general formulas IX, XII, XVI, and XVIII is illustrated for those compositions including general formula IX wherein the selected monomers of Type 1 are further classified as being of Types (1,1), (1,2) or (1,3) and the selected monomers of Type 2 are of Types (2,1), (2,2), or (2,3).

General formula IX copolymers prepared from type (1,1) and type (2,1) monomers have the advantage that the critical concentration necessary for liquid-crystalline behavior is low. For the copolymers listed below, their critical concentration may be as low as about 5 weight percent in polyphosphoric acid at substantially moderate n values, thus allowing a broad range of operable concentrations.

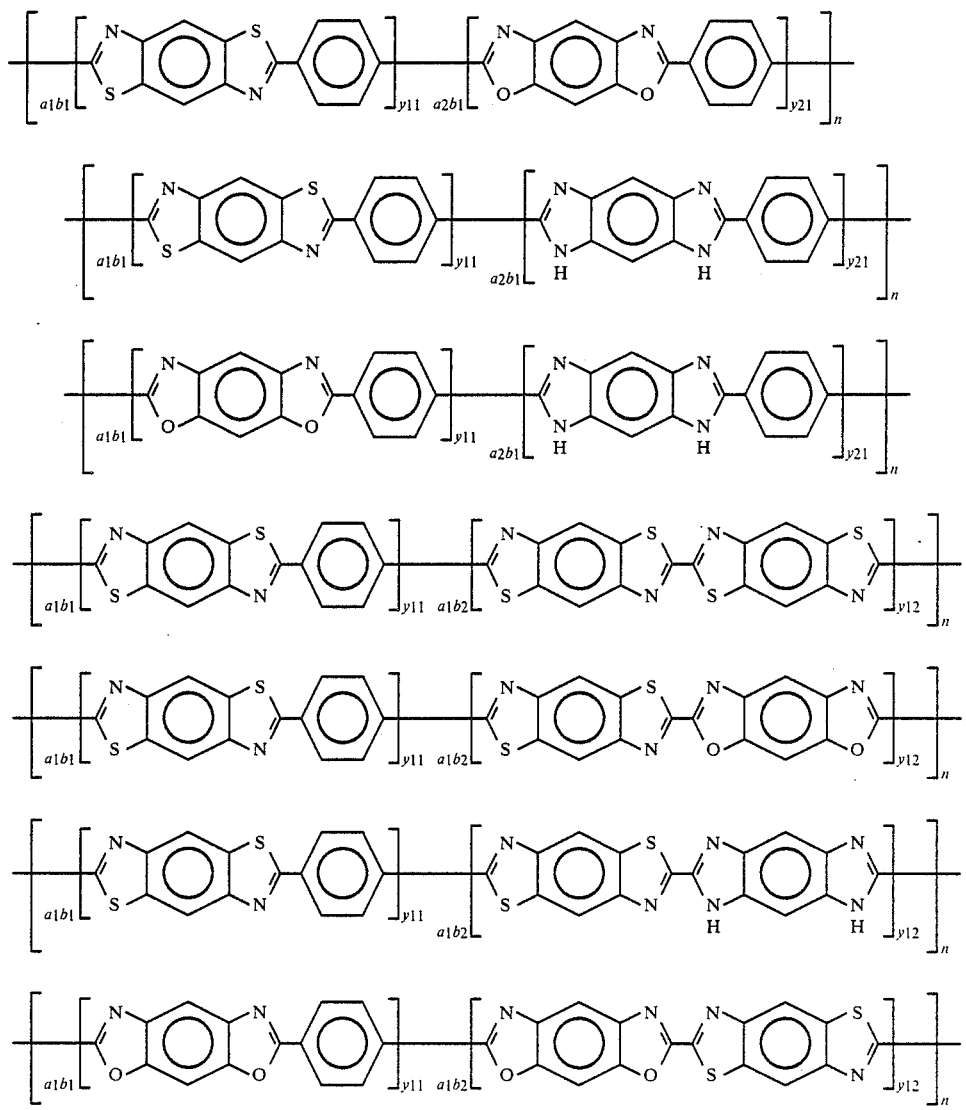

-continued

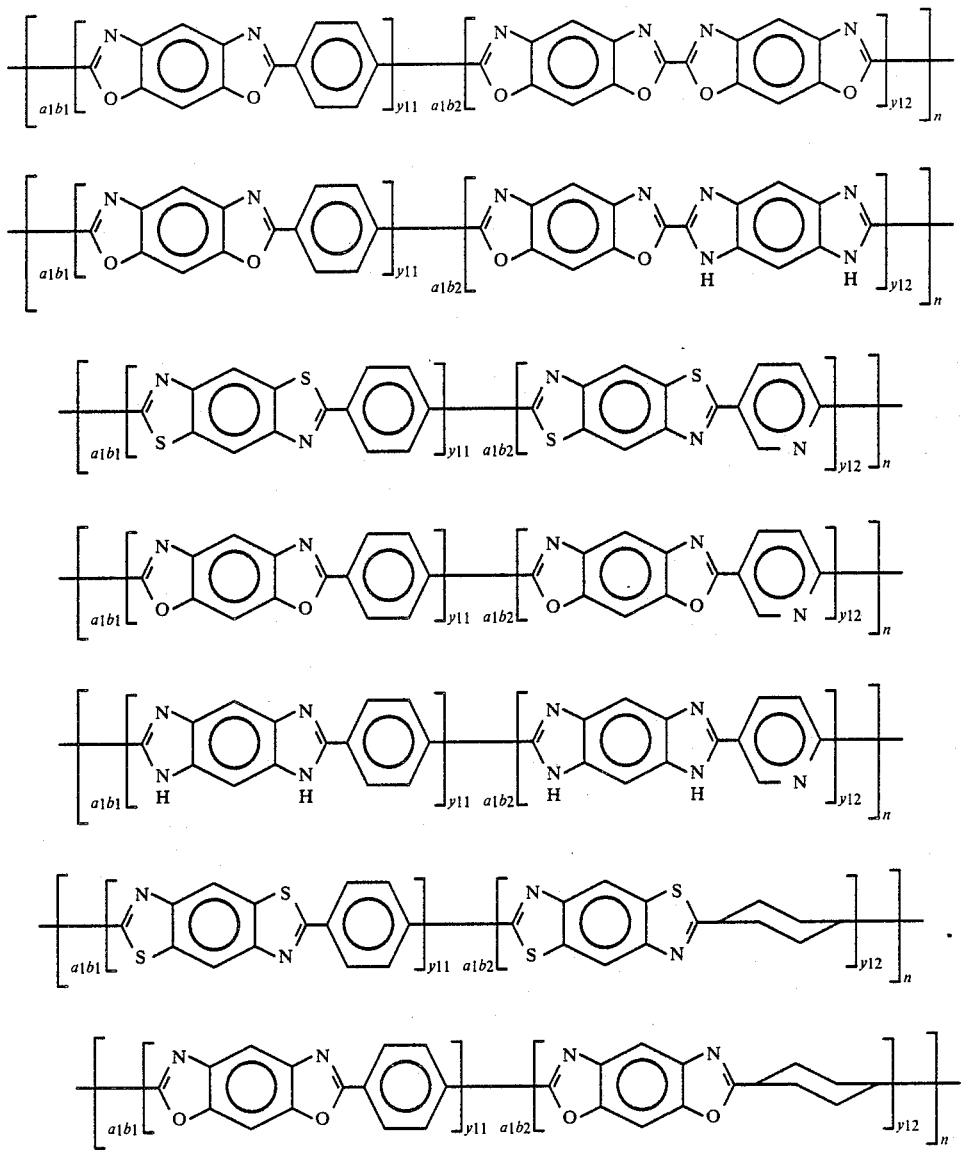

Since the recurring units of the copolymers are of essentially comparable mesogenicity, a broad range of copolymer compositions may be achieved; for instance, $a_1b_1$ can range from nearly zero to nearly one while $a_1b_2$ or $a_2b_1$ (because it is equal to $1-a_1b_1$) ranges from nearly one to nearly zero, respectively. The average block lengths $y_{11}$ and $y_{12}$ or $y_{21}$ are governed by the method of monomer addition described above and the molar quantities selected. Thus, for monomer pairs of essentially equal reactivity, $y_{11}$, which equals $1/1-a_1b_1$, may range from nearly one to very high values. In a like manner, $y_{12}$ or $y_{21}$ can range from very high values to nearly one. Monomer purity, control of stoichiometry, and exclusion of side reactions caused by oxidizing impurities must be sufficient to obtain an overall copolymer length, n, greater than about 50 in order to obtain the desired polymeric properties of useful mechanical strength, modulus, etc. The practice of the invention as it relates to copolymers derived from Class 1 monomers is further illustrated in Examples 49–51 and 54–66 below.

General formula IX copolymers may be prepared from type (1,1), (2,1) and (2,2) monomers and from type (1,1), (1,2) and (2,1) monomers. These monomers are classified as Class 2 owing either to a moderately reduced mesogenic character of the recurring unit derived from them or to their tendency to reduce the solubility range of the resulting polymer, which in turn is usually owing to an overall reduction of the heteroatom/hydrocarbon ratio of the resulting polymer. Both of these conditions dictate that incorporation of Class 2 monomers into copolymers of the present invention should be carefully selected. The degree of this selectivity is illustrated by the following copolymers prepared in accordance with the practice of the invention.

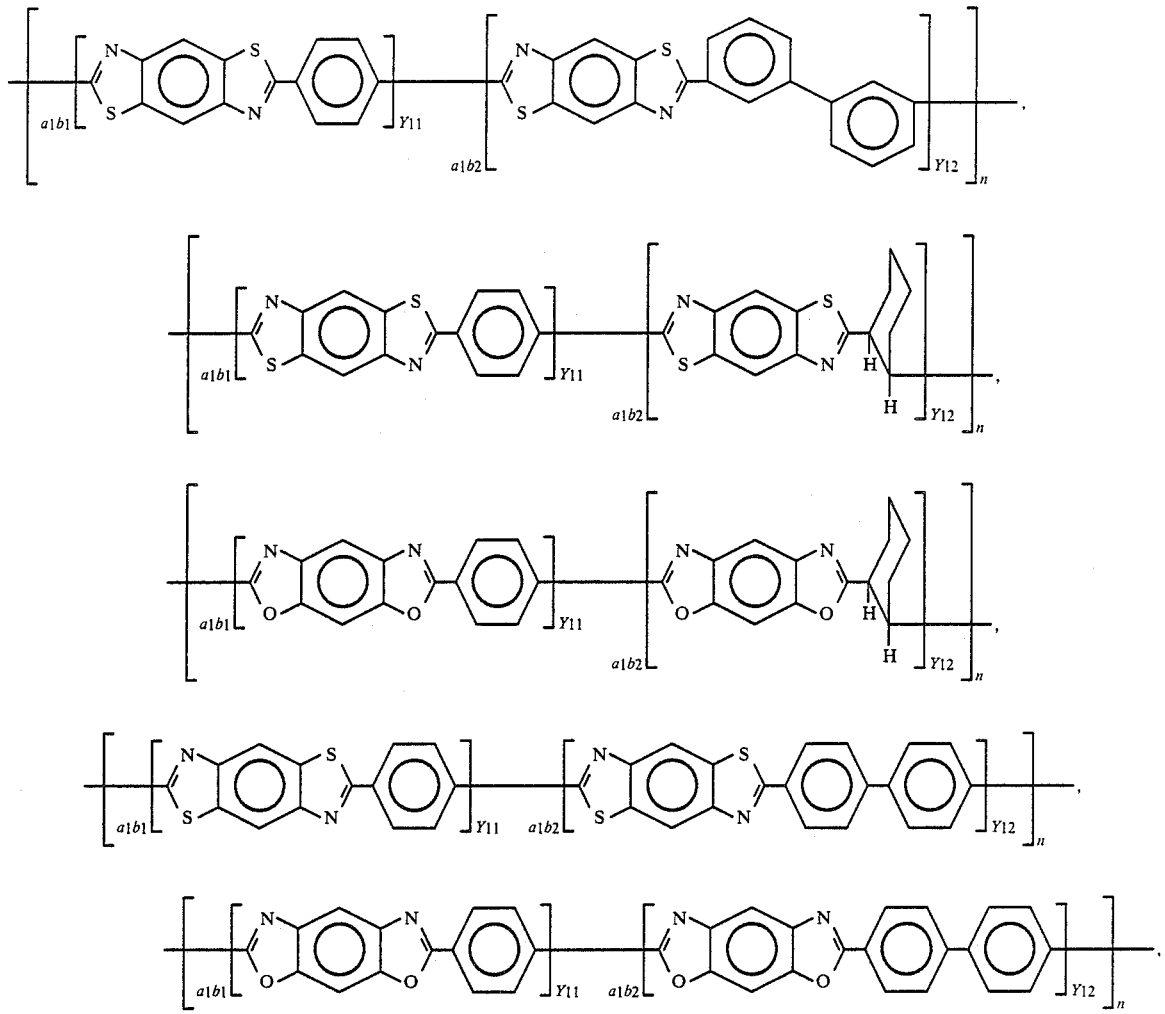

The immediately preceding list of copolymers is derived from monomer compositions containing monomers imparting reduced solubility to the copolymer. The preferred values of $a_1b_1$ (i.e., the mole fraction of the more soluble recurring unit) are those greater than about 0.8, leading to values of $y_{11}$ greater than about 5 and $y_{12}$ values of nearly one. Monomer purity, control of stoichiometry, exclusion of oxidizing impurities, and selection of the molar quantity of the less soluble monomer to maintain copolymer solubility must be sufficient to achieve an average n value of greater than about 50. Increased proportion of a less soluble monomer may be achieved by selecting comonomers that impart improved solubility to the copolymer. In general, monomers of Type 1 wherein X is S impart greater solubility than those in which X is O or N. The practice of the invention as it relates to copolymers of partially reduced solubility is further illustrated in Examples 52, 53, 70, 71, and 72 below.

The following list of copolymers is derived from incorporation of monomers of moderately reduced mesogenicity and the practice of the invention is illustrated for them.

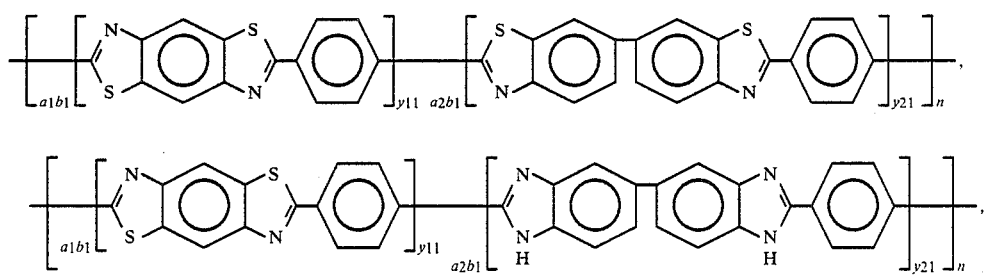

-continued

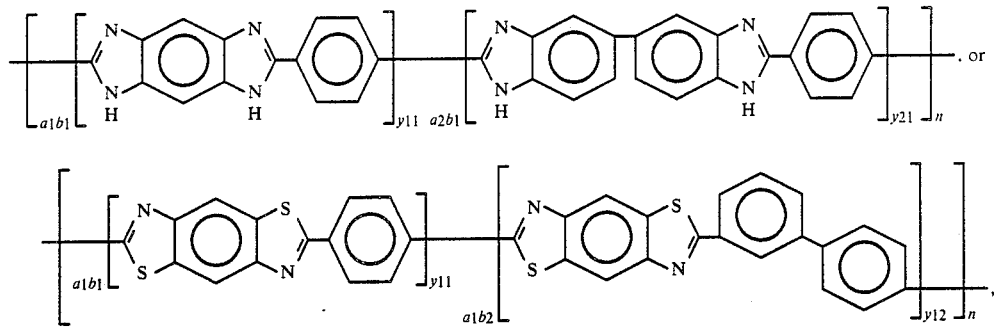

The preferred ranges of $a_1b_1$ are from nearly zero to nearly one for copolymers in this classification with the overall proviso that the overall copolymer concentration in the polyphosphoric acid be above a critical concentration determined by the least mesogenic recurring unit. Thus, above about 13% the above copolymers may have $a_1b_1$ values between about one and zero, $y_{11}$ values of nearly one and greater, and $y_{21}$ values of nearly one and greater. The preferred concentration with these $a_1b_2$ and $a_2b_1$ values may be between about 15 and about 22 weight percent. If the molar proportion of the more highly mesogenic recurring unit (i.e., $a_1b_1$) is selected to have values of greater than about 0.6, preferably greater than about 0.75, then the range of operable concentrations is increased to include concentrations of the copolymer in greater than about 8 weight percent, preferably above about 10 weight percent. Values of n greater than about 50 are preferable as stated above.

General formula IX copolymer compositions may be prepared from Class 3 monomers.

Monomers characterized as belonging to Class 3 lead to polymer recurring units that have little or no mesogenic character. Their incorporation into copolymers prepared as above are within the scope of the present invention but are less preferred because the random incorporation of a significant molar proportion of these non-mesogenic units leads to insufficient block length of the mesogenic recurring unit or units to impart liquid-crystalline behavior. Incorporation of less than about 3 molar percent of Class 3 monomers is preferred. Increased incorporation of Class 3 polymers are highly preferred by use of a block polymer procedure described below. A less preferred embodiment of the present invention is the preparation of General formulas X, XV, and XVII by the addition of monomers of Types 3, 5, and 9, respectively, to the initial solution of the above copolymer procedure. The unique feature of the geometry of monomers of Types 3 (except for 3k), 5, and 9 is the requirement that the block lengths, $y_k$, be large or, if small, be an even number. This condition dictates that preferred compositions of formulas X, XV, and XVII are prepared by a block polymer procedure described below.

The general formula XI copolymer composition shown above is prepared according to the following procedure:

(a) mixing at least two of a selected first monomer with or without oxidation protecting atoms or groups with a preliminary solvent of phosphoric acid having a relatively low phosphorus pentoxide content,
(b) heating and optionally placing the resulting mixture under reduced pressure to remove any volatilized protecting atoms or groups present and provide a solution of the first monomer in the preliminary solvent,
(c) then increasing the phosphorus pentoxide content of the mixture resulting from step (b) to provide a first monomer reaction medium of greater phosphorus pentoxide content suitable for polymerization,
(d) causing polymerization of the said two of a selected first monomer at a temperature sufficient to effect reaction at a rate to form a first co-oligomeric product having a reselected intrinsic viscosity or a first copolymeric product,
(e) optionally adding one or more of a selected monofunctional reactants in step (a) so as to provide a said first co-oligomeric product or a said first copolymeric product following polymerization step (d) having a predetermined intrinsic viscosity less than the maximum attainable in the absence of said selected monofunctional reactants.

Selected molar quantities $(c_1m, c_2m, \ldots c_km)$ of Type 3 monomers may be mixed with a phosphoric acid having a phosphorus pentoxide content of from about 63% to about 78%, preferably greater than about 68%, most preferably about 78%, and the protecting groups, if present, may be substantially removed by heating, and applying reduced pressure, if desired. The quantity of phosphoric acid is determined in accordance with equation a* above, making the necessary calculations for the addition of monomers of possibly different molecular weights and different proportions. The phosphorus pentoxide content of the resulting mixture may then be raised in accordance with equation b* above, so as to raise the final phosphorus pentoxide of the substantially copolymerized mixture to a value greater than about 81%, most preferably between about 82% to about 83% but less than about 84%. The resulting mixture may then be heated to about 100° C. to about 200° C., most preferably between about 150° C. to about 185° C. within a practical period of time, preferably within a time period of less than about 1 hour to about 5 hours or more, and most preferably within a period of about 1 hour to about 3 hours, and then maintained at the selected temperature for sufficient time to achieve the desired n value.

The practice of the present invention as it relates to the production of novel liquid-crystalline compositions that include copolymers with the general formula XI is further illustrated for those compositions wherein the selected monomers of Type 3 are further classified as being of Type (3,2).

The polymers

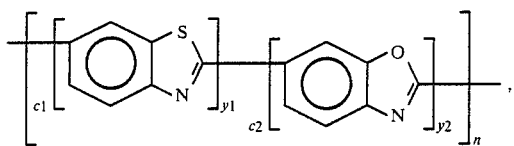

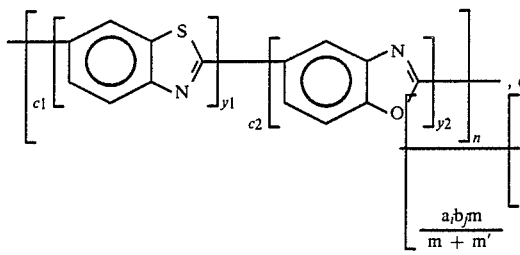

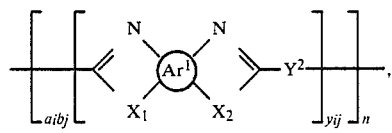

are prepared according to the above procedure wherein $c_1$ is the molar proportion of the more soluble recurring unit and selected to be above about 0.5, more preferably above about 0.7, to ensure the solubility of the resulting copolymer to the high concentrations required for liquid-crystalline behavior. A weight percent of the copolymer above about 15 weight percent, more preferably above about 17.5 weight percent, may be selected. Molar proportions selected above and monomer reactivity ratios determine the average block lengths $y_1$ and $y_2$. The block length does not bear on whether liquid-crystalline behavior in polyphosphoric acid is obtained with these polymers. The important factor is the maintenance of solubility at high concentration and the preparation of these copolymers in polyphosphoric acid at high concentration from monomers.

BLOCKPOLYMERIC COMPOSITIONS AND THEIR PREPARATION

In accordance with a still further aspect of the invention, there is provided a liquid-crystalline composition useful in the preparation of fibers and films comprising a polycondensation product consisting essentially of a blend of certain polyphosphoric acids and a high concentration of at least one high molecular weight extended chain block polymer selected from the group consisting of recurring units of the general formulas:

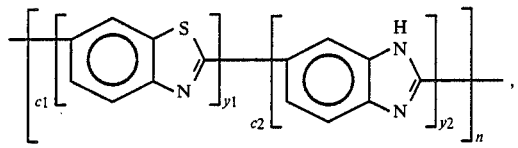

wherein $Ar^1$ represents an aromatic moiety and is XXX as defined above, $X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or represents a bivalent organic radical and is XXXI as defined above, $a_ib_j$ represents the molar proportions of the respective different recurring units present in said block polymer, $y_{ij}$ represents an average number of the respective different sequential recurring units present in said block polymer, n being a positive integer;

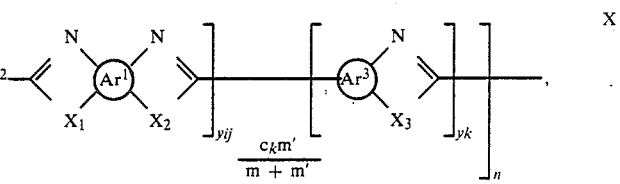

wherein $Ar^1$ represents an aromatic moiety and is XXX as defined above, $X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or represents a bivalent organic radical and is XXXI as defined above, $a_ib_jm/m+m'$ represents the molar proportions of the respective different recurring units present in said block polymer, $y_{ij}$ represents an average number of the respective different sequential recurring units present in said block polymer, $Ar^3$ represents an aromatic moiety and is XXII as defined above, $X_3$ is sulfur, oxygen, or NR (R being hydrogen or an organic group), the nitrogen atoms and $X_3$ being bonded to aromatic carbon atoms of $Ar^1$, N and $X_3$ of each hetero ring are disposed ortho to one another, $c_km'/m+m'$ represents the molar proportions of the respective different recurring units present in said block polymer, $y_k$ represents an average number of the respective different sequential recurring units present in said block polymer, n being a positive integer;

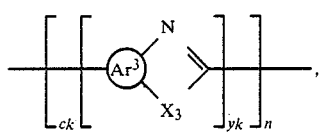

wherein $Ar^3$ represents an aromatic moiety and is XXII as defined above, $X_3$ is sulfur, oxygen, or NR (R being hydrogen or an organic group), the nitrogen atoms and $X_3$ being bonded to aromatic carbon atoms of $Ar^3$, N and $X_3$ of each hetero ring are disposed ortho to one another, $c_k$ represents the molar proportions of the respective different recurring units present in said block polymer, $y_k$ represents an average number of the respective different sequential recurring units present in said block polymer, n being a positive integer;

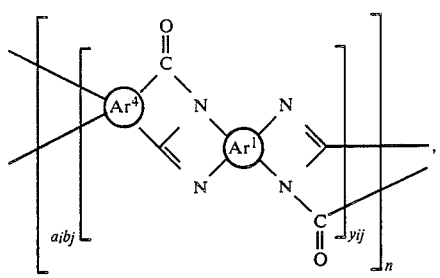

XII sents an average number of the respective different sequential recurring units present in said block polymer, $X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^4$, N and $X_1$ or $X_2$ of each hetero ring are disposed ortho to one another and $Y^2$ is nil or represents a bivalent organic radical and is XXXI as defined above, $m/m+m'$ represents the molar proportions of the respective different recurring units present in said block polymer, y represents an average number of the respective different sequential recurring units present in said block polymer, n being a positive integer;

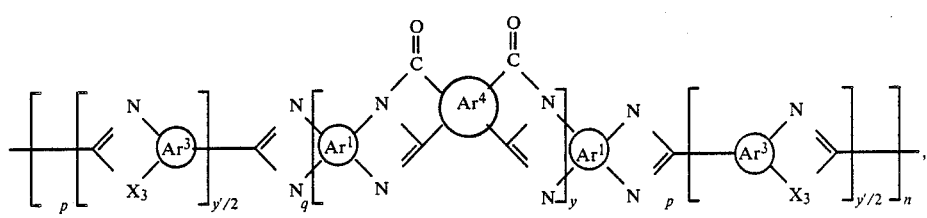

XIV wherein $Ar^1$ represents an aromatic moiety and is XXXII as defined above, $Ar^4$ represents a different aromatic moiety and is XXIII as defined above, the nitrogen atoms being bonded to $Ar^1$ and the carbon atoms being bonded to $Ar^4$, $a_ib_j$ represents the molar proportions of the respective different recurring units present in said block polymer, $y_{ij}$ represents an average number of the respective different sequential recurring units present in said block polymer, n being a positive integer;

wherein $Ar^3$ represents an aromatic moiety and is XXII as defined above, $X_3$ is sulfur, oxygen, or NR (R being hydrogen or an organic group), the nitrogen atoms and $X_3$ being bonded to aromatic carbon atoms of $Ar^3$, N and $X_3$ of each hetero ring are disposed ortho to one another, p represents the molar proportions of the respective different recurring units present in said block polymer, $y'/2$ represents an average number of the respective different sequential recurring units present in said block polymer, $Ar^1$ represents an aromatic moiety

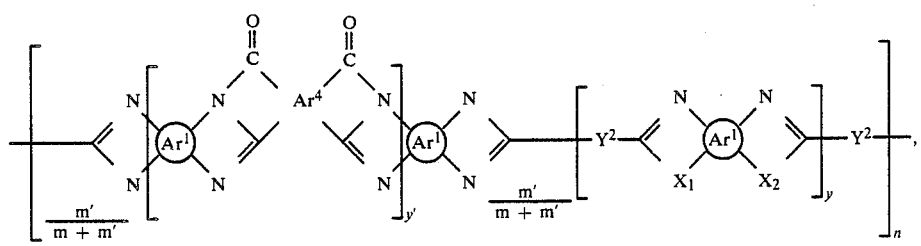

XIII wherein $Ar^1$ represents an aromatic moiety and is XXXII or XXX as defined above with the proviso that when $Ar^1$ is bonded to nitrogen atoms $Ar^1$ is XXXII and when $Ar^1$ is bonded to both nitrogen atoms and $X_1$ and $X_2$, $Ar^1$ is XXX as defined above, $Ar^4$ represents a different aromatic moiety and is XXIII as defined above, the carbon atoms being bonded to $Ar^4$, $m'/m+m'$ represents the molar proportions of the respective different recurring units present in said block polymer, $y'$ repre- and is XXXII as defined above, $Ar^4$ represents a different aromatic moiety and is XXIII as defined above, the nitrogen atoms being bonded to $Ar^1$ and the carbon atoms being bonded to $Ar^4$, q represents the molar proportions of the respective different recurring units present in said block polymer, y represents an average number of the respective different sequential recurring units present in said block polymer, n being a positive integer;

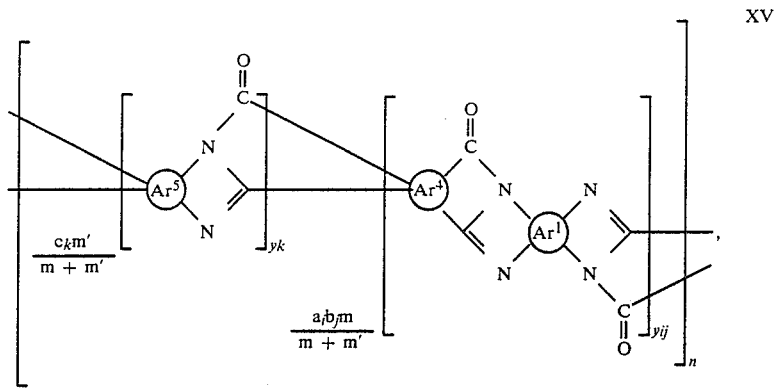
XV wherein $Ar^4$ represents a different aromatic moiety and is XXIII as defined above, $Ar^1$ represents an aromatic moiety and is XXXII as defined above, and $Ar^5$ represents an aromatic moiety different from $Ar^4$ and $Ar^1$ and is XXIV as defined above, the carbon atoms being bonded to $Ar^4$ and $Ar^5$ and the nitrogen atoms being bonded to $Ar^1$ and $Ar^5$, n being a positive integer; $c_k m'/m+m'$ represents the molar proportions of the respective different recurring units present in said block polymer, $y_k$ represents an average number of the respective different sequential recurring units present in said block polymer, $a_i b_j m/m+m'$ represents the molar proportions of the respective different recurring units present in said block polymer, $y_{ij}$ represents an average number of the respective different sequential recurring units present in said block polymer, n being a positive integer;

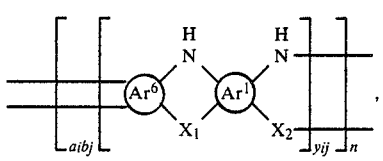
XVI wherein $Ar^1$ represents an aromatic moiety and is XXX as defined above, $Ar^6$ represents a different aromatic moiety and is XXV as defined above, $X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hetero ring are disposed ortho to one another, $a_i b_j$ represents the molar proportions of the respective different recurring units present in said block polymer, $y_{ij}$ represents an average number of the respective different sequential recurring units present in said block polymer, n being a positive integer;

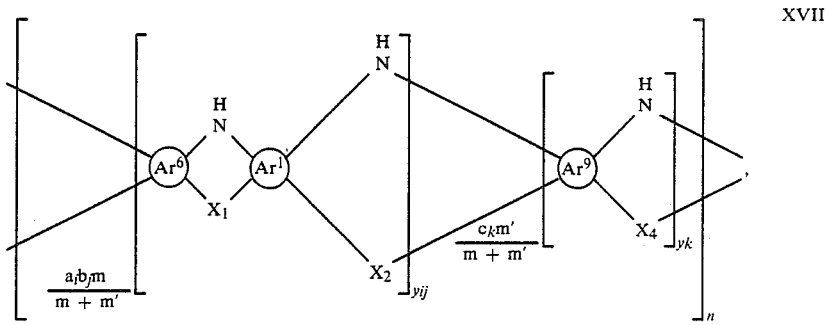
XVII wherein $Ar^1$ represents an aromatic moiety and is XXX as defined above, $Ar^6$ represents a different aromatic moiety and is XXV as defined above, $X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hetero ring are disposed ortho to one another, $a_i b_j m/m+m'$ represents the molar proportions of the respective different recurring units present in said block polymer, $y_{ij}$ represents an average number of the respective different sequential recurring units present in said block polymer, $Ar^9$ represents an aromatic moiety different from $Ar^6$ and $Ar^1$ and is XXVI as defined above, $X_4$ is sulfur, oxygen, or NR (R being hydrogen or an organic group), the NH groups and $X_4$ being bonded to aromatic carbon atoms of $Ar^6$ and $Ar^9$, $c_k m'/m+m'$ represents the molar proportions of the respective different recurring units present in said block polymer, $y_k$ represents an average number of the respective different sequential recurring units present in said block polymer, n being a positive integer;

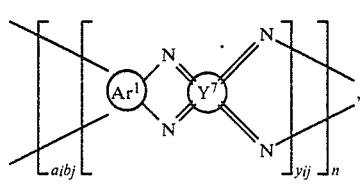
XVIII wherein $Ar^1$ represents an aromatic moiety and is XXXII as defined above, $Y^7$ represents an aromatic or heteroaromatic moiety and is XXVIII as defined above, the nitrogen atoms being bonded to aromatic carbon atoms of $Ar^1$ and bonded to adjacent carbon atoms of $Y^7$, $a_i b_j$ represents the molar proportions of the respective different recurring units present in said block polymer, $y_{ij}$ represents an average number of the respective different sequential recurring units present in said block polymer, n being a positive integer.

In accordance with the practice of the present invention, the synthesis of the aforementioned formulas IX--XIX block polymers can be illustrated by the following general reaction system:

REACTION MECHANISM

Formation of formula IX block polymer

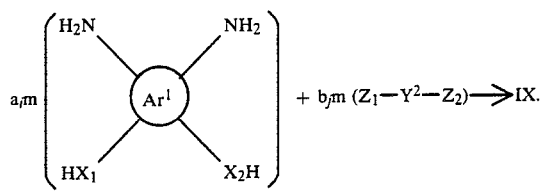

Formation of formula X block polymer

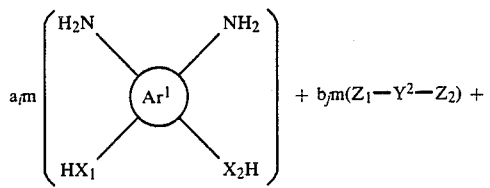

Formation of formula XI block polymer

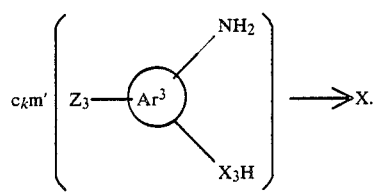

Formation of formula XII block polymer

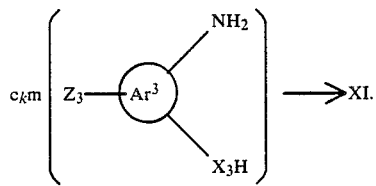

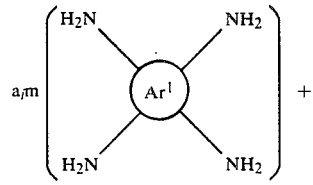

-continued

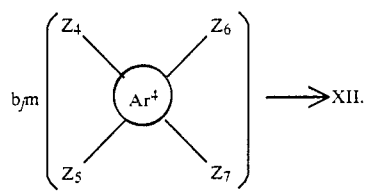

Formation of formula XIII block polymer

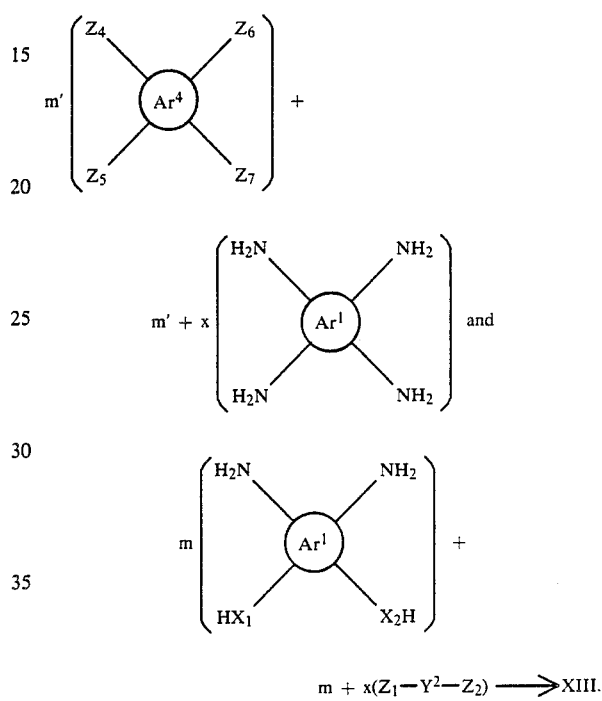

Formation of formula XIV block polymer

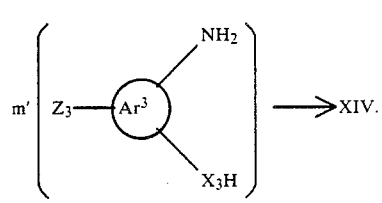

Formation of formula XV block polymer

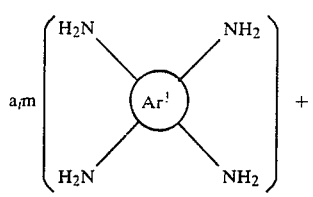
+

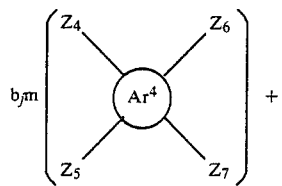
+

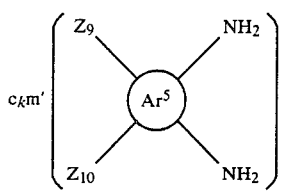 ⟶ XV.

Formation of formula XVI block polymer

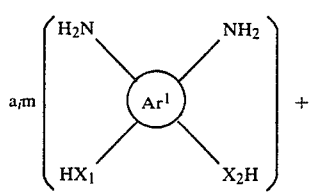
+

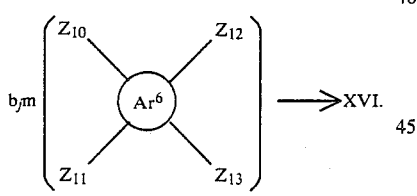 ⟶ XVI.

Formation of formula XVII block polymer

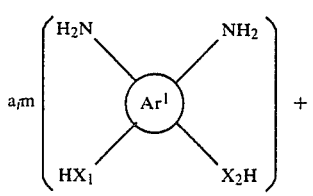
+

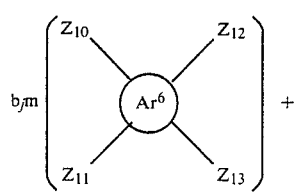

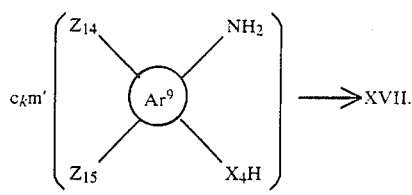 ⟶ XVII.

Formation of formula XVIII block polymer

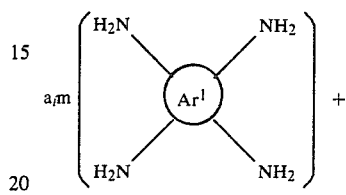
+

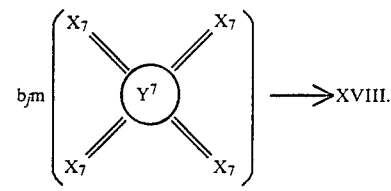 ⟶ XVIII.

Formation of formula XIX block polymer

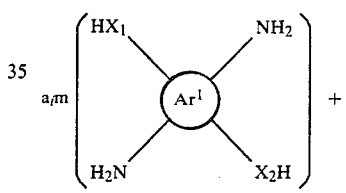
+

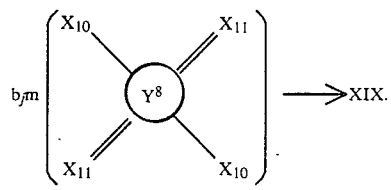 ⟶ XIX.

The above-mentioned formulas IX, XII, XVI, XVIII, and XIX block polymer compositions may be prepared in accordance with the above process parameters by:

(a) mixing at least one of a selected first monomer with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a solution of the first monomer in the preliminary solvent, (c) adding at least one of a selected second monomer in the resulting solution of step (b) to provide a mixture of the first and second monomer in the preliminary solvent, (d) then increasing the phosphorus pentoxide content of the mixture resulting from step (c) to provide a first and second monomer reaction medium of greater phosphorus pentoxide content suitable for polymerization, (e) causing polymerization of the first and second monomer at a temperature sufficient to effect reaction at a rate to form a first homo-oligomeric product having a preselected intrinsic viscosity, (f) mixing a selected amount of the first homo-oligomeric product with a selected amount of at least one of a selected second homo-oligomeric product so as to form a first poly-oligomeric product, said second homo-oligomeric product being formed by like steps (a), (b), (c), (d), and (e) with the overall proviso that at least one of the selected monomer of step (a) or (c) which forms the seond homo-oligomeric product be different from at least one of the selected monomer of step (a) or (c) which forms the first homo-oligomeric product, (g) causing polymerization of the poly-oligomeric product at a temperature sufficient to effect reaction at a rate to form a first block-oligomeric product having a preselected intrinsic viscosity or a first block-polymeric product, (h) optionally adding one or more of a selected monofunctional reactants prior to end of polymerization in step (g) so as to provide a said first block-oligomeric product or a said first block-polymeric product having a predetermined intrinsic viscosity less than the maximum attainable in the absence of said selected monofunctional reactants.

Alternatively, formulas IX, XII, XVI, XVIII, and XIX block polymer compositions may be prepared by:

(a) mixing at least one of a selected first monomer with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a solution of the first monomer in the preliminary solvent, (c) adding at least one of a selected second monomer in the resulting solution of step (b) to provide a first mixture of the first and second monomer in the preliminary solvent, (d) then increasing the phosphorus pentoxide content of the mixture resulting from step (c) to provide a first and second monomer reaction medium of greater phosphorus pentoxide content suitable for polymerization, (e) causing polymerization of the first and second monomer at a temperature sufficient to effect reaction at a rate to form a first homo-oligomeric product having a preselected intrinsic viscosity, (f) mixing a selected amount of the first homo-oligomeric product with a selected amount of a second mixture of a different first and second monomer in the preliminary solvent, said second mixture being formed by like steps (a), (b) and (c) with the overall proviso that at least one of the selected monomer of step (a) or (c) which forms the second mixture be different from at least one of the selected monomer of step (a) or (c) which forms the first homo-oligomeric product, (g) then increasing the phosphorus pentoxide content of the mixture resulting from step (f) to provide a first oligomer-monomer reaction medium of greater phosphorus pentoxide content suitable for polymerization, (h) causing polymerization of the mixture resulting from step (g) at a temperature sufficient to effect reaction at a rate to form a first block-oligomeric product having a preselected intrinsic viscosity or a first block-polymeric product, (i) optionally adding one or more of a selected monofunctional reactants prior to end of polymerization in step (h) so as to provide a said first block-oligomeric product or a said first block-polymeric product having a predetermined intrinsic viscosity less than the maximum attainable in the absence of said selected monofunctional reactants.

The above IX-XIX block polymers forming the liquid crystalline block polymer compositions of the instant invention can be characterized as having more than one recurring unit, the distribution or sequencing of which may be different from that obtained by the random condensation of monomers as in the copolymers described above and is further characterized as having contiguous blocks of the same recurring units as obtained by the random condensation of oligomers.

The preferred formulas IX, XII, XVI, XVIII, and XIX block polymers are those polymers wherein $a_i b_j$ is the mole fraction of the recurring unit formed by the condensation of a homo-oligomeric reaction product (defined below) derived from the ith monomer of Type 1 with a stoichiometric quantity of jth monomer of Type 2, 4, 6, 7, or 8, respectively, and incorporated by a block-polymeric procedure described below, and $y_{ij}$ and n have the same meaning as described above for copolymers.

The preferred XI block polymers are those wherein $c_k$ is the mole fraction of the recurring unit formed by the condensation of a homo-oligomeric reaction product (defined below) derived from the kth monomer of Type 3 and incorporated by a block polymeric procedure described below, and $y_k$ and n are as defined for copolymers.

The preferred X, XV, and XVII block polymers are those wherein $a_i b_j m/m+m'$ is the mole fraction of the recurring unit formed by the condensation of m moles of recurring units of a homo-oligomeric reaction product derived from the ith monomer of Type 1 and the jth monomer of Type 2, 4, or 6 and combined with m' moles of recurring units of a homo-oligomeric reaction product derived from condensation of the kth monomer of Type 3, 5, or 9, respectively, and $y_{ij}$, $y_k$, and n are as defined for copolymers.

The preferred XIII block polymers are those wherein m' and m are appropriate molar quantities of the monomers that form the reaction products and are selected to give desired yields and molar proportions of the respective recurring units, y' and y are block lengths as defined above, n is the total number of recurring units, and x is a molar quantity substantially less than m' that is selected to give an appropriate block length of the first homo-oligomer end-capped with o-diamine functional groups, The preferred XIV block polymers are those wherein m', m, x, n, y, y' are as defined above, q is equal to m'/m+m' and p is equal to m/2(m+m').

Selected molar quantity, m, of a monomer of Type 1 may be mixed with a phosphoric acid having a phosphorus pentoxide content of from about 63% to about 78%, preferably greater than about 68%, most preferably about 78%, and the protecting groups, if present, may be removed as described previously. The quantity of the phosphoric acid is most desirably determined in accordance with equation a* as described above. A stoichiometic quantity (i.e, m) of a monomer of Type 2, 4, 6, 7, or 8 may then be added to the resulting solution. The phosphorus pentoxide content of the resulting mixture may then be raised in accordance with equation b* given above, so as to raise the final phosphorus pentoxide content of the substantially polymerized mixture to a value greater than about 81%, most preferably between about 82% to about 83.5%, but less than about 84%. The resulting mixture may then be heated to about 100° C. to about 185° C., most preferably to about 170° C. to about 185° C., within a practical period of time, preferably within a period of from less than about one to about 5 hours, most preferably from about one to about 3 hours. This temperature is maintained for sufficient time to achieve a selected n value, hereinafter referred to as the homo-oligomeric n value, that is above a selected minimum value to be described for specific cases below, is characterized as being equal to $\frac{1}{2}(1-p)$, where p is the extent of reaction, defined as the mole fraction of either type of functional group present that has undergone condensation, and being preferrably below a selected maximum value characteristic of complete polymerization. A selected molar quantity, $m_{ij}$, of the homo-oligomeric reaction product thus obtained is diverted into a second vessel containing a selected molar quantity, $m_{ij}$, of a similarly obtained but structurally different homo-oligomeric reaction product and the heating at elevated temperatures continued.

The average block lengths, $y_{ij}$, of the block polymers may be determined the following way. The ijth oligomeric reaction product is prepared by adding $a_i$ moles of a first monomer to an equimolar amount $b_j$ of the second monomer. The sum of all $a_i$ or $b_j$ is 1. The mixture is polymerized to a selected intermediate extent of reaction, $p_{ij}$. The oligomeric n value of the ijth oligomeric reaction product, $n_{ij}$, is given by $\frac{1}{2}(1-p_{ij})$. The molar proportions of the recurring units incorporated into the block polymer are given by $$\sqrt{a_i b_j}.$$

The block lengths $y_{ij}$ can be calculated by the equation $$y_{ij} = \frac{n_{ij}}{1 - \frac{\sqrt{a_i b_j}\ (1 - P_{ij})}{\sum_{ij} \sqrt{a_i b_j}\ (1 - P_{ij})}}$$

which assumes that the homo-oligomers condense with equal reactivity. The above equation for $y_{ij}$ shows that if either of two homo-oligomeric reaction products are polymerized to high conversion, (i.e., allowed to achieve a high $n_{ij}$ value before mixing) then both block lengths in the resulting block polymer will be high.

The practice of the present invention as it relates to the production of novel liquid-crystalline compositions that include block polymers with the general formulas IX, XII, XVI, XVIII, and XIX is illustrated for those compositions including general formula IX wherein the selected first homo-oligomer may be prepared from monomers of Type 1 and Type 2 that are further classified as belonging to class 1 and the selected second homo-oligomer is further characterized as belonging to either class 1, class 2, or class 3.

General formula IX block polymers may be prepared from homo-oligomers derived exclusively from class 1 monomers. The block polymers,

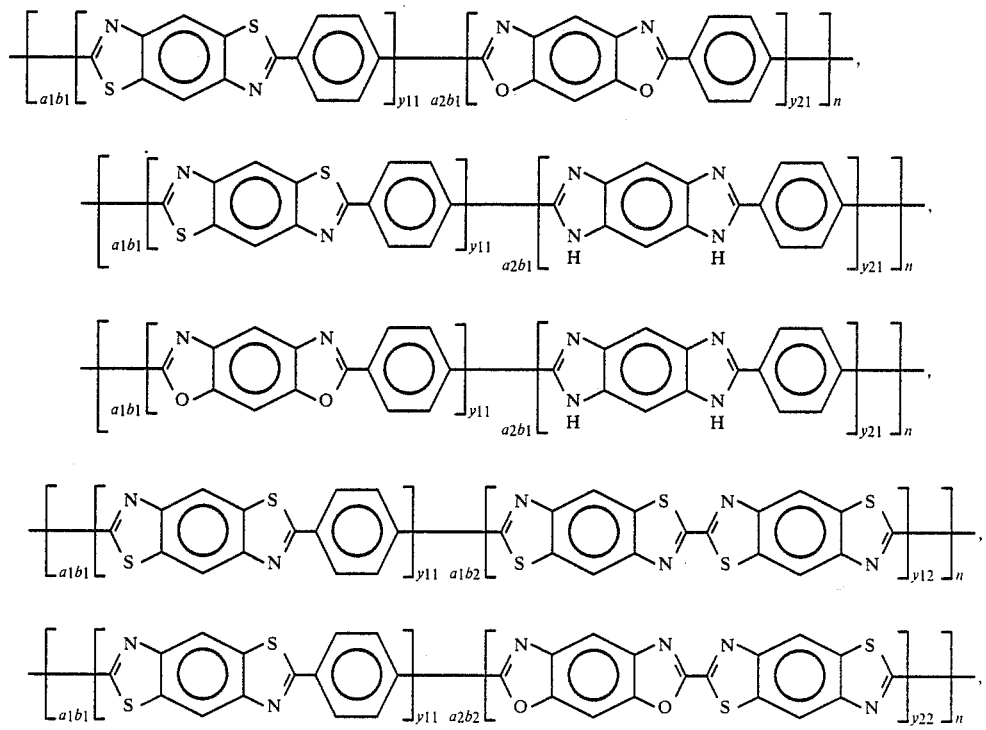

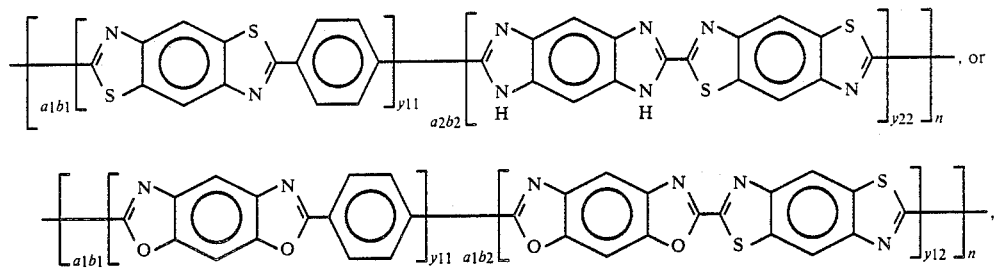

have the same advantage of a broad range of operable concentrations as described for copolymers formed exclusively from Class 1 monomers. The advantage to the block polymer procedure described above for these polymers is the ability to vary $y_{11}$ and $y_{12}$, or $y_{21}$, or $y_{22}$ essentially independent of the molar proportion $a_1b_1$, or $a_2b_2$, or $a_2b_1$, or $a_1b_2$ by selecting appropriate extents of reaction for the corresponding homo-oligomer. For example, $y_{11}$ may be 20 or greater for a broad range of $a_1b_1$ values by increasing the extent of reaction, $p_{11}$, as the $a_1b_1$ value is decreased, $y_{12}$, $y_{21}$, or $y_{22}$ of the above formulas may be obtained with values from about one to about 75, most preferably from about 25 to about 50, by selecting appropriate $p_{11}$ and $p_{12}$, $p_{21}$, or $p_{22}$ values. In practice, the members of this selected class of block polymers, because all the recurring units have a high degree of mesogenicity, are liquid-crystalline when an n value of greater than about 40 is obtained at a concentration of greater than about 6 weight percent independent of the block lengths achieved. The practice of the invention as it relates to block polymers of Class 1 is further illustrated in Examples 75–84 below.

General formula IX block polymers may be prepared from a first homo-oligomer of Class 1 and a second homo-oligomer derived from monomer pairs containing Class 2 monomers. The block polymers, are derived from homo-oligomers of different mesogenicity. The selection of $a_1b_1$ (the molar proportion of the first and more highly mesogenic recurring unit) and the preferred $y_{11}$ (the average block length of the first and more highly mesogenic recurring unit) are governed by the following considerations. The block polymer reaction product in the first case may derive liquid-crystalline behavior by virtue of the sole presence of the first recurring unit when $y_{11}$ is greater than about 30, more preferably greater than about 40, at concentrations of the first recurring unit alone (i.e. the weight of the first oligomer added/weight of the final block polymer reaction product) greater than about 7 percent, or the block polymer reaction product in the second case may derive liquid-crystalline behavior by virtue of the combined presence of both recurring units, independent of $y_{11}$, at concentrations above which the moderately mesogenic recurring unit derived from the second homo-oligomer is liquid-crystalline alone. The preferred values of $a_1b_1$ are from about 0.4 to about one, with $y_{11}$ ranging from about 80 to about 20, respectively, as $a_1b_1$ is varied from 0.4 to one. The most preferred concentrations of these block polymers is above about 15 weight percent but may be lower as either the $a_1b_1$ value or the $y_{11}$ value or both values are increased. The preferred n value for these compositions is from

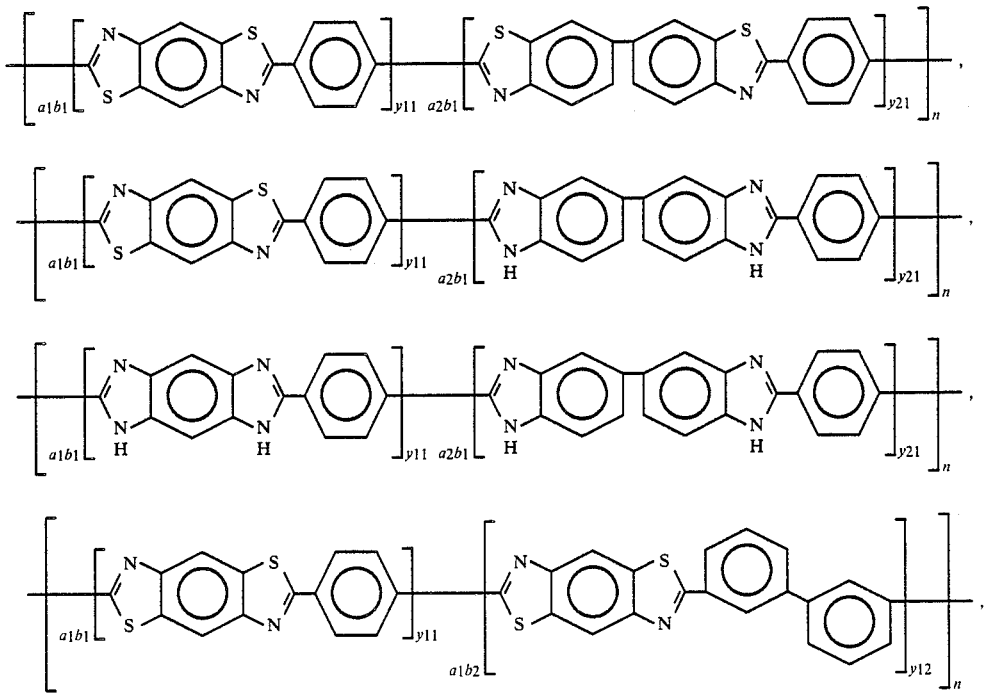

about 50 to 150, most preferably greater than 100. Obtaining sufficient n values may be aided by the addition of the second homo-oligomeric reaction product before the phosphorus pentoxide content is raised to the value necessary for polymerization (i.e., when $p_{12}$ or $p_{21}$ is zero and $n_{12}$ or $n_{21} = \frac{1}{2}$) and then adding the appropriate amount of phosphorus pentoxide to raise the mixture to sufficient phosphorus pentoxide content. This procedure aids in mixing and is most preferred when the homo-oligomeric n value of the first homo-oligomer, $n_{11}$, is large. The practice of the invention as it relates to the preparation of block polymers of Class 2 is further illustrated in Examples 85–88 below.

General formula IX block polymers may be prepared from a first homo-oligomer of Class 1 and a second homo-oligomer derived from monomer pairs containing Class 3 monomers. The block polymers block polymers containing Class 2 monomers. The method of the invention allows the preparation of such highly concentrated mixtures of mesogenic units, i.e., reaction products substantially higher in polymer concentration than that required for liquid-crystalline behavior, that incorporation of significant amounts of non-mesogenic units is possible if the above conditions are met.

The preferred values of $a_1b_1$ are from about 0.6 to about one. The preferred values of $y_{11}$ are from at least about 30 to about 100, more preferably between about 50 to 100. The preferred values of $y_{12}$ or $y_{21}$ are from about one to about 50. The preferred values of n are from about 50 to 200 with the most preferred values being about 100 to 150. The preferred selected concentrations of the block polymer are above about 15 weight percent, especially as the proportion of the non-meso-

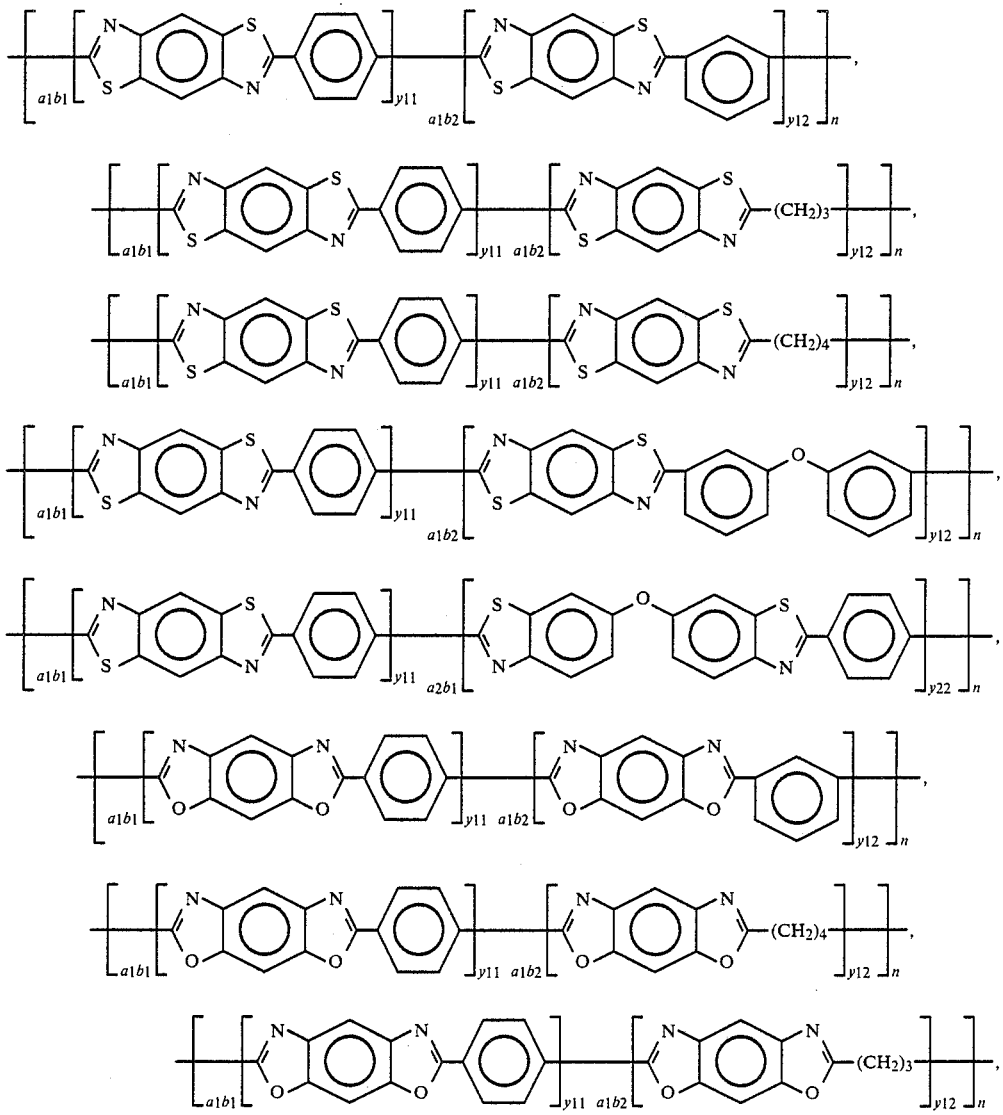

derive their liquid-crystalline behavior entirely from the presence of the first recurring unit, its average block length $y_{11}$, and its concentration alone in the total weight of the final block polymer reaction product. Thus, the values of $a_1b_1$, $y_{11}$, and concentration must meet the conditions of the first case described for the genic recurring unit is increased. The practice of the invention as it relates to production of block polymers containing Class 3 monomers is further illustrated in Examples 73, 74, 89–94 below.

The practice of the invention as it relates to the production of novel liquid-crystalline compositions that include block polymers with the general formulas X, XV, XVII are illustrated for block polymers of formula X wherein the selected first homo-oligomer is prepared from Type (1,1) or (1,2) and Type (2,1) monomers and the selected second homo-oligomer is prepared from monomers of Type (3,2).

The general formulas X, XV, and XVII liquid crystalline block polymer compositions shown above are prepared according to the following procedure:
(a) mixing at least one of a selected first monomer with or without oxidation protecting atoms or groups with a preliminary solvent of phosphoric acid having a relatively low phosphorus pentoxide content,
(b) heating and optionally placing the resulting mixture under reduced pressure to remove any volatilized protecting atoms or groups present and provide a solution of the first monomer in the preliminary solvent,
(c) then increasing the phosphorus pentoxide content of the mixture resulting from step (b) to provide a first monomer reaction medium of greater phosphorus pentoxide content suitable for polymerization,
(d) causing polymerization of the first monomer at a temperature sufficient to effect reaction at a rate to form a first homo-oligomeric product having a preselected intrinsic viscosity.
(e) mixing a selected amount of the first homo-oligomeric product with a selected amount of at least one of a selected second homo-oligomeric product so as to form a first poly-oligomeric product, said second homo-oligomeric product being formed by like steps (a) and (b) followed by:
  (1e) adding at least one of a selected second monomer in the resulting solution of step (b) to provide a mixture of a first and second monomer in the preliminary solvent,
  (2e) then increasing the phosphorus pentoxide content of the mixture resulting from step (1e) to provide a first and second monomer reaction medium of greater phosphorus pentoxide content suitable for polymerization,
  (3e) causing polymerization of the first and second monomer at a temperature sufficient to effect reaction at a rate to form said second homo-oligomeric product having a preselected intrinsic viscosity,
  with the overall proviso that at least one of the selected monomer of step (a) or (1e) which forms the second homo-oligomeric product be different from at least one of the selected monomer of step (a) which forms the first homo-oligomeric product,
(f) causing polymerization of the polyoligomeric product at a temperature sufficient to effect reaction at a rate to form a first block-oligomeric product having a preselected intrinsic viscosity or a first block-polymeric product,
(g) optionally adding one or more of a selected monofunctional reactants prior to end of polymerization in step (f) so as to provide a said first block-oligomeric product or a said first block-polymeric product having a predetermined intrinsic viscosity less than the maximum attainable in the absence of said selected monofunctional reactants.

Alternatively, the general formulas X, XV, and XVII liquid crystalline block polymer compositions shown above may be also prepared by:
(a) mixing at least one of a selected first monomer with or without oxidation protecting atoms or groups with a preliminary solvent of phosphoric acid having a relatively low phosphorus pentoxide content,
(b) heating and optionally placing the resulting mixture under reduced pressure to remove any volatilized protecting atoms or groups present and provide a solution of the first monomer in the preliminary solvent,
(c) mixing a selected amount of the solution of step (b) with a selected amount of at least one of a selected first homo-oligomeric product so as to form a first oligomeric-first monomer reaction medium, said first homo-oligomeric product being formed by like steps (a) and (b) followed by:
  (1c) adding at least one of a selected second monomer in the resulting solution of step (b) to provide a mixture of a first and second monomer in the preliminary solvent,
  (2c) then increasing the phosphorus pentoxide content of the mixture resulting from step (1) to provide a first and second monomer reaction medium of greater phosphorus pentoxide content suitable for polymerization,
  (3c) causing polymerization of the first and second monomer at a temperature sufficient to effect reaction at a rate to form said first homo-oligomeric product having a preselected intrinsic viscosity.
  with the overall proviso that at least one of the selected monomer of step (a) or (1c) which forms the first monomer solution, be different from at least one of the selected monomer of step (a) which forms the first homo-oligomeric product,
(d) then increasing the phosphorus pentoxide content of the mixture resulting from step (c) to provide a reaction medium of greater phosphorus pentoxide content suitable for polymerization,
(e) causing polymerization of the first oligomer-monomer at a temperature sufficient to effect reaction at a rate to form a first block-oligomeric product having a preselected intrinsic viscosity or a first block-polymeric product,
(f) optionally adding one or more of a selected monofunctional reactants prior to end of polymerization in step (e) so as to provide a said first block-oligomeric product or a said first block-polymeric product having a predetermined intrinsic viscosity less than the maximum attainable in the absence of said selected monofunctional reactants.

General formula X block polymers may be derived from a first homo-oligomer of Class 1 and a second homo-oligomer of Class (3,2). The block polymers of Type X are prepared by a procedure analogous to the procedure described for Type IX block polymers, except that the second homo-oligomer is prepared from a single monomer.

The polymers

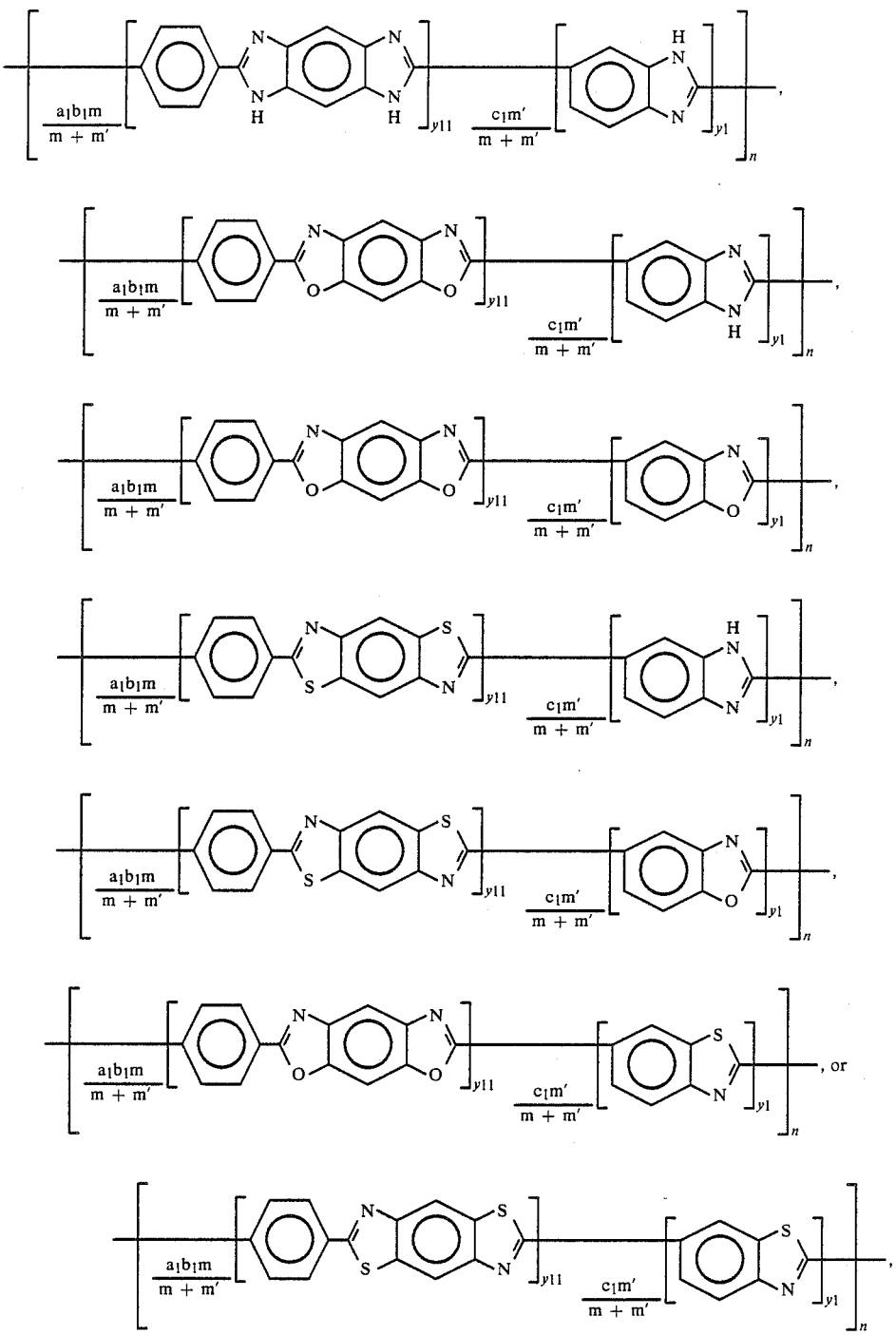

have preferred molar proportion of the first recurring unit, $a_1b_1m/m+m'$ of from about zero to about 0.5 when the concentration selected to be above about 15 weight percent. When $a_1b_1m/m+m'$ is selected to be above about 0.5 but less than one than the operable concentration range is extended to include concentrations of 7%, more preferably 10 weight percent. At concentrations above about 15 weight percent all selected values of $y_{11}$ and values of $y_1$ greater than about 5 give liquid-crystalline products, but n must be greater than about 50, preferably above about 100 to give desirable mechanical properties.

The practice of the invention as it relates to the block polymers of this Class is further illustrated in Examples 102–112 below General formula X block polymer may be derived from a first homo-oligomer of class 2 and a second homo-oligomer of Class (3,2). The block polymers

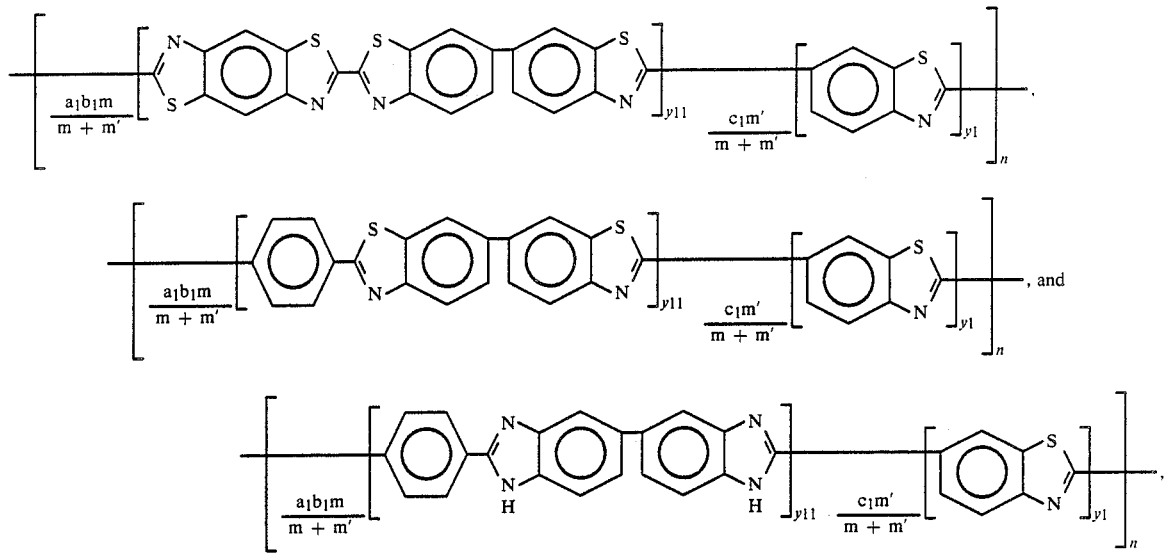

are prepared from two homo-oligomers of Class 2 which dictates the selection of concentrations greater than about 15 weight percent. The molar proportions of the various recurring units are selected based on desired mechanical properties or the maintenance of solubility in two recurring units of different solubility characteristics. The preferred values of $y_1$ are those from about 5–50, more preferably greater than 30. The practice of the invention as it relates to block polymers of this class is further illustrated in Examples 113–115 below.

The practice of the invention is illustrated for general formula XI for block polymers prepared from a single monomer of Type (3,2).

The general formula XI liquid crystalline block polymer compositions shown above are prepared according to the following procedure:

(a) mixing at least one of a selected first monomer with or without oxidation protecting atoms or groups with a preliminary solvent of phosphoric acid having a relatively low phosphorus pentoxide content, (b) heating and optionally placing the resulting mixture under reduced pressure to remove any volatilized protecting atoms or groups present and provide a solution of the first monomer in the preliminary solvent, (c) then increasing the phosphorus pentoxide content of the mixture resulting from step (b) to provide a first monomer reaction medium of greater phosphorus pentoxide content suitable for polymerization, (d) causing polymerization of the first monomer at a temperature sufficient to effect reaction at a rate to form a first homo-oligomeric product having a preselected intrinsic viscosity, (e) mixing a selected amount of the first homo-oligomeric product with a selected amount of at least one of a selected second homo-oligomeric product so as to form a first poly-oligomeric product, said second homo-oligomeric product being formed by like steps (a), (b), (c), and (d) with the overall proviso that at least one of the selected monomer of step (a) which forms the second homo-oligomeric product be different from at least one of the selected monomer of step (a) which forms the first homo-oligomeric product, (f) causing polymerization of the polyoligomeric product at a temperature sufficient to effect reaction at a rate to form a first block-oligomeric product having a preselected intrinsic viscosity or a first block-polymeric product, (g) optionally adding one or more of a selected monofunctional reactants prior to end of polymerization in step (f) so as to provide a said first block-oligomeric product or a said first block-polymeric product having a predetermined intrinsic viscosity less than the maximum attainable in the absence of said selected monofunctional reactants.

The block polymers

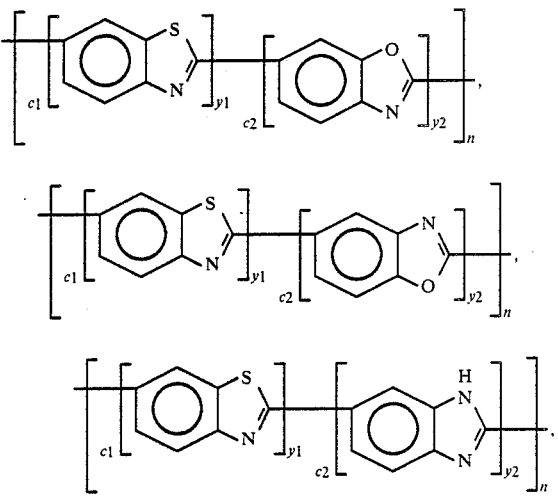

have preferred values of $c_1$ between 0.5 and one, owing to the greater solubility and mesogenicity of the first recurring unit and preferred values of $y_1$ greater than about 25 but less than about 100, owing to the higher mesogenicity. Concentrations greater than about 15%, more preferably greater than about 18%, and most preferably 20%, are selected. Examples 98–101 below further illustrate the method of the present invention.

The method of the invention also relates to the preparation of block polymers by the condensation of co-oligomeric reaction products, instead of the homo-oligomeric reaction products described in the above procedures.

INTRINSIC VISCOSITY

Intrinsic viscosity is determined by extrapolation of $\eta_{rel}-1/c$ and $\ln \eta_{rel}/c$ to zero concentration in methane sulfonic acid at 30° C.

ANISOTROPIC CHARACTER OF THE COMPOSITIONS

The extended chain polymer compositions of this invention are optically anisotropic, i.e., microscopic regions of a given extended chain composition are birefringent; a bulk extended chain composition sample depolarizes plane-polarized light because the light transmission properties of the microscopic areas of the extended chain composition vary with direction. This characteristic is associated with the existence of at least part of the extended chain polymer compositions in the liquid crystalline or mesomorphic state.

The extended chain polymer compositions of this invention that exhibit optical anisotropy do so while the extended chain polymer compositions are in the relaxed state. This is in contrast to conventional polymer solutions which may be caused to depolarize plane-polarized light when subjected to appreciable shear.

The extended chain polymer concentration of the compositions of the instant invention is above the "critical concentration point." The "critical concentration point" is routinely determined using conventional concentration and viscosity measuring techniques (see Kwolek U.S. Pat. No. 3,671,542).

Another qualitative determination of the liquid crystalline character of these extended chain polymer compositions may be made with the naked eye. These extended chain polymer compositions may appear turbid or hazy and yet contain no, or practically no undissolved solid. When the extended chain polymer compositions, seen under reflected ordinary light, is disturbed by shaking or rolling the vessel containing the extended chain polymer compositions or by only slow stirring, there is produced a characteristic, readily observed, satin-like sheen or glow which is observed even after the disturbance ceases, and which decreases in intensity thereafter. This may be described as being a pearly or opalescent quality of the extended chain polymer compositions of this invention. Compositions which are disturbed as described above often give the appearance of having striations and or graininess in the surface. These visual effects are observed in the liquid crystalline extended chain polymer compositions of this invention. This may commonly be referred to as "stir opalescence." Further details on qualitative and quantitative determinations of optical anisotropy are presented in Kwolek U.S. Pat. No. 3,671,542.

FIBER PREPARATION

The liquid crystalline compositions may be formed into fibers of high quality by spinning them into suitable baths such as by wet and "air gap" spinning techniques, using spinnerets and other apparatus constructed of materials resistant to the strong acids used. In "air-gap" spinning the spinneret is usually located in air or in an inert gaseous medium a short distance (e.g., 1 to 24 cm) above the surface of a coagulating bath.

However, air-gaps suitable for use in the present invention may range from less than about 1 cm to about 150 cm or longer, preferably from about 2 cm to about 300 cm, more preferably from about 10 cm to about 200 cm, and most preferably from about 10 cm to about 100 cm.

In accordance with the practice of the invention, the initial draw ratio is approximately from about 1:1 to about 500:1 or higher. Preferably, the initial draw ratio is from about 20:1 to about 80:1, especially preferably from about 60:1 to about 200:1, and most preferably from about 100:1 to about 300:1.

The term "draw ratio", as is well known, is a measure of the degree of stretching during the orientation of the fibrous material. In the present invention, the initial draw ratio is a measure of the degree of stretching of the filaments which occurs between the extrusion orifices and the exit from the coagulation bath. The initial draw ratio is defined as exit velocity divided by jet speed.

The jet speed is the speed at which the extruded polymer exits an extrusion orifice. It is conveniently determined by dividing the total polymer extrusion velocity by the total surface area of the extrusion orifices.

The exit velocity is the speed at which the filaments leave the coagulation bath. Although any means of measurement may be used, the exit velocity is conveniently determined by the surface speed of the rolls which take up the filaments after their exit from the bath. Thus, the speed of the wash rolls is preferably measured for this purpose.

Spinning of polybenzimidazole fibers by one working of this general technique is described in, e.g., Tan U.S. Pat. No. 4,263,245. A variety of baths may be used to coagulate the extruded dope into fibers. The baths may be, e.g., water or methanol and the like, or a dilute solution of a mineral acid (for example, phosphoric acid or sulfuric acid and the like). Preferably, the temperature of a coagulation bath is room temperature or below.

It is desirable to completely remove the spinning solvent from fiber samples prepared from the liquid crystalline compositions of this invention. Water alone or aqueous alkaline solutions may be used for removal of the residual acid. A convenient method is to spray the threadline as it leaves the coagulating bath with an aqueous alkaline solution (e.g., saturated sodium bicarbonate), remove the surface liquid from the threadline with a wiping device (e.g., a sponge) or a jet, wash with water and/or aqueous alkaline solutions to reduce the acid content, and wind up the fibers on bobbins. The fibers may be soaked in water for a period sufficient to remove the acid. The thoroughly washed fibers may be dried on the bobbin in the area of temperatures of up to about 110° C. They can also be conveniently dried on heated rolls.

The liquid crystalline compositions are especially suitable for extruding. This and other methods of article frabication are fully described in J. S. Robinson, "Spinning, Extruding, and Processing of Fibers"; Chemical Technology Review No. 159, Noyes Data Corp., 1980. The above cited patents and/or publications are incorporated herein by reference.

The fibers prepared from the polymers of this invention exhibit high values of tensile properties, especially in the as-extruded state, i.e., without subsequent hot drawing or annealing. The tensile properties of these as-extruded fibers can be enhanced by subjecting the undrawn fibers to a heat treatment.

Fiber tensile properties

Filament properties are measured on fibers that are conditioned at 21 degrees C. and 65% relative humidity (R.H.) for at least 16 hours unless otherwise specified. Yarn properties are measured on yarn that are conditioned at 24 degrees C. and 55% R.H. for at least 16 hours. All measurements are made in the fiber conditioning environment.

Tenacity (breaking tenacity) (T), elongation (breaking elongation) (E), and initial modulus (Mi) are obtained from breaking a single filament or a multifilament yarn on an Instron tester (Instron Engineering Corp., Canton, Mass.).

Single filaments are broken with a gage length (distance between jaws) of 1.0 inch (2.54 cm.). The results on 3 filaments are averaged. Yarns are given 3 turns per inch (2.54 cm.) twist (under 0.1 g.p.d. tension) and broken with a 10 inch (25.4 cm.) gage length. All samples are elongated at a constant rate of extension (10% elongation/minute for fibers having an E of under 8%, and 60% elongation/minute for fibers with E of 8 to 100%) until the sample breaks.

The denier of a single filament (d.p.f.) is calculated from its functional resonant frequency, determined by vibrating a 7 to 9 cm. length of fiber under tension with changing frequency (ASTM D1577-1973). This filament is then used for 1 break.

The denier of yarn is determined by weighing a known length (at 0.1 g.p.d. tension); 90 cm. length is convenient.

The tenacity (grams/denier), elongation (percent) and initial modulus (gram/denier) as defined in ASTM 3379-75e are obtained from the load-elongation curve and the measured denier. In actual practice, the measured denier of the sample, test conditions and sample identification maybe fed to a computer before the start of a test; the computer record the load-elongation curve of the fiber as it is broken and then calculates the fiber properties.

It should be noted that different values maybe obtained from single filaments (filament properties) and from multifilament strands (yarn properties) of the same sample. Unless specified otherwise all properties given herein are filament properties.

Additives

It will be understood that the usual additives such as dyes, fillers, antioxidants, and the like can be incorporated into the compositions of the present invention for the purpose intended, before preparation of the shaped article.

Mineral acids that are solvents for the extended chain polymers of the instant compositions such as polyphosphoric acid, methane sulfonic acid, 100% sulfuric acid, chlorosulfonic acid, and the like, may be added to the compositions of the invention in minor amounts (without departing from the scope of the invention) for purposes of modifying conditions for processing into shaped articles. The strong acid additives may contain one or more of the acid-soluble polymers described in Helmimiak, et al., U.S. Pat. No. 4,207,407 and P. D. Sybert, "Rigid-Rod Polyquinolines: Synthesis, Structure-Property Relationships and High-Strength Fibers", Colorado State University, Ph.D. Thesis, 1980.

The rigid rod polymers (polymers of Class 1) of this invention may be employed as additives in the monomer-acid solutions or reaction mediums so as to induce polymerization in the liquid crystalline phase of flexible and semi-flexible polymers at extremely low or low monomer concentrations. The above cited patent and thesis are incorporated herein by reference.

The fabrication of composites made with the compounds produced by the method of the present invention may be manufactured using techniques described in "Fabrication of Advanced Composites", Handbook of Composites, edited by George Lubin, 1982, which handbook is herein incorporated by reference.

Industrial Applicability

The liquid crystalline extended chain polymer compositions are extremely suitable for spinning into highly ordered and high strength fibers. Such fibers are useful as reinforcement substitutes for other inorganic or organic products. Various examples include glass fibers, asbestos, boron fibers, carbon and graphite fibers, whiskers, quartz and silica fibers, ceramic fibers, metal fibers, natural organic fibers, and synthetic organic fibers. A reinforcement may be defined simply as the material that is added to a resinous matrix to improve the strength and other physical and chemical properties of the material.

Furthermore, the polymers of the instant compositions can be employed in any use typically performed by engineering thermoplastic materials, such as metal replacements and those areas where high performance is necessary. Extended chain polymer compositions may be employed for use in forming high strength films suitable in the production of composites, belts, tires, i.e., as tire cords, and the like. The films are suitable as construction materials for rocket nose cones and various other parts of space craft.

Depending on the extended chain polymer fiber or films selected (i.e., homopolymer, copolymer, block polymer, or mixture thereof) the properties of the article formed may be controlled to suit the desired use. The control of polymer properties is an advantage, since, in the various areas of utility for such polymers, e.g. as laminates, structural materials, adhesives and ablative materials, the needs vary considerably.

By way of comparison, Examples 1–5 below are illustrative of low molecular weight (i.e., low intrinsic viscosity) and/or low polymer concentration compositions.

EXAMPLE 1

In a 6-L resin flask is placed 386.76 g (1.5774 mol) of 2,5-diamino-1,4-benzenedithiol dihydrochloride (1a) and 2.98 kg of freshly prepared PPA. The PPA is prepared as described in Wolfe and Arnold, *Macromolecules*, Vol 14, 909 (1981). The mixture is stirred at room temperature under a flow of argon for 24 h and heated at 60°–70° C. for 34 h. The resulting solution is clear with no evidence of bubbles. Terephthalic acid (262.35 g, 1.5792 mol) is then added and incorporated into the solution by rapid stirring at 110° C. Additional PPA (4.1 kg) is then added. The yellow mixture is heated as follows: 110°–165° C. in 5 h, 165° C. for 12 h, 180° C. for 12 h, and 195° C. for 12 h. The mixture becomes stirropalescent after 6 h at polymerization temperatures. Reduced pressure is applied during the first 6 h of reaction but is alternated with an argon stream such that the mixture does not foam above a predetermined flask wall level. The hazy green product exhibiting yellow-green opalescence is removed from the flask and precipitated into a large volume of water. The copper-colored polymer is washed until the water is no longer acidic and then dried at 80°–100° C. under reduced pressure for 48 h. A portion of the reaction product is bottled for use in fiber-spinning studies: intrinsic viscosity $[\eta]=30.3$ dL/g (MSA). Anal. Calcd for $C_{14}H_6N_2S_2$; C, 63.13; H, 2.27; N, 10.51; S, 24.08. Found: C, 62.75; H, 2.346; N, 10.24; S, 23.22. The foregoing procedure provides a 5.6 wt% of polymer -[AI]-$_n$ in PPA. Polymerization mixtures of higher polymer concentration (up to 10%) are prepared. These runs require higher monomer 1a concentration during dehydrochlorination. Intermittent cooling is cycled with argon pressure as required to control foaming at the desired level in the reaction vessel. Similarly, polymer -[AI]-$_n$ in PPA of lower concentration are prepared and these require less time for complete dehydrochlorination than that described.

EXAMPLE 2

In a 6-L resin flask are placed 919.94 g (3.7519 mol) of 1a and approximately 2.7 kg of 115% PPA; the % $P_2O_5$ content profile for this Example is illustrated in FIG. 8.

The 115% PPA is obtained from FMC Corporation and heated to 150° C. under an argon atmosphere, heated at 150° C. under reduced pressure for 18 h, and cooled to room temperature immediately before use. The viscous mixture is stirred and an ice bath applied for 24 h to prevent vigorous foaming. Five additional days of stirring at room temperature are required to remove enough hydrogen chloride to allow heating above room temperature. A clear, viscous solution is obtained after heating for 18 h at 80° C. Finely powdered 2a (622.90 g, 3.7454 mol) and an additional 2,773 g of the above 115% PPA are then added. The mixture is then stirred and heated to 140° C. for 3 h and then heated at 150°–160° C. for 16 h. The mixture gradually darkens, becomes optically isotropic, and never becomes noticeably more viscous. Samples that are removed and precipitated in water give a dark green non-fibrous material. Additional heating fails to increase the viscosity to an extent to yield a fibrous material. The theoretical polymer concentration -[AI]- for this experiment is 14.8% in a PPA with an intermediate $P_2O_5$ content of 83.8% and a final of 79.8%.

EXAMPLE 3

Figure 9:
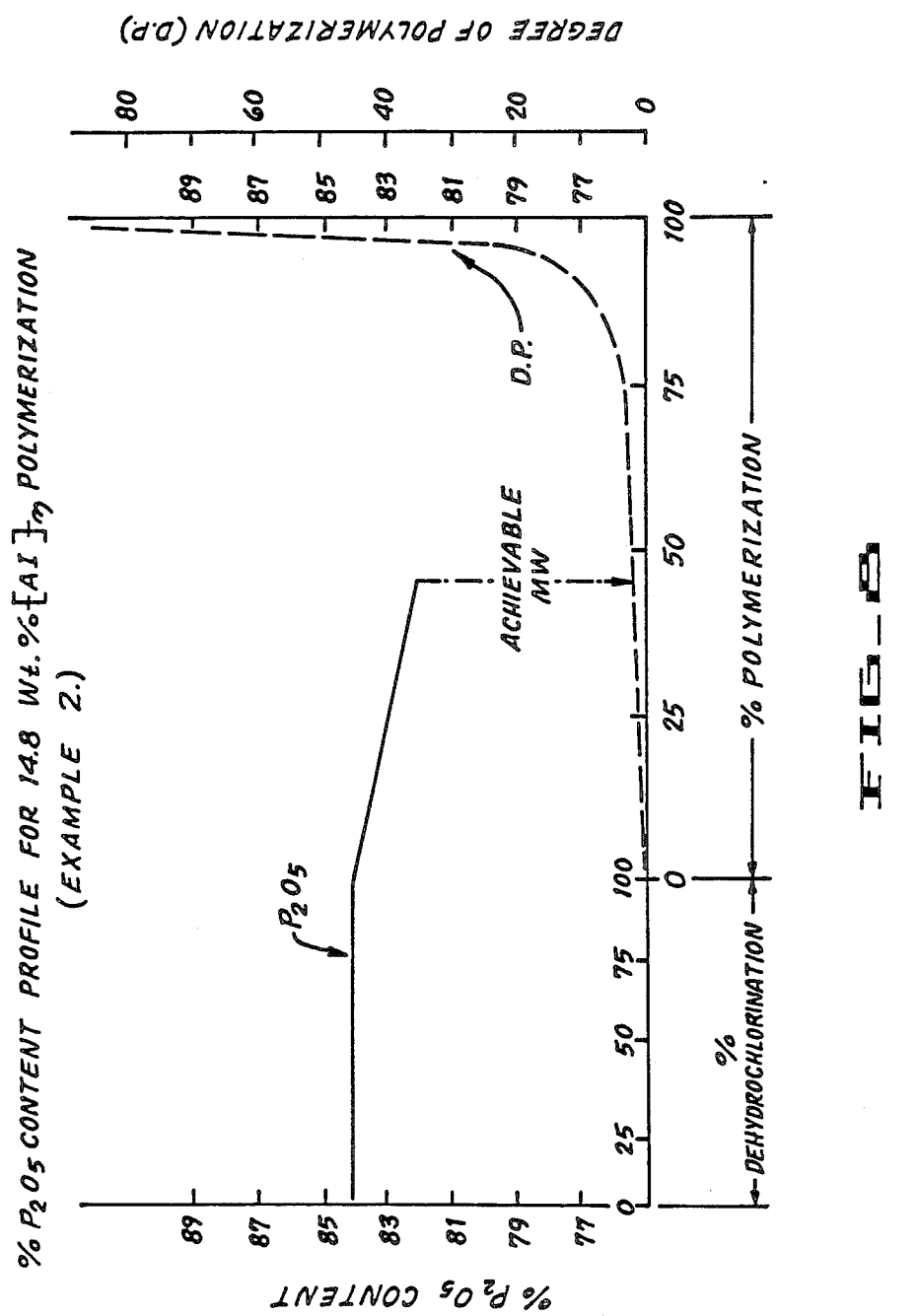
Figure 9:
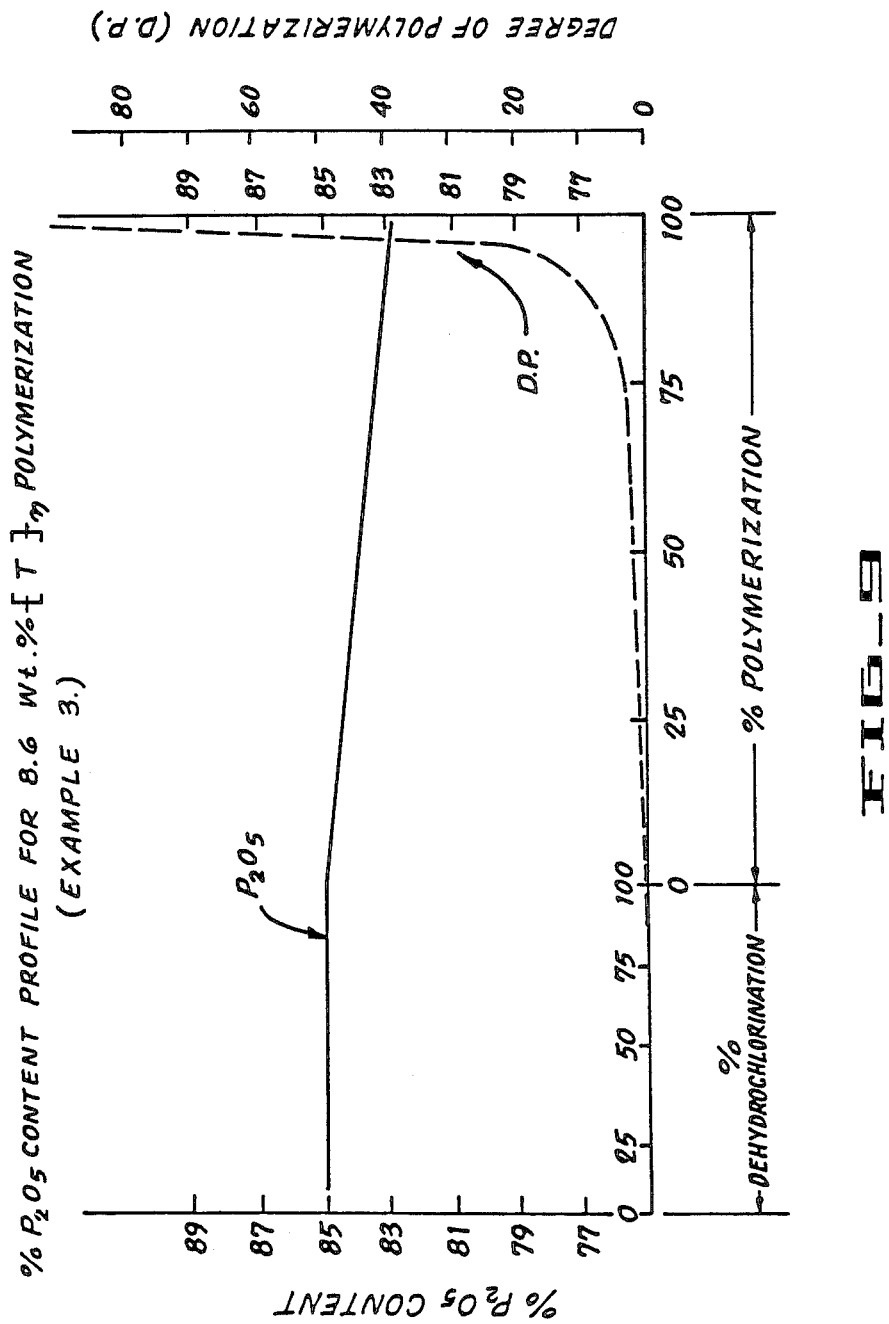

To a 100 mL flask containing 15.8 g of concentrated orthophosphoric acid (85.4% $H_3PO_4$) that has been cooled in an ice bath is added 24.2 g of phosphorus pentoxide and the mixture heated at 150° C. for 6 h under an argon atmosphere. The % $P_2O_5$ content profile for this Example is illustrated in FIG. 9.

After cooling the PPA (84.9% $P_2O_5$) to room temperature, 6.0 g (0.029 mol) of 4-amino-3-mercaptobenzoic acid hydrochloride (3a) (prepared by the method of Wolfe, AFOSR Final Technical Report. Dec. 15, 1980) is added and the viscous mixture stirred at 40° C. for 24 h. The mixture is then placed under reduced pressure and the temperature slowly raised to 70° C. The orange-yellow mixture is then heated to 150° C. over a 2 h period. The resulting dark red solution is optically isotropic. The solution is then stirred at 150° C. for an additional 24 h. The polymer is isolated from the resulting optically isotropic solution containing 8.6% of the polymer by precipitation with water to give brittle films. The intrinsic viscosity of the isolated polymer -[T]-$_n$ is 3.0 dL/g in methanesulfonic acid at 30° C.

EXAMPLE 4

To a 50 mL round bottom flask containing 48.15 g of PPA that has been prepared as described in Wolfe and Arnold, *Macromolecules*, Vol. 14, 909 (1981) is added 7.436 g (0.03616 mol) of 4-amino-3-mercaptobenzoic acid hydrochloride (3a) prepared as described in Wolfe, AFOSR Final Technical Report, Dec. 15, 1980. The mixture is stirred at room temperature under an argon flow for 18 h. After stirring for 2 h under reduced pressure between 50° and 80° C. the solution is a clear orange color. The solution is then heated under reduced pressure as follows: 90° C. for 0.5 h; 100° C. for 0.5 h; 110° C. for 0.5 h; 130° C. for 0.5 h; 140° C. for 0.5 h; 180° C. for 8 h; 150° C. for 5 h; 190° C. for 16 h; 160° C. for 16 h; 200° C. for 20 h and 170° for 7 h. The resulting isotropic solution having a concentration of polymer -[T]-$_n$ of 9.4% by weight gives only brittle amorphous films when precipitated in water. The intrinsic viscosity of the isolated polymer is 3.80 dL/g in methanesulfonic acid at 30.0° C.

EXAMPLE 5

To 38 g of PPA that has been prepared as described in Wolfe and Arnold, *Macromolecules*, Vol. 14, 909 (1981) is added 1.421 g (8.41 mmol) of 4-amino-3-mercaptobenzoic acid (3b) that has been prepared by neutralization of an aqueous suspension of 4-amino-3-mercaptobenzoic acid hydrochloride (3a) (prepared according to Wolfe, AFOSR Final Technical Report, Dec. 15, 1980) followed by extraction with ethyl acetate, evaporation of the ethyl acetate, and recrystallization of the pale yellow residue from methylene chloride. The viscous mixture is heated to 140° C. under an argon flow in a 0.5 h period. The temperature is raised to 160° C. over a 0.5 h period and then maintained at 160° C. for 18 h under reduced pressure. The optically isotropic, red solution is then heated under reduced pressure for 8 h at 200° C. The isolated polymer -[T]-$_n$ has an intrinsic viscosity of 4.57 dL/g in MSA at 30.0° C.

The compositions of this invention, their production and their advantages and uses are further illustrated in the following examples. These are intended only to demonstrate the invention and are not to be construed as limiting its scope, which scope is instead defined by the appended claims.

All polyphosphoric acid (PPA) hereinafter referred to as 115% is obtained from FMC Corporation and is used as received. Terephthalic acid (2a) is obtained from Amoco Chemicals Company, reduced to an average particle size of 95% <10 μm by an air-impact method, and dried before use. All monomers and $P_2O_5$ that are added to PPA are deaerated by placing them in a desiccator, applying reduced pressure, filling with an inert gas, and repeating the procedure at least once.

EXAMPLE 6

A mixture of 88.2 g of concentrated orthophosphoric acid (85.4% $H_3PO_4$) and 205.2 g of 115% PPA is stirred at 100° C. for 2 h under reduced pressure. After allowing the PPA solution to cool to approximately 50° C. a portion of this solution (282.1 g) is added to a 500 mL resin kettle containing 53.01013 g (0.21620 mol) of 1a. After stirring to incorporate the solid monomer into the PPA, the mixture is stirred at room temperature for 2 h under argon and then under reduced pressure at: 25°–30° C. for 24 h; 50° C. for 3 h; and 70° C. for 16 h. Monomer 2a (35.91734 g, 0.216196 mol) is then added to the resulting clear light green solution in four portions. After the addition of each portion, the reaction kettle is placed under reduced pressure before the 2a is incorporated by stirring. the mixture is allowed to cool to approximately 50° C. before 118.3 g of $P_2O_5$ is added to increase the effective $P_2O_5$ content to 83.9%. The viscous slurry is then heated as follows: 100°–170° C. in 3 h; 170° C. for 17 h; 185° C. for 5 h; and 200° C. for 19 h. The intrinsic viscosities (in dL/g) of the polymer $\text{-[AI]-}_n$ are determined from samples of the polymer solution withdrawn at the polymerization times indicated: 9.2 (8.5 h), 12.6 (25.5 h), 15.8 (44.0 h). Heating this reaction solution at 200° C. for an additional 76 h only increases the intrinsic viscosity of the $\text{-[AI]-}_n$ component to 16.4 dL/g. The reaction product is characterized as having a final $P_2O_5$ content of approximately 80.8% with the $\text{-[AI]-}_n$ polymer concentration being approximately 12.6 wt%.

EXAMPLE 7

A mixture of 57.3 g of concentrated orthophosphoric acid (85.4% $H_3PO_4$) and 133.7 g of 115% PPA is stirred at 100° C. for 4 h under reduced pressure. After allowing the PPA solution to cool to room temperature, a portion of this solution (185.0 g) is added to a 500 mL resin kettle containing 53.61422 g (0.21866 mol) of 1a. (Monomer 1a of small crystal size is prepared without a final recrystallization according to the method of Wolfe, Loo, and Arnold, *Macromolecules* Vol. 14, 915 (1981) using the final isolation procedure involving the transfer of the dipotassium salt of 1a as an aqueous solution into 6N hydrochloric acid.) After stirring to incorporate the monomer into the PPA, the mixture is stirred at 55°–65°C. for 5.5 h under reduced pressure, at 25° C. for 15.5 h under an argon flow, and at 65°–72° C. for 4 h under reduced pressure. Monomer 2a (36.3268 g, 0.21866 mol) is added to the resin kettle containing the dehydrochlorinated solution of monomer 1a in PPA. After the addition of each of the six portions, the incorporation of the solid into the solution is aided by placing the kettle under reduced pressure before stirring is initiated. Powdered phosphorus pentoxide (114.4 g) is then added to increase the effective $P_2O_5$ content to 86.4% and the mixture is stirred at 100° C. for 27 h. The polymerization mixture is then heated as follows: 100°–170° C. in 1 h; 170° C. for 21.5 h; and 200° C. for 71.5 h. The intrinsic viscosities (in dL/g) of the polymer $\text{-[AI]-}_n$ are determined from samples withdrawn at the polymerization times indicated: 23.1 (22.5 h), 24.8 (29.0 h), 27.0 (94 h). The reaction product is characterized as having a final effective $P_2O_5$ content of approximately 82.2% and a polymer $\text{-[AI]-}_n$ concentration being approximately 15.2 wt%.

EXAMPLE 8

182.7 g of a PPA solution with an effective $P_2O_5$ content of 77.2% (prepared by mixing 30 wt% of $H_3PO_4$ and 70 wt% of 115% PPA) is added to a 500 mL resin kettle containing 52.62853 g (0.21460 mol) of 1a. (Monomer 1a of large crystal size is prepared with a final recrystallization according to the method of Wolfe, Loo, and Arnold, *Macromolecules*, 14, 915 (1981) using the final isolation procedure involving a transfer of the dipotassium salt of monomer 1a as solid into 6N hydrochloric acid.) After stirring to incorporate the solid monomer into the PPA, the mixture is substantially dehydrochlorinated by heating the mixture at 55°–70° C. under reduced pressure for approximately 31 h. Monomer 2a (35.6522 g, 0.21460 mol) is added to the resin kettle and incorporated as described in the previous Example. Powdered $P_2O_5$ (123.35 g) is then added to increase the effective $P_2O_5$ content to approximately 86.4% and resulting mixture is stirred at 100° C. for 17 h under an argon flow. The polymerization mixture is then heated with stirring as follows: 100°–170° C. in 1 h, 170° C. for 23 h, and 200° C. for 24 h. The intrinsic viscosities (in dL/g) are determined for the $\text{-[AI]-}_n$ polymer from samples withdrawn at the indicated times: 17.2 (7 h), 22.8 (24 h), and 35.4 (48 h). Hearing without stirring for an additional 24 h does not increase the intrinsic viscosity of the $\text{-[AI]-}_n$ polymer. The green reaction product exhibits stir-opalescence and is characterized as having a final effective $P_2O_5$ content of 82.2% with $\text{-[AI]-}_n$ polymer concentration being approximately 15.1 wt%.

EXAMPLE 9

A mixture of 4,925 g of concentrated orthophosphoric acid (85.4% $H_3PO_4$) and 11,491 g of 115% PPA is stirred in a 22 L flask for 5 h at 100° C. under reduced pressure. After allowing the PPA solution to cool to 50° C. under a flow of argon, a portion of this solution (11,321 g) is added to a 40-L glass resin kettle (equipped with a mechanical stirrer consisting of a $\frac{3}{4}$ hp variable speed drive and stirring blades made of Hastelloy C-276) containing 2,380.55 g (9.7088 mol) of 1a prepared as described in Example 7. The mixture is then stirred at: 65° C. for 17 h under a flow of argon; 65° C. for 2 h at 700–400 mm Hg; and 65° C. for 2 h at 40 mm Hg. An additional 2,552.77 g (10.4112 mol) of monomer 1a that has been prepared and deaerated as described in Example 8 is then added under a flow of argon. An additional 4,874 g of the above-mentioned PPA is added and the mixture stirred at: 65° C. for 1 h at 700–300 mm Hg; 65°–70° C. for 3.25 h at 40 mm Hg; 70° C. for 2.5 h at less than 5 mm Hg; 70° C. for 7.5 h under a flow of argon; and 80° C. for 26 h at less than 5 mm Hg. Monomer 2a (3,342.62 g, 20.1205 mol) is then added. The resulting slurry is then cooled to 40° C. and 6,512.1 g of powdered $P_2O_5$ is added over a 4.5 h period. The resulting viscous mixture is stirred at 80° C. for 17 h under an argon flow. The mixture is then heated to 100° C. and an additional 4,655.4 g of $P_2O_5$ added to increase the effective $P_2O_5$ content to 86.5%. After stirring for an additional 48 h at 100°–108° C., the polymerization mixture was heated as follows: 100°–170° C. in 3 h; 170° C. for 20 h; and 200° C. for 1.5 h. The intrinsic viscosities (in dL/g) are determined from samples withdrawn at the indicated reaction times: 17.9 (14 h), 18.5 (16.5 h), 19.0 (23 h), 24.34 (24.5 h). Additional heating at 200° C. only increases the intrinsic viscosity to 24.6 dL/g. The reaction product exhibits stir-opalescence and is characterized as having a final effective $P_2O_5$ content of 82.2% with the $\text{-[AI]-}_n$ polymer concentration being approximately 15.6% by weight.

EXAMPLE 10

To a 500 mL resin kettle containing a deaerated mixture of 12.06155 g (0.0594092 mol) of terephthaloyl chloride (2b) and 14.5665 g (0.0594081 mol) of 1a is added approximately 140 g of 115% PPA that has been stirred at 100° C. under reduced pressure for 1-2 h, and has cooled to room temperature. The mixture is then stirred under an argon flow at: 40° C. for 23 h; 50° C. for 3 h; 60° C. for 2 h; 70° C. for 19 h; and 80° C. for 3 h. The solution is then stirred at 80° C. under reduced pressure for 1 h. An additional 140 g of deaerated 115% PPA is then incorporated into the solution. The polymerization is stirred under argon at: 100° C. for 30 min; 110° C. for 30 min; 120° C. for 30 min; 130° C. for 30 min; 140° C. for 30 min; 150° C. for 30 min; 160° C. for 45 min; 170° C. for 11 h; 185° C. for 5 h; and 200° C. for 46.5 h. Precipitation in water of a small amount of the anisotropic product provides polymer $\{AI\}_n$ which possesses an intrinsic viscosity of 17.7 (dL/g) in MSA at 30° C.

EXAMPLE 11

A mixture of 74.52 g of 85.7% orthophosphoric acid and 173.88 g of 115% PPA (83.8% $P_2O_5$ content) is stirred under reduced pressure for 2 h at 100° C. After cooling to room temperature, 55.23561 g (0.225273 mol) of 1a (prepared as described in Example 8) and 45.73607 g (0.225273 mol) of 2b (freshly sublimed) are added in eight portions. After the addition of each portion of monomer stirring is initiated to incorporate the monomer. The mixture is then stirred while the temperature is slowly increased and the pressure is slowly decreased until dehydrochlorination is complete. Deaerated phosphorus pentoxide (87.54 g) is then added to the dehydrochlorination mixture at 50° C. The mixture is then stirred at 100° C. for several hours. The polymerization is then stirred under an argon atmosphere at 170° C. for approximately 20 h, at 180° C. for approximately 8 h, and at 200° C. for 3 h. The resulting product contains 15 wt% of $\{AI\}_n$ in PPA (82.2% $P_2O_5$).

EXAMPLE 12

Figure 10:
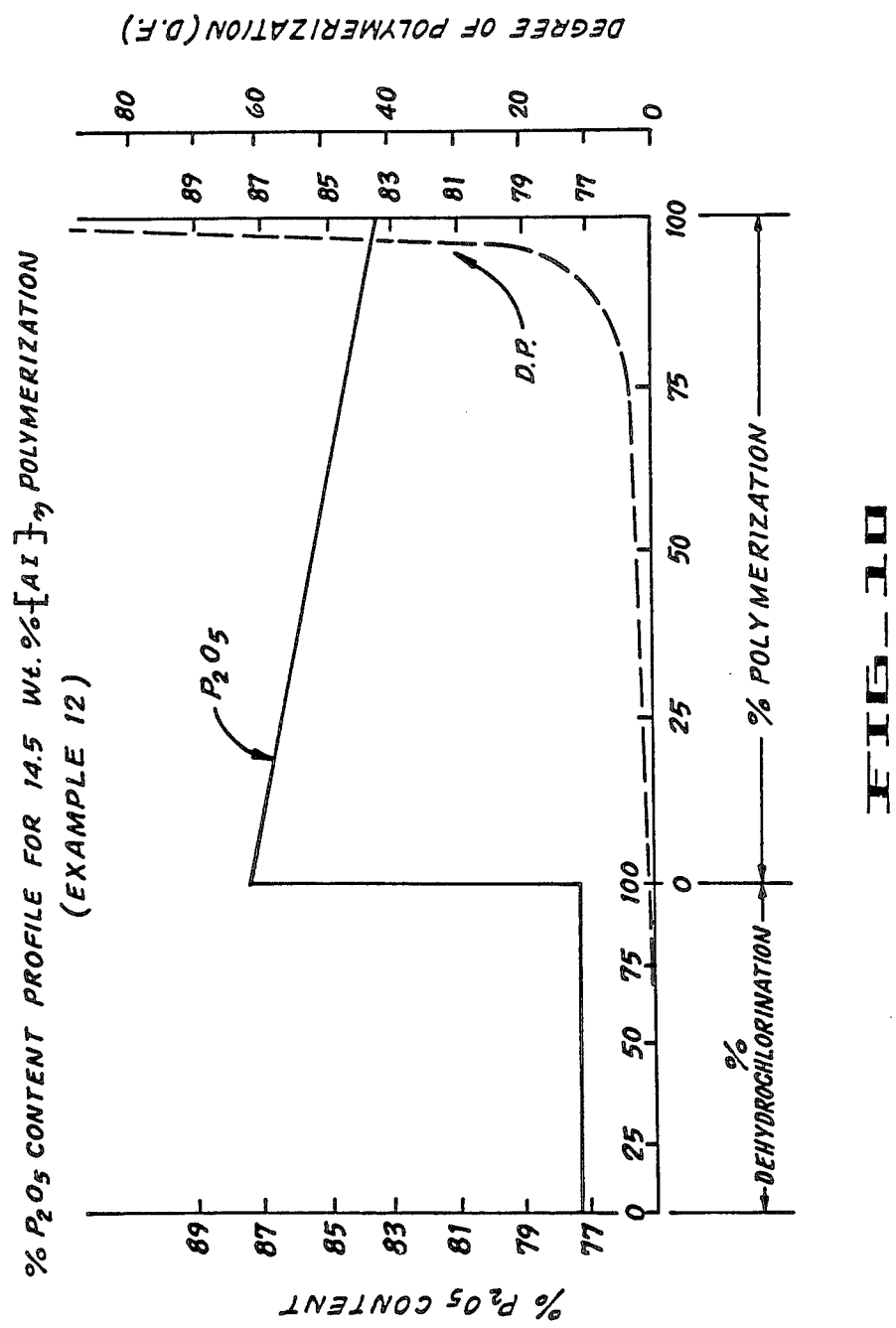

86.17 g of a PPA solution with an effective $P_2O_5$ content of 74.9% (prepared by mixing 40 wt% of 85% $H_3PO_4$ and 60 wt% of 115% PPA) is added to a 500 mL resin kettle containing 27.62485 g (0.112665 mol) of 1a. The monomer is incorporated into the PPA solution by stirring and the resulting mixture is then substantially dehydrochlorinated by heating the mixture at 55°–80° C. under reduced pressure for approximately 21 hours. The % $P_2O_5$ content profile for this Example is illustrated in FIG. 10. Monomer 2a (18.7208 g, 0.112686 mol) is then added to the resin kettle. Powdered $P_2O_5$ (83.17 g) is then added to increase the effective $P_2O_5$ content to approximately 87.2%. The resulting yellow slurry is stirred at 100° C. for 15 h under an argon flow. This slurry, which does not noticeably increase in bulk viscosity, is then stirred vigorously and heated by increasing the oil bath temperature from 100° C. to 178° C. within 40 minutes, and to 185° C. within 1 h. Polymerization times indicated below begin with time above 100° C. The 185° C. temperature is maintained for 76.5 h. Intrinsic viscosities in MSA at 30° C. (in dL/g) are determined for the $\{AI\}_n$ polymer from samples withdrawn at the indicated polymerization times: 16.6 (1.5 h), 21.7 (2.25 h), 24.2 (3.25 h), 35.7 (7.7 h), and 42.1 (76.5 h). The intrinsic viscosity of 42.1 corresponds to an average n value of polymerization of about 140. The polymerization product is stir-opalescent after a polymerization time of 0.75 h and found to be highly drawable after 1.25 h. Fibers prepared by directly drawing this product and precipitating the strands into water are amber, translucent, birefringent (crossed polars), showed extinction of transmitted light when a single polaroid sheet is placed perpendicular to the fiber direction, and can be fibrillated into microfibrils. Fibers prepared after 1.5 h by the same method are noticeably stronger than the sample at 1.25 h. The bulk viscosity of the product and the relaxation time of opalescence noticeably increases after 2.25 h. The $P_2O_5$ content of the PPA component of the product is approximately 83.2% and the concentration of the $\{AI\}_n$ polymer is 14.5% by weight based on the total weight of the resulting reaction product.

EXAMPLE 13

Figure 11:
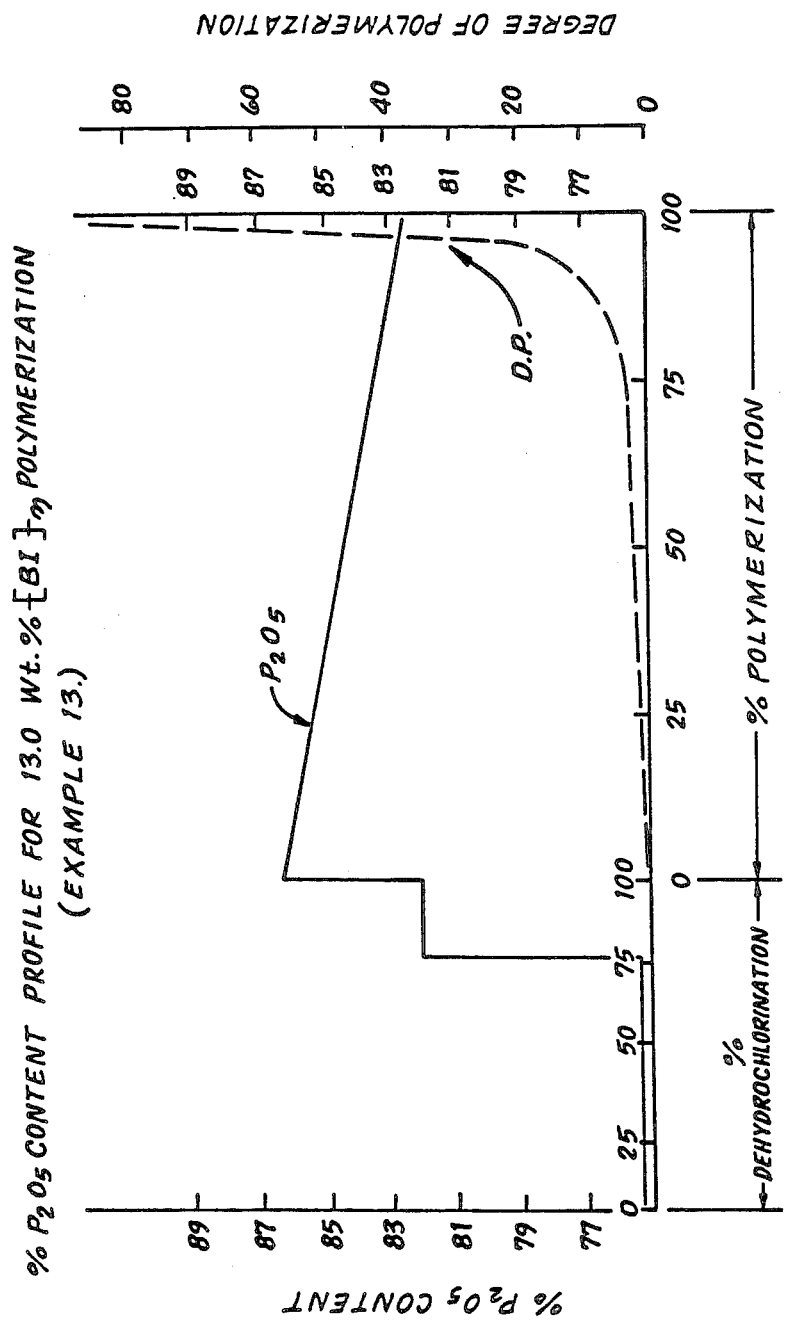

A mixture of 17.7 g of concentrated orthophosphoric acid (85.7% $H_3PO_4$) and 26.6 g of 115% PPA is stirred under reduced pressure at 100° C. for 2 hours. The % $P_2O_5$ content profile for this Example is illustrated in FIG. 11. The resulting solution is then poured at approximately 100° C. under a stream of argon into a 200 mL resin kettle containing 11.41145 g (0.054028 mol) of 4,6-diamino-1,3-benzenediol dihydrochloride (1b).

EXAMPLE 13a

PBO (poly-p-phenylenebenzobisoxazole) is prepared from terephthaloyl chloride and 4,6-diaminoresorcinol dihydrochloride (1b) in polyphosphoric acid (PPA).

The two monomers are dehydrochlorinated together. 115% PPA (132.13 g) is deoxygenated by heating under nitrogen at 150° C. overnight. It is then added under $N_2$ flow to a 500 mL resin kettle containing 11.47017 g (0.056496 mol) of terephthaloyl chloride that is previously purified by sublimation followed by recrystallization from dry hexane. The acid chloride is mixed into the PPA, then monomer (1b) (12.03727 g, 0.056496 mol) is added and mixed under $N_2$ flow. The mixture is heated over 0.5 h to 87° C., and at 87° to 90° C. for 5 h. Considerable foaming occurs at 55° and 87° C. A large surface-to-volume ratio is required for these steps, to allow excape of HCl and thus prevent uncontrollable foaming.

The following heating schedule is used for the polymerization: 130° C. for 2 h, 150° C. for 16 h (during this time the polymer forms a liquid crystalline solution), 170° C. for 2 h, 185° C. for 1 h, and 200° C. for 45 h. A sample is removed. The intrinsic viscosity of this sample in MSA at 30° C. is 17.1 dL/g.

EXAMPLE 13b

PBO (poly-p-phenylenebenzobisoxazole) is prepared from terepthaloyl chloride and 4,6-diaminoresorcinol dihydrochloride (1b) in polyphosphoric acid (PPA).

The acid chloride monomer is dehydrochlorinated first, followed by the diamine monomer (1b). 115% PPA (124.05 g) is deoxygenated by heating at 150° C. under $N_2$ flow overnight. It is then added to a 500 mL resin kettle at 0° C. containing 12.74822 g (0.062791 mol) of terephthaloyl chloride, previously purified by sublimation and recrystallization from dry hexane. The kettle is stirred and slowly heated as follows by dehydrochlorinate: 0° C. to 60° C. over 2.5 h, at 60° C. for 66.5 h, 60° to 90° C. over 1 h, and at 90° C. for 5 h. The kettle is cooled overnight, and (1b) is then added under $N_2$ flow. The stirred mixture is heated to 70° C. over 5.5 h, at 70° C. for 2 h, and at 83° C. for 15 h. Dehydrochlorination appears complete at this time. A large surface-to-volume ratio is required for these steps, to allow excape of HCl and thus prevent uncontrollable foaming.

Deaerated PPA (7.49 g) is then added under $N_2$ flow to decrease the final polymer concentration from 10.4 wt% to 9.9 wt.%. The mixture is then polymerized by heating from 83° C. to 130° C. over 1.6 h, from 130° to 150° C. over 3 h, at 150° C. for 19.5 h (during this time the polymer forms a stir-opalescent solution which relaxes to a hazy solution at rest), at 170° C. for 5.5 h, at 185° C. for 2 h, and at 200° C. for 23.5 h. The anisotropic polymer is removed and stored in a bottle under N₂. A sample is removed, precipitated in H₂O, and dried. The intrinsic viscosity of this sample in MSA at 30° C. is 17.6 dL/g.

EXAMPLE 14

The reaction product from Example 13 is drawn many times its length to give highly fibrillar fibers. A portion of the solution is removed from the reaction flask and placed in a KBr press equipped with a die with a circular orifice of 0.13 mm in diameter. The solution is extruded into the air and stretched by pulling manually and then the fiber is dipped in water. The fiber thus produced is washed with water and then dried under tension in an air oven overnight at 110° C.

High orientation is evident from fibrils which split from the surface of the fiber and by the complete extinction of light transmitted through the fiber when a single polaroid is placed in a perpendicular direction only between the source and the fiber, prepared according to the method of Wolfe and Arnold, *Macromolecules*, Vol. 14, 909 (1981), recrystallized from aqueous hydrochloric acid containing 3 wt% stannous chloride, and dried for 20 h at 63° C. under reduced pressure immediately before use. The mixture is stirred at 53° C. for 15 h and 62° C. for 4 h under reduced pressure. Upon heating to 70° C., the monomer precipitates. Addition of 16.6 g of P₂O₅ results in redissolution of the monomer. The solution is then heated at 100° C. for 3 h under reduced pressure to complete the dehydrochlorination. Monomer 2a (8.9761 g, 0.05403 mol) is then added under an argon flow. Additional P₂O₅ (19.0 g) is then added. The solution is then heated as follows: 100° C. for 48 h; 150° C. for 2.5 h; 160° C. for 10 h (the dark green solution becomes stir-opalescent during this period); and 180° C. for 25 h. The resulting reaction product is deep purple with a metallic luster, exhibits stir-opalescence, depolarized plane-polarized light as evidenced by strong birefringence when viewed between crossed polars, and is further characterized as having a final effective P₂O₅ content of 82% with the $-[BI]_n$- polymer concentration being 13.3% by weight. The intrinsic viscosity of the polymer $-[BI]_n$- isolated from the reaction product is 23.9 dL/g in MSA at 30° C., which corresponds to an average number of recurring units, n, of approximately 110.

EXAMPLE 15

The procedure of Example 8 is essentially repeated. Instead of monomers 1a and 2a, 48.9831 g (0.19978 mol) of monomer 1a is dehydrochlorinated in an "initial" solution of 269.68 g PPA having a P₂O₅ content of 77.2% (prepared by mixing 80.9 g of 85.4% H₃PO₄ with 188.8 g of 115% PPA). When dehydrochlorination is substantially complete, 79.9805 g (0.19978 mol) of monomer 2s is added followed by the gradual addition of 142.23 g of P₂O₅. The mixture is then stirred and heated essentially according to Example 8. The amount of P₂O₅ is preselected (as determined in accord with the aforementioned formulae a* and b*) to provide the reaction mixture with an effective P₂O₅ content of approximately 85.07% prior to the start of polymerization and an effective P₂O₅ content of approximately 82.2% subsequent to substantial complete polymerization. The reaction product obtained exhibits stir-opalescence and is further characterized as having a polymer concentration of 19%; fibers are readily formed by direct spinning, or drawing from the reaction product. The polymer obtained is of the following structure:

characterized by an intrinsic viscosity of 20 dL/g in MSA at 30° C. which corresponds to an n value of average polymerization of about 50.

Heating the reaction mixture for 5 hours gives an intrinsic viscosity of 12 dL/g in MSA at 30° C. heating the reaction mixture for a total of 7 hours gives an intrinsic viscosity of 15 dL/g in MSA at 30° C., heating the reaction mixture for a total of 12 hours gives an intrinsic viscosity of 18 dL/g in MSA at 30° C.

The above procedure is followed with the exception that the P₂O₅ content during the dehydrochlorination begins at 80% and is incrementally increased to an intermediate P₂O₅ content of 85.07% prior to polymerization.

EXAMPLE 16

The procedure of Example 8 is essentially repeated. Instead of monomers 1a and 2a, 64.4470 g (0.26284 mol) of monomer 1a is dehydrochlorinated in an "initial" solution of 341.97 g PPA having a P₂O₅ content of 77.2% (prepared by mixing 102.6 g of 85.4% H₃PO₄ with 239.4 g of 115% PPA). When dehydrochlorination is substantially complete, 63.6826 g (0.26284 mol) of monomer 2j is added followed by the gradual addition of 137.3 g of P₂O₅. The mixture is then stirred and heated essentially according to Example 8. The amount of P₂O₅ is preselected (as determined in accord with the aforementioned formulae a* and b*) to provide the reaction mixture with an effective P₂O₅ content of approximately 83.7% prior to the start of polymerization and an effective P₂O₅ content of approximately 82.2% subsequent to substantial complete polymerization. The reaction product obtained exhibits stir-opalescence and is further characterized as having a polymer concentration of 17%; fibers are readily formed by direct spinning, or drawing from the reaction product. The polymer obtained is of the following structure:

characterized by an intrinsic viscosity of 15 dL/g in MSA at 30° C. which corresponds to an n value of average polymerization of about 100.

Heating the reaction mixture for 5 hours gives an intrinsic viscosity of 7 dL/g in MSA at 30° C.; heating the reaction mixture for a total of 7 hours gives an intrinsic viscosity of 10 dL/g in MSA at 30° C.; heating the reaction mixture for a total of 12 hours gives an intrinsic viscosity of 14 dL/g in MSA at 30° C.

The above procedure is followed with the exception that the P₂O₅ content during the dehydrochlorination begins at 81% and then is incrementally increased to an intermediate P₂O₅ content of 83.7% prior to polymerization.

EXAMPLE 17

The procedure of Example 8 is essentially repeated. Instead of monomers 1a and 2a, 61.1619 g (0.28706 mol) of monomer 1b is dehydrochlorinated in an "initial" solution of 338.4 g PPA having a P₂O₅ of 85.4% H₂PO₄ with 236.8 g of 115% PPA). When dehydrochlorination is substantially complete, 69.5488 g (0.28706 mol) of monomer 2j is added followed by the gradual addition of 140.1 g of $P_2O_5$. The mixture is then stirred and heated essentially according to Example 8. The amount of $P_2O_5$ is preselected (as determined in accord with the aforementioned formulae a* and b*) to provide the reaction mixture with an effective $P_2O_5$ content of approximately 83.8% prior to the start of polymerization and an effective $P_2O_5$ content of approximately 82.2% subsequent to substantial complete polymerization. The reaction product obtained exhibits stir-opalescence and is further characterized as having a polymer concentration of 17%; fibers are readily formed by direct spinning, or drawing ffrom the reaction product. The polymer obtained is of the following structure:

characterized by an intrinsic viscosity of 16 dL/g in MSA at 30° C. which corresponds to an n value of average polymerization of about 60.

The above procedure is followed with the exception that the $P_2O_5$ content during the dehydrochlorination begins at 80% and then is incrementally increased to an intermediate $P_2O_5$ content of 83.8% prior to polymerization.

Heating the reaction mixture for 5 hours gives an intrinsic viscosity of 6 dL/g in MSA at 30° C.; heating the reaction mixture for a total of 7 hours gives an intrinsic viscosity of 8 dL/g in MSA at 30° C.; heating the reaction mixture for a total of 12 hours gives an intrinsic viscosity of 11 dL/g in MSA at 30° C.

EXAMPLE 18

The procedure of Example 8 is essentially repeated. Instead of monomers 1a and 2a, 81.9923 g (0.28869 mol) of monomer 1c is dehydrochlorinated in an "initial" solution of 366.8 g PPA having a $P_2O_5$ content of 77.2% (prepared by mixing 110 g of 85.4% $H_3PO_4$ with 256.8 g of 115% PPA). When dehydrochlorination is substantially complete, 69.9438 g (0.28869 mol) of monomer 2j is added followed by the gradual addition of 148.4 g of $P_2O_5$. The mixture is then stirred and heated essentially according to Example 8. The amount of $P_2O_5$ is preselected (as determined in accord with the aforementioned formulae a* and b*) to provide the reaction mixture with an effective $P_2O_5$ content of approximately 83.8% prior to the start of polymerization and an effective $P_2O_5$ content of approximately 82.2% subsequent to substantial complete polymerization. The reaction product obtained exhibits stir-opalescence and is further characterized as having a polymer concentration of 16%; fibers are readily formed by direct spinning, or drawing from the reaction product. The polymer obtained is of the following structure:

characterized by an intrinsic viscosity of 16 dL/g in MSA at 30° C. which corresponds to an n value of average polymerization of about 60.

The above procedure is followed with the except that the $P_2O_5$ content during the dehydrochlorination begins at 82% and then is incrementally increased to an intermediate $P_2O_5$ content of 83.8% prior to polymerization.

When the intermediate $P_2O_5$ content is increased such that the final $P_2O_5$ content is 83.0% and the reaction mixture is heated for 5 hours at 185° C., an intrinsic viscosity of 9 dL/g in MSA at 30° C. is obtained; heating the reaction mixture for a total of 7 hours at 185° C. gives an intrinsic viscosity of 16 dL/g in MSA at 30° C.; heating the reaction mixture for a total of 12 hours at 185° C. gives an intrinsic viscosity of 20 dL/g in MSA at 30° C.

EXAMPLE 19

The procedure of Example 8 is essentially repeated. Instead of monomers 1a and 2a, 93.8232 g (0.29202 mol) of monomer 1i is dehydrochlorinated in an "initial" solution of 263.5 g PPA having a $P_2O_5$ content of 77.2% (prepared by mixing 79.1 g of 85.4% $H_3PO_4$ with 184.4 g of 115% PPA). When dehydrochlorination is substantially complete, 48.5129 g (0.29202 mol) of monomer 2a is added followed by the gradual addition of 171 g of $P_2O_5$. The mixture is then stirred and heated essentially according to Example 8. The amount of $P_2O_5$ is preselected (as determined in accord with the aforementioned formulae a* and b*) to provide the reaction mixture with an effective $P_2O_5$ content of approximately 86.2% prior to the start of polymerization and an effective $P_2O_5$ content of approximately 82.2% subsequent to substantially complete polymerization. The reaction product obtained exhibits stir-opalescence and is further characterized as having a polymer concentration of 18%; fibers are readily formed by direct spinning, or drawing from the reaction product. The polymer obtained is of the following structure:

characterized by an intrinsic viscosity of 15 dL/g in MSA at 30° C.

The above procedure is followed with the exception that the $P_2O_5$ content during the dehydrochlorination begins at 80% and then is incrementally increased to an intermediate $P_2O_5$ content of 86.2% prior to polymerization.

When the intermediate $P_2O_5$ content is increased such that the final $P_2O_5$ content is 83.0% and the reaction mixture is heated for 5 hours at 185° C., an intrinsic viscosity of 10 dL/g in MSA at 30° C. is obtained; heating the reaction mixture for a total of 7 hours at 185° C. gives an intrinsic viscosity of 17 dL/g in MSA at 30° C.; heating the reaction mixture for a total of 12 hours at 185° C. gives an intrinsic viscosity of 21 dL/g in MSA at 30° C.

EXAMPLE 20

The procedure of Example 8 is essentially repeated. Instead of monomers 1a and 2a, 93.1836 g (0.32225 mol) of monomer 1j is dehydrochlorinated in an "initial" solution of 254.0 g PPA having a $P_2O_5$ content of 77.2% (prepared by mixing 76.2 g of 85.4% $H_3PO_4$ with 177.8 g of 115% PPA). When dehydrochlorination is substantially complete, 53.5357 g (0.32225 mol) of monomer 2a is added, followed by the gradual addition of 178.4 g of $P_2O_5$. The mixture is then stirred and heated essentially according to Example 8. The amount of $P_2O_5$ is preselected (as determined in accord with the aforementioned formulae a* and b*) to provide the reaction mixture with an effective $P_2O_5$ content of approximately 86.6% prior to the start of polymerization and an effective $P_2O_5$ content of approximately 82.2% subsequent to substantially complete polymerization. The reaction product obtained exhibits stir-opalescence and is further characterized as having a polymer concentration of 18%; fibers are readily formed by direct spinning, or drawing from the reaction product. The polymer obtained is of the following structure:

characterized by an intrinsic viscosity of 14 dL/g in MSA at 30° C.

The above procedure is followed with the exception that the $P_2O_5$ content during the dehydrochlorination begins at 83% and then is incrementally increased to an intermediate $P_2O_5$ content of 86.6% prior to polymerization. This dehydrochlorination is conducted in a Pope wiped-film evaporator at 100° C.

When the intermediate $P_2O_5$ content is increased such that the final $P_2O_5$ content is 83.0% and the reaction mixture is heated for 5 hours at 185° C., an intrinsic viscosity of 8 dL/g in MSA at 30° C. is obtained; heating the reaction mixture for a total of 7 hours at 185° C. gives an intrinsic viscosity of 12 dL/g in MSA in 30° C.; heating the reaction mixture for a total of 12 hours at 185° C. gives an intrinsic viscosity of 16 dL/g in MSA at 30° C.

EXAMPLE 21

The procedure of Example 8 is essentially repeated. Instead of monomers 1a and 2a, 93.1836 g (0.32225 mol) of monomer 1k is dehydrochlorinated in an "initial" solution of 254.0 g PPA having a $P_2O_5$ content of 77.2% (prepared by mixing 76.2 g of 85.4% $H_3PO_4$ with 177.8 g of 115% PPA). When dehydrochlorination is substantially complete, 53.5357 g (0.32225 mol) of monomer 2a is added, followed by the gradual addition of 178.4 g of $P_2O_5$. The mixture is then stirred and heated essentially according to Example 8. The amount of $P_2O_5$ is preselected (as determined in accord with the aforementioned formulae a* and b*) to provide the reaction mixture with an effective $P_2O_5$ content of approximately 86.6% prior to the start of polymerization and an effective $P_2O_5$ content of approximately 82.2% subsequent to substantially complete polymerization. The reaction product obtained exhibits stir-opalescence and is further characterized as having a polymer concentration of 18%; fibers are readily formed by direct spinning, or drawing from the reaction product. The polymer obtained is of the following structure:

characterized by an intrinsic viscosity of 14 dL/g in MSA at 30° C.

The above procedure is followed with the exception that the $P_2O_5$ content during the dehydrochlorination begins at 82% and then is incrementally increased to an intermediate $P_2O_5$ content of 86.6% prior to polymerization.

When the intermediate $P_2O_5$ content is increased such that the final $P_2O_5$ content is 83.0% and the reaction mixture is heated for 5 hours at 185° C., an intrinsic viscosity of 8 dL/g in MSA at 30° C. is obtained; heating the reaction mixture for a total of 7 hours at 185° C. gives an intrinsic viscosity of 12 dL/g in MSA at 30° C.; heating the reaction mixture for a total of 12 hours at 185° C. gives an intrinsic viscosity of 15 dL/g in MSA at 30° C.

The above procedure is followed with the exception that the $P_2O_5$ content during the dehydrochlorination begins at 80% and then is incrementally increased to an intermediate $P_2O_5$ content of 89.1% prior to polymerization.

When the intermediate $P_2O_5$ content is increased such that the final $P_2O_5$ content is 83.0% and the reaction mixture is heated for 5 hours at 185° C., an intrinsic viscosity of 7 dL/g in MSA at 30° C. is obtained; heating the reaction mixture for a total of 7 hours at 185° C. gives an intrinsic viscosity of 10 dL/g in MSA at 30° C.; heating the reaction mixture for a total of 12 hours at 185° C. gives an intrinsic viscosity of 14 dL/g in MSA at 30° C.

EXAMPLE 22

The procedure of Example 8 is essentially repeated. Instead of monomers 1a and 2a, 128.474 g (0.32431 mol) of monomer 1l is dehydrochlorinated in an "initial" solution of 223.5 g PPA having a $P_2O_5$ content of 79.4% (prepared by mixing 44.7 g of 85.4% $H_3PO_4$ with 178.8 g of 115% PPA). When dehydrochlorination is substantially complete, 53.8778 g (0.32431 mol) of monomer 2a is added, followed by the gradual addition of 197.0 g of $P_2O_5$. Inorganic salts, such as lithium salts (e.g., LiCl, LiF, Lithium phosphate, and the like) can be added at this point, if required, to promote polymer solubility. The mixture is then stirred and heated essentially according to Example 8. The amount of $P_2O_5$ is preselected (as determined in accord with the aforementioned formulae a* and b*) to provide the reaction mixture with an effective $P_2O_5$ content of approximately 89.1% prior to the start of polymerization and an effective $P_2O_5$ content of approximately 82.2% subsequent to substantially complete polymerization. The reaction product obtained exhibits stir-opalescence and is further characterized as having a polymer concentration of 18%; fibers are readily formed by direct spinning, or drawing from the reaction product. The polymer obtained is of the following structure:

characterized by an intrinsic viscosity of 12 dL/g in MSA at 30° C.

EXAMPLE 23

The procedure of Example 8 is essentially repeated. Instead of monomers 1a and 2a, 70.3707 g (0.21902 mol) of monomer 1i is dehydrochlorinated in an "initial" solution of 323.1 g PPA having a $P_2O_5$ content of 77.2% (prepared by mixing 96.9 g of 85.4% $H_3PO_4$ with 226.2 g of 115% PPA). When dehydrochlorination is substantially complete, 53.0654 g (0.21902 mol) of monomer 2j is added followed by the gradual addition of 125.0 g of $P_2O_5$. The mixture is then stirred and heated essentially according to Example 8. The amount of $P_2O_5$ is preselected (as determined in accord with the aforementioned formulae a* and b*) to provide the reaction mixture with an effective $P_2O_5$ content of approximately 83.6% prior to the start of polymerization and an effective $P_2O_5$ content of approximately 82.2% subsequent to substantially complete polymerization. The reaction product obtained exhibits stir-opalescence and is further characterized as having a polymer concentration of 18%; fibers are readily formed by direct spinning, or drawing from the reaction product. The polymer obtained is of the following structure:

characterized by an intrinsic viscosity of 17 dL/g in MSA at 30° C.

The above procedure is followed with the exception that the $P_2O_5$ content during the dehydrochlorination begins at 83% and then is incrementally increased to an intermediate $P_2O_5$ content of 83.6% prior to polymerization. This dehydrochlorination is conducted in a Pope wiped-film evaporator at 100° C.

When the intermediate $P_2O_5$ content is increased such that the final $P_2O_5$ content is 83.0% and the reaction mixture is heated for 5 hours at 185° C., an intrinsic viscosity of 6 dL/g in MSA at 30° C. is obtained; heating the reaction mixture for a total of 7 hours at 185° C. gives an intrinsic viscosity of 10 dL/g in MSA at 30° C.; heating the reaction mixture for a total of 12 hours at 185° C. gives an intrinsic viscosity of 15 dL/g in MSA at 30° C.

EXAMPLE 24

The procedure of Example 8 is essentially repeated. Instead of monomers 1a and 2a, 68.1280 g (0.23560 mol) of monomer 1j is dehydrochlorinated in an "initial" solution of 320.7 g PPA having a $P_2O_5$ content of 77.2% (prepared by mixing 96.2 g of 85.4% $H_3PO_4$ with 224.5 g of 115% PPA). When dehydrochlorination is substantially complete, 57.824 g (0.23560 mol) of monomer 2j is added followed by the gradual addition of 126.9 g of $P_2O_5$. The mixture is then stirred and heated essentially according to Example 8. The amount of $P_2O_5$ is preselected (as determined in accord with the aforementioned formulae a* and b*) to provide the reaction mixture with an effective $P_2O_5$ content of approximately 83.7% prior to the start of polymerization and an effective $P_2O_5$ content of approximately 82.2% subsequent to substantially complete polymerization. The reaction product obtained exhibits stir-opalescence and is further characterized as having a polymer concentration of 18%; fibers are readily formed by direct spinning, or drawing from the reaction product. The polymer obtained is of the following structure:

characterized by an intrinsic viscosity of 15 dL/g in MSA at 30° C.

The above procedure is followed with the exception that the $P_2O_5$ content during the dehydrochlorination begins at 82% and then is incrementally increased to an intermediate $P_2O_5$ content of 83.7% prior to polymerization.

When the intermediate $P_2O_5$ content is increased such that the final $P_2O_5$ content is 83.0% and the reaction mixture is heated for 5 hours at 185° C., an intrinsic viscosity of 6 dL/g in MSA at 30° C. is obtained; heating the reaction mixture for a total of 7 hours at 185° C. gives an intrinsic viscosity of 8 dL/g in MSA at 30° C.; heating the reaction mixture for a total of 12 hours at 185° C. gives an intrinsic viscosity of 12 dL/g in MSA at 30° C.

EXAMPLE 25

The procedure of Example 8 is essentially repeated. Instead of monomers 1a and 2a, 68.1280 g (0.23560 mol) of monomer 1k is dehydrochlorinated in an "initial" solution of 320.64 g PPA having a $P_2O_5$ content of 77.2% (prepared by mixing 96.19 g of 85.4% $H_3PO_4$ with 184.4 g of 115% PPA). When dehydrochlorination is substantially complete, 57.0824 g (0.23560 mol) of monomer 2j is added followed by the gradual addition of 126.88 g of $P_2O_5$. The mixture is then stirred and heated essentially according to Example 8. The amount of $P_2O_5$ is preselected (as determined in accord with the aforementioned formulae a* and b*) to provide the reaction mixture with an effective $P_2O_5$ content of approximately 83.7% prior to the start of polymerization and an effective $P_2O_5$ content of approximately 82.2% subsequent to substantially complete polymerization. The reaction product obtained exhibits stir-opalescence and is further characterized as having a polymer concentration of 18%; fibers are readily formed by direct spinning, or drawing from the reaction product. The polymer obtained is of the following structure:

$$-AN-_n$$

characterized by an intrinsic viscosity of 14 dL/g in MSA at 30° C.

The above procedure is followed with the exception that the $P_2O_5$ content during the dehydrochlorination begins at 80% and then is incrementally increased to an intermediate $P_2O_5$ content of 83.7% prior to polymerization.

When the intermediate $P_2O_5$ content is increased such that the final $P_2O_5$ content is 83.0% and the reaction mixture is heated for 5 hours at 185° C., an intrinsic viscosity of 8 dL/g in MSA at 30° C. is obtained; heating the reaction mixture for a total of 7 hours at 185° C. gives an intrinsic viscosity of 12 dL/g in MSA at 30° C.; heating the reaction mixture for a total of 12 hours at 185° C. gives an intrinsic viscosity of 16 dL/g in MSA at 30° C.

Analogous to the foregoing Examples 6–25, other Type I extended chain polymers may be synthesized to yield liquid-crystalline compositions having varying proportions of polymer concentration, $P_2O_5$ content and polymer intrinsic viscosity in accordance with the present invention.

The synthesis is illustrated by the reaction systems in Tables 16a, 16b, 17a, 17b, and 17c. The m→, e→, and p→ denote most preferred, especially preferred, and preferred selected monomer reactions respectively.

TABLE 16a

Polymers of Type I, Class 1
Polymerization Reactions:

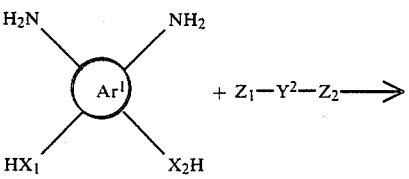

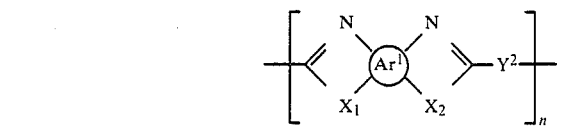

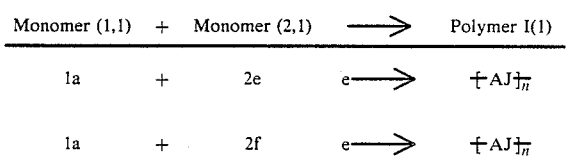

TABLE 16a-continued
Polymers of Type I, Class 1
Polymerization Reactions:

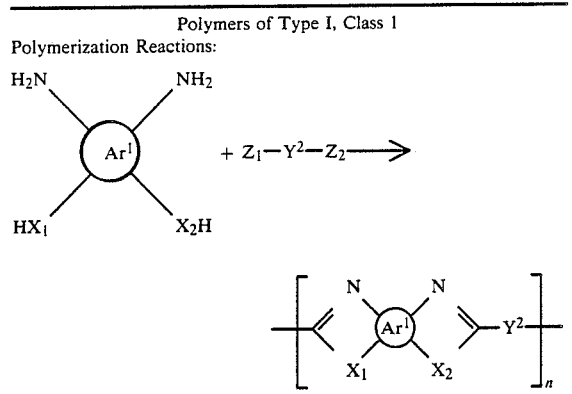

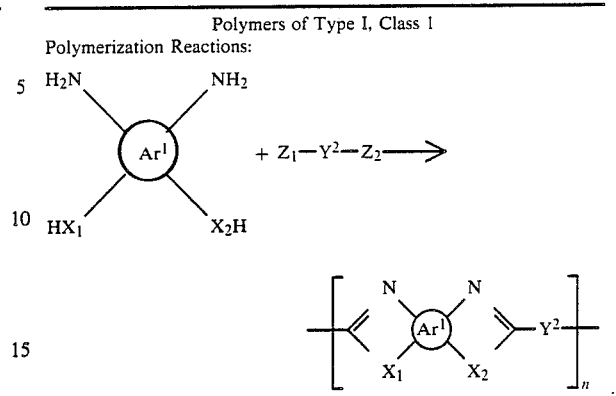

| Monomer (1,1) | + | Monomer (2,1) | → | Polymer I(1) | | Monomer (1,1) | + | Monomer (2,1) | → | Polymer I(1) |
|---|---|---|---|---|---|---|---|---|---|---|
| 1a | + | 2i | e→ | ${+AK+}_n$ | | 1b | + | 2o | e→ | ${+BF+}_n$ |
| 1a | + | 2k | e→ | ${+AB+}_n$ | | 1b | + | 2p | e→ | ${+BG+}_n$ |
| 1a | + | 2l | e→ | ${+AC+}_n$ | | 1b | + | 2q | e→ | ${+BH+}_n$ |
| 1a | + | 2m | e→ | ${+AD+}_n$ | | 1b | + | 2t | e→ | ${+BICI+}_n$ |
| 1a | + | 2n | e→ | ${+AE+}_n$ | | 1b | + | 2u | e→ | ${+BIDI+}_n$ |
| 1a | + | 2o | e→ | ${+AF+}_n$ | | 1b | + | 2v | e→ | ${+BIEI+}_n$ |
| 1a | + | 2p | e→ | ${+AG+}_n$ | | 1b | + | 2w | e→ | ${+BIFI+}_n$ |
| 1a | + | 2q | e→ | ${+AH+}_n$ | | 1b | + | 2x | e→ | ${+BIGI+}_n$ |
| 1a | + | 2t | e→ | ${+AICI+}_n$ | | 1b | + | 2y | e→ | ${+BIHI+}_n$ |
| 1a | + | 2u | e→ | ${+AIDI+}_n$ | | 1c | + | 2a | e→ | ${+CI+}_n$ |
| 1a | + | 2v | e→ | ${+AIEI+}_n$ | | 1c | + | 2e | e→ | ${+CJ+}_n$ |
| 1a | + | 2w | e→ | ${+AIFI+}_n$ | | 1c | + | 2i | e→ | ${+CK+}_n$ |
| 1a | + | 2x | e→ | ${+AIGI+}_n$ | | 1c | + | 2k | e→ | ${+BC+}_n$ |
| 1a | + | 2y | e→ | ${+AIHI+}_n$ | | 1c | + | 2l | e→ | ${+C+}_n$ |
| 1b | + | 2e | e→ | ${+BJ+}_n$ | | 1c | + | 2m | e→ | ${+CD+}_n$ |
| 1b | + | 2i | e→ | ${+BK+}_n$ | | 1c | + | 2n | e→ | ${+CE+}_n$ |
| 1b | + | 2k | e→ | ${+B+}_n$ | | 1c | + | 2o | e→ | ${+CF+}_n$ |
| 1b | + | 2l | e→ | ${+BC+}_n$ | | 1c | + | 2p | e→ | ${+CG+}_n$ |
| 1b | + | 2m | e→ | ${+BD+}_n$ | | 1c | + | 2q | e→ | ${+CH+}_n$ |
| 1b | + | 2n | e→ | ${+BE+}_n$ | | 1c | + | 2u | e→ | ${+CIDI+}_n$ |

TABLE 16a-continued
Polymers of Type I, Class 1
Polymerization Reactions:

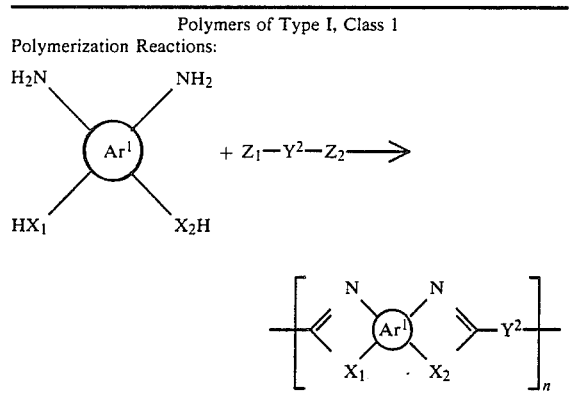
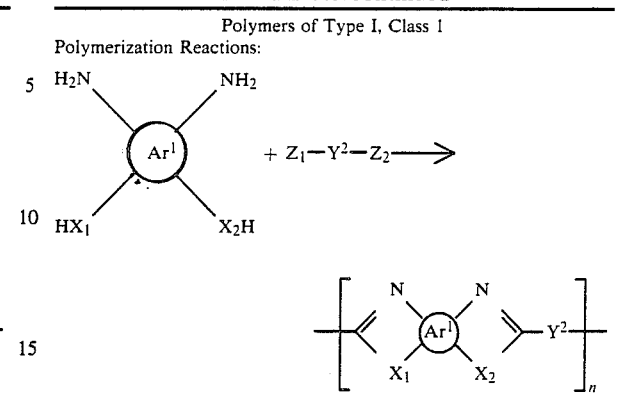

| Monomer (1,1) | + | Monomer (2,1) | ⟶ | Polymer I(1) | | Monomer (1,1) | + | Monomer (2,1) | ⟶ | Polymer I(1) |
|---|---|---|---|---|---|---|---|---|---|---|
| 1c | + | 2v | e⟶ | ─(CIEI)$_n$─ | | 1e | + | 2o | e⟶ | ─(EF)$_n$─ |
| 1c | + | 2w | e⟶ | ─(CIFI)$_n$─ | | 1e | + | 2p | e⟶ | ─(EG)$_n$─ |
| 1c | + | 2x | e⟶ | ─(CIGI)$_n$─ | | 1e | + | 2q | e⟶ | ─(EH)$_n$─ |
| 1c | + | 2y | e⟶ | ─(CIHI)$_n$─ | | 1e | + | 2w | e⟶ | ─(EIFI)$_n$─ |
| 1d | + | 2a | e⟶ | ─(DI)$_n$─ | | 1e | + | 2x | e⟶ | ─(EIGI)$_n$─ |
| 1d | + | 2e | e⟶ | ─(DJ)$_n$─ | | 1e | + | 2y | e⟶ | ─(EIHI)$_n$─ |
| 1d | + | 2i | e⟶ | ─(DK)$_n$─ | | 1f | + | 2a | e⟶ | ─(FI)$_n$─ |
| 1d | + | 2m | e⟶ | ─(D)$_n$─ | | 1f | + | 2e | e⟶ | ─(FJ)$_n$─ |
| 1d | + | 2n | e⟶ | ─(DE)$_n$─ | | 1f | + | 2i | e⟶ | ─(FK)$_n$─ |
| 1d | + | 2o | e⟶ | ─(DF)$_n$─ | | 1f | + | 2o | e⟶ | ─(F)$_n$─ |
| 1d | + | 2p | e⟶ | ─(DG)$_n$─ | | 1f | + | 2p | e⟶ | ─(FG)$_n$─ |
| 1d | + | 2q | e⟶ | ─(DH)$_n$─ | | 1f | + | 2q | e⟶ | ─(FH)$_n$─ |
| 1d | + | 2v | e⟶ | ─(DIEI)$_n$─ | | 1f | + | 2x | e⟶ | ─(FIGI)$_n$─ |
| 1d | + | 2w | e⟶ | ─(DIFI)$_n$─ | | 1f | + | 2y | e⟶ | ─(FIHI)$_n$─ |
| 1d | + | 2x | e⟶ | ─(DIGI)$_n$─ | | 1g | + | 2g | e⟶ | ─(GI)$_n$─ |
| 1d | + | 2y | e⟶ | ─(DIHI)$_n$─ | | 1g | + | 2e | e⟶ | ─(GJ)$_n$─ |
| 1e | + | 2a | e⟶ | ─(EI)$_n$─ | | 1g | + | 2i | e⟶ | ─(GK)$_n$─ |
| 1e | + | 2e | e⟶ | ─(EJ)$_n$─ | | 1g | + | 2p | e⟶ | ─(G)$_n$─ |
| 1e | + | 2i | e⟶ | ─(EK)$_n$─ | | 1g | + | 2q | e⟶ | ─(GH)$_n$─ |
| 1e | + | 2n | e⟶ | ─(E)$_n$─ | | 1g | + | 2y | e⟶ | ─(GIHI)$_n$─ |

TABLE 16a-continued
Polymers of Type I, Class 1
Polymerization Reactions:

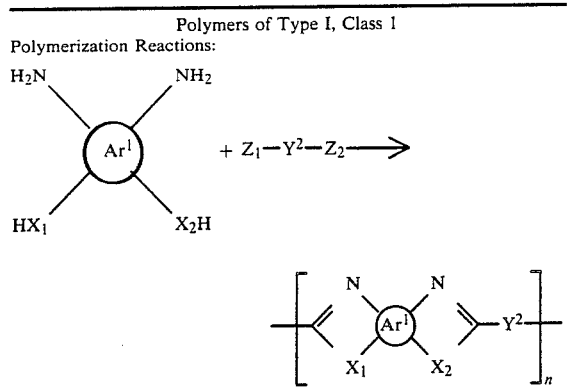

| Monomer (1,1) | + | Monomer (2,1) | → | Polymer I(1) |
|---|---|---|---|---|
| 1h | + | 2a | e→ | (HI)$_n$ |
| 1h | + | 2e | e→ | (HJ)$_n$ |
| 1h | + | 2i | e→ | (HK)$_n$ |
| 1h | + | 2q | e→ | (H)$_n$ |

TABLE 16b
Polymers of Type I, Class 1
Polymerization Reactions:

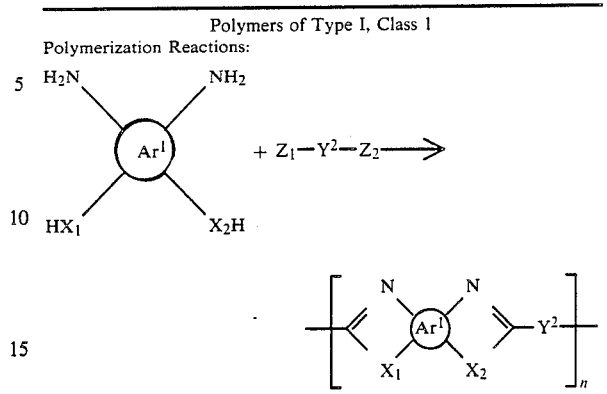

| Monomer (1,1) | + | Monomer (2,1) | → | Polymer I(1) |
|---|---|---|---|---|
| 1a | + | 2c | p→ | (AI)$_n$ |
| 1a | + | 2d | p→ | (AI)$_n$ |
| 1a | + | 2g | p→ | (AJ)$_n$ |
| 1a | + | 2h | p→ | (AJ)$_n$ |
| 1a | + | 2r | p→ | (AI)$_n$ |
| 1a | + | 2z | p→ | (A)$_n$ |
| 1b | + | 2b | p→ | (BI)$_n$ |
| 1b | + | 2c | p→ | (BI)$_n$ |

TABLE 16b-continued
Polymers of Type I, Class 1
Polymerization Reactions:

| Monomer (1,1) | + | Monomer (2,1) | → | Polymer I(1) |
|---|---|---|---|---|
| 1b | + | 2d | p→ | (BI)$_n$ |
| 1b | + | 2f | p→ | (BJ)$_n$ |
| 1b | + | 2g | p→ | (BJ)$_n$ |
| 1b | + | 2h | p→ | (BJ)$_n$ |
| 1b | + | 2r | p→ | (AIBI)$_n$ |
| 1b | + | 2s | p→ | (BI)$_n$ |
| 1b | + | 2z | p→ | (B)$_n$ |
| 1c | + | 2b | p→ | (CI)$_n$ |
| 1c | + | 2c | p→ | (CI)$_n$ |
| 1c | + | 2d | p→ | (CI)$_n$ |
| 1c | + | 2f | p→ | (CJ)$_n$ |
| 1c | + | 2g | p→ | (CJ)$_n$ |
| 1c | + | 2h | p→ | (CJ)$_n$ |
| 1c | + | 2r | p→ | (AICI)$_n$ |
| 1c | + | 2s | p→ | (BICI)$_n$ |
| 1c | + | 2t | p→ | (CI)$_n$ |
| 1d | + | 2b | p→ | (DI)$_n$ |
| 1d | + | 2c | p→ | (DI)$_n$ |
| 1d | + | 2d | p→ | (DI)$_n$ |
| 1d | + | 2f | p→ | (DJ)$_n$ |

TABLE 16b-continued

Polymers of Type I, Class 1
Polymerization Reactions:

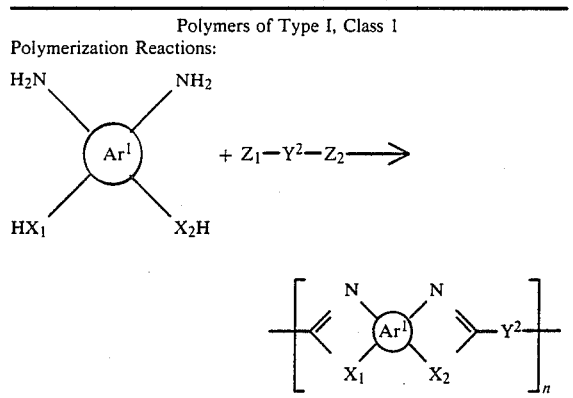

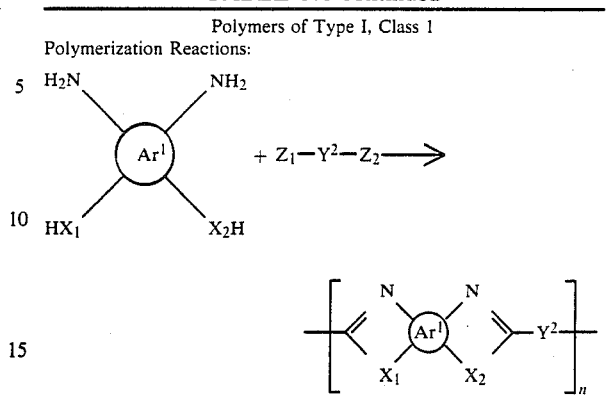

| Monomer (1,1) | + | Monomer (2,1) | → | Polymer I(1) | | Monomer (1,1) | + | Monomer (2,1) | → | Polymer I(1) |
|---|---|---|---|---|---|---|---|---|---|---|
| 1d | + | 2g | p→ | ⁺(DJ)ₙ | | 1e | + | 2s | p→ | ⁺(BIEI)ₙ |
| 1d | + | 2h | p→ | ⁺(DJ)ₙ | | 1e | + | 2t | p→ | ⁺(CIEI)ₙ |
| 1d | + | 2j | p→ | ⁺(AD)ₙ | | 1e | + | 2u | p→ | ⁺(DIEI)ₙ |
| 1d | + | 2k | p→ | ⁺(BD)ₙ | | 1e | + | 2v | p→ | ⁺(EI)ₙ |
| 1d | + | 2l | p→ | ⁺(CD)ₙ | | 1f | + | 2b | p→ | ⁺(FI)ₙ |
| 1d | + | 2r | p→ | ⁺(AIDI)ₙ | | 1f | + | 2c | p→ | ⁺(FI)ₙ |
| 1d | + | 2s | p→ | ⁺(BIDI)ₙ | | 1f | + | 2d | p→ | ⁺(FI)ₙ |
| 1d | + | 2t | p→ | ⁺(CIDI)ₙ | | 1f | + | 2f | p→ | ⁺(FJ)ₙ |
| 1d | + | 2u | p→ | ⁺(DI)ₙ | | 1f | + | 2g | p→ | ⁺(FJ)ₙ |
| 1e | + | 2b | p→ | ⁺(EI)ₙ | | 1f | + | 2h | p→ | ⁺(FJ)ₙ |
| 1e | + | 2c | p→ | ⁺(EI)ₙ | | 1f | + | 2j | p→ | ⁺(AF)ₙ |
| 1e | + | 2d | p→ | ⁺(EI)ₙ | | 1f | + | 2k | p→ | ⁺(BF)ₙ |
| 1e | + | 2f | p→ | ⁺(EJ)ₙ | | 1f | + | 2l | p→ | ⁺(CF)ₙ |
| 1e | + | 2g | p→ | ⁺(EJ)ₙ | | 1f | + | 2m | p→ | ⁺(DF)ₙ |
| 1e | + | 2h | p→ | ⁺(EJ)ₙ | | 1f | + | 2n | p→ | ⁺(EF)ₙ |
| 1e | + | 2j | p→ | ⁺(AE)ₙ | | 1f | + | 2r | p→ | ⁺(AIFI)ₙ |
| 1e | + | 2k | p→ | ⁺(BE)ₙ | | 1f | + | 2s | p→ | ⁺(BIFI)ₙ |
| 1e | + | 2l | p→ | ⁺(CE)ₙ | | 1f | + | 2t | p→ | ⁺(CIFI)ₙ |
| 1e | + | 2m | p→ | ⁺(DE)ₙ | | 1f | + | 2u | p→ | ⁺(DIFI)ₙ |
| 1e | + | 2r | p→ | ⁺(AIEI)ₙ | | 1f | + | 2v | p→ | ⁺(EIFI)ₙ |

TABLE 16b-continued

Polymers of Type I, Class 1

Polymerization Reactions:

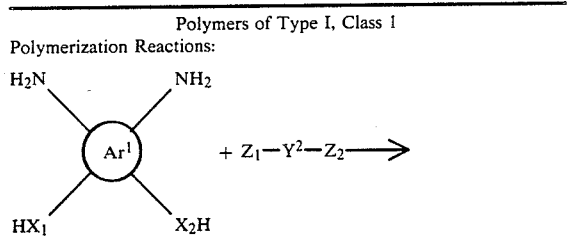

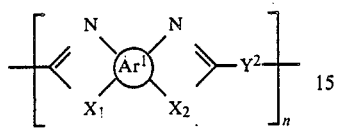

| Monomer (1,1) | + | Monomer (2,1) | ⟶ | Polymer I(1) |
|---|---|---|---|---|
| 1f | + | 2w | p⟶ | ⁺(FI)ₙ |
| 1g | + | 2b | p⟶ | ⁺(GI)ₙ |
| 1g | + | 2c | p⟶ | ⁺(GI)ₙ |
| 1g | + | 2d | p⟶ | ⁺(GI)ₙ |
| 1g | + | 2f | p⟶ | ⁺(GJ)ₙ |
| 1g | + | 2g | p⟶ | ⁺(GJ)ₙ |
| 1g | + | 2h | p⟶ | ⁺(GJ)ₙ |
| 1g | + | 2j | p⟶ | ⁺(AG)ₙ |
| 1g | + | 2k | p⟶ | ⁺(BG)ₙ |
| 1g | + | 2l | p⟶ | ⁺(CG)ₙ |
| 1g | + | 2m | p⟶ | ⁺(DG)ₙ |
| 1g | + | 2n | p⟶ | ⁺(EG)ₙ |
| 1g | + | 2o | p⟶ | ⁺(FG)ₙ |
| 1g | + | 2r | p⟶ | ⁺(AIGI)ₙ |
| 1g | + | 2s | p⟶ | ⁺(BIGI)ₙ |
| 1g | + | 2t | p⟶ | ⁺(CIGI)ₙ |
| 1g | + | 2u | p⟶ | ⁺(DIGI)ₙ |
| 1g | + | 2v | p⟶ | ⁺(EIGI)ₙ |
| 1g | + | 2w | p⟶ | ⁺(FIGI)ₙ |
| 1g | + | 2x | p⟶ | ⁺(GI)ₙ |

TABLE 16b-continued

Polymers of Type I, Class 1

Polymerization Reactions:

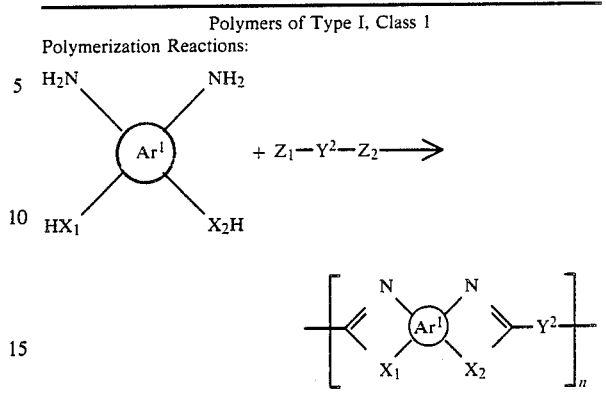

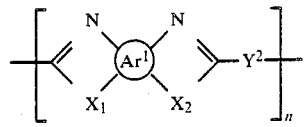

| Monomer (1,1) | + | Monomer (2,1) | ⟶ | Polymer I(1) |
|---|---|---|---|---|
| 1h | + | 2b | p⟶ | ⁺(HI)ₙ |
| 1h | + | 2c | p⟶ | ⁺(HI)ₙ |
| 1h | + | 2d | p⟶ | ⁺(HI)ₙ |
| 1h | + | 2f | p⟶ | ⁺(HJ)ₙ |
| 1h | + | 2g | p⟶ | ⁺(HJ)ₙ |
| 1h | + | 2h | p⟶ | ⁺(HJ)ₙ |
| 1h | + | 2j | p⟶ | ⁺(AH)ₙ |
| 1h | + | 2k | p⟶ | ⁺(BH)ₙ |
| 1h | + | 2l | p⟶ | ⁺(CH)ₙ |
| 1h | + | 2m | p⟶ | ⁺(DH)ₙ |
| 1h | + | 2n | p⟶ | ⁺(EH)ₙ |
| 1h | + | 2o | p⟶ | ⁺(FH)ₙ |
| 1h | + | 2p | p⟶ | ⁺(GH)ₙ |
| 1h | + | 2r | p⟶ | ⁺(AIHI)ₙ |
| 1h | + | 2s | p⟶ | ⁺(BIHI)ₙ |
| 1h | + | 2t | p⟶ | ⁺(CIHI)ₙ |
| 1h | + | 2u | p⟶ | ⁺(DIHI)ₙ |
| 1h | + | 2v | p⟶ | ⁺(EIHI)ₙ |
| 1h | + | 2w | p⟶ | ⁺(FIHI)ₙ |
| 1h | + | 2x | p⟶ | ⁺(GIHI)ₙ |

TABLE 16b-continued
Polymers of Type I, Class 1

Polymerization Reactions:

H$_2$N—Ar$^1$(HX$_1$)(X$_2$H)—NH$_2$ + Z$_1$—Y$^2$—Z$_2$ ⟶

$$\left[ =\!\!\!\underset{X_1}{\overset{N}{\diagup}}\!\!Ar^1\!\!\underset{X_2}{\overset{N}{\diagdown}}\!\!=\!Y^2\right]_n$$

| Monomer (1,1) | + | Monomer (2,1) | ⟶ | Polymer I(1) |
|---|---|---|---|---|
| 1h | + | 2y | p⟶ | +HI+$_n$ |

TABLE 17a
Polymers of Type I, Class 2

Polymerization Reactions:

H$_2$N—Ar$^1$(HX$_1$)(X$_2$H)—NH$_2$ + Z$_1$—Y$^2$—Z$_2$ ⟶

$$\left[ =\!\!\!\underset{X_1}{\overset{N}{\diagup}}\!\!Ar^1\!\!\underset{X_2}{\overset{N}{\diagdown}}\!\!=\!Y^2\right]_n$$

| Monomer (1,2) | + | Monomer (2,1) | ⟶ | Polymer I(2) |
|---|---|---|---|---|
| 1i | + | 2b | e⟶ | +LI+$_n$ |
| 1i | + | 2c | p⟶ | +LI+$_n$ |
| 1i | + | 2d | p⟶ | +LI+$_n$ |
| 1i | + | 2e | e⟶ | +LJ+$_n$ |
| 1i | + | 2f | p⟶ | +LJ+$_n$ |
| 1i | + | 2g | p⟶ | +LJ+$_n$ |
| 1i | + | 2h | p⟶ | +LJ+$_n$ |
| 1i | + | 2i | e⟶ | +LK+$_n$ |
| 1i | + | 2k | e⟶ | +BL+$_n$ |
| 1i | + | 2l | e⟶ | +CL+$_n$ |
| 1i | + | 2m | e⟶ | +DL+$_n$ |

TABLE 17a-continued
Polymers of Type I, Class 2

Polymerization Reactions:

H$_2$N—Ar$^1$(HX$_1$)(X$_2$H)—NH$_2$ + Z$_1$—Y$^2$—Z$_2$ ⟶

$$\left[ =\!\!\!\underset{X_1}{\overset{N}{\diagup}}\!\!Ar^1\!\!\underset{X_2}{\overset{N}{\diagdown}}\!\!=\!Y^2\right]_n$$

| Monomer (1,2) | + | Monomer (2,1) | ⟶ | Polymer I(2) |
|---|---|---|---|---|
| 1i | + | 2n | e⟶ | +EL+$_n$ |
| 1i | + | 2o | e⟶ | +FL+$_n$ |
| 1i | + | 2p | e⟶ | +GL+$_n$ |
| 1i | + | 2q | p⟶ | +HL+$_n$ |
| 1i | + | 2r | m⟶ | +AILI+$_n$ |
| 1i | + | 2s | m⟶ | +BILI+$_n$ |
| 1i | + | 2t | e⟶ | +CILI+$_n$ |
| 1i | + | 2u | e⟶ | +DILI+$_n$ |
| 1i | + | 2v | e⟶ | +EILI+$_n$ |
| 1i | + | 2w | e⟶ | +FILI+$_n$ |
| 1i | + | 2x | e⟶ | +GILI+$_n$ |
| 1i | + | 2y | p⟶ | +HILI+$_n$ |
| 1i | + | 2z | e⟶ | +L+$_n$ |
| 1j | + | 2b | e⟶ | +MI+$_n$ |
| 1j | + | 2c | p⟶ | +MI+$_n$ |
| 1j | + | 2d | p⟶ | +MI+$_n$ |
| 1j | + | 2e | e⟶ | +MJ+$_n$ |
| 1j | + | 2f | p⟶ | +MJ+$_n$ |
| 1j | + | 2g | p⟶ | +MJ+$_n$ |

TABLE 17a-continued
Polymers of Type I, Class 2

Polymerization Reactions:

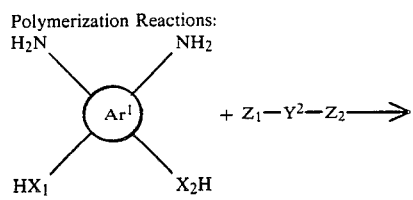  + $Z_1-Y^2-Z_2 \longrightarrow$

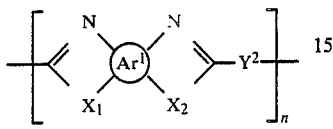

| Monomer (1,2) | + | Monomer (2,1) | → | Polymer I(2) |
|---|---|---|---|---|
| 1j | + | 2h | p⟶ | (MJ)$_n$ |
| 1j | + | 2i | e⟶ | (MK)$_n$ |
| 1j | + | 2k | e⟶ | (BM)$_n$ |
| 1j | + | 2l | e⟶ | (CM)$_n$ |
| 1j | + | 2m | e⟶ | (DM)$_n$ |
| 1j | + | 2n | e⟶ | (EM)$_n$ |
| 1j | + | 2o | e⟶ | (FM)$_n$ |
| 1j | + | 2p | e⟶ | (GM)$_n$ |
| 1j | + | 2q | e⟶ | (HM)$_n$ |
| 1j | + | 2r | e⟶ | (AIMI)$_n$ |
| 1j | + | 2s | e⟶ | (BIMI)$_n$ |
| 1j | + | 2t | e⟶ | (CIMI)$_n$ |
| 1j | + | 2u | e⟶ | (DIMI)$_n$ |
| 1j | + | 2v | e⟶ | (EIMI)$_n$ |
| 1j | + | 2w | e⟶ | (FIMI)$_n$ |
| 1j | + | 2x | e⟶ | (GIMI)$_n$ |
| 1j | + | 2y | p⟶ | (HIMI)$_n$ |
| 1j | + | 2z | e⟶ | (M)$_n$ |
| 1k | + | 2b | e⟶ | (NI)$_n$ |
| 1k | + | 2c | p⟶ | (NI)$_n$ |

TABLE 17a-continued
Polymers of Type I, Class 2

Polymerization Reactions:

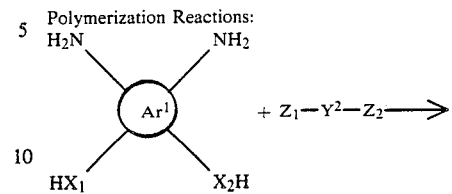  + $Z_1-Y^2-Z_2 \longrightarrow$

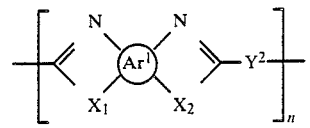

| Monomer (1,2) | + | Monomer (2,1) | → | Polymer I(2) |
|---|---|---|---|---|
| 1k | + | 2d | p⟶ | (NI)$_n$ |
| 1k | + | 2e | e⟶ | (NJ)$_n$ |
| 1k | + | 2f | p⟶ | (NJ)$_n$ |
| 1k | + | 2g | p⟶ | (NJ)$_n$ |
| 1k | + | 2h | p⟶ | (NJ)$_n$ |
| 1k | + | 2i | e⟶ | (NK)$_n$ |
| 1k | + | 2k | e⟶ | (BN)$_n$ |
| 1k | + | 2l | e⟶ | (CN)$_n$ |
| 1k | + | 2m | e⟶ | (DN)$_n$ |
| 1k | + | 2n | e⟶ | (EN)$_n$ |
| 1k | + | 2o | e⟶ | (FN)$_n$ |
| 1k | + | 2p | e⟶ | (GN)$_n$ |
| 1k | + | 2q | p⟶ | (HN)$_n$ |
| 1k | + | 2r | e⟶ | (AINI)$_n$ |
| 1k | + | 2s | e⟶ | (BINI)$_n$ |
| 1k | + | 2t | e⟶ | (CINI)$_n$ |
| 1k | + | 2u | e⟶ | (DINI)$_n$ |
| 1k | + | 2v | e⟶ | (EINI)$_n$ |
| 1k | + | 2w | e⟶ | (FINI)$_n$ |

TABLE 17a-continued

Polymers of Type I, Class 2

Polymerization Reactions:

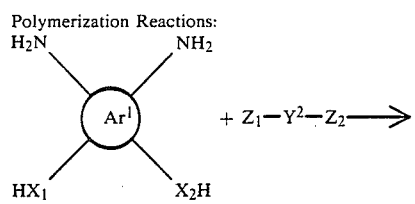

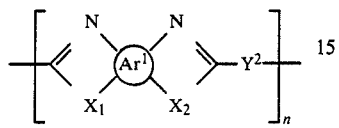

| Monomer (1,2) | + | Monomer (2,1) | ⟶ | Polymer I(2) |
|---|---|---|---|---|
| 1k | + | 2x | e⟶ | ─(GINI)ₙ─ |
| 1k | + | 2y | p⟶ | ─(HINI)ₙ─ |
| 1k | + | 2z | e⟶ | ─(N)ₙ─ |
| 1l | + | 2b | e⟶ | ─(OI)ₙ─ |
| 1l | + | 2c | p⟶ | ─(OI)ₙ─ |
| 1l | + | 2d | p⟶ | ─(OI)ₙ─ |
| 1l | + | 2e | e⟶ | ─(OJ)ₙ─ |
| 1l | + | 2f | p⟶ | ─(OJ)ₙ─ |
| 1l | + | 2g | p⟶ | ─(OJ)ₙ─ |
| 1l | + | 2h | p⟶ | ─(OJ)ₙ─ |
| 1l | + | 2i | e⟶ | ─(OK)ₙ─ |
| 1l | + | 2j | e⟶ | ─(AO)ₙ─ |
| 1l | + | 2k | e⟶ | ─(BO)ₙ─ |
| 1l | + | 2l | e⟶ | ─(CO)ₙ─ |
| 1l | + | 2m | e⟶ | ─(DO)ₙ─ |
| 1l | + | 2n | e⟶ | ─(EO)ₙ─ |
| 1l | + | 2o | e⟶ | ─(FO)ₙ─ |
| 1l | + | 2p | e⟶ | ─(GO)ₙ─ |
| 1l | + | 2q | p⟶ | ─(HO)ₙ─ |
| 1l | + | 2r | e⟶ | ─(AIOI)ₙ─ |

TABLE 17a-continued

Polymers of Type I, Class 2

Polymerization Reactions:

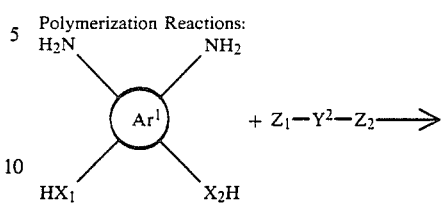

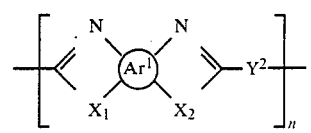

| Monomer (1,2) | + | Monomer (2,1) | ⟶ | Polymer I(2) |
|---|---|---|---|---|
| 1l | + | 2s | e⟶ | ─(BIOI)ₙ─ |
| 1l | + | 2t | e⟶ | ─(CIOI)ₙ─ |
| 1l | + | 2u | e⟶ | ─(DIOI)ₙ─ |
| 1l | + | 2v | e⟶ | ─(EIOI)ₙ─ |
| 1l | + | 2w | e⟶ | ─(FIOI)ₙ─ |
| 1l | + | 2x | e⟶ | ─(GIOI)ₙ─ |
| 1l | + | 2y | p⟶ | ─(HIOI)ₙ─ |
| 1m | + | 2a | p⟶ | ─(PI)ₙ─ |
| 1m | + | 2b | p⟶ | ─(PI)ₙ─ |
| 1m | + | 2c | p⟶ | ─(PI)ₙ─ |
| 1m | + | 2d | p⟶ | ─(PI)ₙ─ |
| 1m | + | 2e | p⟶ | ─(PJ)ₙ─ |
| 1m | + | 2f | p⟶ | ─(PJ)ₙ─ |
| 1m | + | 2g | p⟶ | ─(PJ)ₙ─ |
| 1m | + | 2h | p⟶ | ─(PJ)ₙ─ |
| 1m | + | 2i | p⟶ | ─(PK)ₙ─ |
| 1m | + | 2j | p⟶ | ─(AP)ₙ─ |
| 1m | + | 2k | p⟶ | ─(BP)ₙ─ |
| 1m | + | 2l | p⟶ | ─(CP)ₙ─ |

TABLE 17a-continued

Polymers of Type I, Class 2

Polymerization Reactions:

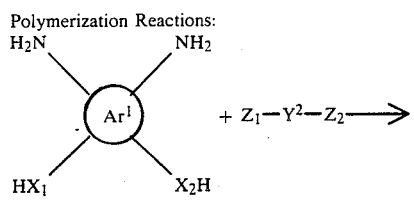 + $Z_1-Y^2-Z_2 \longrightarrow$

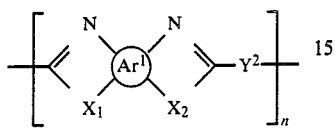

| Monomer (1,2) | + | Monomer (2,1) | $\longrightarrow$ | Polymer I(2) |
|---|---|---|---|---|
| 1m | + | 2m | p⟶ | ⁺DP⁺ₙ |
| 1m | + | 2n | p⟶ | ⁺EP⁺ₙ |
| 1m | + | 2o | p⟶ | ⁺FP⁺ₙ |
| 1m | + | 2p | p⟶ | ⁺GP⁺ₙ |
| 1m | + | 2q | p⟶ | ⁺HP⁺ₙ |
| 1m | + | 2r | p⟶ | ⁺AIPI⁺ₙ |
| 1m | + | 2s | p⟶ | ⁺BIPI⁺ₙ |
| 1m | + | 2t | p⟶ | ⁺CIPI⁺ₙ |
| 1m | + | 2u | p⟶ | ⁺DIPI⁺ₙ |
| 1m | + | 2v | p⟶ | ⁺EIPI⁺ₙ |
| 1m | + | 2w | p⟶ | ⁺FIPI⁺ₙ |
| 1m | + | 2x | p⟶ | ⁺GIPI⁺ₙ |
| 1m | + | 2y | p⟶ | ⁺HIPI⁺ₙ |
| 1n | + | 2a | e⟶ | ⁺QI⁺ₙ |
| 1n | + | 2b | p⟶ | ⁺QI⁺ₙ |
| 1n | + | 2c | p⟶ | ⁺QI⁺ₙ |
| 1n | + | 2d | p⟶ | ⁺QI⁺ₙ |
| 1n | + | 2e | e⟶ | ⁺QJ⁺ₙ |
| 1n | + | 2f | p⟶ | ⁺QJ⁺ₙ |
| 1n | + | 2g | p⟶ | ⁺QJ⁺ₙ |

TABLE 17a-continued

Polymers of Type I, Class 2

Polymerization Reactions:

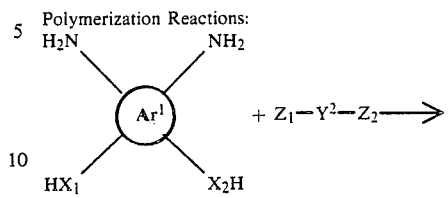 + $Z_1-Y^2-Z_2 \longrightarrow$

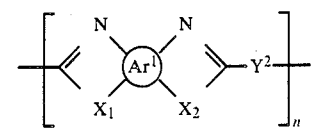

| Monomer (1,2) | + | Monomer (2,1) | $\longrightarrow$ | Polymer I(2) |
|---|---|---|---|---|
| 1n | + | 2h | p⟶ | ⁺QJ⁺ₙ |
| 1n | + | 2i | e⟶ | ⁺QK⁺ₙ |
| 1n | + | 2j | e⟶ | ⁺AQ⁺ₙ |
| 1n | + | 2k | e⟶ | ⁺BQ⁺ₙ |
| 1n | + | 2l | e⟶ | ⁺CQ⁺ₙ |
| 1n | + | 2m | e⟶ | ⁺DQ⁺ₙ |
| 1n | + | 2n | e⟶ | ⁺EQ⁺ₙ |
| 1n | + | 2o | e⟶ | ⁺FQ⁺ₙ |
| 1n | + | 2p | e⟶ | ⁺GQ⁺ₙ |
| 1n | + | 2q | p⟶ | ⁺HQ⁺ₙ |
| 1n | + | 2r | e⟶ | ⁺AIQI⁺ₙ |
| 1n | + | 2s | e⟶ | ⁺BIQI⁺ₙ |
| 1n | + | 2t | e⟶ | ⁺CIQI⁺ₙ |
| 1n | + | 2u | e⟶ | ⁺DIQI⁺ₙ |
| 1n | + | 2v | e⟶ | ⁺EIQI⁺ₙ |
| 1n | + | 2w | e⟶ | ⁺FIQI⁺ₙ |
| 1n | + | 2x | e⟶ | ⁺GIQI⁺ₙ |
| 1n | + | 2y | p⟶ | ⁺HIQI⁺ₙ |
| 1n | + | 2z | e⟶ | ⁺Q⁺ₙ |

TABLE 17a-continued
Polymers of Type I, Class 2

Polymerization Reactions:

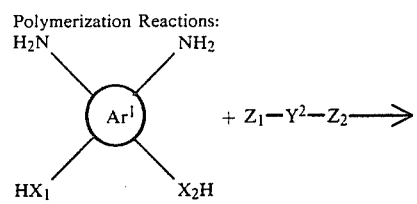  + $Z_1-Y^2-Z_2 \longrightarrow$

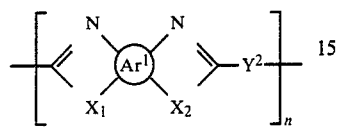

| Monomer (1,2) | + | Monomer (2,1) | $\longrightarrow$ | Polymer I(2) |
|---|---|---|---|---|
| 1o | + | 2a | e $\longrightarrow$ | $-(RI)_n$ |
| 1o | + | 2b | p $\longrightarrow$ | $-(RI)_n$ |
| 1o | + | 2c | p $\longrightarrow$ | $-(RI)_n$ |
| 1o | + | 2d | p $\longrightarrow$ | $-(RI)_n$ |
| 1o | + | 2e | e $\longrightarrow$ | $-(RJ)_n$ |
| 1o | + | 2f | p $\longrightarrow$ | $-(RJ)_n$ |
| 1o | + | 2g | p $\longrightarrow$ | $-(RJ)_n$ |
| 1o | + | 2h | p $\longrightarrow$ | $-(RJ)_n$ |
| 1o | + | 2i | e $\longrightarrow$ | $-(RK)_n$ |
| 1o | + | 2j | e $\longrightarrow$ | $-(AR)_n$ |
| 1o | + | 2k | e $\longrightarrow$ | $-(BR)_n$ |
| 1o | + | 2l | e $\longrightarrow$ | $-(CR)_n$ |
| 1o | + | 2m | e $\longrightarrow$ | $-(DR)_n$ |
| 1o | + | 2n | e $\longrightarrow$ | $-(ER)_n$ |
| 1o | + | 2o | e $\longrightarrow$ | $-(FR)_n$ |
| 1o | + | 2p | e $\longrightarrow$ | $-(GR)_n$ |
| 1o | + | 2q | p $\longrightarrow$ | $-(HR)_n$ |
| 1o | + | 2r | e $\longrightarrow$ | $-(AIRI)_n$ |
| 1o | + | 2s | e $\longrightarrow$ | $-(BIRI)_n$ |
| 1o | + | 2t | e $\longrightarrow$ | $-(CIRI)_n$ |

TABLE 17a-continued
Polymers of Type I, Class 2

Polymerization Reactions:

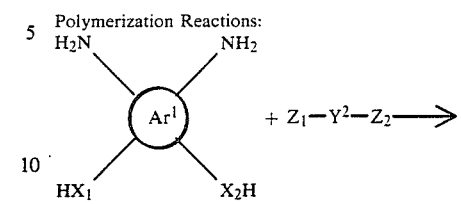  + $Z_1-Y^2-Z_2 \longrightarrow$

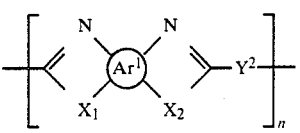

| Monomer (1,2) | + | Monomer (2,1) | $\longrightarrow$ | Polymer I(2) |
|---|---|---|---|---|
| 1o | + | 2u | e $\longrightarrow$ | $-(DIRI)_n$ |
| 1o | + | 2v | e $\longrightarrow$ | $-(EIRI)_n$ |
| 1o | + | 2w | e $\longrightarrow$ | $-(FIRI)_n$ |
| 1o | + | 2x | e $\longrightarrow$ | $-(GIRI)_n$ |
| 1o | + | 2y | p $\longrightarrow$ | $-(HIRI)_n$ |
| 1o | + | 2z | e $\longrightarrow$ | $-(R)_n$ |
| 1p | + | 2a | e $\longrightarrow$ | $-(SI)_n$ |
| 1p | + | 2b | p $\longrightarrow$ | $-(SI)_n$ |
| 1p | + | 2c | p $\longrightarrow$ | $-(SI)_n$ |
| 1p | + | 2d | p $\longrightarrow$ | $-(SI)_n$ |
| 1p | + | 2e | e $\longrightarrow$ | $-(SJ)_n$ |
| 1p | + | 2f | p $\longrightarrow$ | $-(SJ)_n$ |
| 1p | + | 2g | p $\longrightarrow$ | $-(SJ)_n$ |
| 1p | + | 2h | p $\longrightarrow$ | $-(SJ)_n$ |
| 1p | + | 2i | e $\longrightarrow$ | $-(SK)_n$ |
| 1p | + | 2j | e $\longrightarrow$ | $-(AS)_n$ |
| 1p | + | 2k | e $\longrightarrow$ | $-(BS)_n$ |
| 1p | + | 2l | e $\longrightarrow$ | $-(CS)_n$ |
| 1p | + | 2m | e $\longrightarrow$ | $-(DS)_n$ |

TABLE 17a-continued
Polymers of Type I, Class 2

Polymerization Reactions:

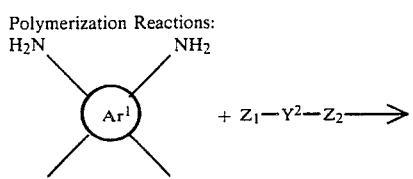  + $Z_1-Y^2-Z_2 \longrightarrow$

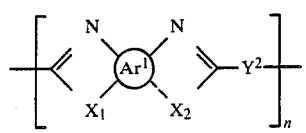

| Monomer (1,2) | + | Monomer (2,1) | $\longrightarrow$ | Polymer I(2) |
|---|---|---|---|---|
| 1p | + | 2n | e⟶ | ⟨ES⟩ₙ |
| 1p | + | 2o | e⟶ | ⟨FS⟩ₙ |
| 1p | + | 2p | e⟶ | ⟨GS⟩ₙ |
| 1p | + | 2q | p⟶ | ⟨HS⟩ₙ |
| 1p | + | 2r | p⟶ | ⟨AISI⟩ₙ |
| 1p | + | 2s | p⟶ | ⟨BISI⟩ₙ |
| 1p | + | 2t | p⟶ | ⟨CISI⟩ₙ |
| 1p | + | 2u | p⟶ | ⟨DISI⟩ₙ |
| 1p | + | 2v | p⟶ | ⟨EISI⟩ₙ |
| 1p | + | 2w | p⟶ | ⟨FISI⟩ₙ |
| 1p | + | 2x | p⟶ | ⟨GISI⟩ₙ |
| 1p | + | 2y | p⟶ | ⟨HISI⟩ₙ |

TABLE 17b
Polymers of Type I, Class 2
Polymerization Reactions:

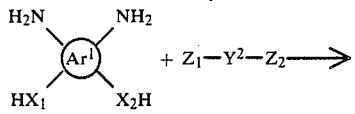  + $Z_1-Y^2-Z_2 \longrightarrow$

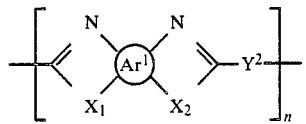

| Monomer (1,1) | + | Monomer (2,2) | $\longrightarrow$ | Polymer I(2) |
|---|---|---|---|---|
| 1a | + | 2hh | e⟶ | ⟨AVIV'⟩ₙ |

TABLE 17b-continued
Polymers of Type I, Class 2
Polymerization Reactions:

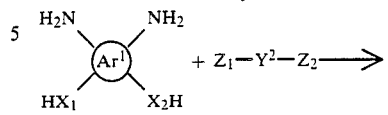  + $Z_1-Y^2-Z_2 \longrightarrow$

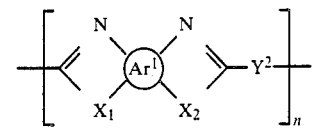

| Monomer (1,1) | + | Monomer (2,2) | $\longrightarrow$ | Polymer I(2) |
|---|---|---|---|---|
| 1a | + | 2ii | e⟶ | ⟨ATIT'⟩ₙ |
| 1a | + | 2jj | e⟶ | ⟨ATKT'⟩ₙ |
| 1b | + | 2hh | e⟶ | ⟨BVIV'⟩ₙ |
| 1b | + | 2ii | e⟶ | ⟨BTIT'⟩ₙ |
| 1b | + | 2jj | e⟶ | ⟨BTKT'⟩ₙ |
| 1c | + | 2hh | e⟶ | ⟨CVIV'⟩ₙ |
| 1c | + | 2ii | e⟶ | ⟨CTIT'⟩ₙ |
| 1c | + | 2jj | e⟶ | ⟨CTKT'⟩ₙ |
| 1d | + | 2hh | e⟶ | ⟨DVIV'⟩ₙ |
| 1d | + | 2ii | e⟶ | ⟨DTIT'⟩ₙ |
| 1d | + | 2jj | e⟶ | ⟨DTKT'⟩ₙ |
| 1e | + | 2hh | e⟶ | ⟨EVIV'⟩ₙ |
| 1e | + | 2ii | e⟶ | ⟨ETIT'⟩ₙ |
| 1e | + | 2jj | e⟶ | ⟨ETKT'⟩ₙ |
| 1f | + | 2hh | e⟶ | ⟨FVIV'⟩ₙ |
| 1f | + | 2ii | e⟶ | ⟨FTIT'⟩ₙ |
| 1f | + | 2jj | e⟶ | ⟨FTKT'⟩ₙ |
| 1g | + | 2hh | e⟶ | ⟨GVIV'⟩ₙ |
| 1g | + | 2ii | e⟶ | ⟨GTIT'⟩ₙ |
| 1g | + | 2jj | e⟶ | ⟨GTKT'⟩ₙ |
| 1h | + | 2hh | e⟶ | ⟨HVIV'⟩ₙ |

TABLE 17b-continued

Polymers of Type I, Class 2
Polymerization Reactions:

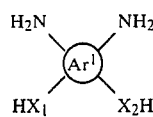

| Monomer (1,1) | + | Monomer (2,2) | ⟶ | Polymer I(2) |
|---|---|---|---|---|
| 1h | + | 2ii | e⟶ | ⁺(HTIT')ₙ⁻ |
| 1h | + | 2jj | e⟶ | ⁺(HTKT')ₙ⁻ |

TABLE 17c

Polymers of Type I, Class 2
Polymerization Reactions:

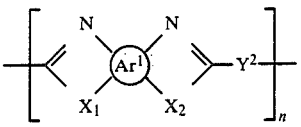

| Monomer (1,2) | + | Monomer (2,2) | ⟶ | Polymer I(2) |
|---|---|---|---|---|
| 1i | + | 2hh | e⟶ | ⁺(LVIV')ₙ⁻ |
| 1i | + | 2ii | e⟶ | ⁺(LTIT')ₙ⁻ |
| 1i | + | 2jj | e⟶ | ⁺(LTKT')ₙ⁻ |
| 1j | + | 2hh | e⟶ | ⁺(MVIV')ₙ⁻ |
| 1j | + | 2ii | e⟶ | ⁺(MTIT')ₙ⁻ |
| 1j | + | 2jj | e⟶ | ⁺(MTKT')ₙ⁻ |
| 1k | + | 2hh | e⟶ | ⁺(NVIV')ₙ⁻ |
| 1k | + | 2ii | e⟶ | ⁺(NTIT')ₙ⁻ |
| 1k | + | 2jj | e⟶ | ⁺(NTKT')ₙ⁻ |
| 1l | + | 2hh | e⟶ | ⁺(OVIV')ₙ⁻ |
| 1l | + | 2ii | e⟶ | ⁺(OTIT')ₙ⁻ |
| 1l | + | 2jj | e⟶ | ⁺(OTKT')ₙ⁻ |

TABLE 17c-continued

Polymers of Type I, Class 2
Polymerization Reactions:

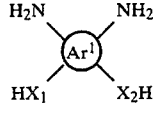

| Monomer (1,2) | + | Monomer (2,2) | ⟶ | Polymer I(2) |
|---|---|---|---|---|
| 1m | + | 2hh | e⟶ | ⁺(PVIV')ₙ⁻ |
| 1m | + | 2ii | e⟶ | ⁺(PTIT')ₙ⁻ |
| 1m | + | 2jj | e⟶ | ⁺(PTKT')ₙ⁻ |
| 1n | + | 2hh | e⟶ | ⁺(QVIV')ₙ⁻ |
| 1n | + | 2ii | e⟶ | ⁺(QTIT')ₙ⁻ |
| 1n | + | 2jj | e⟶ | ⁺(QTKT')ₙ⁻ |
| 1o | + | 2hh | e⟶ | ⁺(RVIV')ₙ⁻ |
| 1o | + | 2ii | e⟶ | ⁺(RTIT')ₙ⁻ |
| 1o | + | 2jj | e⟶ | ⁺(RTKT')ₙ⁻ |
| 1p | + | 2hh | e⟶ | ⁺(SVIV')ₙ⁻ |
| 1p | + | 2ii | e⟶ | ⁺(STIT')ₙ⁻ |
| 1p | + | 2jj | e⟶ | ⁺(STKT')ₙ⁻ |

EXAMPLE 26

A solution consisting of 63.34 g concentrated phosphoric acid and 147.59 g of 115% PPA is stirred at 100° C. under reduced pressure for 3 h in a 300 ml 3-necked flask. To a 500 mL resin kettle is added 63.49 g (0.3087 mol) of 4-amino-3-mercaptobenzoic acid hydrochloride (3a) (prepared by the method of Wolfe, AFOSR Final Technical Report, Dec. 15, 1980). A portion of the above-prepared PPA having a $P_2O_5$ of 77.3% (207.57 g) is poured into the resin kettle containing the monomer while under argon flow. After the monomer has been incorporated, a second portion of monomer (30.71 g, 0.1493 mol) is added. The mixture is heated to 55° C. and the pressure gradually decreased over 1.5 h. An additional 5.35 g of monomer is added to the kettle under argon flow bringing the total monomer added to 99.65 g (0.4845 mol). The mixture is then stirred under reduced pressure at 50° C. overnight. The temperature is then raised to 70° C. for 8 h. Phosphorus pentoxide (138.62 g) is then added in one portion to increase the effective $P_2O_5$ content to 86.4%. After heating at 100°

C. with stirring overnight the reaction product is stir-opalescent. After placing the mixture, which still contains undissolved monomer, under reduced pressure for 3 h, a sample is removed and placed between a microscope slide and a cover glass. The unprecipitated product depolarizes plane polarized light. The reaction mixture is then heated under argon as follows: an additional 2.5 h at 100° C.; 2 h at 120° C.; 16 h at 130° C.; 31 h at 170° C.; 43.5 h at 200° C. A sample of the green, opalescent polymer reaction product yields gold-orange fibers upon precipitation in water. The sample is extracted in water for 24 h and dried under vacuum at 140° C. for 24 h. The intrinsic viscosity is determined to be 8.2 dL/g in MSA at 30.1° C. The reaction product is characterized as having a final effective $P_2O_5$ content of 82.2% with the polymer $-\{T\}_n$ having a concentration of 15.1% by weight.

EXAMPLE 27

Figure 12:
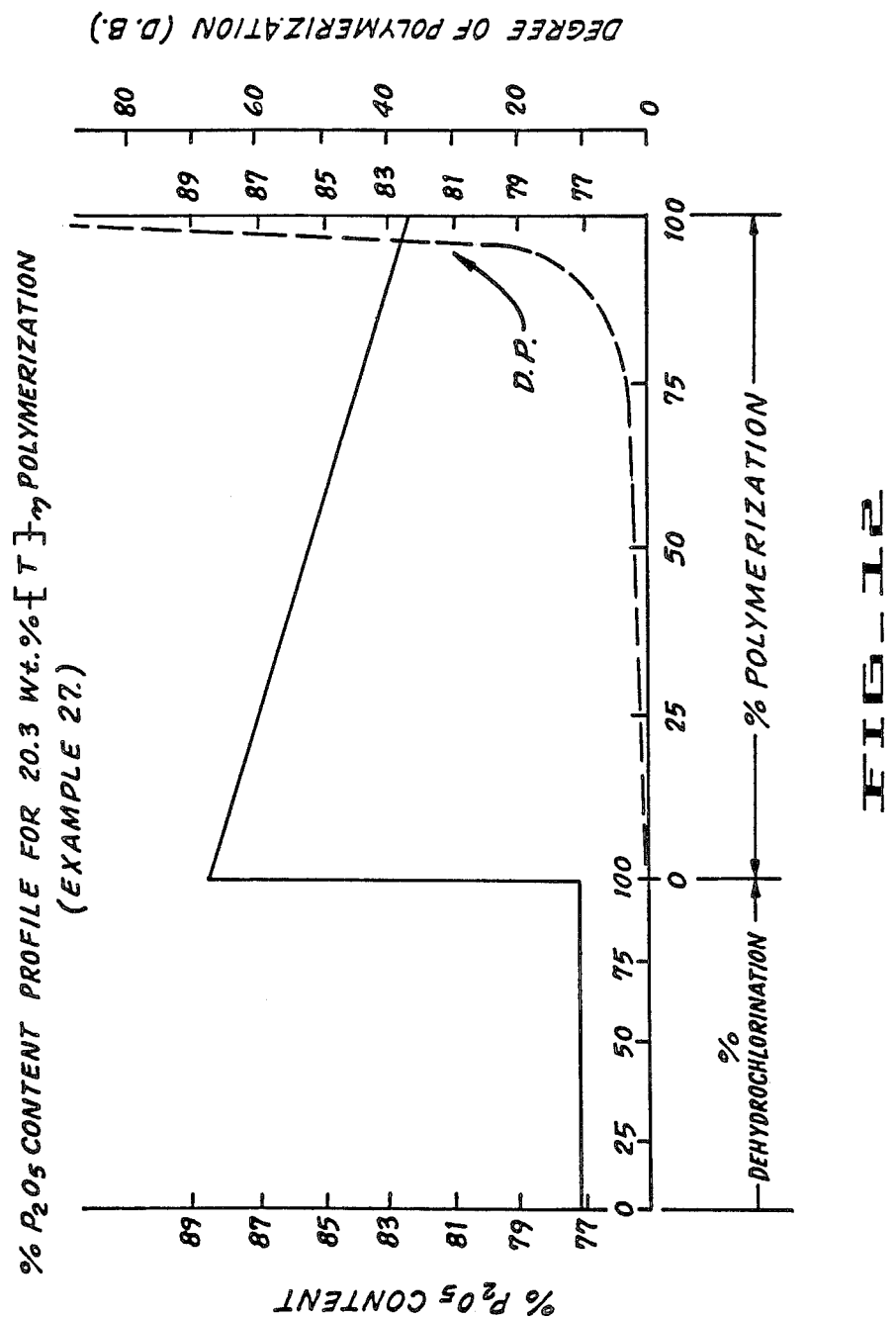

A mixture of 125.8 g of 115% PPA and 53.9 g of concentrated phosphoric acid (85.7% $H_3PO_4$) is heated to 100° C. for 4 h under reduced pressure in a 500 mL 3-necked flask. The % $P_2O_5$ content profile for this Example is illustrated in FIG. 12. To a 500 mL resin kettle is added 91.85 g (0.4466 mol) of 3a. The kettle containing the monomer is deaerated. 108.17 g of the PPA prepared above (having a $P_2O_5$ content of 77.2%) is then added. The kettle was then heated with an oil bath at 50° C. under a thin stream of argon overnight. The kettle is then placed under reduced pressure again and heated to 70° C. for 23 h. $P_2O_5$ (108.32 g) is then added in three portions to increase the effective $P_2O_5$ content to 88.5%. Reduced pressure is applied to degas the $P_2O_5$ and to cause foaming that aids in mixing. After 3 h of stirring the temperature is raised to 100° C. and maintained at that temperature under reduced pressure for 21 h. The mixture is stir-opalescent and depolarizes plane-polarized light. The mixture is then heated as follows: 115° C. under argon for 3 h; 130° C. under reduced pressure for 2 h; 170° C. for 0.5 h; 190° C. for 17 h. A sample of the green, opalescent reaction product is removed and gives a fibrillar, golden-colored fiber upon drawing followed by precipitation in water. After extracting with water in a Soxhlet apparatus for 24 h the sample is dried for 24 h at 110° C. under reduced pressure. The intrinsic viscosity of this sample is 15.8 dL/g in MSA at 30.0° C. An additional 7.5 h of heating gives a sample with an intrinsic viscosity of 16.7 dL/g. The reaction product thus obtained is 20.3% by weight of polymer $-\{T\}_n$ in PPA with a final $P_2O_5$ content of 82.4%.

When the intermediate $P_2O_5$ content is increased such that the final $P_2O_5$ content is 83.0% and the reaction mixture is heated for 5 hours at 185° C., an intrinsic viscosity of 7 dL/g in MSA at 30° C. is obtained; heating the reaction mixture for a total of 7 hours at 185° C. gives an intrinsic viscosity of 10 dL/g in MSA at 30° C. heating the reaction mixture for a total of 12 hours at 185° C. gives an intrinsic viscosity of 12 dL/g in MSA at 30° C. The above procedure is followed with the exception that methanesulfonic acid (MSA) in the amount of 22% of the weight of the solvent is added during the dehydrochlorination step. After the addition of the $P_2O_5$ the polymerization mixture is heated at 140° C. for 67 hours to give a stir opalescent reaction mixture. The polymer isolated by precipitation into water has an intrinsic viscosity of 7.3 dL/g in MSA at 30° C.

EXAMPLE 28

The procedure of Example 27 is essentially repeated. Instead of monomer 3a, 146.9123 g (0.4305753 mol) of monomer 3 k is dehydrochlorinated in an "initial" solution of 265.9 g of PPA having a $P_2O_5$ content of 77.3% (prepared by mixing 78.6 g of 85.4% $H_3PO_4$ with 187.4 g of 115% PPA). When dehydrochlorination is substantially complete, an additional 144.85 g of $P_2O_5$ is gradually added to the mixture and dissolved by stirring and heating essentially according to the schedule given in Example 27. The amount of $P_2O_5$ added is preselected (as determined in accord with the aforementioned formulae a* and b*) to provide the reaction mixture with an effective $P_2O_5$ content of approximately 85.3% prior to the start of polymerization and an effective $P_2O_5$ content of approximately 82.2% subsequent to substantial complete polymerization. The reaction product obtained exhibits stir-opalescence and is further characterized as having a polymer concentration of 19%; fibers are readily formed by direct spinning, or drawing from the reaction product. The polymer obtained is of the following structure:

characterized by an intrinsic viscosity of 15 dL/g in MSA at 30° C. which corresponds to an average n value of polymerization of about 70.

The above procedure is followed with the exception that the $P_2O_5$ content during the dehydrochlorination begins at 82% and then is incrementally increased to an intermediate $P_2O_5$ content of 85.3% prior to polymerization.

When the intermediate $P_2O_5$ content is increased such that the final $P_2O_5$ content is 83.0% and the reaction mixture is heated for 5 hours at 185° C., an intrinsic viscosity of 7 dL/g in MSA at 30° C. is obtained; heating the reaction mixture for a total of 7 hours at 185° C. gives an intrinsic viscosity of 9 dL/g in MSA at 30° C.; heating the reaction mixture for a total of 12 hours at 185° C. gives an intrinsic viscosity of 12 dL/g in MSA at 30° C.

EXAMPLE 29

The procedure of Example 27 is essentially repeated. Instead of monomer 3a, 161.90 g (0.85391 mol) of monomer 3c is dehydrochlorinated in an "initial" solution of 198.8 g of PPA having a $P_2O_5$ content of 77.3% (prepared by mixing 58.7 g of 85.4% $H_3PO_4$ with 140.0 g of 115% PPA). When dehydrochlorination is substantially complete, an additional 196.8 g of $P_2O_5$ is gradually added to the mixture and dissolved by stirring and heating essentially according to Example 27. The amount of $P_2O_5$ added is preselected (as determined in accord with the aforementioned formulae a* and b*) to provide the reaction mixture with an effective $P_2O_5$ content of approximately 88.6% prior to the start of polymerization and an effective $P_2O_5$ content of approximately 82.2% subsequent to substantial complete polymerization. The reaction product obtained exhibits stir-opalescence and is further characterized as having a polymer concentration of 19%; fibers are readily formed by direct spinning, or drawing from the reaction product. The polymer obtained is of the following structure:

characterized by an intrinsic viscosity of 12 dL/g in MSA at 30° C.

The above procedure is followed with the exception that the P$_2$O$_5$ content during the dehydrochlorination begins at 80% and then is incrementally increased to an intermediate P$_2$O$_5$ content of 88.6% prior to polymerization.

When the intermediate P$_2$O$_5$ content is increased such that the final P$_2$O$_5$ content is 83.0% and the reaction mixture is heated for 5 hours at 185° C., an intrinsic viscosity of 4 dL/g in MSA at 30° C. is obtained; heating the reaction mixture for a total of 7 hours at 185° C. gives an intrinsic viscosity of 8 dL/g in MSA at 30° C.; heating the reaction mixture for a total of 12 hours at 185° C. gives an intrinsic viscosity of 10 dL/g in MSA at 30° C.

EXAMPLE 30

The procedure of Example 27 is essentially repeated. Instead of monomer 3a, 161.90 g (0.85391 mol) of monomer 3d is dehydrochlorinated in an "initial" solution of 221.7 g of PPA having a P$_2$O$_5$ content of 77.3% (prepared by mixing 65.50 g of 85.4% H$_3$PO$_4$ with 156.2 g of 115% PPA). When dehydrochlorination is substantially complete, an additional 203.1 g of P$_2$O$_5$ is gradually added to the mixture and dissolved by stirring and heating essentially according to Example 27. The amount of P$_2$O$_5$ added is preselected (as determined in accord with the aforementioned formulae a* and b*) to provide the reaction mixture with an effective P$_2$O$_5$ content of approximately 88.2% prior to the start of polymerization and an effective P$_2$O$_5$ content of approximately 82.2% subsequent to substantial complete polymerization. The reaction product obtained exhibits stir-opalescence and is further characterized as having a polymer concentration of 18%; fibers are readily formed by direct spinning, or drawing from the reaction product. The polymer obtained is of the following structure:

characterized by an intrinsic viscosity of 12 dL/g in MSA at 30° C.

The above procedure is followed with the exception that the P$_2$O$_5$ content during the dehydrochlorination begins at 83% and then is incrementally increased to an intermediate P$_2$O$_5$ content of 88.2% prior to polymerization. This dehydrochlorination is conducted in a Pope wiped-film evaporator at 100° C.

When the intermediate P$_2$O$_5$ content is increased such that the final P$_2$O$_5$ content is 83.0% and the reaction mixture is heated for 8 hours at 185° C., an intrinsic viscosity of 10 dL/g in MSA at 30° C. is obtained; heating the reaction mixture for a total of 8 hours at 185° C. gives an intrinsic viscosity of 15 dL/g in MSA at 30° C.; heating the reaction mixture for a total of 16 hours at 185° C. gives an intrinsic viscosity of 19 dL/g in MSA at 30° C. The above procedure is followed with the exception that methanesulfonic acid (MSA) in the amount of 22% of the weight of the solvent is added during the dehydrochlorination step. After the addition of the P$_2$O$_5$ the polymerization mixture is heated at 150° C. for 48 hours to give a opalescent reaction mixture. The polymer isolated by precipitation into water has an intrinsic viscosity of 11.8 dL/g in MSA at 30° C.

Analogous to the foregoing Examples 26–30, other Type II extended chain polymers may be synthesized to yield liquid-crystalline compositions having varying proportions of polymer concentration, P$_2$O$_5$ content and polymer intrinsic viscosity in accordance with the present invention.

The synthesis is illustrated by the reaction systems in Table 19. The e→ denotes especially preferred selected monomer reactions.

TABLE 19

Polymers of Type II, Class 2
Polymerization Reactions:

| Monomer (3,2) | → | Polymer II(2) |
|---|---|---|
| 3f | e→ | ⁅X⁆$_n$ |
| 3g | e→ | ⁅Y⁆$_n$ |
| 3h | e→ | ⁅TI⁆$_n$ |
| 3i | e→ | ⁅UI⁆$_n$ |

EXAMPLE 31

The procedure of Example 8 is essentially repeated. Instead of monomers 1a and 2a, 99.923 g (0.35182 mol) of monomer 1c is dehydrochlorinated in an "initial" solution of 602.0 g of PPA having a P$_2$O$_5$ content of 77.3% (prepared by mixing 177.9 g of 85.4% H$_3$PO$_4$ with 424.1 g of 115% PPA). When dehydrochlorination is substantially complete, 76.740 g (0.35182 mol) of monomer 4a is added followed by the gradual addition of 272.7 g of P$_2$O$_5$. The mixture is then stirred and heated essentially according to Example 8. The amount of P$_2$O$_5$ added is preselected (as determined in accord with the aforementioned formulae a* and b*) to provide the reaction mixture with an effective P$_2$O$_5$ content of approximately 84.4% prior to the start of polymerization and an effective P$_2$O$_5$ content of approximately 82.0% subsequent to substantial complete polymerization. The reaction product obtained exhibits stir-opalescence and is further characterized as having a polymer concentration of 10%; fibers are readily formed by direct spinning, or drawing from the reaction product. The polymer obtained is of the following structure:

⁅ZB'A'B'⁆$_n$ characterized by an intrinsic viscosity of 10 dL/g in MSA at 30° C.

When the intermediate P$_2$O$_5$ content is increased such that the final P$_2$O$_5$ content is 83.0% and the reaction mixture is heated for 5 hours, an intrinsic viscosity of 10 dL/g in MSA at 30° C. is obtained; heating the reaction mixture for a total of 7 hours gives an intrinsic viscosity of 12 dL/g in MSA at 30° C.; heating the reaction mixture for a total of 12 hours gives an intrinsic viscosity of 16 dL/g in MSA at 30° C.

Analogous to the foregoing Example 31, other Type III extended chain polymers may be synthesized to yield liquid-crystalline compositions having varying proportions of polymer concentration, P$_2$O$_5$ content and polymer intrinsic viscosity in accordance with the present invention.

The synthesis is illustrated by the reaction systems in Table 20. The e→ denotes especially preferred selected monomer reactions.

TABLE 20
Polymers of Type III, Class 1
Polymerization Reactions:

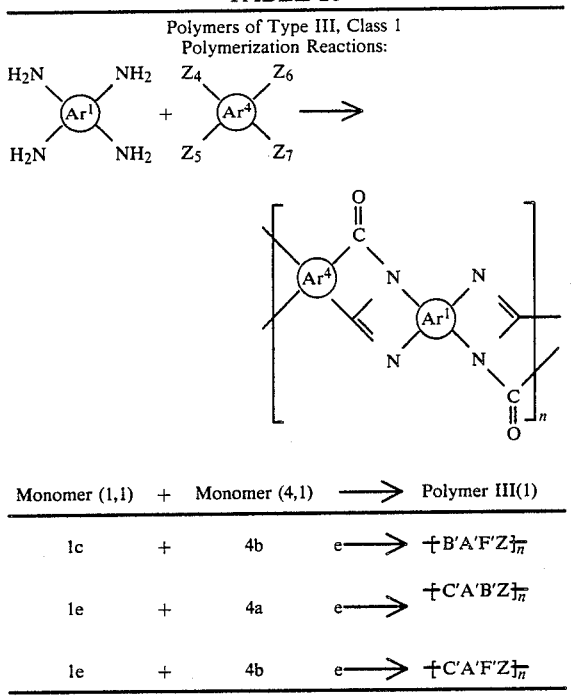

| Monomer (1,1) | + | Monomer (4,1) | → | Polymer III(1) |
|---|---|---|---|---|
| 1c | + | 4b | e→ | $\{B'A'F'Z\}_n$ |
| 1e | + | 4a | e→ | $\{C'A'B'Z\}_n$ |
| 1e | + | 4b | e→ | $\{C'A'F'Z\}_n$ |

EXAMPLE 32

The procedure of Example 8 is essentially repeated. Instead of monomers 1a and 2a, 109.94 g (0.27752 mol) of monomer 11 is dehydrochlorinated in an "initial" solution of 317.2 g of PPA having a $P_2O_5$ content of 77.3% (prepared by mixing 93.7 g of 85.4% $H_3PO_4$ with 223.5 g of 115% PPA). When dehydrochlorination is substantially complete, 60.533 g (0.27752 mol) of monomer 4a is added followed by the gradual addition of 219.5 g of $P_2O_5$. The mixture is then stirred and heated essentially according to Example 8. The amount of $P_2O_5$ added is preselected (as determined in accord with the aforementioned formulae a* and b*) to provide the reaction mixture with an effective $P_2O_5$ content of approximately 86.6% prior to the start of polymerization and an effective $P_2O_5$ content of approximately 82.0% subsequent to substantial complete polymerization. The reaction product obtained exhibits stir-opalescence and is further characterized as having a polymer concentration of 15%; fibers are readily formed by direct spinning, or drawing from the reaction product. The polymer obtained is of the following structure:

characterized by an intrinsic viscosity of 7 dL/g in MSA at 30° C.

The above procedure is followed with the exception that the $P_2O_5$ content during the dehydrochlorination begins at 82% and then is incrementally increased to an intermediate $P_2O_5$ content of 86.6% prior to polymerization.

When the intermediate $P_2O_5$ content is increased such that the final $P_2O_5$ content is 83.0% and the reaction mixture is heated for 5 hours, an intrinsic viscosity of 7 dL/g in MSA at 30° C. is obtained; heating the reaction mixture for a total of 7 hours gives an intrinsic viscosity of 10 dL/g in MSA at 30° C.; heating the reaction mixture for a total of 12 hours gives an intrinsic viscosity of 12 dL/g in MSA at 30° C.

Analogous to the foregoing Example 32, other Type III extended chain polymers may be synthesized to yield liquid-crystalline compositions having varying proportions of polymer concentration, $P_2O_5$ content and polymer intrinsic viscosity in accordance with the present invention.

The synthesis is illustrated by the reactions in Table 21. The e→ denotes especially preferred selected monomer reactions.

TABLE 21
Polymers of Type III, Class 2
Polymerization Reactions:

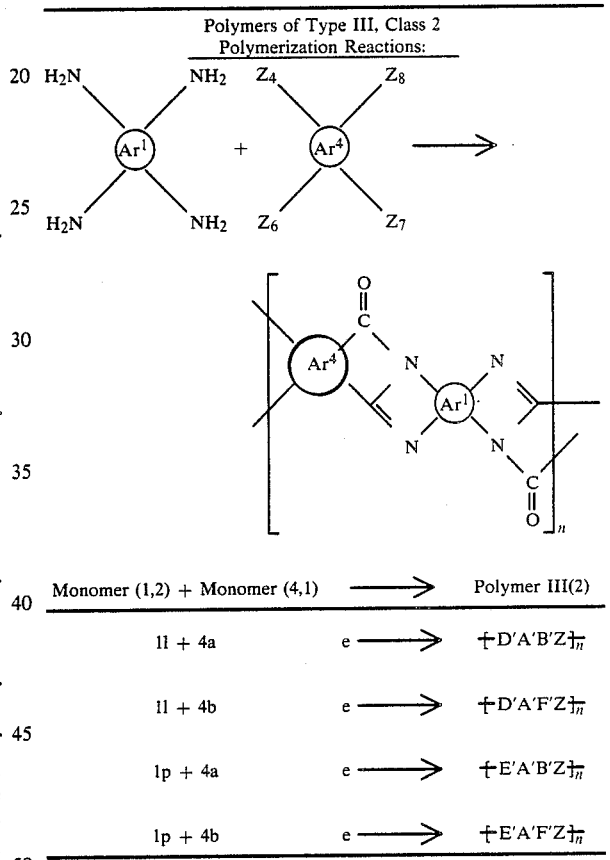

| Monomer (1,2) | + | Monomer (4,1) | → | Polymer III(2) |
|---|---|---|---|---|
| 11 | + | 4a | e→ | $\{D'A'B'Z\}_n$ |
| 11 | + | 4b | e→ | $\{D'A'F'Z\}_n$ |
| 1p | + | 4a | e→ | $\{E'A'B'Z\}_n$ |
| 1p | + | 4b | e→ | $\{E'A'F'Z\}_n$ |

EXAMPLE 33

The procedure of Example 27 is essentially repeated. Instead of monomer 3a, 117.5156 g (0.5149463 mol) of monomer 5a is dissolved in an "initial" solution of 623.7 g of PPA having a $P_2O_5$ content of 77.0% (prepared by mixing 192.8 g of 85.4% $H_3PO_4$ with 430.9 g of 115% PPA). When dissolution is substantially complete, an additional 257.8 g of $P_2O_5$ is gradually added to the mixture and dissolved by stirring and heating essentially according to Example 27. The amount of $P_2O_5$ added is preselected (as determined in accord with the aforementioned formulae a* and b*) to provide the reaction mixture with an effective $P_2O_5$ content of approximately 83.7% prior to the start of polymerization and an effective $P_2O_5$ content of approximately 82.0% subsequent to substantial complete polymerization. The reaction product obtained exhibits stir-opalescence and is further characterized as having a polymer concentration of 10%; fibers are readily formed by direct spinning, or drawing from the reaction product. The polymer obtained is of the following structure:

characterized by an intrinsic viscosity of 10 dL/g in MSA at 30° C. The above procedure is followed with the exception that the P₂O₅ content during the dehydrochlorination begins at 82% and then is incrementally increased to an intermediate P₂O₅ content of 83.7% prior to polymerization.

When the intermediate P₂O₅ content is increased such that the final P₂O₅ content is 83.0% and the reaction mixture is heated for 5 hours at 185° C., an intrinsic viscosity of 6 dL/g in MSA at 30° C. is obtained; heating the reaction mixture for a total of 7 hours at 185° C. gives an intrinsic viscosity of 8 dL/g in MSA at 30° C.; heating the reaction mixture for a total of 12 hours at 185° C. gives an intrinsic viscosity of 12 dL/g in MSA at 30° C.

EXAMPLE 34

The procedure of Example 8 is essentially repeated. Instead of monomers 1a and 2a, 70.784 g (0.28869 mol) of monomer 1a is dehydrochlorinated in an "initial" solution of 242.6 g of PPA having a P₂O₅ content of 77.3% (prepared by mixing 71.7 g of 85.4% H₃PO₄ with 171.0 g of 115% PPA). When dehydrochlorination is substantially complete, 71.070 g (0.28869 mol) of monomer 6a is added followed by the gradual addition of 162.9 g of P₂O₅. The mixture is then stirred and heated according to a schedule similar to Example 8. The amount of P₂O₅ added is preselected (as determined in accord with the aforementioned formulae a* and b*) to provide the reaction mixture with an effective P₂O₅ content of approximately 86.4% prior to the start of polymerization and an effective P₂O₅ content of approximately 82.2% subsequent to substantial complete polymerization. The reaction product obtained exhibits stir-opalescence and is further characterized as having a polymer concentration of 19%; fibers are readily formed by direct spinning, or drawing from the reaction product. The polymer obtained is of the following structure:

characterized by an intrinsic viscosity of 7 dL/g in MSA at 30° C.

The above procedure is followed with the exception that the P₂O₅ content during the dehydrochlorination begins at 80% and then is incrementally increased to an intermediate P₂O₅ content of 86.4% prior to polymerization.

When the intermediate P₂O₅ content is increased such that the final P₂O₅ content is 83.0% and the reaction mixture is heated for 5 hours at 185° C., an intrinsic viscosity of 6 dL/g in MSA at 30° C. is obtained; heating the reaction mixture for a total of 7 hours at 185° C. gives an intrinsic viscosity of 8 dL/g in MSA at 30° C.; heating the reaction mixture for a total of 12 hours at 185° C. gives an intrinsic viscosity of 10 dL/g in MSA at 30° C.

EXAMPLE 35

The procedure of Example 13 is essentially repeated. Instead of monomers 1b and 2a, 67.798 g (0.31820 mol) of monomer 1b is dehydrochlorinated in an "initial" mixture of 343.3 g of PPA having a P₂O₅ content of 77.3% (prepared by mixing 101.4 g of 85.4% H₃PO₄ with 241.9 g of 115% PPA). When dehydrochlorination is substantially complete, 78.336 g (0.31820 mol) of monomer 6a is added followed by the gradual addition of 200.4 g of P₂O₅. The mixture is then stirred and heated according to a schedule similar to Example 13. The amount of P₂O₅ added is preselected (as determined in accord with the aforementioned formulae a* and b*) to provide the reaction mixture with an effective P₂O₅ content of approximately 85.7% prior to the start of polymerization and an effective P₂O₅ content of approximately 82.2% subsequent to substantial complete polymerization. The reaction product obtained exhibits stir-opalescence and is further characterized as having a polymer concentration of 15%; fibers are readily formed by direct spinning, or drawing from the reaction product. The polymer obtained is of the following structure:

characterized by an intrinsic viscosity of 7 dL/g in MSA at 30° C.

The above procedure is followed with the exception that the P₂O₅ content during the dehydrochlorination begins at 83% and then is incrementally increased to an intermediate P₂O₅ content of 85.7% prior to polymerization. This dehydrochlorination is conducted in Pope wiped-film evaporator at 100° C.

When the intermediate P₂O₅ content is increased such that the final P₂O₅ content is 83.0% and the reaction mixture is heated for 5 hours at 185° C., an intrinsic viscosity of 7 dL/g in MSA at 30° C. is obtained; heating the reaction mixture for a total of 7 hours at 185° gives an intrinsic viscosity of 10 dL/g in MSA at 30° C.; heating the reaction mixture for a total of 12 hours at 185° C. gives an intrinsic viscosity of 12 dL/g in MSA at 30° C.

EXAMPLE 36

The procedure of Example 8 is essentially repeated. Instead of monomers 1a and 2a, 90.945 g (0.32021 mol) of monomer 1c is dehydrochlorinated in an "initial" solution of 402.5 g of PPA having a P₂O₅ content of 77.3% (prepared by mixing 192.1 g of 85.4% H₃PO₄ with 210.4 g of 115% PPA). When dehydrochlorination is substantially complete, 78.830 g (0.32021 mol) of monomer 6a is added followed by the gradual addition of 307.8 g of P₂O₅. The mixture is then stirred and heated according to a schedule similar to Example 8. The amount of P₂O₅ added is preselected (as determined in accord with the aforementioned formulae a* and b*) to provide the reaction mixture with an effective P₂O₅ content of approximately 84.9% prior to the start of polymerization and an effective P₂O₅ content of approximately 82.2% subsequent to substantial complete polymerization. The reaction product obtained exhibits stir-opalescence and is further characterized as having a polymer concentration of 12%; fibers are readily formed by direct spinning, or drawing from the reaction product. The polymer obtained is of the following structure:

$\{B'I'\}_n$ characterized by an intrinsic viscosity of 7 dL/g in MSA at 30° C.

The above procedure is followed with the exception that the P$_2$O$_5$ content during the dehydrochlorination begins at 80% and then is incrementally increased to an intermediate P$_2$O$_5$ content of 84.9% prior to polymerization.

When the intermediate P$_2$O$_5$ content is increased such that the final P$_2$O$_5$ content is 83.0% and the reaction mixture is heated for 5 hours, an intrinsic viscosity of 7 dL/g in MSA at 30° C. is obtained; heating the reaction mixture for a total of 7 hours gives an intrinsic viscosity of 10 dL/g in MSA at 30° C.; heating the reaction mixture for a total of 12 hours gives an intrinsic viscosity of 12 dL/g in MSA at 30° C.

Analogous to the foregoing Examples 34–36, other Type V extended chain polymers may be synthesized to yield liquid-crystalline compositions having varying proportions of polymer concentration, P$_2$O$_5$ content and polymer intrinsic viscosity in accordance with the present invention.

The synthesis is illustrated by the reaction systems in Table 23. The e→ denotes especially preferred selected monomer reactions.

TABLE 23

Polymers of Type V, Class 1
Polymerization Reactions:

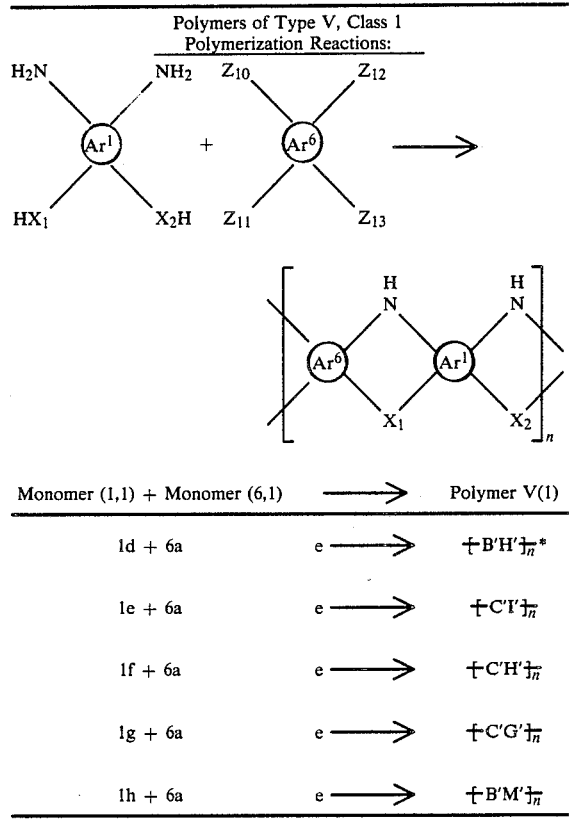

| Monomer (1,1) + Monomer (6,1) | | → | Polymer V(I) |
|---|---|---|---|
| 1d + 6a | e | → | $\{B'H'\}_n$* |
| 1e + 6a | e | → | $\{C'I'\}_n$ |
| 1f + 6a | e | → | $\{C'H'\}_n$ |
| 1g + 6a | e | → | $\{C'G'\}_n$ |
| 1h + 6a | e | → | $\{B'M'\}_n$ |

*Note: Oxygens always para on B'

EXAMPLE 37

The procedure of Example 8 is essentially repeated. Instead of monomers 1a and 2a, 58.035 g (0.23669 mol) of monomer 1a is dehydrochlorinated in an "initial" solution of 307.7 g of PPA having a P$_2$O$_5$ content of 77.3% (prepared by mixing 90.9 g of 85.4% H$_3$PO$_4$ with 216.8 g of 115% PPA). When dehydrochlorination is substantially complete, 76.281 g (0.23669 mol) of monomer 6b is added followed by the gradual addition of 163.5 g of P$_2$O$_5$. The mixture is then stirred and heated according to a schedule similar to Example 8. The amount of P$_2$O$_5$ added is preselected (as determined in accord with the aforementioned formulae a* and b*) to provide the reaction mixture with an effective P$_2$O$_5$ content of approximately 85.2% prior to the start of polymerization and an effective P$_2$O$_5$ content of approximately 82.2% subsequent to substantial complete polymerization. The reaction product obtained exhibits stir-opalescence and is further characterized as having a polymer concentration of 17%; fibers are readily formed by direct spinning, or drawing from the reaction product. The polymer obtained is of the following structure:

$\{B'J'\}_n$ characterized by an intrinsic viscosity of 7 dL/g in MSA at 30° C.

The above procedure is followed with the exception that the P$_2$O$_5$ content during the dehydrochlorination begins at 82% and then is incrementally increased to an intermediate P$_2$O$_5$ content of 85.2% prior to polymerization.

When the intermediate P$_2$O$_5$ content is increased such that the final P$_2$O$_5$ content is 83.0% and the reaction mixture is heated for 5 hours at 185° C., an intrinsic viscosity of 4 dL/g in MSA at 30° C. is obtained; heating the reaction mixture for a total of 7 hours at 185° C. gives an intrinsic viscosity of 7 dL/g in MSA at 30° C.; heating the reaction mixture for a total of 12 hours at 185° C. gives an intrinsic viscosity of 10 dL/g in MSA at 30° C.

EXAMPLE 38

The procedure of Example 13 is essentially repeated. Instead of monomers 1b and 2a, 54.581 g (0.25617 mol) of monomer 1b is dehydrochlorinated in an "initial" solution of 330.4 g of PPA having a P$_2$O$_5$ content of 77.3% (prepared by mixing 97.6 g of 85.4% H$_3$PO$_4$ with 232.7 g of 115% PPA). When dehydrochlorination is substantially complete, 82.559 g (0.25617 mol) of monomer 6b is added followed by the gradual addition of 176.2 g of P$_2$O$_5$. The mixture is then stirred and heated according to a schedule similar to Example 13. The amount of P$_2$O$_5$ added is preselected (as determined in accord with the aforementioned formulae a* and b*) to provide the reaction mixture with an effective P$_2$O$_5$ content of approximately 85.2% prior to the start of polymerization and an effective P$_2$O$_5$ content of approximately 82.2% subsequent to substantial complete polymerization. The reaction product obtained exhibits stir-opalescence and is further characterized as having a polymer concentration of 16%; fibers are readily formed by direct spinning, or drawing from the reaction product. The polymer obtained is of the following structure:

$\{B'K'\}_n$ characterized by an intrinsic viscosity of 7 dL/g in MSA at 30° C.

The above procedure is followed with the exception that the P$_2$O$_5$ content during the dehydrochlorination begins at 80% and then is incrementally increased to an intermediate P$_2$O$_5$ content of 85.2% prior to polymerization.

When the intermediate P$_2$O$_5$ content is increased such that the final P$_2$O$_5$ content is 83.0% and the reaction mixture is heated for 5 hours at 185° C., an intrinsic viscosity of 4 dL/g in MSA at 30° C. is obtained; heating the reaction mixture for a total of 7 hours at 185° C., gives an intrinsic viscosity of 7 dL/g in MSA at 30° C.; heating the reaction mixture for a total of 12 hours at 185° C. gives an intrinsic viscosity of 10 dL/g in MSA at 30° C.

EXAMPLE 39

The procedure of Example 8 is essentially repeated. Instead of monomers 1a and 2a, 73.126 g (0.25747 mol) of monomer 1c is dehydrochlorinated in an "initial" solution of 362.6 g of PPA having a P$_2$O$_5$ content of 77.3% (prepared by mixing 107.1 g of 84.4% H$_3$PO$_4$ with 255.5 g of 115% PPA). When dehydrochlorination is substantially complete, 82.978 g (0.25747 mol) of monomer 6b is added followed by the gradual addition of 185.5 g of P$_2$O$_5$. The mixture is then stirred and heated according to a schedule similar to Example 8. The amount of P$_2$O$_5$ added is preselected (as determined in accord with the aforementioned formulae a* and b*) to provide the reaction mixture with an effective P$_2$O$_5$ content of approximately 85.0% prior to the start of polymerization and an effective P$_2$O$_5$ content of approximately 82.2% subsequent to substantial complete polymerization. The reaction product obtained exhibits stir-opalescence and is further characterized as having a polymer concentration of 15%; fibers are readily formed by direct spinning, or drawing from the reaction product. The polymer obtained is of the following structure:

characterized by an intrinsic viscosity of 6 dL/g in MSA at 30° C.

The above procedure is followed with the exception that the P$_2$O$_3$ content during the dehydrochlorination begins at 83% and then is incrementally increased to an intermediate P$_2$O$_5$ content of 85.0% prior to polymerization. This dehydrochlorination is conducted in a Pope wiped-film evaporator at 100° C.

When the intermediate P$_2$O$_5$ content is increased such that the final P$_2$O$_5$ content is 83.0% and the reaction mixture is heated for 5 hours at 185° C., an intrinsic viscosity of 4 dL/g in MSA at 30° C. is obtained; heating the reaction mixture for a total of 7 hours at 185° C. gives an intrinsic viscosity of 6 dL/g in MSA at 30° C.; heating the reaction mixture for a total of 12 hours at 185° C. gives an intrinsic viscosity of 8 dL/g in MSA at 30° C.

Analogous to the foregoing Examples 37-39, other Type V extended chain polymers may be synthesized to yield liquid-crystalline compositions having varying proportions of polymer concentration, P$_2$O$_5$ content and polymer intrinsic viscosity in accordance with the present invention.

The synthesis is illustrated by the reaction systems in Table 24a. The e→ denotes especially preferred selected monomer reactions.

TABLE 24a

Polymers of Type V, Class 2
Polymerization Reactions:

| Monomer (1,1) + Monomer (6,2) | → | Polymer V(2) |
|---|---|---|
| 1d + 6b | e → | ${+B'K'+}_n$ * |
| 1e + 6b | e → | ${+C'L'+}_n$ |
| 1f + 6b | e → | ${+C'K'+}_n$ |
| 1g + 6b | e → | ${+C'J'+}_n$ |
| 1h + 6b | e → | ${+B'N'+}_n$ |

*Note: Oxygens always para on B'

EXAMPLE 40

The procedure of Example 8 is essentially repeated. Instead of monomers 1a and 2a, 76.047 g (0.23369 mol) of monomer 1i is dehydrochlorinated in an "initial" solution of 369.2 g of PPA having a P$_2$O$_5$ content of 77.3% (prepared by mixing 109.1 g of 85.4% H$_3$PO$_4$ with 260.1 g of 115% PPA). When dehydrochlorination is substantially complete, 58.269 g (0.23369 mol) of monomer 6a is added followed by the gradual addition of 180.4 g of P$_2$O$_5$. The mixture is then stirred and heated according to a schedule similar to Example 8. The amount of P$_2$O$_5$ added is preselected (as determined in accord with the aforementioned formulae a* and b*) to provide the reaction mixture with an effective P$_2$O$_5$ content of approximately 84.8% prior to the start of polymerization and an effective P$_2$O$_5$ content of approximately 82.2% subsequent to substantial complete polymerization. The reaction product obtained exhibits stir-opalescence and is further characterized as having a polymer concentration of 15%; fibers are readily formed by direct spinning, or drawing from the reaction product. The polymer obtained is of the following structure:

${+D'G'+}_n$ characterized by an intrinsic viscosity of 10 dL/g in MSA at 30° C.

The above procedure is followed with the exception that the P$_2$O$_5$ content during the dehydrochlorination begins at 82% and then is incrementally increased to an intermediate P$_2$O$_5$ content of 84.8% prior to polymerization.

When the intermediate P$_2$O$_5$ content is increased such that the final P$_2$O$_5$ content is 83.0% and the reaction mixture is heated for 5 hours at 185° C., an intrinsic viscosity of 7 dL/g in MSA at 30° C. is obtained; heating the reaction mixture for a total of 7 hours at 185° C. gives an intrinsic viscosity of 11 dL/g in MSA at 30° C.; heating the reaction mixture for a total of 12 hours at 185° C. gives an intrinsic viscosity of 14 dL/g in MSA at 30° C.

EXAMPLE 41

The procedure of Example 8 is essentially repeated. Instead of monomers 1a and 2a, 74.075 g (0.25617 mol) of monomer 1j is dehydrochlorinated in an "initial" solution of 493.7 g of PPA having a P$_2$O$_5$ content of 77.3% (prepared by mixing 145.9 g of 85.4% H$_3$PO$_4$ with 347.8 g of 115% PPA). When dehydrochlorination is substantially complete, 63.065 g (0.25617 mol) of monomer 6a is added followed by the gradual addition of 221.2 g of P$_2$O$_5$. The mixture is then stirred and heated according to a schedule similar to Example 8. The amount of P$_2$O$_5$ added is preselected (as determined in accord with the aforementioned formulae a* and b*) to provide the reaction mixture with an effective P$_2$O$_5$ content of approximately 84.3% prior to the start of polymerization and an effective P$_2$O$_5$ content of approximately 82.2% subsequent to substantial complete polymerization. The reaction product obtained exhibits stir-opalescence and is further characterized as having a polymer concentration of 12%; fibers are readily formed by direct spinning, or drawing from the reaction product. The polymer obtained is of the following structure:

characterized by an intrinsic viscosity of 6 dL/g in MSA at 30° C.

The above procedure is followed with the exception that the P$_2$O$_5$ content during the dehydrochlorination begins at 80% and then is incrementally increased to an intermediate P$_2$O$_5$ content of 84.3% prior to polymerization.

When the intermediate P$_2$O$_5$ content is increased such that the final P$_2$O$_5$ content is 83.0% and the reaction mixture is heated for 5 hours at 185° C., an intrinsic viscosity of 4 dL/g in MSA at 30° C. is obtained; heating the reaction mixture for a total of 7 hours at 185° C. gives an intrinsic viscosity of 6 dL/g in MSA at 30° C.; heating the reaction mixture for a total of 12 hours at 185° C. gives an intrinsic viscosity of 8 dL/g in MSA at 30° C.

EXAMPLE 42

The procedure of Example 8 is essentially repeated. Instead of monomers 1a and 2a, 74.075 g (0.25617 mol) of monomer 1k is dehydrochlorinated in an "initial" solution of 493.7 g of PPA having a P$_2$O$_5$ content of 77.3 % (prepared by mixing 145.9 g of 85.4% H$_3$PO$_4$ with 347.8 g of 115% PPA). When dehydrochlorination is substantially complete, 63.065 g (0.25617 mol) of monomer 6a is added followed by the gradual addition of 221.2 g of P$_2$O$_5$. The mixture is then stirred and heated according to a schedule similar to Example 8. The amount of P$_2$O$_5$ added is preselected (as determined in accord with the aforementioned formulae a* and b*) to provide the reaction mixture with an effective P$_2$O$_5$ content of approximately 84.3% prior to the start of polymerization and an effective P$_2$O$_5$ content of approximately 82.2% subsequent to substantial complete polymerization. The reaction product obtained exhibits stir-opalescence and is further characterized as having a polymer concentration of 12%; fibers are readily formed by direct spinning, or drawing from the reaction product. The polymer obtained is of the following structure:

characterized by an intrinsic viscosity of 6 dL/g in MSA at 30° C.

The above procedure is followed with the exception that the P$_2$O$_5$ content during the dehydrochlorination begins at 83% and then is incrementally increased to an intermediate P$_2$O$_5$ content of 84.3% prior to polymerization. This dehydrochlorination is conducted in a Pope wiped-film evaporator at 100° C.

When the intermediate P$_2$O$_5$ content is increased such that the final P$_2$O$_5$ content is 83.0% and the reaction mixture is heated for 5 hours at 185° C., an intrinsic viscosity of 4 dL/g in MSA at 30° C. is obtained; heating the reaction mixture for a total of 7 hours at 185° C. gives an intrinsic viscosity of 6 dL/g in MSA at 30° C.; heating the reaction mixture for a total of 12 hours at 185° C. gives an intrinsic viscosity of 8 dL/g in MSA at 30° C.

EXAMPLE 43

The procedure of Example 8 is essentially repeated. Instead of monomers 1a and 2a, 101.996 g (0.25747 mol) of monomer 1l is dehydrochlorinated in an "initial" solution of 493.3 g of PPA having a P$_2$O$_5$ content of 77.3% (prepared by mixing 145.7 g of 85.4% H$_3$PO$_4$ with 347.6 g of 115% PPA). When dehydrochlorination is substantially complete, 63.385 g (0.25747 mol) of monomer 6a is added followed by the gradual addition of 221.5 g of P$_2$O$_5$. The mixture is then stirred and heated according to a schedule similar to Example 8. The amount of P$_2$O$_5$ added is preselected (as determined in accord with the aforementioned formulae a* and b*) to provide the reaction mixture with an effective P$_2$O$_5$ content of approximately 84.3% prior to the start of polymerization and an effective P$_2$O$_5$ content of approximately 82.2% subsequent to substantial complete polymerization. The reaction product obtained exhibits stir-opalescence and is further characterized as having a polymer concentration of 12%; fibers are readily formed by direct spinning, or drawing from the reaction product. The polymer obtained is of the following structure:

characterized by an intrinsic viscosity of 7 dL/g in MSA at 30° C.

The above procedure is followed with the exception that the P$_2$O$_5$ content during the dehydrochlorination begins at 82% and then is incrementally increased to an intermediate P$_2$O$_5$ content of 84.3% prior to polymerization.

When the intermediate P$_2$O$_5$ content is increased such that the final P$_2$O$_5$ content is 83.0% and the reaction mixture is heated for 5 hours at 185° C., an intrinsic viscosity of 5 dL/g in MSA at 30° C. is obtained; heating the reaction mixture for a total of 7 hours at 185° C. gives an intrinsic viscosity of 7 dL/g in MSA at 30° C.; heating the reaction mixture for a total of 12 hours at 185° C. gives an intrinsic viscosity of 9 dL/g in MSA at 30° C.

Analogous to the foregoing Examples 40–43, other Type V extended chain polymers may be synthesized to yield liquid-crystalline compositions having varying proportions of polymer concentration, $P_2O_5$ content and polymer intrinsic viscosity in accordance with the present invention.

The synthesis is illustrated by the reaction systems in Tables 24b and 24c. The e→ and p→ denote especially preferred and preferred selected monomer reactions respectively.

TABLE 24b

Polymers of Type V, Class 2
Polymerization Reactions:

$$\begin{array}{c} H_2N \diagdown \quad \diagup NH_2 \quad Z_{10} \diagdown \quad \diagup Z_{12} \\ (Ar^1) \quad + \quad (Ar^6) \quad \longrightarrow \\ HX_1 \diagup \quad \diagdown X_2H \quad Z_{11} \diagup \quad \diagdown Z_{13} \end{array}$$

$$\left[ \begin{array}{c} H \quad H \\ N \quad N \\ (Ar^6)(Ar^1) \\ X_1 \quad X_2 \end{array} \right]_n$$

| Monomer (1,2) + Monomer (6,1) | | Polymer V(2) |
|---|---|---|
| 1m + 6a | e ⟶ | ⟊D′M′⟋ₙ |
| 1n + 6a | e ⟶ | ⟊E′G′⟋ₙ |
| 1o + 6a | e ⟶ | ⟊E′H′⟋ₙ |
| 1p + 6a | e ⟶ | ⟊E′I′⟋ₙ |

TABLE 24c

| Monomer (1,2) + Monomer (6,2) | | Polymer V(2) |
|---|---|---|
| 1i + 6b | p ⟶ | ⟊D′J′⟋ₙ |
| 1j + 6b | p ⟶ | ⟊D′K′⟋ₙ* |
| 1k + 6b | p ⟶ | ⟊D′K′⟋ₙ** |
| 1l + 6b | p ⟶ | ⟊D′L′⟋ₙ |
| 1m + 6b | p ⟶ | ⟊D′N′⟋ₙ |
| 1n + 6b | p ⟶ | ⟊E′J′⟋ₙ |
| 1o + 6b | p ⟶ | ⟊E′K′⟋ₙ |

TABLE 24c-continued

| Monomer (1,2) + Monomer (6,2) | | Polymer V(2) |
|---|---|---|
| 1p + 6b | p ⟶ | ⟊E′L′⟋ₙ |

*Note: Oxygen always in 3,3′-positions on D′
**Note: Oxygens always in 4,4′-positions on D′

EXAMPLE 44

The procedure of Example 27 is essentially repeated. Instead of monomer 3a, 123.074 g (0.64042 mol) of monomer 9a is dissolved in an "initial" solution of 423.1 g of PPA having a $P_2O_5$ content of 77.3% (prepared by mixing 125.0 g of 85.4% $H_3PO_4$ with 298.1 g of 115% PPA). When dissolution is substantially complete, an additional 223.0 g of $P_2O_5$ is gradually added to the mixture and dissolved by stirring and heating essentially according to Example 27. The amount of $P_2O_5$ added is preselected (as determined in accord with the aforementioned formulae a* and b*) to provide the reaction mixture with an effective $P_2O_5$ content of approximately 85.1% prior to the start of polymerization and an effective $P_2O_5$ content of approximately 82.2% subsequent to substantial complete polymerization. The reaction product obtained exhibits stir-opalescence and is further characterized as having a polymer concentration of 13%; fibers are readily formed by direct spinning, or drawing from the reaction product. The polymer obtained is of the following structure:

characterized by an intrinsic viscosity of 10 dL/g in MSA at 30° C.

The above procedure is followed with the exception that the $P_2O_5$ content during the dehydrochlorination begins at 80% and then is incrementally increased to an intermediate $P_2O_5$ content of 85.1% prior to polymerization.

When the intermediate $P_2O_5$ content is increased such that the final $P_2O_5$ content is 83.0% and the reaction mixture is heated for 5 hours at 185° C., an intrinsic viscosity of 8 dL/g in MSA at 30° C. is obtained; heating the reaction mixture for a total of 7 hours at 185° C. gives an intrinsic viscosity of 12 dL/g in MSA at 30° C.; heating the reaction mixture for a total of 12 hours at 185° C. gives an intrinsic viscosity of 14 dL/g in MSA at 30° C.

EXAMPLE 45

The procedure of Example 8 is essentially repeated. Instead of monomers 1a and 2a, 86.502 g (0.30457 mol) of monomer 1c is dehydrochlorinated in an "initial" solution of 478.4 g of PPA having a $P_2O_5$ content of 77.3% (prepared by mixing 141.3 g of 85.4% $H_3PO_4$ with 337.0 g of 115% PPA). When dehydrochlorination is substantially complete, 79.864 g (0.30457 mol) of monomer 7a is added followed by the gradual addition of 233.0 g of $P_2O_5$. The mixture is then stirred and heated according to a schedule similar to Example 8. The amount of $P_2O_5$ added is preselected (as determined in accord with the aforementioned formulae a* and b*) to provide the reaction mixture with an effective $P_2O_5$ content of approximately 84.7% prior to the start of polymerization and an effective $P_2O_5$ content of approximately 82.2% subsequent to substantial complete polymerization. The reaction product obtained exhibits stir-opalescence and is further characterized as having a polymer concentration of 12%; fibers are readily formed by direct spinning, or drawing from the reaction product. The polymer obtained is of the following structure:

characterized by an intrinsic viscosity of 10 dL/g in MSA at 30° C.

The above procedure is followed with the exception that the P$_2$O$_5$ content during the dehydrochlorination begins at 83% and then is incrementally increased to an intermediate P$_2$O$_5$ content of 84.7% prior to polymerization. This dehydrochlorination is conducted in a Pope wiped-film evaporator at 100° C.

When the intermediate P$_2$O$_5$ content is increased such that the final P$_2$O$_5$ content is 83.0% and the reaction mixture is heated for 5 hours at 185° C., an intrinsic viscosity of 8 dL/g in MSA at 30° C. is obtained; heating the reaction mixture for a total of 7 hours at 185° C. gives an intrinsic viscosity of 12 dL/g in MSA at 30° C.; heating the reaction mixture for a total of 12 hours at 185° C. gives an intrinsic viscosity of 14 dL/g in MSA at 30° C.

Analogous to the foregoing Example 45, other Type VII extended chain polymers may be synthesized to yield liquid-crystalline compositions having varying proportions of polymer concentration. P$_2$O$_5$ content and polymer intrinsic viscosity in accordance with the present invention.

The synthesis is illustrated by the reaction systems in Tables 26 and 27. The e→ denotes especially preferred selected monomer reactions.

TABLE 26

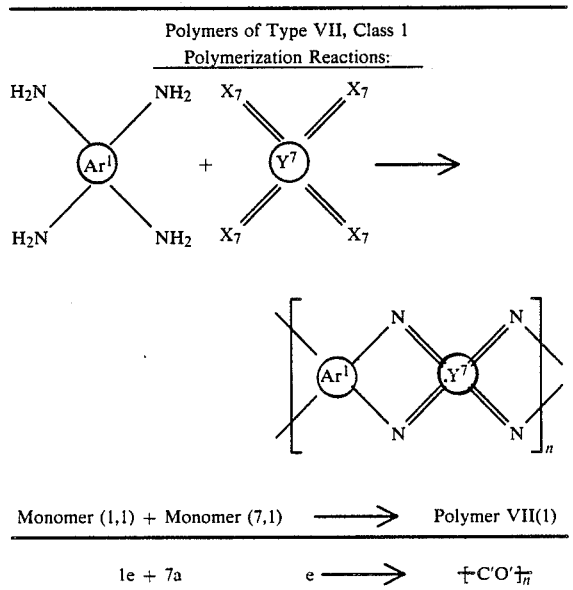

TABLE 27

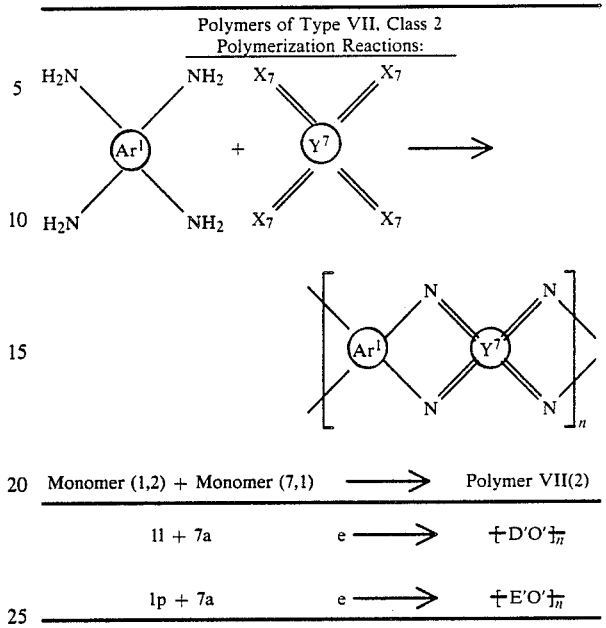

EXAMPLE 46

The procedure of Example 8 is essentially repeated. Instead of monomers 1a and 2a, 102.35 g (0.48036 mol) of monomer 1b is dehydrochlorinated in an "initial" solution of 329.2 g of PPA having a P$_2$O$_5$ content of 77.3% (prepared by mixing 97.3 g of 85.4% H$_3$PO$_4$ with 231.9 g of 115% PPA). When dehydrochlorination is substantially complete, 67.296 g (0.48036 mol) of monomer 8a is added followed by the gradual addition of 250.5 g of P$_2$O$_5$. The mixture is then stirred and heated according to a schedule similar to Example 8. The amount of P$_2$O$_5$ added is preselected (as determined in accord with the aforementioned formulae a* and b*) to provide the reaction mixture with an effective P$_2$O$_5$ content of approximately 87.1% prior to the start of polymerization and an effective P$_2$O$_5$ content of approximately 82.2% subsequent to substantial complete polymerization. The reaction product obtained exhibits stir-opalescence and is further characterized as having a polymer concentration of 14%; fibers are readily formed by direct spinning, or drawing from the reaction product. The polymer obtained is of the following structure:

characterized by an intrinsic viscosity of 7 dL/g in MSA at 30° C.

The above procedure is followed with the exception that the P$_2$O$_5$ content during the dehydrochlorination begins at 82% and then is incrementally increased to an intermediate P$_2$O$_5$ of 87.1% prior to polymerization.

When the intermediate P$_2$O$_5$ content is increased such that the final P$_2$O$_5$ content is 83.0% and the reaction mixture is heated for 5 hours at 185° C. an intrinsic viscosity of 5 dL/g in MSA at 30° C. is obtained; heating the reaction mixture for a total of 7 hours at 185° C. gives an intrinsic viscosity of 7 dL/g in MSA at 30° C. heating the reaction mixture for a total of 12 hours at 185° C. gives an intrinsic viscosity of 9 dL/g in MSA at 30° C.

EXAMPLE 47

The procedure of Example 8 is essentially repeated. Instead of monomers 1a and 2a, 137.73 g (0.48494 mol) of monomer 1c is dehydrochlorinated in an "initial" solution of 370.8 g of PPA having a $P_2O_5$ content of 77.3% (prepared by mixing 109.6 g of 85.4% $H_3PO_4$ with 261.3 g of 115% PPA). When dehydrochlorination is substantially complete, 67.939 g (0.48494 mol) of monomer 8a is added followed by the gradual addition of 263.5 g of $P_2O_5$. The mixture is then stirred and heated according to a schedule similar to Example 8. The amount of $P_2O_5$ added is preselected (as determined in accord with the aforementioned formulae a* and b*) to provide the reaction mixture with an effective $P_2O_5$ content of approximately 86.7% prior to the start of polymerization and an effective $P_2O_5$ content of approximately 82.2% subsequent to substantial complete polymerization. The reaction product obtained exhibits stir-opalescence and is further characterized as having a polymer concentration of 13%; fibers are readily formed by direct spinning, or drawing from the reaction product. The polymer obtained is of the following structure:

characterized by an intrinsic viscosity of 7 dL/g in MSA at 30° C.

The above procedure is followed with the exception that the $P_2O_5$ content during the dehydrochlorination begins at 80% and then is incrementally increased to an intermediate $P_2O_5$ content of 86.7% prior to polymerization.

When the intermediate $P_2O_5$ content is increased such that the final $P_2O_5$ content is 83.0% and the reaction mixture is heated for 5 hours at 185° C. an intrinsic viscosity of 5 dL/g in MSA at 30° C. is obtained; heating the reaction mixture for a total of 7 hours at 185° C. gives an intrinsic viscosity of 7 dL/g in MSA at 30° C. heating the reaction mixture for a total of 12 hours at 185° C. gives an intrinsic viscosity of 9 dL/g in MSA at 30° C.

Analogous to the foregoing Examples 46 and 47, other Type VIII extended chain polymers may be synthesized to yield liquid-crystalline compositions having varying proportions of polymer concentration, $P_2O_5$ content and polymer intrinsic viscosity in accordance with the present invention.

The synthesis is illustrated by the reaction systems in Table 28. The e→ and p→ denote especially preferred and preferred selected monomer reactions respectively.

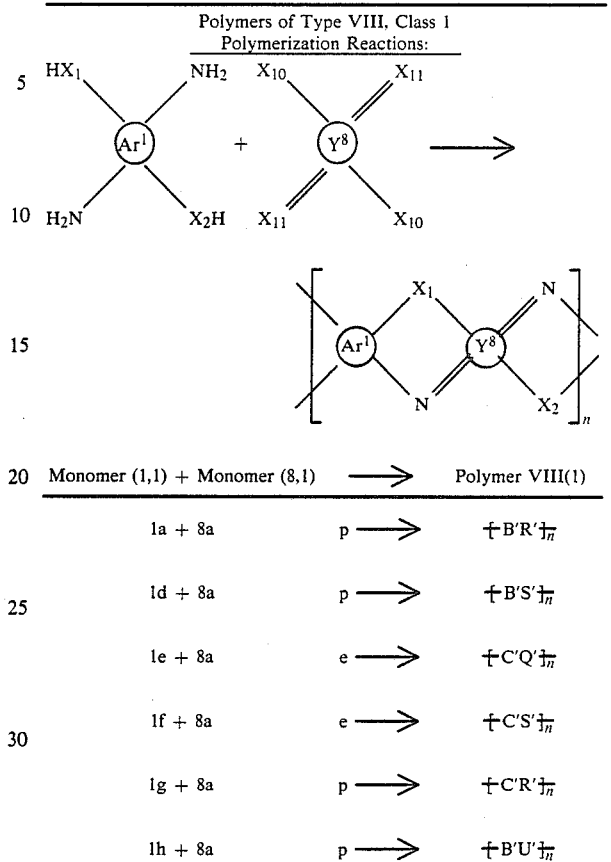

TABLE 28

Polymers of Type VIII, Class 1
Polymerization Reactions:

| Monomer (1,1) + Monomer (8,1) | → | Polymer VIII(1) |
|---|---|---|
| 1a + 8a | p → | ${+B'R'+}_n$ |
| 1d + 8a | p → | ${+B'S'+}_n$ |
| 1e + 8a | e → | ${+C'Q'+}_n$ |
| 1f + 8a | e → | ${+C'S'+}_n$ |
| 1g + 8a | p → | ${+C'R'+}_n$ |
| 1h + 8a | p → | ${+B'U'+}_n$ |

EXAMPLE 48

The procedure of Example 8 is essentially repeated. Instead of monomers 1a and 2a, 140.33 (0.35423 mol) of monomer 11 is dehydrochlorinated in an "initial" solution of 313.01 g of PPA having a $P_2O_5$ content of 77.3% (prepared by mixing 92.5 g of 85.4% $H_3PO_4$ with 220.5 g of 115% PPA). When dehydrochlorination is substantially complete, 49.627 g (0.35423 mol) of monomer 8a is added followed by the gradual addition of 263.0 of $P_2O_5$. The mixture is then stirred and heated according to a schedule similar to Example 8. The amount of $P_2O_5$ added is preselected (as determined in accord with the aforementioned formulae a* and b*) to provide the reaction mixture with an effective $P_2O_5$ content of approximately 85.8% prior to the start of polymerization and an effective $P_2O_5$ content of approximately 82.2% subsequent to substantial complete polymerization. The reaction product obtained exhibits stir-opalescence and is further characterized as having a polymer concentration of 14%; fibers are readily formed by direct spinning, or drawing from the reaction product. The polymer obtained is of the following structure:

characterized by an intrinsic viscosity of 6 dL/g in MSA at 30° C.

The above procedure is followed with the exception that the $P_2O_5$ content during the dehydrochlorination begins at 83% and then is incrementally increased to an intermediate $P_2O_5$ content of 85.8% prior to polymerization. This dehydrochlorination is conducted in a Pope wiped-film evaporator at 100° C.

When the intermediate P₂O₅ content is increased such that the final P₂O₅ content is 83.0% and the reaction mixture is heated for 5 hours at 185° C., an intrinsic viscosity of 4 dL/g in MSA at 30° C. is obtained; heating the reaction mixture for a total of 7 hours at 185° C. gives an intrinsic viscosity of 7 dL/g in MSA at 30° C., heating the reaction mixture for a total of 12 hours at 185° C. gives an intrinsic viscosity of 9 dL/g in MSA at 30° C.

EXAMPLE 49

A mixture of 123.38 g of 115% PPA and 52.63 g of concentrated orthophosphoric acid (85.7% H₃PO₄) is stirred at 100° C. for 2 h under reduced pressure. After allowing the solution to cool to 50° C. under a flow of argon, a portion (168.18 g) of the PPA (77.3% P₂O₅) is added under a flow of argon to a resin kettle containing 57.61082 g (0.23496 mol, $a_1$=0.95) of 1a that had been prepared as described in Example 8 and 2.6358 g (0.012371 mol, $a_2$=0.05) of 1b that has been prepared by the method of Wolfe and Arnold, *Macromolecules*, Vol. 14, 909 (1981) and recrystallized from hydrochloric acid containing 3 wt% of stannous chloride. The mixture is then stirred at 50° C. for 33 h under reduced pressure and 90° C. for 4 h under reduced pressure. Monomer 2a (41.0899 g, 0.24733 mol=m, $b_1$=1) is then added. The mixture is cooled to approximately 40° C. and 139.18 g of P₂O₅ was added to increase the effective P₂O₅ content before polymerization to 87.6%. The mixture is then stirred at the specified temperatures for the specified times under a flow of argon: 100° C. for 24 h; 150° C. for 1 h; 160° C. for 1 h; 170° C. for 5.5 h; and 200° C. for 64 h. The final concentration of the resulting random copolymer is 16.8% in a PPA with an approximate P₂O₅ content of 82.5%. Fibers of the copolymer are isolated by drawing the resulting green, opalescent product and precipitating into water. The intrinsic viscosity of the copolymer isolated after heating at 200° C. for 1.5 h is shown to be 25.4 dL/g and actually decreases to 24.4 dL/g after completing the above heating schedule. The copolymer obtained apparently is of the following structure:

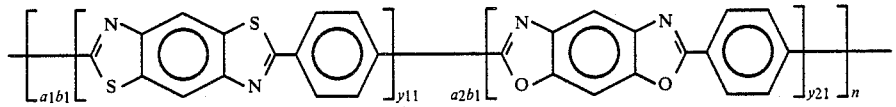

where the mole fraction of AI units ($a_1b_1$) is believed to be 0.95, the mole fraction of BI units ($a_2b_1$) is believed to be 0.05, the average block lengths $y_{11}$ and $y_{21}$ are believed to be 20 and 1, respectively, and the average total number of recurring units of both types (n) is believed to be approximately 100.

EXAMPLE 50

To a deaerated mixture of 16.09147 g (0.0656275 mol, $a_1$=0.75) of 1a and 4.66149 g (0.0218778 mol, $a_2$=0.25) of 1b was added 220 g of freshly prepared and deaerated PPA (The PPA was prepared from 173.81 g of 86.8% orthophosphoric acid and 267.64 g of phosphorus pentoxide, equilibrated, and deaerated). The mixture was stirred under an argon flow at: room temperature overnight; 50° C. for 3.5 h; and 72° C. for 21 h. The mixture was stirred under reduced pressure at 72° C. overnight to substantially complete dehydrochlorination. Terephthalic acid (2a) (14.53762 g, 0.0875059 mol) was added to the solution and the mixture was deaerated before stirring was initiated. The PPA prepared above was then added to this mixture to give a total of 394.5 g of PPA. The slurry was then stirred under reduced pressure for 0.5 h at 110° C. and under an argon atmosphere at: 120° C. for 1 h; 130° C. for 0.5 h; 140° C. for 0.5 h; 150° C. for 0.5 h; 160° C. for 1.0 h; 170° C. for 15.5 h; 185° C. for 6.5 h; and 200° C. for 19 h. The optically anisotropic product contained 5.3 wt% polymer in PPA (84.0% P₂O₅ content). Precipitation of a small amount of the polymeric product provided the random copolymer, believed to have the structure:

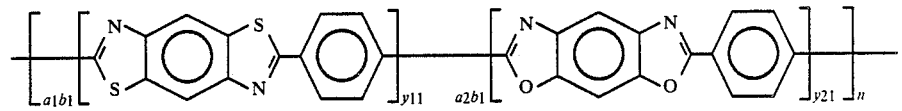

where $a_1b_1$=0.75, $y_{11}$=4, $a_2b_1$=0.25, and $y_{21}$=1.33, with an intrinsic viscosity of 26.59 dL/g in MSA at 30° C., which corresponds to an n value of approximately 110.

The above procedure is followed with the exception that the P₂O₅ content during the dehydrochlorination begins at 82% and then is incrementally increased to an intermediate P₂O₅ content of 84.9% prior to polymerization.

When the intermediate P₂O₅ content is decreased such that the final P₂O₅ content is 83.0% and the reaction mixture is heated for 5 hours at 185° C., an intrinsic viscosity of 10 dL/g in MSA at 30° C. is obtained; heating the reaction mixture for a total of 19 hours at 185° C. gives an intrinsic viscosity of 19 dL/g in MSA at 30° C.; heating the reaction mixture for a total of 32 hours at 185° C. gives an intrinsic viscosity of 31 dL/g in MSA at 30° C.

EXAMPLE 51

To a deaerated mixture of 22.36319 g (0.0912061 mol, $a_1$=0.9) of 1a and 2.15918 g (0.0101340 mol, $a_2$=0.10) of 1b is added approximately 230 g of freshly prepared deaerated PPA. (The PPA is prepared by stirring a mixture of 135.97 g of 85.4% orthophosphoric acid and 207.36 g of phosphorus pentoxide at 150° C. overnight under an argon atmosphere, followed by deaeration by stirring under reduced pressure at 150° C. for 5.5 h. The solution is allowed to cool to room temperature under argon before use). The mixture is stirred under an argon flow at: room temperature overnight; 50° C. for 3 h; and at 70° C. overnight. The solution is then stirred under reduced pressure for 2.5 h at 70° C. Terephthalic acid (2a) (16.83595 g, 0.101340 mol); is added to the solution and, after placing the kettle under reduced pressure, stirring is initiated. The remaining above-mentioned PPA is then added to the mixture (total PPA added=317.6 g) under an argon atmosphere. The polymerization mixture is then stirred under an argon atmosphere at 110° C. for 30 min; 120° C. for 30 min; 130° C. for 30 min; 140° C. for 30 min; 150° C. for 30 min; 160° C. for 30 min; and 170° C. for 14.5 h. The polymerization mixture is heated under an argon atmosphere without stirring at 185° C. for 5 h and at 193°–200° C. for 28 h. The final polymer concentration is 7.6 wt% in PPA (83.0% $P_2O_5$). Precipitation of a small amount of the anisotropic polymer product provides the random copolymer of Type IX, Class 1 with the structure:

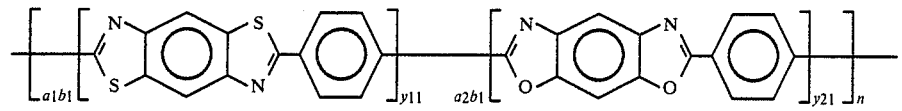

where $a_1b_1=0.9$, $a_2b_1=0.10$, and the average block lengths $y_{11}$ and $y_{21}$ are believed to be 10 and 1.11, respectively. The isolated copolymer possesses an intrinsic viscosity of 26.36 dL/g in MSA at 30° C., which corresponds to an n value of approximately 110.

The above procedure is followed with the exception that the $P_2O_5$ content during the dehydrochlorination begins at 77% and then is incrementally increased to an intermediate $P_2O_5$ content of 84.9% prior to polymerization.

When the intermediate $P_2O_5$ content is increased such that the final $P_2O_5$ content is 84.0% and the reaction mixture is heated for 10 hours at 185° C., an intrinsic viscosity of 16 dL/g in MSA at 30° C. is obtained; heating the reaction mixture for a total of 15 hours at 185° C. gives an intrinsic viscosity of 23 dL/g in MSA at 30° C.; heating the reaction mixture for a total of 24 hours at 185° C. gives an intrinsic viscosity of 26 dL/g in MSA at 30° C.

EXAMPLE 52

A solution of 135.51 g of 115% PPA and 59.10 g of 85.7% $H_3PO_4$ was stirred at 100° C. for 2 h under reduced pressure. The solution was allowed to cool to room temperature under reduced pressure, and 180.16 g of the mixture was added to 30.20054 g of 1a under an argon atmosphere. After a homogeneous mixture was obtained 28.29941 g (58.49995 g total, 0.23859 mol total=m, $a_1=1$) of deaerated 1a was added. The mixture was stirred under reduced pressure at: 50° C. for 18.5 h; 70° C. for 10 min; 80° C. for 25 min; and 90° C. for 5.5 h. Deaerated 2a (35.6892 g, 0.21482 mol, $b_1=0.9$) and 5.79905 g (0.02394 mol, $b_2=0.10$) of deaerated 4,4'-biphenyldicarboxylic acid (2aa) were added under an inert atmosphere. After the monomers were incorporated into the mixture, the reaction mixture was cooled to 40° C. and 136.11 g of deaerated $P_2O_5$ was added to give an effective $P_2O_5$ content before polymerization of 87.01%. After stirring at 100° C. for 63 h, the polymerization was stirred at: 160° C. for 2.5 h; 170° C. for 5.5 h, and 200° C. for 64 h. The concentration of the resulting copolymer was 15.9% in PPA with a $P_2O_5$ content of approximately 82.5%. The reaction product was stiropalescent and was drawn into oriented fibers. The copolymer possesses an intrinsic viscosity of 7.9 dL/g in MSA at 30° C. The structure of the resulting polymer is believed to be:

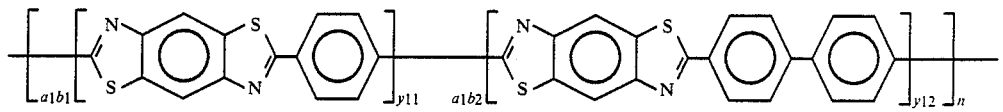

where $a_1b_1$ is 0.9, $a_1b_2$ is 0.1, $y_{11}$ is 10, $y_{12}$ is 1.1, and n is approximately 40.

The above procedure is followed with the exception that the $P_2O_5$ content during the dehydrochlorination begins at 80% and then is incrementally increased to an intermediate $P_2O_5$ content of 87.0% prior to polymerization.

When the intermediate $P_2O_5$ content is increased such that the final $P_2O_5$ content is 83.0% and the reaction mixture is heated for 10 hours at 185° C., an intrinsic viscosity of 7 dL/g in MSA at 30° C. is obtained; heating the reaction mixture for a total of 12 hours at 185° C. gives an intrinsic viscosity of 9 dL/g in MSA at 30° C.; heating the reaction mixture for a total of 18 hours at 185° C. gives an intrinsic viscosity of 11 dL/g in MSA at 30° C.

EXAMPLE 53

A mixture of 20.10 g of concentrated orthophosphoric acid (85.7% $H_3PO_4$) and 46.74 g of 115% PPA was stirred at 100° C. for 2 h under reduced pressure in a 100 mL 3-necked flask. After allowing this PPA solution, having a $P_2O_5$ content of 77.3%, to cool to 50° C. under reduced pressure, a portion (62.45 g) was added under a flow of argon to a 200 mL resin kettle containing 20.2783 g (0.082703 mol=m, $a_1b=1$) of 1a that had been prepared and deaerated as described in Example 7. The mixture was then stirred at the specified temperatures for the specified times under either reduced pressure (vac) or argon flow (Ar): 50° C., for 4 h, vac; 50° C., 15 h, Ar; 60° C., 3 h, vac; 80° C., 1 h, vac; 90° C., 3 h, vac; 60° C., 15 h, Ar; 80° C., 7 h, vac. Trans-1,2-cyclohexanedicarboxylic acid (2gg) (0.6781 g, 0.004132 mol, $b_2=0.05$) that was obtained from Aldrich Chemical Company and was recrystallized from methanol before use was added to the kettle and then terephthalic acid (2a) (13.05455 g, 0.078579 mol, $b_1=0.95$) was added. Powdered $P_2O_5$ (45.00 g) was then added to the mixture that had been cooled to 50° C. to increase the effective $P_2O_5$ content before polymerization to 86.8%. The mixture was then stirred for 17 h at 100° C. under argon flow. The yellow mixture is then heated with stirring under argon as follows: 120° C. for 1 h; 130°–140° C. for 1 h; 150° C. for 2 h; 160° C. for 0.5 h; 170° C. for 4 h (stir-opalescence is apparent during this time); 185° C. for 15.5 h; and 200° C. for 75 h. The final concentration of the resulting random copolymer is 16.4% in PPA, with a $P_2O_5$ content of approximately of 82.2%. The polymer obtained apparently is of the following structure:

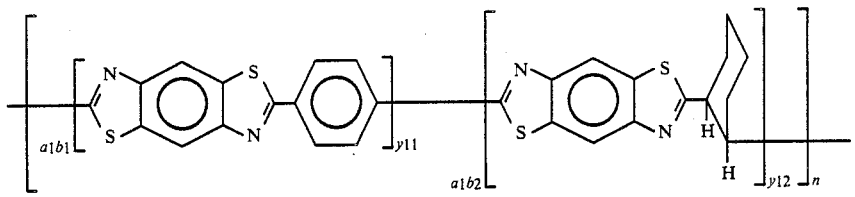

characterized as having an intrinsic viscosity in methanesulfonic acid at 30° C. of 10.0 dL/g, which corresponds to an average n value of about 50, a mole fraction of $\{AI\}_n$ units ($a_1b_1$) of 0.95, and a mole fraction of $\{AA''\}_n$ units ($a_1b_2$) of 0.05. The average block lengths, $y_{11}$ and $y_{12}$, are believed to be 20 and 1, respectively.

The above procedure is followed with the exception that the $P_2O_5$ content during the dehydrochlorination begins at 80% and then is incrementally increased to an intermediate $P_2O_5$ content of 88.0% prior to polymerization.

When the intermediate $P_2O_5$ content is increased such that the final $P_2O_5$ content is 83.0% and the reaction mixture is heated for 8 hours at 185° C. an intrinsic viscosity of 7 dL/g in MSA at 30° C. is obtained; heating the reaction mixture for a total of 10 hours at 185° C. gives an intrinsic viscosity of 9 dL/g in MSA at 30° C.; heating the reaction mixture for a total of 15 hours at 185° C. gives an intrinsic viscosity of 11 dL/g in MSA at 30° C.

EXAMPLE 54

The procedure of Example 49 is essentially repeated. Instead of using 95 mol% of monomer 1a, 5 mol% of monomer 1b, and 100 mol% of monomer 2a, a mixture of 50 mol% of monomer 1a and 50 mol% of monomer 1c is substantially dehydrochlorinated in a comparable weight percent of PPA with essentially similar $P_2O_5$ content. After the addition of a stoichiometric amount of monomer 2a and an appropriate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

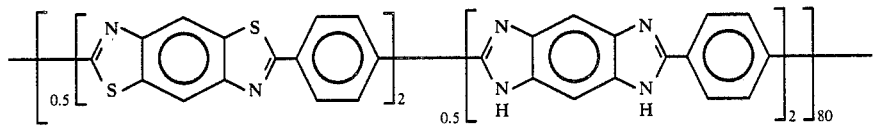

and has an intrinsic viscosity in MSA at 30° C. of 20 dL/g after heating at 185° C. for 8 hours. Additional heating at the same temperature for a total of the indicated time raises the intrinsic viscosity in MSA at 30° C. to 26 dL/g (14 hours) and to 30 dL/g (20 hours).

EXAMPLE 55

The procedure of Example 49 is essentially repeated. Instead of using 95 mol% of monomer 1a, 5 mol% of monomer 1b, and 100 mol% of monomer 2a, a mixture of 50 mol% of monomer 1b and 50 mol% of monomer 1c is substantially dehydrochlorinated in a comparable weight percent of PPA with essentially similar $P_2O_5$ content. After the addition of a stoichiometric amount of monomer 2a and an appropriate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

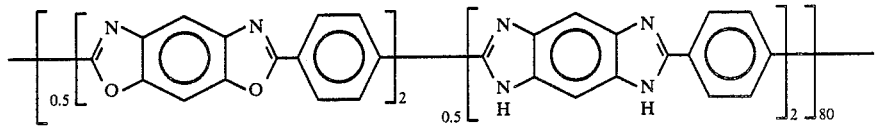

and has an intrinsic viscosity in MSA at 30° C. of 16 dL/g after heating at 185° C. for 8 hours. Additional heating at the same temperature for a total of the indicated time raises the intrinsic viscosity in MSA at 30° C. to 20 dL/g (14 hours) and to 25 dL/g (20 hours).

EXAMPLE 56

The procedure of Example 53 is essentially repeated. Instead of using 100 mol% of monomer 1a, 95 mol% of monomer 2a, and 5 mol% of monomer 2gg, 100 mol% of monomer 1a is substantially dehydrochlorinated in a comparable weight percent of PPA with essentially similar $P_2O_5$ content. After the addition of 50 mol% of monomer 2a and 50 mol% of monomer 2j and an appropriate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

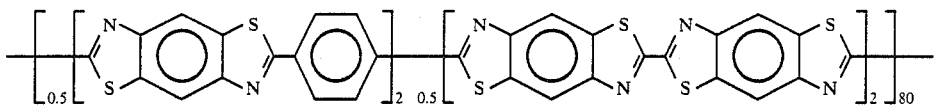

and has an intrinsic viscosity in MSA at 30° C. of 16 dL/g after heating at 185° C. for 8 hours. Additional heating at the same temperature for a total of the indicated time raises the intrinsic viscosity in MSA at 30° C. to 20 dL/g (14 hours) and to 25 dL/g (20 hours).

EXAMPLE 57

The procedure of Example 53 is essentially repeated. Instead of using 100 mol% of monomer 1a, 95 mol% of monomer 2a, and 5 mol% of monomer 2gg, 100 mol% of monomer 1a is substantially dehydrochlorinated in a comparable weight percent of PPA with essentially similar $P_2O_5$ content. After the addition of 50 mol% of monomer 2a and 50 mol% of monomer 2k and an appropriate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

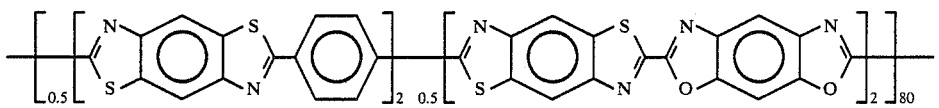

and has an intrinsic viscosity in MSA at 30° C. of 14 dL/g after heating at 185° C. for 8 hours. Additional heating at the same temperature for a total of the indicated time raises the intrinsic viscosity in MSA at 30° C. to 19 dL/g (16 hours) and to 23 dL/g (20 hours).

EXAMPLE 58

The procedure of Example 53 is essentially repeated. Instead of using 100 mol% of monomer 1a, 95 mol% of monomer 2a, and 5 mol% of monomer 2gg, 100 mol% of monomer 1a is substantially dehydrochlorinated in a comparable weight percent of PPA with essentially similar $P_2O_5$ content. After the addition of 50 mol% of monomer 2a and 50 mol% of monomer 2l and an appropriate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

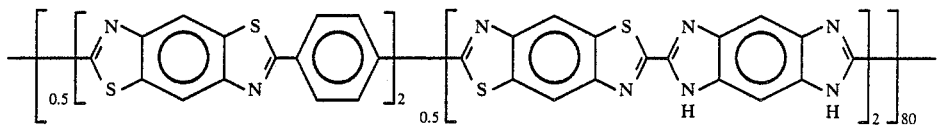

and has an intrinsic viscosity in MSA at 30° C. of 16 dL/g after heating at 185° C. for 8 hours. Additional heating at the same temperature for a total of the indicated time raises the intrinsic viscosity in MSA at 30° C. to 20 dL/g (14 hours) and to 25 dL/g (20 hours).

EXAMPLE 59

The procedure of Example 53 is essentially repeated. Instead of using 100 mol% of monomer 1a, 95 mol% of monomer 2a, and 5 mol% of monomer 2gg, 100 mol% of monomer 1b is substantially dehydrochlorinated in a comparable weight percent of PPA with essentially similar $P_2O_5$ content. After the addition of 50 mol% of monomer 2a and 50 mol% of monomer 2j and an appropriate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

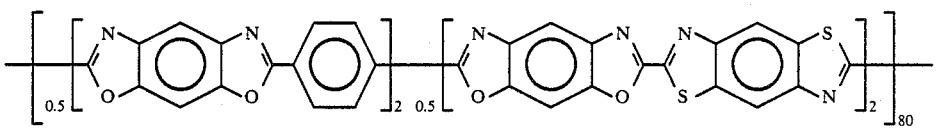

and has an intrinsic viscosity in MSA at 30° C. of 8 dL/g after heating at 185° C. for 3 hours. Additional heating at the same temperature for a total of the indicated time raises the intrinsic viscosity in MSA at 30° C. to 15 dL/g (14 hours) and to 19 dL/g (20 hours).

EXAMPLE 60

The procedure of Example 53 is essentially repeated. Instead of using 100 mol% of monomer 1a, 95 mol% of monomer 2a, and 5 mol% of monomer 2gg, 100 mol% of monomer 1b is substantially dehydrochlorinated in a comparable weight percent of PPA with essentially similar $P_2O_5$ content. After the addition of 50 mol% of monomer 2a and 50 mol% of monomer 2k and an appropriate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

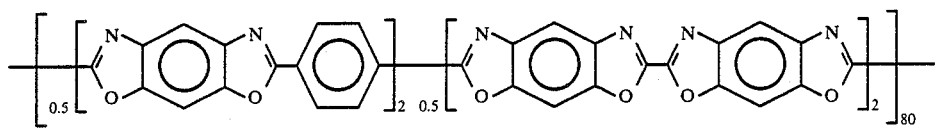

and has an intrinsic viscosity in MSA at 30° C. of 8 dL/g after heating at 185° C. for 4 hours. Additional heating at the same temperature for a total of the indicated time raises the intrinsic viscosity in MSA at 30° C. to 15 dL/g (10 hours) and to 22 dL/g (20 hours).

EXAMPLE 61

The procedure of Example 53 is essentially repeated. Instead of using 100 mol% of monomer 1a, 95 mol% of monomer 2a, and 5 mol% of monomer 2gg, 100 mol% of monomer 1b is substantially dehydrochlorinated in a comparable weight percent of PPA with essentially similar $P_2O_5$ content. After the addition of 50 mol% of monomer 2a and 50 mol% of monomer 2l and an appropriate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

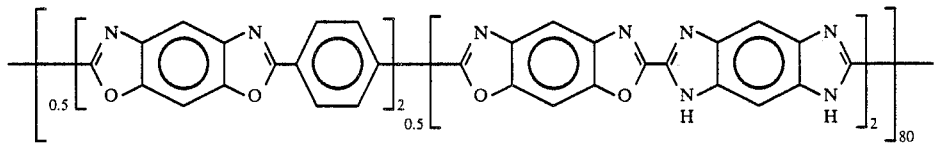

and has an intrinsic viscosity in MSA at 30° C. of 10 dL/g after heating at 185° C. for 4 hours. Additional heating at the same temperature for a total of the indicated time raises the intrinsic viscosity in MSA at 30° C. to 16 dL/g (10 hours) and to 22 dL/g (20 hours).

EXAMPLE 62

The procedure of Example 53 is essentially repeated. Instead of using 100 mol% of monomer 1a, 95 mol% of monomer 2a, and 5 mol% of monomer 2gg, 100 mol% of monomer 1a is substantially dehydrochlorinated in a comparable weight percent of PPA with essentially similar $P_2O_5$ content. After the addition of 75 mol% of monomer 2a and 25 mol% of monomer 2i and an appropriate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

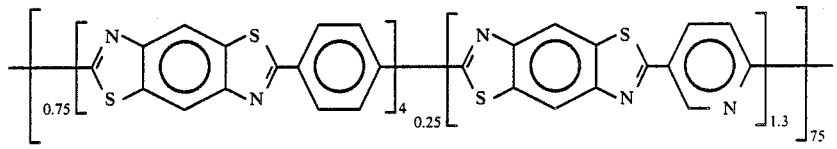

and has an intrinsic viscosity in MSA at 30° C. of 12 dL/g after heating at 185° C. for 8 hours. Additional heating at the same temperature for a total of the indicated time raises the intrinsic viscosity in MSA at 30° C. to 16 dL/g (14 hours) and to 20 dL/g (20 hours).

EXAMPLE 63

The procedure of Example 53 is essentially repeated. Instead of using 100 mol% of monomer 1a, 95 mol% of monomer 2a, and 5 mol% of monomer 2gg, 100 mol% of monomer 1b is substantially dehydrochlorinated in a comparable weight percent of PPA with essentially similar $P_2O_5$ content. After the addition of 75 mol% of monomer 2a and 25 mol% of monomer 2i and an appropriate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

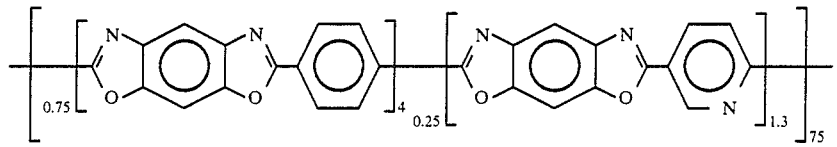

and has an intrinsic viscosity in MSA at 30° C. of 6 dL/g after heating at 185° C. for 3 hours. Additional heating at the same temperature for a total of the indicated time raises the intrinsic viscosity in MSA at 30° C. to 12 dL/g (9 hours) and to 18 dL/g (20 hours).

EXAMPLE 64

The procedure of Example 53 is essentially repeated. Instead of using 100 mol% of monomer 1a, 95 mol% of monomer 2a, and 5 mol% of monomer 2gg, 100 mol% of monomer 1c is substantially dehydrochlorinated in a comparable weight percent of PPA with essentially similar $P_2O_5$ content. After the addition of 75 mol% of monomer 2a and 25 mol% of monomer 2i and an appropriate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

priate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

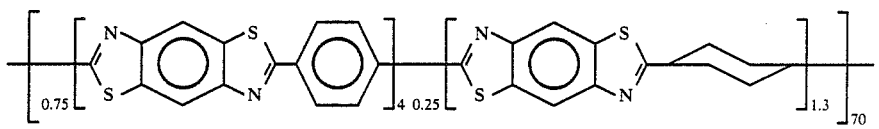

and has an intrinsic viscosity in MSA at 30° C. of 6 dL/g after heating at 185° C. for 8 hours. Additional heating at the same temperature for a total of the indicated time raises the intrinsic viscosity in MSA at 30° C. to 12 dL/g (14 hours) and to 16 dL/g (20 hours).

EXAMPLE 66

The procedure of Example 53 is essentially repeated. Instead of using 100 mol% of monomer 1a, 95 mol% of monomer 2a, and 5 mol% of monomer 2gg, 100 mol% of monomer 1b is substantially dehydrochlorinated in a comparable weight percent of PPA with essentially similar $P_2O_5$ content. After the addition of 75 mol% of monomer 2a and 25 mol% of monomer 2e and an appropriate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stri-opalescence) and can be directly utilized for forming into articles by spinning, or drawing. The copolymer obtained is of the following structure:

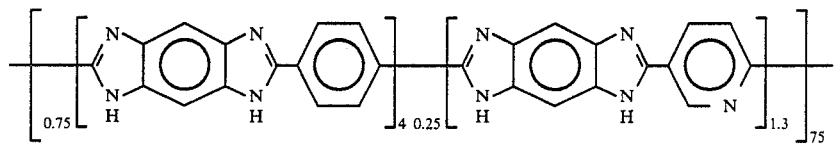

and has an intrinsic viscosity in MSA at 30° C. of 10 dL/g after heating at 185° C. for 8 hours. Additional heating at the same temperature for a total of the indicated time raises the intrinsic viscosity in MSA at 30° C. to 16 dL/g (14 hours) and to 20 dL/g (20 hours).

EXAMPLE 65

The procedure of Example 53 is essentially repeated. Instead of using 100 mol% of monomer 1a, 95 mol% of monomer 2a, and 5 mol% of monomer 2gg, 100 mol% of monomer 1a is substantially dehydrochlorinated in a comparable weight percent of PPA with essentially similar $P_2O_5$ content. After the addition of 75 mol% of monomer 2a and 25 mol% of monomer 2e and an appro-

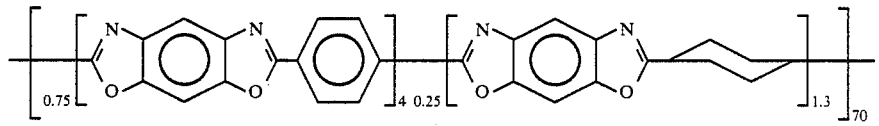

and has an intrinsic viscosity in MSA at 30° C. of 6 dL/g after heating at 185° C. for 10 hours. Additional heating at the same temperature for a total of the indi-

EXAMPLE 67

The procedure of Example 49 is essentially repeated. Instead of using 95 mol% of monomer 1a, 5 mol% of monomer 1b, and 100 mol% of monomer 2a, a mixture of 60 mol% of monomer 1a and 40 mol% of monomer 1i is substantially dehydrochlorinated in a comparable weight percent of PPA with essentially similar $P_2O_5$ content. After the addition of a stoichiometric amount of monomer 2a and an appropriate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

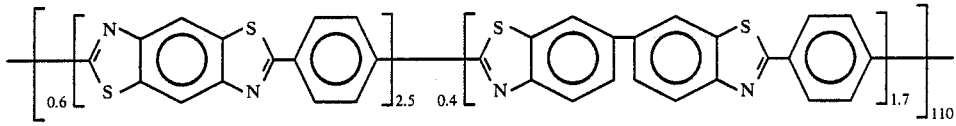

and has an intrinsic viscosity in MSA at 30° C. of 12 dL/g after heating at 185° C. for 8 hours. Additional heating at the same temperature for a total of the indicated time raises the intrinsic viscosity in MSA at 30° C. to 16 dL/g (14 hours) and to 18 dL/g (20 hours).

EXAMPLE 68

The procedure of Example 49 was essentially repeated. Instead of using 95 mol% of monomer 1a, 5 mol% of monomer 1b, and 100 mol% of monomer 2a, a mixture of 80 mol% of monomer 1a and 20 mol% of monomer 1l was substantially dehydrochlorinated in a comparable weight percent of PPA with essentially similar $P_2O_5$ content. After the addition of a stoichiometric amount of monomer 2a and an appropriate amount of $P_2O_5$ (thereby raising the final $P_2O_5$ content to substantially above about 82%), the resultant mixture was then heated in essentially the same manner in accordance with Example 12 to provide a copolymerization product. The product so formed was anisotropic-liquid crystalline (exhibited stir-opalescence) and was formed into ordered fibers by simple drawing. The copolymer obtained is believed to be of the following structure:

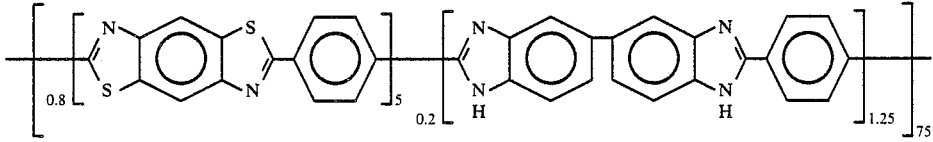

and has an intrinsic viscosity in MSA at 30° C. of 6 dL/g after heating at 185° C. for 8 hours. Additional heating at the same temperature for a total of the indicated time raises the intrinsic viscosity in MSA at 30° C. to 9 dL/g (14 hours) and to 13 dL/g (20 hours).

EXAMPLE 69

The procedure of Example 69 is essentially repeated. Instead of using 95 mol% of monomer 1a, 5 mol% of monomer 1b, and 100 mol% of monomer 2a, a mixture of 85 mol% of monomer 1c and 15 mol% of monomer 1l is substantially dehydrochlorinated in a comparable weight percent of PPA with essentially similar $P_2O_5$ content. After the addition of a stoichiometric amount of monomer 2a and an appropriate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

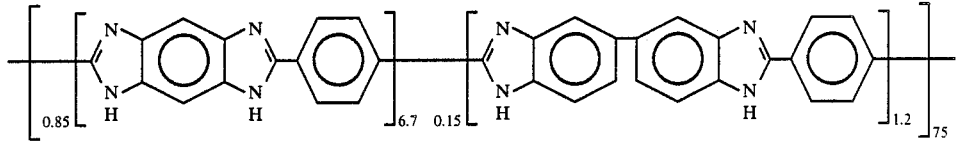

and has an intrinsic viscosity in MSA at 30° C. of 5 dL/g after heating at 185° C. for 8 hours. Additional heating at the same temperature for a total of the indicated time raises the intrinsic viscosity in MSA at 30° C. to 10 dL/g (16 hours) and to 12 dL/g (24 hours).

EXAMPLE 70

The procedure of Example 52 is essentially repeated. Instead of using 100 mol% of monomer 1a, 90 mol% of monomer 2a, and 10 mol% of monomer 2aa, 100 mol% of monomer 1b is substantially dehydrochlorinated in a comparable weight percent of PPA with essentially similar $P_2O_5$ content. After the addition of 95 mol% of monomer 2a and 5 mol% of monomer 2aa and an appropriate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

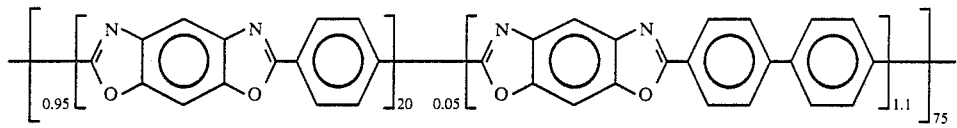

and has an intrinsic viscosity in MSA at 30° C. of 12 dL/g after heating at 185° C. for 8 hours. Additional heating at the same temperature for a total of the indicated time raises the intrinsic viscosity in MSA at 30° C. to 16 dL/g (14 hours) and to 19 dL/g (20 hours).

EXAMPLE 71

The procedure of Example 53 is essentially repeated. Instead of using 100 mol% of monomer 1a, 95 mol% of monomer 2a, and 5 mol% of monomer 2gg, 100 mol% of monomer 1b is substantially dehydrochlorinated in a comparable weight percent of PPA with essentially similar $P_2O_5$ content. After the addition of 95 mol% of monomer 2a and 5 mol% of monomer 2gg and an appropriate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

EXAMPLE 72

The procedure of Example 53 is essentially repeated. Instead of using 100 mol% of monomer 1a, 95 mol% of monomer 2a, and 5 mol% of monomer 2gg, 100 mol% of monomer 1a is substantially dehydrochlorinated in a comparable weight percent of PPA with essentially similar $P_2O_5$ content. After the addition of 95 mol% of monomer 2a and 5 mol% of monomer 2ff and an appropriate amount of $P_2O_5$ (thereby raising the final $P_2O_5$ content to substantially above about 82%), the resultant mixture is then heated in essentially the same manner in accordance with Example 12 to provide a copolymerization product. The product so formed is anisotropic-liquid crystalline (exhibits stir-opalescence) and can be directly utilized for forming into articles by spinning, or drawing. The copolymer obtained is of the following structure:

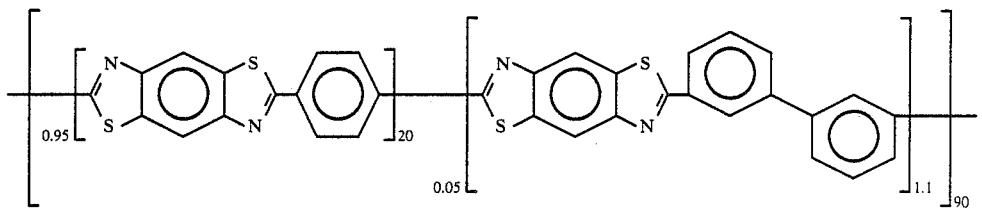

and has an intrinsic viscosity in MSA at 30° C. of 11 dL/g after heating at 185° C. for 8 hours. Additional heating at the same temperature for a total of the indicated time raises the intrinsic viscosity in MSA at 30° C. to 15 dL/g (14 hours) and to 20 dL/g (20 hours).

EXAMPLE 73

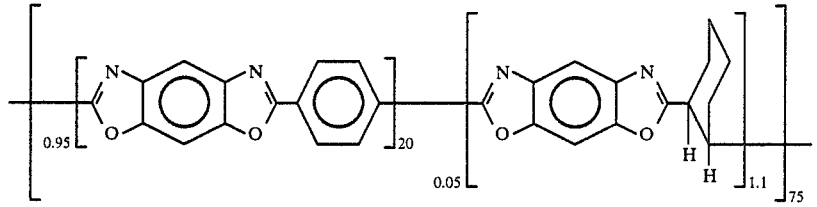

and has an intrinsic viscosity in MSA at 30° C. of 5 dL/g after heating at 185° C. for 6 hours. Additional heating at the same temperature for a total of the indicated time raises the intrinsic viscosity in MSA at 30° C. to 12 dL/g (14 hours) and to 15 dL/g (24 hours).

Two polymerizations (Step A and Step B) were conducted simultaneously in separate resin kettles and combined at a later stage (Step C) to give a product of a block copolymer believed to have the following structure:

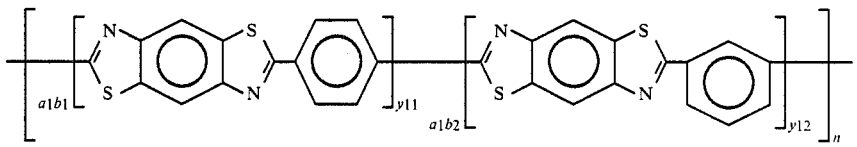

where $a_1b_1$ is 0.793 and $a_1b_2$ is 0.207 and $y_{11}$ is greater than about 30.

Step A: Preparation of $\text{-}\!\{\text{AI}\}\!\text{-}_n$. A mixture of 92.06 g of 115% PPA and 39.45 g of concentrated orthophosphoric acid (85.7% $H_3PO_4$) was stirred at 100° C. for 2 h under reduced pressure. A portion (128.63 g) of the hot PPA (77.3% $P_2O_5$) was added under a flow of argon to a resin kettle containing 41.42682 g (0.16896 mol) of 1a. The mixture was stirred at 50° C. under argon flow for 15 h, then under reduced pressure at 60° C. for 23.5 h, 70° C. for 6 h, and 80° C. for 8.5 h to effect dehydrochlorination. Terephthalic acid (2a) (28.0688 g, 0.16895 mol) was then added in four portions. The mixture was cooled to approximately 40° C. and 92.22 g of $P_2O_5$ was added. The mixture was stirred at the following temperatures for the specified times under a flow of argon: 100° C. for 42.5 h; 120° C. to 160° C. in increments of 10° C. per 0.5 h; 170° C. for 2.5 h. At this time the mixture became stir-opalescent and a sample of the dope exhibited birefringence under plane-polarized light. After an additional 3 h at 170° C. the polymer from Step B was added (See Step C). The intrinsic viscosity of Polymer $\text{-}\!\{\text{AI}\}\!\text{-}_n$ isolated from the reaction mixture immediately before Step C was 2.3 dL/g which corresponds to an n value (average number of recurring units) of 30 and a p value (extent of reaction) of 0.983.

Step B: Preparation of $\text{-}\!\{\text{AG}''\}\!\text{-}_n$. A mixture of 30.72 g of 115% PPA and 13.13 g of concentrated orthophosphoric acid (85.7% $H_3PO_4$) was stirred at 100° C. for 2 h under reduced pressure. The PPA (41.66 g; 77.3% $P_2O_5$) was added without cooling under a flow of argon to a resin kettle containing 13.80877 g (0.05632 mol) of 1a. The mixture was stirred at 50° C. under argon flow for 15 h, then under reduced pressure at 60° C. for 23.5 h, 70° C. for 6 h, and 80° C. for 35.5 h. Isophthalic acid (2ss) (9.3569 g, 0.05632 mol) that had been obtained from Aldrich Chemical Company in 99% purity was twice recrystallized from 90% aqueous ethanol and dried at 110° C. for 24 h and was then added in two portions incorporating the solid after each addition. The mixture was cooled to approximately 40° C. and then 31.59 g of $P_2O_5$ was added. The mixture was then heated simultaneously and at the same heating schedule as the solution in Step A.

Step C: Block Copolymerization. After 5.5 h at 170° C., 72 g of the viscous, red, optically isotropic product from Step B was added to the kettle from Step A under an argon atmosphere at the time indicated in Step A. Both kettles were heated under an argon flow as follows: 170° C. for 12.8 h; 190° C. for 2 h; 200° C. for 26 h. The resulting mixture remained stir-opalescent and continued to polymerize as indicated by intrinsic viscosities of samples removed at various times. Upon precipitation in $H_2O$, the final sample of the resulting copolymer had an intrinsic viscosity of 17.5 dL/g in MSA at 30° C. The final precipitated sample of the portion of the product from Step B that had not been added to the product from Step A (but had been heated according to the same schedule as the mixture) had an intrinsic viscosity of 1.8 dL/g in MSA at 30° C. The weight percent of polymer $\text{-}\!\{\text{AI}\}\!\text{-}_n$ in the product from Step A was 16.2; the weight percent of polymer $\text{-}\!\{\text{AG}''\}\!\text{-}_n$ in the product from Step B was 16.3. The weight percent of block copolymer

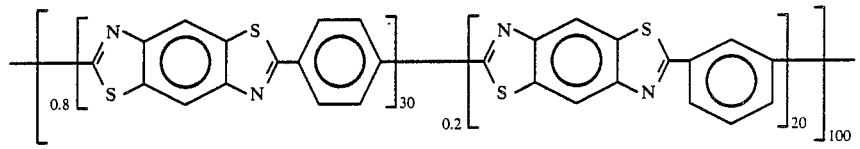

was therefore calculated to be 16.2; the weight percents of the individual $\text{-}\!\{\text{AI}\}\!\text{-}_n$ and $\text{-}\!\{\text{AG}''\}\!\text{-}_n$ segments of the block copolymer in the final product were 12.9 and 3.4, respectively, as calculated from the weights of the constituent polymers added and the total weight of the resulting product. The mol percent of mesogenic $\text{-}\!\{\text{AI}\}\!\text{-}_n$ and flexible $\text{-}\!\{\text{AG}''\}\!\text{-}_n$ units were 79.3 and 20.7, respectively, as calculated from the weights of the constituent polymers added.

The above procedure is essentially repeated using 100 times the amounts of all of the reagents and monomers with the following modifications. The dehydrochlorination mixtures of both Steps A and B are mixed in separate Atlantic mixers maintained at 60° C. and circulated through separate Teflon-coated, 6-inch-diameter, Pope wiped-film evaporators at 100° C. (to effect the dehydrochlorinations) and then are returned to the original mixers. The appropriate amounts of terephthalic acid and isophthalic acid are then added and incorporated into the dehydrochlorinated mixtures at 100° C. Both of the mixers are then cooled to 50° C. and the appropriate amounts of $P_2O_5$ are added. The mixture from Step A is then polymerized to give the polymer $\text{-}\!\{\text{AI}\}\!\text{-}_n$ with an intrinsic viscosity (in MSA at 30° C.) of approximately 10 dL/g by passing the reaction mixture through a static mixer of the Kenics type with a residence time at 185° C. of 1.5 hours. The mixture from Step B is simultaneously polymerized to give the polymer $\text{-}\!\{\text{AG}''\}\!\text{-}_n$ with an intrinsic viscosity (in MSA at 30° C.) of approximately 0.4 dL/g by passing the reaction mixture through a separate static mixer of the Kenics type with a residence time at 175° C. of 1.5 hours. The two oligomeric reaction products are then mixed in the same proportions as above by feeding the intermediate products into the same mixer at 185° C. and continuing the polymerization by heating at 185°–190° C. for an additional 15 hours. The resulting block polymer has an intrinsic viscosity in MSA at 30° C. (at the indicated times) of 12.5 dL/g (at 4 hours), of 16.7 dL/g (at 6 hours), and of 20 dL/g (at 15 hours).

EXAMPLE 74

Two polymerizations were conducted simultaneously in separate resin kettles (Steps A and B), and combined at a later stage (Step C) to give a block polymer product believed to have the following structure:

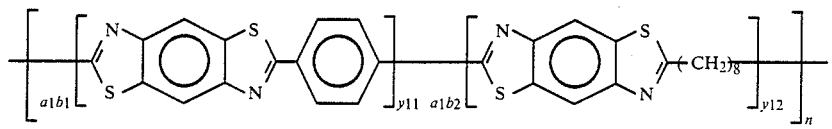

where $a_1b_1$ is 0.587 and $a_1b_2$ is 0.413 and $Y_{11}$ is greater than about 40.

Step A: Preparation of $\{AI\}_n$. A mixture of 36.73 g of 115% PPA and 24.43 g of concentrated orthophosphoric acid (85.0% $H_3PO_4$) was stirred at 100° C. for 4.5 h under reduced pressure. A portion (58.69%) of the hot PPA (74.9% $P_2O_5$) was added under a flow of argon to a resin kettle containing 20.71434 g (0.08448 mol) of 1a. The mixture was stirred under reduced pressure at 50° C. for 1 h, 70° C. for 1.3 h, and 80° C. for 23 h. To dissolve monomer, 6.02 g of $P_2O_5$ was added, and the kettle was heated at 80° C. for an additional 26 h. Terephthalic acid (2a) (14.0351 g, 0.08448 mol) was then added in three portions. The acid monomer was incorporated by stirring after each addition. The kettle was cooled to 50° C. and an additional 46.24 g deaerated $P_2O_5$ was added. The mixture was stirred under argon flow at the following temperatures for the specified times: 100° C. for 18 h; 150° C. for 2 h; 170° C. for 5 h. (After 1 h at 170° C. the mixture exhibited stiropalescence). At this time the polymer from Step B was added. (See Step C).

Step B: Preparation of $\{AN''\}_n$. A mixture of 63.88 g of 115% PPA and 42.51 g of concentrated orthophosphoric acid (85.0% $H_3PO_4$) was stirred at 100° C. for 4.5 h under reduced pressure. A portion (104.41 g) of the PPA (74.9% $P_2O_5$) was added without cooling under a flow of argon to a resin kettle containing 20.26865 g (0.08266 mol) of 1a. The mixture was stirred under reduced pressure at 50° C. for 0.8 h, 60° C. for 7.5 h, and 80° C. for 9.5 h. Sebacic acid, (monomer 2zz, purified by crystallization of the disodium salt, then repeated recrystallization of the free acid in $H_2O$ and dried in vacuo at 80° C. for 24 h) (16.7190 g, 0.08266 mol), was then added in three portions to the resin kettle, incorporating after each addition. The mixture was cooled to 50° C. and 70.91 g of $P_2O_5$ was added slowly. The polymerization proceeded rapidly, and the gel-like solid was heated without stirring at 100° C. for 16.5 h and at 130° C. for 7.8 h. At this time the polymer was removed in an inert atmosphere, leaving a portion in the kettle which was reassembled and heated according to the same schedule as the block copolymer.

Step C: Block Copolymerization. A portion of the polymer from Step B (153.13 g) was added under an argon atmosphere to the kettle from Step A. The mixture was then stirred under argon flow at 170° C. for 16 h and at 200° C. for 28 h. The mixture remained stir-opalescent and continued to polymerize as shown by an increase in the bulk viscosity. The weight percent of polymer $\{AI\}_n$ in the product from Step A was 16.1; the weight percent of polymer $\{AN''\}_n$ in the product from Step B was 12.1. The weight percent of block copolymer was calculated to be 12.1; the weight percents of $\{AI\}_n$ and $\{AN''\}_n$ segments of the block copolymer in solution were 6.8 and 5.6 respectively. The mole percent of mesogenic $\{AI\}_n$ and $\{AN''\}_n$ units were 58.7 and 41.3 respectively, as calculated from the weights of the constituent polymers added. The resulting polymer isolated was not completely soluble in methane sulfonic acid thus precluding intrinsic viscosity measurements.

EXAMPLE 75

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 13 are diverted into a common agitated reaction vessel in amounts to give a ratio of 3:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

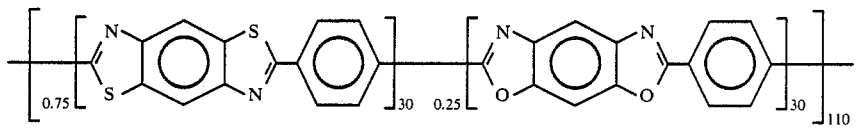

and has an intrinsic viscosity in MSA at 30° C. (at the indicated reaction times) of 17.5 dL/g (at 4 hours), of 20 dL/g (at 6 hours), and of 26.7 dL/g (at 10 hours).

EXAMPLE 76

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 13 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

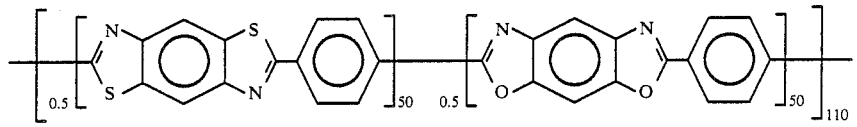

and has an intrinsic viscosity in MSA at 30° C. (at the indicated reaction times) of 20 dL/g (at 4 hours), of 25 dL/g (at 6 hours), and of 32 dL/g (at 12 hours).

EXAMPLE 77

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 13 are diverted into a common agitated reaction vessel in amounts to give a ratio of 1:3. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

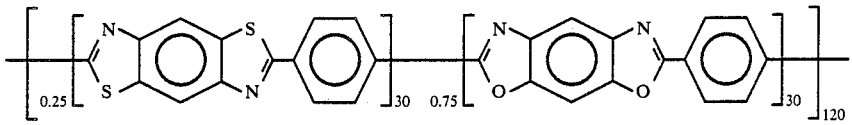

and has an intrinsic viscosity in MSA at 30° C. (at the indicated reaction times) of 17 dL/g (at 4 hours), of 21 dL/g (at 6 hours), and of 24 dL/g (at 10 hours).

EXAMPLE 78

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 13 are diverted into a common agitated reaction vessel in amounts to give a ratio of 1:4. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

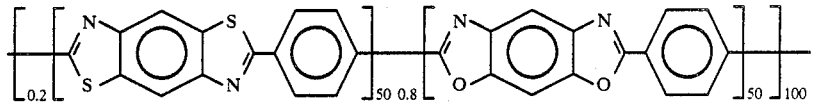

and has an intrinsic viscosity in MSA at 30° C. (at the indicated reaction times) of 22 dL/g (at 4 hours), of 25 dL/g (at 6 hours), and of 31 dL/g (at 15 hours).

EXAMPLE 79

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 28 are diverted into a common agitated reaction vessel in amounts to give a ratio of 2:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

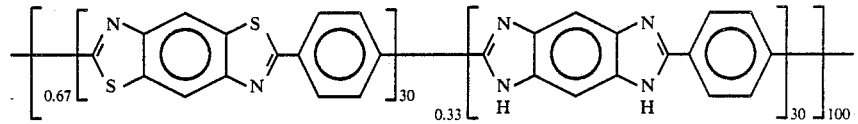

and has an intrinsic viscosity in MSA at 30° C. (at the indicated reaction times) of 19 dL/g (at 4 hours), of 24 dL/g (at 6 hours), and of 29 dL/g (at 16 hours).

EXAMPLE 80

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 13 and 28 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

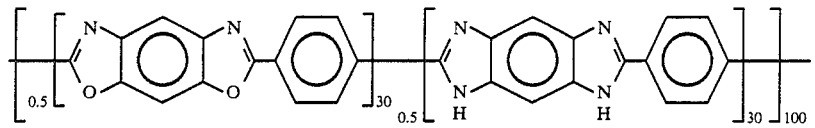

and has an intrinsic viscosity in MSA at 30° C. (at the indicated reaction times) of 17.5 dL/g (at 4 hours), of 20 dL/g (at 6 hours), and of 25 dL/g (at 10 hours).

EXAMPLE 81

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 16 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

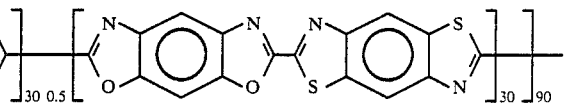

and has an intrinsic viscosity in MSA at 30° C. (at the indicated reaction times) of 19 dL/g (at 4 hours), of 24 dL/g (at 6 hours), and of 28 dL/g (at 16 hours).

EXAMPLE 82

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 17 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

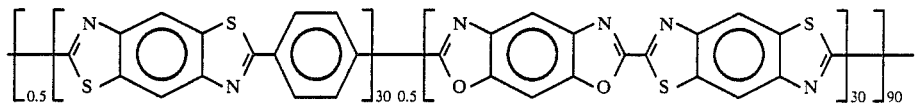

and has an intrinsic viscosity in MSA at 30° C. (at the indicated reaction times) of 17 dL/g (at 6 hours), of 20 dL/g (at 8 hours), and of 24 dL/g (at 18 hours).

EXAMPLE 83

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 18 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

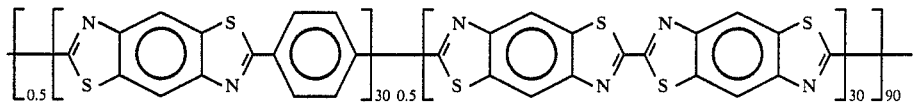

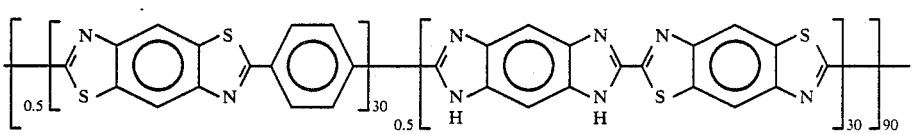

and has an intrinsic viscosity in MSA at 30° C. (at the indicated reaction times) of 18.8 dL/g (at 4 hours), of 20.9 dL/g (at 6 hours), and of 24 dL/g (at 10 hours).

EXAMPLE 84

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 13 and 17 are diverted into a common agitated reaction vessel in amounts to give a ratio of 1:1. The polymerization of the resultant mixture is allowed to continue to form a substantially polymerized blockpolymerization product.

The product so formed is anisotropic-liquid crystalline (exhibits stir-opalescence) and can be directly utilized for forming into articles by spinning or drawing and the like. The blockpolymer obtained is of the following structure:

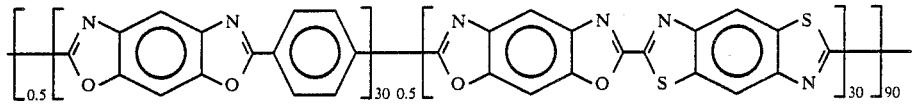

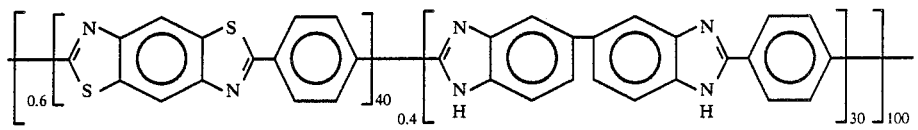

and has an intrinsic viscosity in MSA at 30° C. (at the indicated reaction times) of 16 dL/g (at 6 hours), of 19 dL/g (at 9 hours), and of 23 dL/g (at 17 hours).

EXAMPLE 85

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 19 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

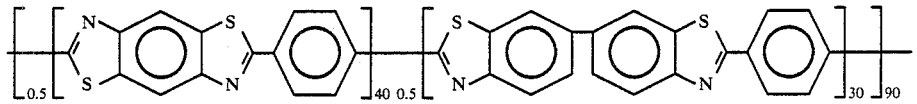

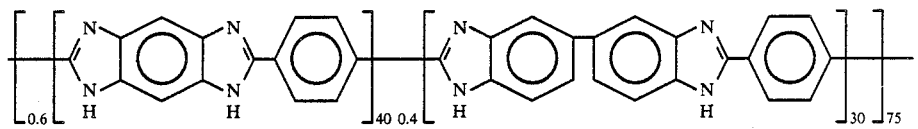

and has an intrinsic viscosity in MSA at 30° C. (at the indicated reaction times) of 13 dL/g (at 7 hours), of 16 dL/g (at 10 hours), and of 19 dL/g (at 16 hours).

EXAMPLE 86

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 22 are diverted into a common agitated reaction vessel in amounts to give a ratio of 1.5:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

and has an intrinsic viscosity in MSA at 30° C. (at the indicated reaction times) of 12 dL/g (at 4 hours), of 15 dL/g (at 6 hours), and of 17 dL/g (at 10 hours).

EXAMPLE 87

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 28 and 22 are diverted into a common agitated reaction vessel in amounts to give a ratio of 1.5:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

and has an intrinsic viscosity in MSA at 30° C. (at the indicated reaction times) of 10 dL/g (at 4 hours), of 12 dL/g (at 6 hours), and of 16 dL/g (at 14 hours).

EXAMPLE 88

The procedure of Example 73 is essentially repeated. Instead of using monomers 1a and 2ss in Step B, equimolar quantities of monomers 1a and 2ff are polymerized at a comparable concentration and to a comparable extent of reaction. The (partially completed) separate polymerization products (i.e., homo-oligomers) from Steps A and B are diverted into a common agitated reaction vessel in amounts to give a ratio of 1.5:1. The polymerization of the resultant mixture is allowed to continue to form a substantially polymerized block-polymerization product. The product so formed is anisotropic-liquid crystalline (exhibits stir-opalescence) and can be directly utilized for forming into articles by spinning or drawing and the like. The blockpolymer obtained is of the following structure:

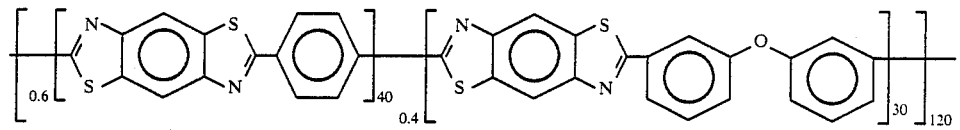

and has an intrinsic viscosity in MSA at 30° C. (at the indicated reaction times) of 9 dL/g (at 4 hours), of 11 dL/g (at 6 hours), and of 13 dL/g (at 10 hours).

EXAMPLE 89

The procedure of Example 73 is essentially repeated. Instead of using monomers 1a and 2ss in Step B, equimolar quantities of monomers 1a and 2xx are polymerized at a comparable concentration and to a comparable extent of reaction. The (partially completed) separate polymerization products (i.e., homo-oligomers) from Steps A and B are diverted into a common agitated reaction vessel in amounts to give a ratio of 1.5:1. The polymerization of the resultant mixture is allowed to continue to form a substantially polymerized block-polymerization product. The product so formed is anisotropic-liquid crystalline (exhibits stir-opalescence) and can be directly utilized for forming into articles by spinning or drawing and the like. The blockpolymer obtained is of the following structure:

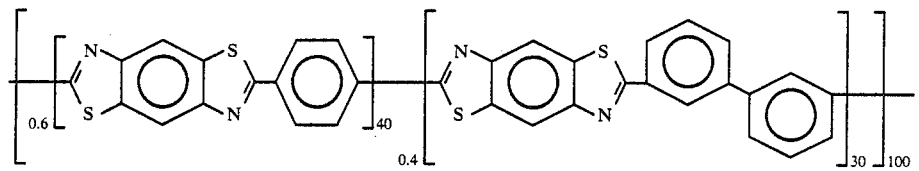

EXAMPLE 90

The procedure of Example 73 is essentially repeated. Instead of using monomers 1a and 2ss in Step B, equimolar quantities of monomers 1a and 2uu are polymerized at a comparable concentration and to a comparable extent of reaction. The (partially completed) separate polymerization products (i.e., homo-oligomers) from Steps A and B are diverted into a common agitated reaction vessel in amounts to give a ratio of 1.5:1. The polymerization of the resultant mixture is allowed to continue to form a substantially polymerized block-polymerization product. The product so formed is anisotropic-liquid crystalline (exhibits stir-opalescence) and can be directly utilized for forming into articles by spinning or drawing and the like. The blockpolymer obtained is of the following structure:

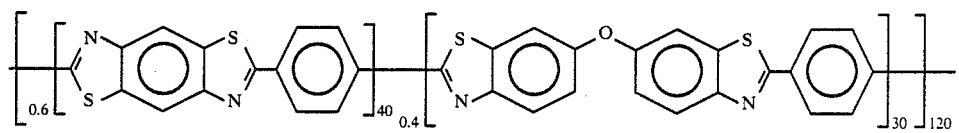

EXAMPLE 91

The procedure of Example 73 is essentially repeated. Instead of using monomers 1a and 2ss in Step B, equimolar quantities of monomers 1q and 2a are polymerized at a comparable concentration and to a comparable extent of reaction. The (partially completed) separate polymerization products (i.e., homo-oligomers) from Steps A and B are diverted into a common agitated reaction vessel in amounts to give a ratio of 1.5:1. The polymerization of the resultant mixture is allowed to continue to form a substantially polymerized block-polymerization product. The product so formed is anisotropic-liquid crystalline (exhibits stir-opalescence) and can be directly utilized for forming into articles by spinning or drawing and the like. The blockpolymer obtained is of the following structure:

EXAMPLE 92

The procedure of Example 73 is essentially repeated. Instead of using monomer 1a in Step A, an equimolar quantity of 1b is used. Instead of using monomers 1a and 2ss in Step B, equimolar quantities of monomers 1b and 2ss are polymerized at a comparable concentration and to a comparable extent of reaction. The (partially completed) separate polymerization products (i.e., homo-oligomers) from Steps A and B are diverted into a common agitated reaction vessel in amounts to give a ratio of 1.5:1. The polymerization of the resultant mixture is allowed to continue to form a substantially polymerized blockpolymerization product. The product so formed is

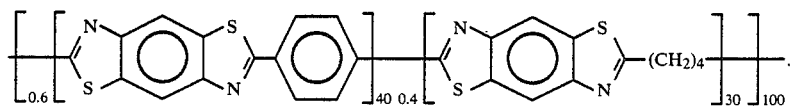

anisotropic-liquid crystalline (exhibits stir-opalescence) and can be directly utilized for forming into articles by spinning or drawing and the like. The blockpolymer obtained is of the following structure:

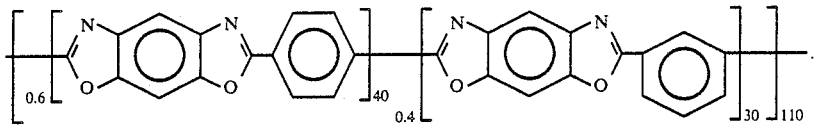

EXAMPLE 93

The procedure of Example 73 is essentially repeated. Instead of using monomer 1a in Step A, an equimolar quantity of 1b is used. Instead of using monomers 1a and 2ss in Step B, equimolar quantities of monomers 1b and 2xx are polymerized at a comparable concentration and to a comparable extent of reaction. The (partially completed) separate polymerization products (i.e., homo-oligomers) from Steps A and B are diverted into a common agitated reaction vessel in amounts to give a ratio of 2:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

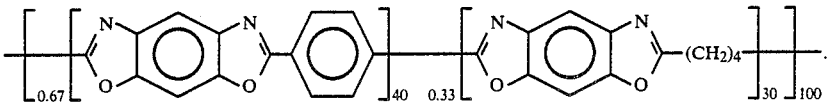

EXAMPLE 94

The procedure of Example 73 is essentially repeated. Instead of using monomer 1a in Step A, an equimolar quantity of 1b is used. Instead of using monomers 1a and 2ss in Step B, equimolar quantities of monomers 1b and 2zz are polymerized at a comparable concentration and to a comparable extent of reaction. The (partially completed) separate polymerization products (i.e., homo-oligomers) from Steps A and B are diverted into a common agitated reaction vessel in amounts to give a ratio of 2:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

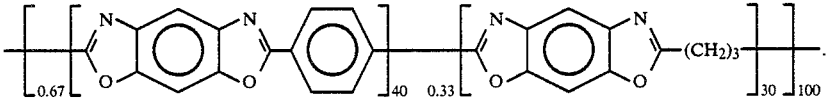

EXAMPLE 95

The procedure of Example 27 is essentially repeated. Instead of using monomer 3a, a mixture of 80 mol% of monomer 3a and 20 mol% of monomer 3c is substantially dehydrochlorinated in a comparable weight percent of PPA with essentially similar $P_2O_5$ content. After the addition of appropriate amount of $P_2O_5$ (thereby raising the final $P_2O_5$ content to substantially above about 82%), the resultant mixture is then heated in essentially the same manner in accordance with Example 27 to provide a copolymerization product. The product so formed is anisotropic-liquid crystalline (exhibits stir-opalescence) and can be directly utilized for forming into articles by spinning, or drawing. The copolymer obtained is of the following structure:

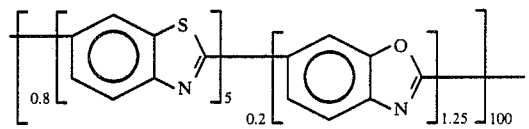

and has an intrinsic viscosity in MSA at 30° C. (at the indicated reaction times) of 6 dL/g (at 4 hours), of 8 dL/g (at 6 hours), and of 11 dL/g (at 12 hours).

EXAMPLE 96

The procedure of Example 27 is essentially repeated. Instead of using monomer 3a, a mixture of 80 mol% of monomer 3a and 20 mol% of monomer 3d is substantially dehydrochlorinated in a comparable weight percent of PPA with essentially similar $P_2O_5$ content. After the addition of appropriate amount of $P_2O_5$ (thereby raising the final $P_2O_5$ content to substantially above about 82%), the resultant mixture is then heated in essentially the same manner in accordance with Example 27 to provide a copolymerization product. The product so formed is anisotropic-liquid crystalline (exhibits stir-opalescence) and can be directly utilized for forming into articles by spinning, or drawing. The copolymer obtained is of the following structure:

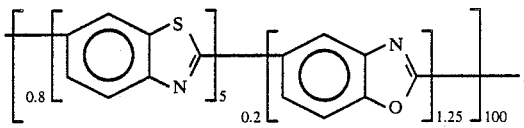

EXAMPLE 97

The procedure of Example 27 is essentially repeated. Instead of using monomer 3a, a mixture of 80 mol% of monomer 3a and 20 mol% of monomer 3e is substantially dehydrochlorinated in a comparable weight percent of PPA with essentially similar P$_2$O$_5$ content. After the addition of appropriate amount of P$_2$O$_5$ (thereby raising the final P$_2$O$_5$ content to substantially above about 82%), the resultant mixture is then heated in essentially the same manner in accordance with Example 27 to provide a copolymerization product. The product so formed is anisotropic-liquid crystalline (exhibits stir-opalescence), highly drawable, and can be directly utilized for forming into articles by spinning, or drawing. The copolymer obtained is believed to be of the following structure:

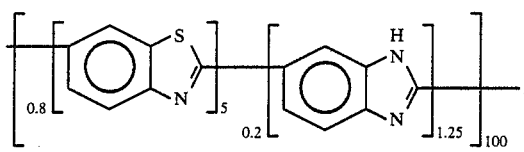

EXAMPLE 98

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 27 and 29 are diverted into a common agitated reaction vessel in amounts to give a ratio of 2:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

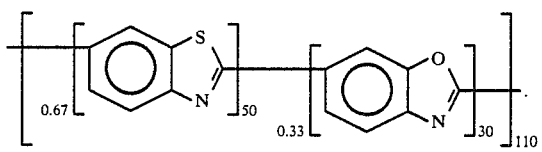

EXAMPLE 99

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 27 and 30 are diverted into a common agitated reaction vessel in amounts to give a ratio of 2:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

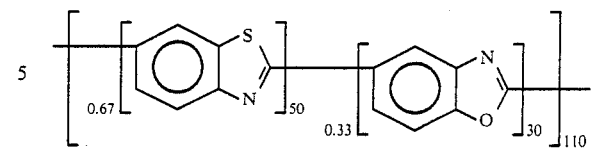

EXAMPLE 100

3,4-diaminobenzoic acid (3e) (Aldrich, 97%) is recrystallized from hot water with 3-4 g of carbon black and 0.5 g of sodium dithionite added for every 30 g of 3e. The recovered light orange crystals are dried at room temperature under reduced pressure for 24 h. An acid mixture prepared from 183.4 g of 115% PPA and 78.6 g of 85.7% H$_3$PO$_4$ (J. T. Baker Analyzed Reagent) is deaerated by heating in a 3-necked flask at 100° C. for 2 h under reduced pressure and then at 50° C. under reduced pressure for 17 h. To a 500 mL resin kettle is added 20.24 g of 3e. The kettle is then deaerated by applying reduced pressure and then filling with nitrogen three times. 51.11 g of the above-mentioned PPA is added to the kettle and the contents stirred until well mixed. 38.77 g of P$_2$O$_5$ (J. T. Baker Analyzed Reagent, 99.1%) is added. The temperature of the kettle is raised to 100° C. and the P$_2$O$_5$ incorporated into the mixture. The following heating schedule is used with color changes as noted: 100° C. for 20 min; 110° C. for 20 min; 120° C. for 20 min; 130° C. for 20 min; color changes from tan to green; 140° C. for 20 min; the green color becomes darker. 150° C. for 20 min; 160° C. for 20 min. A sample is removed and precipitated in water to give a red polymeric substance with an intrinsic viscosity in MSA at 30.0° C. of 4.25 dL/g. Heating at 160° C. is continued for another 30 h. The intrinsic viscosity in MSA at 30° C. of polymer component of a sample removed at this time is measured to be 4.5 dL/g. The reaction is heated at 175° C. an additional 35 h. The resultant red-brown polymeric material isolated from this solution has an intrinsic viscosity of 4.5 dL/g in methanesulfonic acid at 30.0° C. Final reaction products contain 16.8% of polymer $+W+_n$ in PPA. Initial P$_2$O$_5$ content is 77.3%, final P$_2$O$_5$ content is 82.2%.

EXAMPLE 101

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 27 and 100 are diverted into a common agitated reaction vessel in amounts to give a ratio of 2.5:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

(exhibits stir-opalescence) and can be directly utilized for forming into articles by spinning or drawing and the like. The blockpolymer obtained is of the following structure:

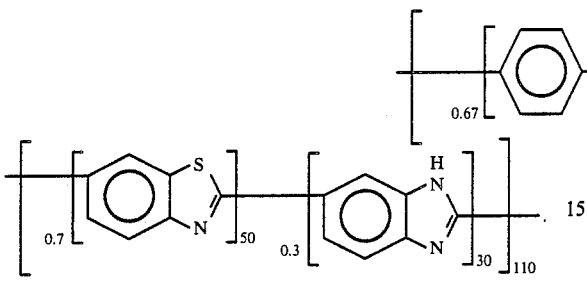

EXAMPLE 102

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 27 are diverted into a common agitated reaction vessel in amounts to give a ratio of 1:3. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

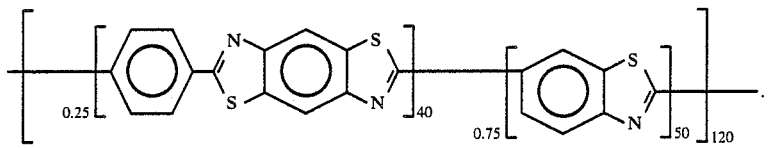

EXAMPLE 103

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 26 are diverted into a common agitated reaction vessel in amounts to give a ratio of 2:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

EXAMPLE 104

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 13 and 27 are diverted into a common agitated reaction vessel in amounts to give a ratio of 1:4. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

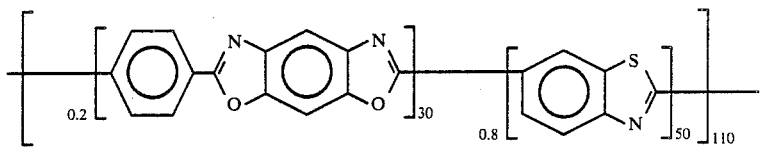

EXAMPLE 105

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 13 and 26 are diverted into a common agitated reaction vessel in amounts to give a ratio of 2:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

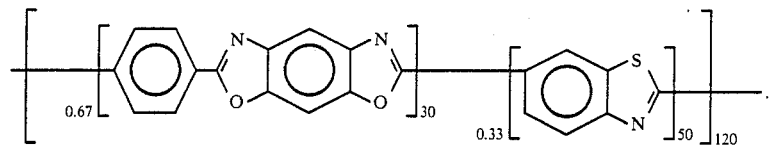

EXAMPLE 106

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 30 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

EXAMPLE 108

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 13 and 30 are diverted into a common agitated reaction vessel in amounts to give a ratio of 1:3. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

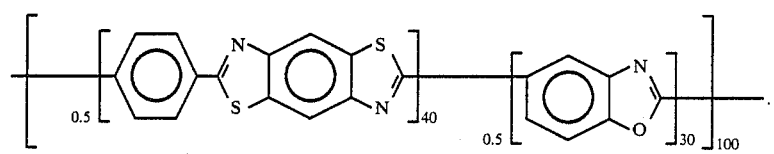

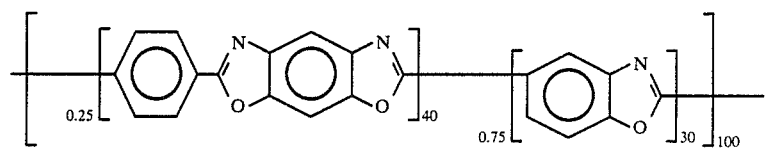

EXAMPLE 107

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 30 are diverted into a common agitated reaction vessel in amounts to give a ratio of 3:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

EXAMPLE 109

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 13 and 30 are diverted into a common agitated reaction vessel in amounts to give a ratio of 1.5:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

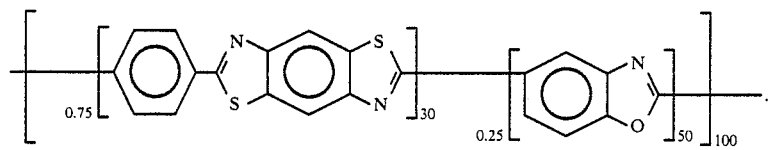

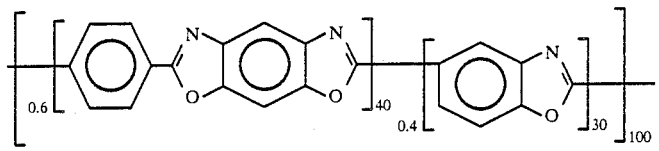

EXAMPLE 110

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 8 and 100 are diverted into a common agitated reaction vessel in amounts to give a ratio of 1.5:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

EXAMPLE 112

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 28 and 100 are diverted into a common agitated reaction vessel in amounts to give a ratio of 2:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

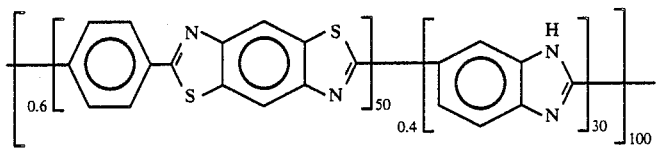

EXAMPLE 111

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 13 and 100 are diverted into a common agitated reaction vessel in amounts to give a ratio of 1.5:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

EXAMPLE 113

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 19 and 27 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

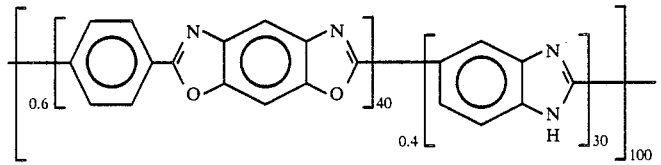

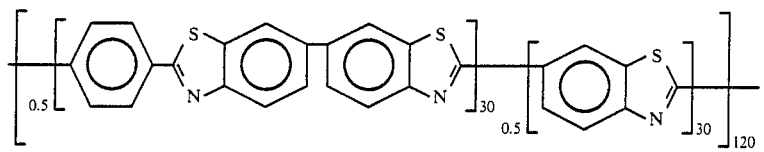

EXAMPLE 114

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 23 and 27 are diverted into a common agitated reaction vessel in amounts to give a ratio of 1:1. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

with an oil bath at 55° C. with slow stirring under a water aspirator (reduced pressure) for 0.33 hours. The flask is then placed under vacuum for an additional 45.87 hours. During the initial 5 hours of dehydrochlorination, the temperature is increased from 55° C. to 70° C. Near the end of the dehydrochlorination, the mixture changes from a very pale pink to a blue-green color that is almost transparent. 26.56 g of deaerated $P_2O_5$ is added as a powder under argon flow. The $P_2O_5$ is incorporated using a combination of stirring and vacuum at about 70° C. The mixture is allowed to equilibrate at 100° C. with stirring under argon flow for 17.33 hours. The amount of $P_2O_5$ added is calculated to provide the reaction mixture with an effective $P_2O_5$ content of approximately 86% prior to the beginning of polymerization and an effective $P_2O_5$ content of approximately 81.97% subsequent to substantial complete polymerization. The

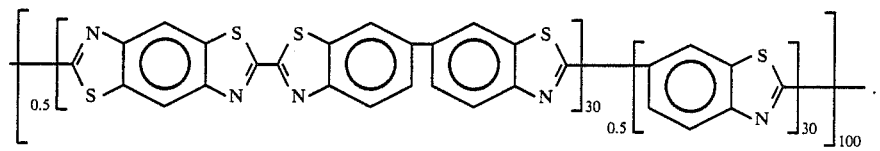

EXAMPLE 115

The procedure of Example 73 is essentially repeated. Subsequent to the start of polymerization and at a preselected range of intrinsic viscosities or after a predetermined selected temperature and rate of reaction, the (partially completed) separate polymerization products (i.e., homo-oligomers) of Examples 22 and 27 are diverted into a common agitated reaction vessel in amounts to give a ratio of 1:2. The polymerization of the resultant mixture is allowed to continue to form a substantially polymerized blockpolymerization product. The product so formed is anisotropic-liquid crystalline (exhibits stir-opalescence) and can be directly utilized for forming into articles by spinning or drawing and the like. The blockpolymer obtained is of the following structure:

mixture is heated to a final temperature of 200° C. following the heating schedule outlined below.

| Temperature (°C.) | Time (Hours) | Observations |
| --- | --- | --- |
| 110 | 0.33 | Dark mint green; creamy. |
| 120 | 0.67 | Less viscous. |
| 130 | 0.38 | |
| 140 | 0.70 | More viscous (mixture full of bubbles). |
| 150 | 0.63 | Darker green; shiny glass-like appearance. |
| 160 | 0.48 | Mixture riding on stir blades. |
| 170 | 0.55 | Unable to stir fast; darker green. |
| 185 | 2.43 | Mixture more transparent |
| 200 | 19.15 | |

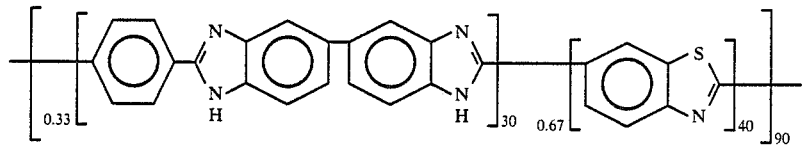

EXAMPLE 116

A mixture of 42.13 g of PPA (83.8% $P_2O_5$) and 18.06 g of $H_3PO_4$ (85.9%) is stirred and heated to 100° C. in a 100 ml 3-necked flask. The flask is placed under reduced pressure overnight. 21.34 g of 3,4-diaminobenzoic acid.2HCl is added to a 100 ml resin kettle. The resin kettle is deaerated and flushed with argon and 42.81 g of the above prepared PPA solvent with a $P_2O_5$ content of 77.32% is then added to the kettle. The flask is heated The reaction product obtained is optically isotropic characterized as having a polymer concentration of 13.14% and an intrinsic viscosity of 6.57 dL/g in MSA at 30° C. The polymer obtained is of the following structure:

EXAMPLE 117

The reaction product of Example 13 is placed in a constant displacement spinning apparatus and extruded at about 3.4 MPa (500 psi) through a 0.381 mm (0.015 in.) diameter orifice and passed through a 20.96 cm (8.25 in.) air gap at a selected take up rate to give a spin draw ratio of about 6.12:1. The extrusion temperature is about 63° C. The coagulation medium is water. The average tensile properties of seven single filaments (ASTM D 3379, 2.54 cm (1.0 in.) gage length) are 2.96 GPa ($4.3 \times 10^5$ psi) tensile strength, 89.6 GPa ($13 \times 10^6$ psi) modulus, and elongation at break range from 4.2–6%. The fiber diameters range from 33–37 micrometer (0.00129 to 0.00146 inches). Heat treated filaments (conditioned under tension at 500° C. for 60 seconds in a nitrogen atmosphere) give average values of tensile strength 3.45 GPa ($5.0 \times 10^5$ psi), modulus 317 GPa ($46 \times 10^6$ psi), and elongation at break 1.8–2.4%. The heat treated fiber diameters range from 29.7–33.3 micrometer (0.00117 to 0.00133 inches).

EXAMPLE 118

The procedure of Example 13 is essentially repeated using 21.0018 g (0.09857 mol) of 1b and 16.3768 g (0.09858 mol) of 2a. The $P_2O_5$ content during dehydrochlorination is 75.16% for 8 hours and is increased to 81.37% by the addition of deaerated $P_2O_5$ for an additional 24 hours. The concentration of monomer 1b during dehydrochlorination is initially 21.94%. After the addition of 2a, $P_2O_5$ is added so as to raise the $P_2O_5$ content to 87.5% before polymerization and to give a $P_2O_5$ content after substantial polymerization of 83.17%. The mixture is then heated at 185° C. for 28 hours. The concentration of polymer $-BI-_n$ is 13.8 weight percent. The isolated polymer $-BI-_n$ has an intrinsic viscosity of 24.4 dL/g.

EXAMPLE 119

The reaction product from Example 118 is dry-jet-wet spun as in Example 117 except that the extrusion temperature is 70° C., the jet diameter is 0.254 mm (0.010 in.), the air gap is 20.3 cm (8 in.) and the required extrusion pressure is 1.17 MPa (170 psi). The average tensile strength of nine single filaments is 3.12 GPa (453,000 psi) which ranges from about 2.82 to about 3.35 GPa (410,000 to 486,000 psi). The average tensile modulus is 303 GPa ($43.9 \times 10^6$ psi). After treating this fiber at 450° C. in air for 30 seconds with a 2% stretch the strength is unchanged and the modulus has increased to an average of 410 GPa ($59.5 \times 10^6$ psi). Repeating these conditions with a 2.8% stretch give identical strength and a modulus of 394 GPa ($57.09 \times 10^6$ psi). After treating the as spun fiber at 500° C. in air for 30 seconds with a 2.5% stretch the tensile strength increases to an average of 3.58 GPa (519,000 psi) and the modulus increases to 467 GPa ($67.8 \times 10^6$ psi).

EXAMPLE 120

A mixture of 13.35 g of 115% PPA and 8.89 g of 85.9% $H_3PO_4$ is stirred under reduced pressure for 3.3 h at 100° C. To a 100-mL resin kettle is added 17.76096 g (0.09368 mol) of 3-amino-4-hydroxybenzoic acid hydrochloric (3d). The kettle is flushed with argon, and 20.45 g of the above PPA ($P_2O_5$ content=75.2%) is added. This mixture is stirred under reduced pressure; however, the mixture solidifies overnight. 115% PPA (8.20 g, $P_2O_5$ content=83.8%) is added to obtain a stirrable mixture with a $P_2O_5$ content of 77.6%. After 8 h, 10.17 g of $P_2O_5$ is added as a powder, giving a $P_2O_5$ content of 83.49%. Dehydrochlorination is substantially complete after stirring for an additional 15 h at 80° C. Additional $P_2O_5$ (12.65 g) is then added at 100° C. in accordance with equation b* to give a $P_f$ of 82.2% and an intermediate $P_2O_5$ content of 87.55%. The kettle is placed under reduced pressure before incorporating the $P_2O_5$ by stirring. The mixture is then stirred for 2.4 h at 100° C., and the temperature is increased to 140° C. After 1 h at this temperature, a clear amber solution is obtained. The temperature is raised to 150° C. for 1 h and then raised to 185° C. After 1 h at 185° C., the reaction mixture shows a tan pearlescence when stirred and is birefringent when viewed at rest under crossed polars. The reaction mixture is then heated at 185° C. for an additional 40 h. Nearly colorless, high strength fibers are readily formed by drawing the reaction product. The concentration of polymer $-(-V-)_n$ in the product is calculated to be 16.67%. The intrinsic viscosity of polymer $-(-V-)_n$ isolated from the product is measured to be 13.84 dL/g in MSA at 30° C. The dried polymer has a TGA break in air at 10° C./min of 640° C. Anal. Calcd. for $C_7H_3NO$: C, 71.80; H, 2.58; N, 11.96. Found: C, 71.09; H, 2.64; N, 11.67; Residue, 0.8.

EXAMPLE 121

The reaction mixture of Example 120 is placed in a constant displacement spinning apparatus and extruded at about 3.4 MPa (500 psi) through a 0.381 mm (0.015 in.) diameter orifice into a 31.75 cm (12.5 in.) air gap with a take-up rate to supply a spin draw ratio of 6.6:1. The temperature of the spinning dope is 65° C. The as spun fiber is of poor quality and very non-uniform. The as-spun properties are ($340 \times 10^3$ psi) tensile strength, 41.3–96.5 GPa ($6–14 \times 10^6$ psi) modulus, with no elongation to break determined. After heat treatment under tension at 500° C. for 60 seconds in nitrogen, the strength is essentially unchanged and the modulus has increased to an average value of 136 GPa ($19.7 \times 10^6$ psi).

EXAMPLE 122

The procedure of Example 120 is essentially repeated using 80.95 g (0.4269 mol) of monomer 3d, 34.37 g of 85.9% $H_3PO_4$, 80.13 g of 115% PPA and 118.06 g of $P_2O_5$. These amounts give a $P_i$ of 77.32%, an intermediate $P_2O_5$ content of 88.83%, and (because of the loss of 1.54 g of water during polycondensation) a $P_f$ of 83.8%. The $P_2O_5$ content profile for this example is graphically presented by the step-wise curve of FIG. 13. The concentration of polymer $-(-V-)_n$ in the reaction product is calculated to be 16.87 weight %. The total reaction time above 100° C. is 43.5 hours. The stir-opalescent reaction product is birefringent at rest and give colorless fibers after drawing and precipitating in water. The intrinsic viscosity of isolated polymer $-(-V-)_n$ is 12.0 dL/g.

EXAMPLE 123

The reaction product of Example 122 is placed in a constant displacement spinning apparatus and extruded at about 3.4 MPa (500 psi) through a 0.25 mm (0.010 in.) diameter orifice into a 20.3 cm (8 in.) air gap with a take up rate to supply a spin draw ratio of 145:1. The temperature of the spinning dope is 90° C. The tensile strength of fibers (average of nine breaks) spun from said dope is 3.57 GPa (518,000 psi).

The average tensile modulus is 133 GPa (19.3×10$^6$ psi). This value does not take into account the machine compliance. The average strain at break is 3.3%. The fiber diameter is 16 micrometers (0.630×10$^{-3}$ in.).

EXAMPLE 124

The reaction product of Example 122 is placed in a constant displacement spinning apparatus and extruded at about 3.4 MPa (500 psi) through a 0.250 mm (0.010 in.) diameter orifice into a 20.3 cm (8 in.) air gap with a take up rate to supply a spin draw ratio of 125:1. The temperature of the spinning dope is 90° C. The tensile strength of fibers (average of ten breaks) spun from said dope is 2.57 GPa (373,000 psi).

The average tensile modulus is 79 GPa (11.5×10$^6$ psi). This value does not take into account the machine compliance. The average strain at break is 4.5%. The fiber diameter is 19 micrometers (0.748×10$^{-3}$ in.).

EXAMPLE 125

The reaction product of Example 122 is placed in a constant displacement spinning apparatus and extruded at about 3.4 MPa (500 psi) through a 0.25 mm (0.010 in.) diameter orifice into a 20.3 cm (8 in.) air gap with a take up rate to supply a spin draw ratio of 100:1. The temperature of the spinning dope is 90° C. The tensile strength of fibers (average of seven breaks) spun from said dope is 2.83 GPa (410,000 psi).

The average tensile modulus is 61 GPa (8.8×10$^6$ psi). This value does not take into account the machine compliance. The average strain at break is 4.8%. The fiber diameter is 21 micrometer (0.827×10$^{-3}$ in.).

EXAMPLE 126

The reaction product of Example 122 is placed in a constant displacement spinning apparatus and extruded at about 3.4 MPa (500 psi) through a 0.025 mm (0.010 in.) diameter orifice into a 20.3 cm (8 in.) air gap with a take up rate to supply a spin draw ratio of 17.2:1. The temperature of the spinning dope is 80° C. The tensile strength of fibers (average of seven breaks) spun from said dope is 2.76 GPa (400,000 psi). The average tensile modulus is 41 GPa (6.0×10$^6$ psi). This value does not take into account the machine compliance. The fiber diameter is 45 micrometer (1.76×10$^{-3}$ in.).

EXAMPLE 127

Poly-2,5-pyridinebenzobisoxazole

A mixture of 13.25 g of concentrated orthophosphoric acid (85.9% $H_3PO_4$) and 29.75 g of 115% PPA is stirred under reduced pressure at 100° C. for 2.5 hours. The resulting solution is then poured under a stream of argon at 20° C. into a 100 ml resin kettle containing 10.8621 g (0.050980 mol) of 4,6-diamino-1,3-benzenediol dihydrochloride (1b) that was prepared according to the method of Wolfe, et al., *Macromolecules*, Vol. 14, 909 (1981), recrystallized from aqueous hydrochloric acid containing 3 wt% stannous chloride, and dried for 72 hours at 20° C. under reduced pressure immediately before use. The mixture is stirred at 55° C. for 18 hours, at 76° C. for 24 hours under reduced pressure. 2,5-pyridinedicarboxylic acid (2i) (8.5720 g, 0.050984 mol) is then added under argon flow. Additional $P_2O_5$ (31.18 g) is then added. The solution is stirred, and heated as follows: 100° C. for 1 hour; 120° C. for 3 hours; 130° C. for 0.5 hours; 140° C. for 0.5 hours; 150° C. for 0.5 hours; 185° C. for 48 hours (the dark red solution becomes stir-opalescent during the first hour of this last period). The resulting product is deep red with a metallic luster, exhibits stir-opalescence, and is further characterized as having a final effective $P_2O_5$ content of 84% with the ${-\!\!+\!\!BK\!\!+\!\!-}_n$ polymer concentration being 13.4% by weight. The intrinsic viscosity of the polymer ${-\!\!+\!\!BK\!\!+\!\!-}_n$ is isolated from the reaction product is 4.96 dL/g in MSA at 30° C., which corresponds to an average number of recurring units, n, of approximately 50.

EXAMPLE 128

The reaction products from Examples 27 and 120 are precipitated in water and the polymers obtained (polymers ${-\!\!+\!\!T\!\!+\!\!-}_n$ and ${-\!\!+\!\!V\!\!+\!\!-}_n$, respectively) are chopped in a Waring Blender and dried. The reaction product from Example 12 is dry-jet wet spun into fiber (polymer ${-\!\!+\!\!AI\!\!+\!\!-}_n$) and dried. All of the precipitated polymers and spun fiber of Examples 12, 27, and 120 including as spun fiber (polymer ${-\!\!+\!\!BI\!\!+\!\!-}_n$) produced in Example 117 are tested as follows: the precipitated polymers and spun fibers are placed in four of the ten positions in an isothermal aging apparatus developed by SRL Laboratories of Dayton, Ohio and heated at 371° C. in circulating air for 200 hours. The apparatus has ten positions and the weight remaining in each of the positions is recorded at 20 minute intervals. Each of the polymer samples loses approximately 14% of their original weight initially indicating the presence of residual volatile species (e.g. water). The weight losses due to isothermal aging of the individual polymers (after the initial weight loss) are as follows:

| Polymer | Wt % Loss |
| --- | --- |
| ${-\!\!+\!\!V\!\!+\!\!-}_n$ | 8.0 |
| ${-\!\!+\!\!BI\!\!+\!\!-}_n$ | 12.0 |
| ${-\!\!+\!\!T\!\!+\!\!-}_n$ | 23.0 |
| ${-\!\!+\!\!AI\!\!+\!\!-}_n$ | 27.0 |

The results are shown graphically in FIGS. 1 and 2.

EXAMPLE 129

The samples described in Example 128 are analyzed in a Du Pont 990 Thermogravimetric Analyzer at a heating rate of 5° C./min. The weight retention in He and air atmospheres (flow rate=60 ml/min) as a function of temperature is shown for the four polymers in FIGS. 3, 4 (in He) and 5, 6 (in air). The isothermal aging (see FIGS. 1 and 2) of all four polymers of Example 128 show a marked improvement especially for polymers ${-\!\!+\!\!V\!\!+\!\!-}_n$, and ${-\!\!+\!\!BI\!\!+\!\!-}_n$. Polymer ${-\!\!+\!\!BI\!\!+\!\!-}_n$ can be compared directly with Wolfe and Loo U.S. Pat. No. 4,225,700. The improvement is presumed to be caused by the increase in molecular weight and/or the more highly ordered morphology of the resulting polymers/fibers formed from compositions of the invention. Thermogravimetric analysis in air (at a heating rate of 10° C./min) are also preformed on two block polymers of the instant invention; these block polymers are isolated and dried from the reaction products of Example 73 and 74. The results of the TGA are shown in FIG. 2A.

EXAMPLE 130

A mixture of 173.59 g of concentrated orthophosphoric acid (85.5% $H_3PO_4$) and 414.71 g of 115% PPA is stirred under reduced pressure for 2 hours. The resulting solution is then poured at approximately 30° C. under an argon stream into a 2 L resin kettle containing 118.70422 g (0.557127 mol) of 4,6-diamino-1,3-benzenediol dihydrochloride (1b) that was prepared according to the method of Wolfe and Arnold, *Macromolecules*, vol. 14, 909 (1981), recrystallized from aqueous hydrochloric acid containing 3 wt % stannous chloride, and dried for 3.5 days at 20° C. under reduced pressure immediately before use. The mixture is stirred at 60° C. for 48 hours and 80° C. for 6 hours under reduced pressure. Monomer 2a (92.55800 g, 0.55713 mol) is then added under argon flow. Deaerated $P_2O_5$ (404.45 g) is added. The mixture is then heated at 100° C. for 18 hours, and 185° C. for 29 hours. The dark blue-black solution becomes stir-opalescent after 1.5 hours at 185° C. The reaction product is deep purple with a metallic luster, exhibits stir-opalescence, and is further characterized as having a final effective $P_2O_5$ content of 83.2%, with the $\{BI\}_n$ polymer concentration being 11.3% by weight. The intrinsic viscosity of the polymer $\{BI\}_n$ isolated from the reaction product is 20.4 dL/g in MSA at 30° C., which corresponds to an average number of recurring units, n, of approximately 100.

EXAMPLE 131

The reactor used for the preparation of polymer $\{AI\}_n$ of this Example is constructed with all wetted parts made of Hastelloy C-276. The working volume is 115 L (30 gal). Mixing is provided by four vertical, stationary baffles attached to the reactor lid and a rotating assembly with four vertical members. The rotating assembly is driven by a 5 hp-2.5 hp two-speed motor and has a bearing and seal at top and bottom. The reactor is charged with 13.4888 kg (55.0129 mol) of monomer 1a and then with 49.1 kg of a PPA prepared from 19.64 kg of 85.8% $H_3PO_4$ and 29.46 kg of 115% PPA. The reactor is then heated to 60° C. within 1 hour and placed under reduced pressure for 20 hours. The $P_2O_5$ content is then raised to 78.5% by the addition of 7.751 kg of $P_2O_5$ over a 2-hour period, which causes the temperature to rise spontaneously to 92° C. After cooling to 68° C., an additional 5.647 kg of $P_2O_5$ is added in 30 minutes, causing the temperature to rise to 84° C. The mixture is stirred at 80° C. under reduced pressure for an additional 17 hours, at which time all the HCl appears to have been evolved. Monomer 2a (9.1396 kg, 55.015 mol) is then added in four portions. Each portion is added under reduced pressure by first adding the monomer to a 12 L addition bulb, placing both the reactor and bulb under reduced pressure, and then opening a ball valve between the two chambers. Additional $P_2O_5$ (26.296 kg) is then added in two portions according to equation b* to give an intermediate $P_2O_5$ content of 86.26% and a final $P_2O_5$ content of 82.57%. The reaction mixture is then stirred at slow speed overnight at 100°-112° C. under an argon atmosphere. Using the faster stirring speed, the mixture is then heated, and samples removed for intrinsic viscosity determinations according to the following schedule:

| Reaction Time minutes | Reaction Temperature °C. | $\{AI\}$, dL/g |
|---|---|---|
| 0–12 | 103–112 | |
| 20 | 127 | |
| 27 | 140 | |
| 42 | 159 | |
| 60 | 172 | |
| 73 | 180 | |
| 87 | 183 | |
| 100 | 185 | 7.83 |
| 120 | 185 | 15.33 |
| 135 | 187 | 17.77 |
| 149 | 186 | 20.18 |
| 165 | 184 | 21.80 |
| 183 | 179 | |

The reaction mixture is then cooled to 110° C. over a period of four hours, at which time the intrinsic viscosity is 24.6 dL/g. The green, opalescent product is then reheated to 130° C. and removed from the reactor for spinning. A sample taken at the end of the removal is measured to have an intrinsic viscosity of 27.26 dL/g. A small sample is heated at 185° C. for an additional 24 hours, and the intrinsic viscosity rises to 34.11 dL/g.

EXAMPLE 132

A mixture of 34.97 g of PPA (83.8%) and 15.00 g of $H_3PO_4$ is stirred and heated to 100° C. in a 100-ml 3-necked flask. The flask is placed under reduced pressure for 2.0 hours. To a 100-ml resin kettle is added 21.32 g of 3,4-diaminobenzoic acid.2HCl. The flask is deaerated and flushed with argon. 33.84 g of the above prepared PPA solvent (having a $P_2O_5$ content of 77.32%) is added to the kettle. The kettle is heated with an oil bath at 50° C. with moderate stirring under water-aspirator reduced pressure for 1.0 hour. The flask is then placed under vacuum-pump reduced pressure for an additional 46.83 hours. The temperature remains at 50° C. for 18.0 hours, at 60° C. for 1.77 hours, at 70° C. for 23.81 hours, and at 80° C. for 4.25 hours. At the time the vacuum is removed, the mixture is riding on the stir blades. Near the end of dehydrochlorination, the mixture is still opaque and the color is mint green. The $P_2O_5$ is added as a powder in two additions. The first addition of $P_2O_5$ is in the amount of 6.93 g. The $P_2O_5$ is added under argon at 80° C. with stirring. The $P_2O_5$ is incorporated under reduced pressure. Reduced pressure is maintained for 18.57 hours. The remaining 14.00 g of $P_2O_5$ are added and incorporated under reduced pressure with stirring at 80° C. (Total $P_2O_5 = 20.93$ g.) The amount of $P_2O_5$ added is calculated to provide the reaction mixture with an effective $P_2O_5$ content of approximately 85.99% prior to the beginning of polymerization and an effective $P_2O_5$ content of approximately 80.94% subsequent to substantially complete polymerization. The mixture is heated to a final temperature of 200° C. following the heating schedule outlined below.

| Temperature (°C.) | Time (Hours) | Observations |
|---|---|---|
| 90 | 0.73 | |
| 110 | 0.63 | Foamy; darker green; vacuum removed. |
| 120 | 0.72 | Pea-soup green; more fluid; clearing. |
| 130 | 0.88 | |
| 142 | 0.50 | |
| 152 | 0.17 | Mixture clearer with small particles present. |
| 161 | 0.27 | Mixture full of bubbles. |
| 169 | 0.45 | |
| 182 | 0.83 | |
| 200 | 20.79 | |

A sample of the reaction product is stretchable, fibrous, and turns white as it is drawn. The fiber is precipitated in water. The fiber and a nonprecipitated sample are birefringent at rest at room temperature under crossed polars. The clear green dope appears hazy as it is cooled. The intrinsic viscosity of the reaction product is 6.58 dL/g in MSA at 30° C. and the polymer concentration is 15.90%. The polymer obtained is of the following structure:

EXAMPLE 133

A mixture of 14.71 g of concentrated orthophosphoric acid (85.9% $H_3PO_4$) and 22.64 g of 115% PPA is stirred under reduced pressure at 100° C. for 2.5 hours. The resulting solution is then poured at approximately 25° C. under a stream of Argon into a 100 ml resin kettle containing 11.04664 g (0.045053 mol) of 2,5-diamino-1,4-benzenedithiol dihydrochloride (1a). The mixture is stirred under reduced pressure at 50° C. for 2 hours; 60° C. for 16 hours, and 80° C. for 12.5 hours to complete the dehydrochlorination. Monomer 2a (7.4863 g, 0.045001 mol) is then added under an Ar flow. $P_2O_5$ (48.29 g) is then added. The mixture is heated at 100° C. for 3 hours and at 185° C. for 33 hours. The resulting reaction product is light green with an iridescent luster, exhibited stir-opalescence, and is further characterized as having a final effective $P_2O_5$ content of 83.6% with the $-[AI]-_n$ polymer concentration being 11.6 wt %. The intrinsic viscosity of the polymer $-[AI]-_n$ isolated from the reaction product is 47.8 dL/g in MSA at 30° C., which corresponds to an average number of recurring units, n, of approximately 140.

The physical properties of as spun and heat treated fibers formed from compositions of Examples 117, 119, 121, 123, 124, 125, and 126 above are shown in Tables 29 and 30 below.

TABLE 29

| | EXAMPLES | | | |
|---|---|---|---|---|
| | $-[BI]-_n$ | $-[BI]-_n$ | $-[V]-_n$ | $-[V]-_n$ |
| | Example No.: | | | |
| CONDITION | 117 | 119 | 121 | 123 |
| Polymer dope | | | | |
| 1. Intrinsic Viscosity (dL/g) | 23.9 | 24.4 | 13.8 | 12.0 |
| 2. $P_2O_5$ Content (%) | 82.3 | 83.2 | 82.2 | 83.8 |
| 3. Polymer Concentration (%) | 13.3 | 13.8 | 16.7 | 16.9 |
| Spinning Conditions | | | | |
| 4. Spin Draw Ratio | 6.1:1 | 53:1 | 6.6:1 | 145:1 |
| 5. Spin Temperature (°C.) | 63 | 70 | 65 | 90 |
| 6. Air Gap Distance (cm) | 21 | 20.3 | 31.7 | 20.3 |
| 7. Jet Diameter (mm) | 0.381 | 0.25 | 0.381 | 0.25 |
| 8. Dope pressure (MPa) | *2 | 1.17 | *3.4 | *3.4 |
| As Spun Fiber Properties | | | | |
| 9. Tensile Strength (GPa) | 2.96 | 3.12 | 2.34 | 3.57 |
| 10. Single break Tensile Strength (GPa) -highest value | — | — | — | 5.01 |
| 11. Modulus (GPa) | 89.6 | 303 | 41–96 | 133 |
| 12. Elongation % | 4.2–6 | — | — | 3.3 |
| 13. Fiber diameter (micrometer) | 33 | — | 37–76 | 16 |
| Heat Treatment Conditions | | | | |
| 14. Temperature (°C.) | 500 | 450 | 500 | — |
| 15. Time (seconds) | 60 | 30 | 60 | — |
| 16. Stretch factor (%) | — | 2 | 7.5 | — |
| 17. Atmosphere condition | Nitrogen | Air | Nitrogen | — |
| Post Heat Treatment Fiber Properties | | | | |
| 18. Tensile Strength (GPa) | 3.45 | 3.07 | 2.34 | — |
| 19. Modulus (GPa) | 317 | 410 | 136 | — |
| 20. Elongation (%) | 1.8–2.4 | — | — | — |
| 21. Fiber Diameter (micrometer) | 31.4 | — | — | — |
| 22. Visual | uniform | non-uniform | — | — |

*denotes approximate values

TABLE 30

| | EXAMPLES | | |
|---|---|---|---|
| | $-[V]-_n$ | $-[V]-_n$ | $-[V]-_n$ |
| | Example No.: | | |
| CONDITIONS | 124 | 125 | 126 |
| Polymer dope | | | |
| 1. Intrinsic Viscosity (dL/g) | 12.0 | 12.0 | 12.0 |
| 2. $P_2O_5$ Content (%) | 83.8 | 83.8 | 83.8 |
| 3. Polymer Concentration (%) | 16.9 | 16.9 | 16.9 |
| Spinning Conditions | | | |
| 4. Spin Draw Ratio | 125:1 | 100:1 | 17.2:1 |
| 5. Spin Temperature (°C.) | 90 | 90 | 80 |
| 6. Air Gap Distance (cm) | 20.3 | 20.3 | 31.7 |
| 7. Jet Diameter (mm) | 0.25 | 0.25 | 0.25 |
| 8. Dope pressure (MPa) | *3.4 | *3.4 | *3.4 |
| As Spun Fiber Properties | | | |
| 9. Tensile Strength (GPa) | 2.57 | 2.83 | 2.76 |
| 10. Single break Tensile Strength (GPA)-highest value | 3.38 | 3.29 | — |
| 11. Modulus (GPa) | 79 | 61 | 41 |
| 12. Elongation (%) | 4.6 | 4.8 | — |
| 13. Fiber diameter (micrometer) | 19 | 21 | 45 |
| Heat Treatment Conditions | | | |
| 14. Temperature (°C.) | 450 | 400 | 500 |
| 15. Time (seconds) | 30 | 30 | 30 |
| 16. Stretch factor (%) | 4.37 | 4.37 | 1.28 |
| 17. Atmosphere condition | Nitrogen | Nitrogen | Nitrogen |
| Post Heat Treatment Fiber Properties | | | |
| 18. Tensile Strength (GPa) | 2.85 | 3.34 | 2.62 |
| 19. Single break Tensile Strength (GPA)-highest value | 4.94 | 3.76 | 3.00 |
| 20. Modulus (GPa) | 119 | 115 | 144 |
| 21. Elongation (%) | 2.5 | 3.6 | 2.2 |

TABLE 30-continued

| | EXAMPLES | | |
|---|---|---|---|
| | $\{V\}_n$ | $\{V\}_n$ | $\{V\}_n$ |
| | Example No.: | | |
| CONDITIONS | 124 | 125 | 126 |
| 22. Fiber Diameter (micrometers) | 19.15 | — | 42.7 |

*denotes approximate values

EXAMPLE 134

40.6 g of a PPA solution with an effective $P_2O_5$ content of 77.1% (prepared by mixing 39 wt% of $H_3PO_4$ and 61 wt% of 115% PPA) is added to a 100 mL resin kettle containing 11.0444 g 0.045043 mol) of 1a. (Monomer 1a of large crystal size is prepared with a final recrystallization according to the method of Wolfe, Loo, and Arnold, *Macromolecules*, 14, 915 (1981) using the final isolation procedure involving a transfer of the dipotassium salt of monomer 1a as solution into 6N hydrochloric acid.) After stirring to incorporate the solid monomer into the PPA, the mixture is substantially dehydrochlorinated by heating the mixture at 55°–70° C. under reduced pressure for approximately 22 h. Monomer 2a (7.4851 g, 0.045054 mol) is added to the resin kettle and incorporated as described in Example 7. Powdered $P_2O_5$ (37.09 g) is then added to increase the effective $P_2O_5$ content to approximately 88.4% and resulting mixture is stirred at 100° C. for 16 h under an argon flow. The polymerization mixture is then heated with stirring as follows: 100°–185° C. in 1 h, and 185° C. for 75 h. (a total of 0.34 g of water is lost during dehydrochlorination and polymerization). The green reaction product exhibits stir-opalescence and is characterized as having a final effective $P_2O_5$ content of 84.8% with $\{AI\}_n$ polymer concentration being approximately 12.9 wt%. The intrinsic viscosity of the polymer $\{AI\}_n$ isolated from the reaction product is 30.0 dL/g in MSA at 30° C. which corresponds to an average number of recurring units, n, of approximately 115.

EXAMPLE 135

39.42 g of a PPA solution with an effective $P_2O_5$ content of 75.9% (prepared by mixing 39 wt% of $H_3PO_4$ and 61 wt% of 115% PPA) is added to a 100 mL resin kettle containing 11.0143 g (0.044921 mol) of 1a. (Monomer 1a is taken from the same batch as the 1a used in Example 134). After stirring to incorporate the solid monomer into the PPA, the mixture is substantially dehydrochlorinated by heating the mixture at 55°–70° C. under reduced pressure for approximately 17 h. Monomer 2a (7.2769 g, 0.043801 mol) is added to the resin kettle and incorporated as described in Example 7. Benzoic acid (Matheson primary standard 0.2734 g, 0.002239 mol) is then added under a stream of argon and incorporated under reduced pressure. Powdered $P_2O_5$ (36.02 g) is then added to increase the effective $P_2O_5$ content to approximately 88.6% and the resulting mixture is stirred at 100° C. for 18 h under an argon flow. The polymerization mixture is then heated with stirring at 100°–185° C. for 0.3 h, then at 185° C. for 5.8 h. A total of 1.24 g of water is lost during dehydrochlorination and polymerization. The green reaction product exhibits stir-opalescence and is characterized as having a final effective $P_2O_5$ content of 84.9% with $\{AI\}_n$ polymer concentration being approximately 13.3 wt%. The intrinsic viscosity of the end-capped polymer $\{AI\}_n$ isolated from the reaction product is 7.5 dL/g in MSA at 30° C. which corresponds to an average number of recurring units, n, of approximately 50.

EXAMPLE 136

60.7 kg of a PPA solution with an effective $P_2O_5$ content of 75.5% (prepared by mixing 37 wt% of $H_3PO_4$ and 63 wt% of 115%P PA) is added to a 30 gal Hastelloy reactor containing 18.75 kg (76.47 mol) of 1a. (Monomer 1a is then taken from the same batch as the 1a used in Example 134). After stirring to incorporate the solid monomer into the PPA, the mixture is substantially dehydrochlorinated by heating the mixture at 55°–70° C. under reduced pressure for approximately 84 h. Monomer 2a (12.61 kg, 75.94 mol) is added to the resin kettle and incorporated. Benzoic acid (Matheson primary standard, 130.74 g, 1.0706 mol) is also added and incorporated. Powdered $P_2O_5$ (49.86 kg) is then added to increase the effective $P_2O_5$ content to approximately 86.6% and resulting mixture is stirred at 100° C. for 24 h under an argon flow. The polymerization mixture is then heated with stirring as follows: 100°–185° C. in 2 h, and 185° C. for 42 h. The intrinsic viscosities (in dL/g) are determined for the end-capped polymer $\{AI\}_n$ from samples withdrawn at the indicated times: 1.6 (1.8 h), 11.16 (2.2 h), 14.05 (2.4 h), 17.17 (2.8 h), 18.51 (3.5 h), and 18.66 (42 h) (as shown in FIG. 15). A total of 7.0 g of water is lost during dehydrochlorination and polymerization. The green reaction product exhibits stir-opalescence and is characterized as having a final effective $P_2O_5$ content of 82.5% with $\{AI\}_n$ polymer concentration being approximately 14.9 wt%.

EXAMPLE 137

38.66 g of a PPA solution with an effective $P_2O_5$ content of 75.3% (prepared by mixing 40 wt% of $H_3PO_4$ and 60 wt% of 115% PPA) is added to a 100 mL resin kettle containing 11.0493 g (0.045063 mol) of 1a. (Monomer 1a is taken from the same batch as the 1a used in Example 134). After stirring to incorporate the solid monomer into the PPA, the mixture is substantially dehydrochlorinated by heating the mixture at 55°–70° C. under reduced pressure for approximately 31 h. Monomer 2a (7.4543 g, 0.044869 mol) is added to the resin kettle and incorporated. Powdered $P_2O_5$ (36.73 g) is then added to increase the effective $P_2O_5$ content to approximately 86.4% and the resulting mixture is stirred at 100° C. for 2.5 h under an argon flow. The polymerization mixture is then heated with stirring 100°–185° C. in 0.3 h, then was quickly cooled to 100° C. Benzoic acid (Matheson primary standard 0.0478 g, 0.000391 mol) is then added and incorporated under reduced pressure. The mixture is stirred under an argon atmosphere at 100° C. for 15.3 h, then is heated to 185° C. over 0.3 h, and at 185° C. for 74 h. A total of 0.5 g of water is lost. The reaction product exhibits stir-opalescence and is characterized as having a final effective $P_2O_5$ content of 84.1% with $\{AI\}_n$ polymer concentration being approximately 13.3 wt%. The intrinsic viscosity of the end-capped polymer $\{AI\}_n$ isolated from the reaction product is 24.2 dL/g in MSA at 30° C. which corresponds to an average number of recurring units, n, of approximately 90.

EXAMPLE 138

The procedure of Example 13 is essentially repeated with the following modifications. Instead of the molar amounts of 2a given in Example 13, 8.7066 g, 0.05241 mols of 2a is added. Benzoic acid (Matheson primary standard, 0.3959 g, 0.003242 mol) is then added under a stream of argon and incorporated under reduced pressure.

The resulting reaction product is characterized as having a final effective $P_2O_5$ content of 82% with the $-\!\!+\!BI\!\!+\!\!_n$ polymer concentration being 13.3% by weight. The intrinsic viscosity of the end-capped polymer $-\!\!+\!BI\!\!+\!\!_n$ isolated from the reaction product is 6 dL/g in MSA at 30° C., which corresponds to an average number of recurring units, n, of approximately 50.

EXAMPLE 139

The procedure of Example 13 is essentially repeated with the following modifications. Instead of the molar amounts of 2a given in Example 13, 8.8412 g, 0.05322 mol of 2a is added. Benzoic acid (Matheson primary standard, 0.1979 g, 0.001621 mol) is then added under a stream of argon and incorporated under reduced pressure.

The resulting reaction product is characterized as having a final effective $P_2O_5$ content of 82% with the $-\!\!+\!BI\!\!+\!\!_n$ polymer concentration being 13.3% by weight. The intrinsic viscosity of the end-capped polymer $-\!\!+\!BI\!\!+\!\!_n$ isolated from the reaction product is 15 dL/g in MSA at 30° C., which corresponds to an average number of recurring units, n, of approximately 85.

EXAMPLE 140

The procedure of Example 13 is essentially repeated with the following modifications. Instead of the molar amounts of 2a given in Example 13, 8.9534 g, 0.05389 mols of 2a was added. Benzoic acid (Matheson primary standard, 0.0330 g, 0.2701 mmol) was then added under a stream of argon and incorporated under reduced pressure.

The resulting reaction product is characterized as having a final effective $P_2O_5$ content of 82% with the $-\!\!+\!BI\!\!+\!\!_n$ polymer concentration being 13.3% by weight. The intrinsic viscosity of the end-capped polymer $-\!\!+\!BI\!\!+\!\!_n$ isolated from the reaction product is 20 dL/g in MSA at 30° C., which corresponds to an average number of recurring units, n, of approximately 100.

EXAMPLE 141

The procedure of Example 27 is essentially repeated with the following modification. After dehydrochlorination is substantially complete and the $P_2O_5$ is added, benzoic acid (Matheson primary standard, 1.6365 g, 0.01340 mol) is added under a stream of argon and incorporated under reduced pressure. The intrinsic viscosity of end-capped polymer $-\!\!+\!T\!\!+\!\!_n$ isolated from the reaction product is 5.2 dL/g. The reaction product thus obtained is 20.3% by weight of polymer $-\!\!+\!T\!\!+\!\!_n$ in PPA with a final $P_2O_5$ content of 82.4%.

EXAMPLE 142

The procedure of Example 27 is essentially repeated with the following modifications. After dehydrochlorination is substantially complete and the $P_2O_5$ is added, benzoic acid (Matheson primary standard, 0.8181 g, 6.699 mmol) is added under a stream of argon and incorporated under reduced pressure. The intrinsic viscosity of polymer $-\!\!+\!T\!\!+\!\!_n$ isolated from the reaction product is 10.2 dL/g. The reaction product thus obtained is 20.3% by weight of end-capped polymer $-\!\!+\!T\!\!+\!\!_n$ in PPA with a final $P_2O_5$ content of 82.4%.

EXAMPLE 143

The procedure of Example 27 is essentially repeated with the following modifications. After dehydrochlorination is substantially complete and the $P_2O_5$ is added, benzoic acid (Matheson primary standard, 0.1364 g, 1.117 mmol) is added under a stream of argon and incorporated under reduced pressure. The intrinsic viscosity of polymer $-\!\!+\!T\!\!+\!\!_n$ isolated from the reaction product is 16.4 dL/g. The reaction product thus obtained is 20.3% by weight of end-capped polymer $-\!\!+\!T\!\!+\!\!_n$ in PPA with a final $P_2O_5$ content of 82.4%.

EXAMPLE 144

The procedure of Example 30 is essentially repeated with the following modifications. After dehydrochlorination is substantially complete and the $P_2O_5$ is added, benzoic acid (Matheson primary standard, 3.1285 g, 25.62 mmol) is added under a stream of argon and incorporated under reduced pressure. The intrinsic viscosity of polymer $-\!\!+\!V\!\!+\!\!_n$ isolated from the reaction product is 4.0 dL/g. The reaction product thus obtained is 18% by weight of end-capped polymer $-\!\!+\!V\!\!+\!\!_n$ in PPA with a final $P_2O_5$ content of 82.2%.

EXAMPLE 145

The procedure of Example 30 is essentially repeated with the following modifications. After dehydrochlorination is substantially complete and the $P_2O_5$ is added, benzoic acid (Matheson primary standard, 1.5642 g, 12.81 mmol) is added under a stream of argon and incorporated under reduced pressure. The intrinsic viscosity of polymer $-\!\!+\!V\!\!+\!\!_n$ isolated from the reaction product is 9.6 dL/g. The reaction product thus obtained is 20.3% by weight of end-capped polymer $-\!\!+\!V\!\!+\!\!_n$ in PPA with a final $P_2O_5$ content of 82.2%.

EXAMPLE 146

The procedure of Example 30 is essentially repeated with the following modifications. After dehydrochlorination is substantially complete and the $P_2O_5$ is added, benzoic acid (Matheson primary standard, 0.2607 g, 2.135 mmol) is added under a stream of argon and incorporated under reduced pressure. The intrinsic viscosity of polymer $-\!\!+\!V\!\!+\!\!_n$ isolated from the reaction product is 14.2 dL/g. The reaction product thus obtained is 20.3% by weight of end-capped polymer $-\!\!+\!V\!\!+\!\!_n$ in PPA with a final $P_2O_5$ content of 82.2%.

EXAMPLE 147

The procedure of Example 135 is essentially repeated except that 0.08092 g, 1.348 mmol of glacial acetic acid is added instead of benzoic acid. The reaction product exhibits stir-opalescence and is characterized as having a final effective $P_2O_5$ content of 84.9% with end-capped $-\!\!+\!AI\!\!+\!\!_n$ polymer concentration being approximately 13.3 wt%. The intrinsic viscosity of the end-capped polymer isolated from the reaction product is 8 dL/g in MSA at 30° C.

EXAMPLE 148

The procedure of Example 138 is essentially repeated except that 0.09734 g, 1.621 mmol of glacial acetic acid is added instead of benzoic acid. The reaction product exhibits stir-opalescence and is characterized as having a final effective $P_2O_5$ content of 82% with end-capped $-\!\!+\!BI\!\!+\!\!_n$ polymer concentration being approximately 13.3 wt%. The intrinsic viscosity of the end-capped polymer isolated from the reaction product is 15 dL/g in MSA at 30° C.

EXAMPLE 149

The procedure of Example 142 is essentially repeated except that 0.4023 g, 6.699 mmol of glacial acetic acid is added instead of benzoic acid. The reaction product exhibits stir-opalescence and is characterized as having a final effective $P_2O_5$ content of 82.4% with end-capped $+T+_n$ polymer concentration being approximately 20.3 wt%. The intrinsic viscosity of the end-capped polymer isolated from the reaction product is 11 dL/g in MSA at 30° C.

EXAMPLE 150

The procedure of Example 145 is essentially repeated except that 0.7692 g, 12.81 mmol of glacial acetic acid is added instead of benzoic acid. The reaction product exhibits stir-opalescence and is characterized as having a final effective $P_2O_5$ content of 82.2% with end-capped $+V+_n$ polymer concentration being approximately 18 wt%. The intrinsic viscosity of the end-capped polymer isolated from the reaction product is 9 dL/g in MSA at 30° C.

EXAMPLE 151

182.7 g of a PPA solution with an effective $P_2O_5$ content of 77.2% (prepared by mixing 30 wt% of $H_3PO_4$ and 70 wt% of 115% PPA) is added to a 500 mL resin kettle containing 53.1448 g (0.2167 mol) of 1a. After stirring to incorporate the solid monomer into the PPA, the mixture is substantially dehydrochlorinated by heating the mixture at 55°–70° C. under reduced pressure for approximately 31 h. Monomer 2a (35.6522 g, 0.21460 mol) is added to the resin kettle and incorporated. Powdered $P_2O_5$ (123.35 g) is then added to increase the effective $P_2O_5$ content to approximately 86.4% and the resulting mixture is stirred at 100° C. for 17 h under an argon flow. The polymerization mixture is then heated with stirring as follows: 100°–185° C. in 1 h, then at 185° C. for 20 h. The reaction product exhibits stir-opalescence and is characterized as having a final effective $P_2O_5$ content of 82.2% with $+AI+_n$ polymer concentration being approximately 15.1 wt%. The intrinsic viscosity of the polymer $+AI+_n$ isolated from the reaction product is 7 dL/g in MSA at 30° C. which corresponds to an average number of recurring units, n, of approximately 50.

EXAMPLE 152

182.7 g of a PPA solution with an effective $P_2O_5$ content of 77.2% (prepared by mixing 30 wt% of $H_3PO_4$ and 70 wt% of 115% PPA) is added to a 500 mL resin kettle containing 52.7502 g (0.2151 mol) of 1a. After stirring to incorporate the solid monomer into the PPA, the mixture is substantially dehydrochlorinated by heating the mixture at 55°–70° C. under reduced pressure for approximately 31 h. Monomer 2a (35.6522 g, 0.21460 mol) is added to the resin kettle and incorporated. Powdered $P_2O_5$ (123.35 g) is then added to increase the effective $P_2O_5$ content to approximately 86.4% and the resulting mixture is stirred at 100° C. for 17 h under an argon flow. The polymerization mixture is then heated with stirring as follows: 100°–185° C. in 1 h, then at 185° C. for 23 h. The green reaction product exhibits stir-opalescence and is characterized as having a final effective $P_2O_5$ content of 82.2% with $+AI+_n$ polymer concentration being approximately 15.1 wt%.

The intrinsic viscosity of the polymer $+AI+_n$ isolated from the reaction product is 29 dL/g in MSA at 30° C. which corresponds to an average number of recurring units, n, of approximately 115.

EXAMPLE 153

A mixture of 17.7 g of concentrated orthophosphoric acid (85.7% $H_3PO_4$) and 26.6 g of 115% PPA is stirred under reduced pressure at 100° C. for 2 hours. The resulting solution is then poured at approximately 100° C. under a stream of argon into a 200 mL resin kettle containing 11.6265 g (0.05456 mol) of 4,6-diamino-1,3-benzenediol dihydrochloride (1b). The mixture is stirred at 53° C. for 15 h and 62° C. for 4 h under reduced pressure. Upon heating to 70° C., the monomer precipitates. Addition of 16.6 g of $P_2O_5$ results in redissolution of the monomer. The solution is then heated at 100° C. for 3 h under reduced pressure to complete the dehydrochlorination. Monomer 2a (8.9761g, 0.05403 mol) is then added under an argon flow. Additional $P_2O_5$ (19.0 g) is then added. The solution is then heated as follows: 100°–185° C. in 1 h, and 185° C. for 20 h. The resulting reaction product is deep purple with a metallic luster, exhibits stir-opalescence, depolarizes plane-polarized light as evidenced by strong birefringence when viewed between crossed polars, and is further characterized as having a final effective $P_2O_5$ content of 82% with the $+BI+_n$ polymer concentration being 13.3% by weight. The intrinsic viscosity of the polymer $+BI+_n$ isolated from the reaction product is 15 dL/g in MSA at 30° C., which corresponds to an average number of recurring units, n, of approximately 85.

EXAMPLE 154

The procedure of Example 51 is essentially repeated. Instead of adding 0.10134 mol of 2a, 16.667 g (0.10033 mol) are added and then 2.475 g (2.027 mmol) of benzoic acid are added and incorporated. After a heating schedule as in Example 51, the resulting end-capped copolymer isolated from the reaction product has an intrinsic viscosity of 17.2 dL/g in MSA at 30° C., which corresponds to an n value of approximately 85.

EXAMPLE 155

The procedure of Example 73 is essentially repeated with the following modification. In Step C, at the time of addition of the optically isotropic product from Step B is also added 0.025 mole percent (0.0103 g) of benzoic acid to stabilize the molecular weight of the resulting block polymer at an intrinsic viscosity of 16.5 dL/g in MSA at 30° C.

The following nonlimitive examples are given to further illustrate the invention, especially the effect of bulk viscosity on the conditions necessary for dehydrochlorination.

One of the parameters that contributes to the bulk viscosity of the dehydrochlorination mixture is the $P_2O_5$ content of the PPA employed. The empirical relationship minimum S/V shows the strong dependence of the minimum surface-to-volume ratio on the initial $P_2O_5$ content. This dependence is a direct result of the strong dependence of the viscosity on the $P_2O_5$ content.

Examples 156 through 191 illustrates the preparation of 100 grams of poly(benzo[1,2-d':5,4-d']bisoxazole-2,6-diyl)-1,4-phenylene) (PBO). 90.966 grams of 4,6-diamino-1,3-benzenediol dihydrochloride is added to a* grams of PPA having a $P_2O_5$ content of $P_i$ to form the dehydrochlorination mixture. In those examples where the selected $P_i$ is greater than that commercially or readily "available PPA" the monomer is added to the appropriate amount of available PPA and then add a sufficient amount of $P_2O_5$ to achieve the selected $P_i$. In this case the weight of the PPA employed upon mixing, a, is given by $$a^{} = a^*(P_i - 1)/(P_2O_5 \text{ content of available PPA} - 1)$$

and the amount of $P_2O_5$ to be added during the mixing procedure is given by $a^* - a^{**}$. The viscosity of the dehydrochlorination mixture is dependent on whether the PPA is equilibrated by prior heating above 100° C. or is a mixture of a PPA of lower $P_2O_5$ content and solid $P_2O_5$. The latter situation is preferred when the $P_i$ is greater than about 86% $P_2O_5$ because of the high viscosity of these PPAs.

In Examples 156 through 191, 70.932 grams of $P_2O_5$ (b* grams) is added when the dehydrochlorination is substantially complete. In those examples in which a monofunctional reactant is employed the indicated mole percent (based on 4,6-diamino-1,3-benzenediol dihydrochloride) is also added, and the amount of terephthalic acid is reduced by half of the moles of nonofunctional reactant used.

Examples 192 through 227 illustrates the preparation of 100 grams of poly(benzo[1,2-d':4,5-d']bisthiazole-2,6-diyl)-4-phenylene) (PBT). 92.062 grams of 2,5-diamino-1,4-benzenedithiol dihydrochloride is added to a* grams of PPA having a $P_2O_5$ content of $P_i$ to form the dehydrochlorination mixture. The same considerations in the preparation of high $P_2O_5$ content $P_i$'s as given for Examples 156–191 are employed in these Examples.

When the maximum solubility listed in the Example exceeds the actual concentration in the Example this indicates that the monomer is only partially soluble at the initial $P_2O_5$ content and thus dehydrochlorination will proceed with the advantages of the lower viscosity of the low $P_2O_5$ content PPA, but the $P_2O_5$ content must be incrementally increased by the addition of $P_2O_5$ (which has the effect of increasing the solubility and decreasing the actual concentration) to the value of the intermediate $P_2O_5$ content, $P_m$, during the dehydrochlorination step.

| | Examples | | | | | | | | | | | | | | | | | | |
|---|---|---|---|---|---|---|---|---|---|---|---|---|---|---|---|---|---|---|---|
| | 156 | 157 | 158 | 159 | 160 | 161 | 162 | 163 | 164 | 165 | 166 | 167 | 168 | 169 | 170 | 171 | 172 | 173 | 174 |
| $P_c$, wt fraction | 0.15 | 0.15 | 0.15 | 0.15 | 0.15 | 0.15 | 0.15 | 0.15 | 0.15 | 0.15 | 0.125 | 0.1 | 0.075 | 0.05 | 0.13 | 0.13 | 0.13 | 0.13 | 0.13 |
| $P_f$, wt fraction | 0.84 | 0.84 | 0.84 | 0.84 | 0.84 | 0.84 | 0.84 | 0.84 | 0.84 | 0.83 | 0.83 | 0.83 | 0.83 | 0.83 | 0.82 | 0.82 | 0.82 | 0.82 | 0.82 |
| $P_m$, wt fraction | 0.888 | 0.888 | 0.888 | 0.888 | 0.888 | 0.888 | 0.888 | 0.888 | 0.888 | 0.878 | 0.868 | 0.859 | 0.851 | 0.844 | 0.860 | 0.860 | 0.860 | 0.860 | 0.860 |
| $P_b$, wt fraction | 0.888 | 0.858 | 0.828 | 0.798 | 0.768 | 0.738 | 0.708 | 0.678 | 0.648 | 0.878 | 0.868 | 0.859 | 0.851 | 0.844 | 0.860 | 0.830 | 0.800 | 0.770 | 0.740 |
| $a^*$, grams of PPA[l] | 535.891 | 422.482 | 348.690 | 296.842 | 258.418 | 228.801 | 205.274 | 186.135 | 170.260 | 535.891 | 669.224 | 869.224 | 1202.557 | 1869.224 | 638.455 | 526.099 | 447.370 | 389.137 | 344.318 |
| $b^*$, grams of $P_2O_5$[l] | .000 | 113.409 | 187.201 | 239.048 | 277.473 | 307.090 | 330.616 | 349.756 | 365.630 | .000 | .000 | .000 | .000 | .000 | .000 | 112.356 | 191.085 | 249.318 | 294.137 |
| $a^*/(a^* + b^*)$ | 1.000 | 0.788 | 0.651 | 0.554 | 0.482 | 0.427 | 0.383 | 0.347 | 0.318 | 1.000 | 1.000 | 1.000 | 1.000 | 1.000 | 1.000 | 0.824 | 0.701 | 0.609 | 0.539 |
| First Monomer conc (wt %) | 14.511 | 17.717 | 20.690 | 23.456 | 26.036 | 28.448 | 30.707 | 32.828 | 34.823 | 14.511 | 11.966 | 9.474 | 7.032 | 4.641 | 12.471 | 14.742 | 16.898 | 18.947 | 20.898 |
| Maximum solubility[m] | 23.31 | 22.08 | 20.96 | 19.93 | 18.99 | 18.13 | 17.35 | 16.63 | 15.97 | 22.86 | 22.47 | 22.12 | 21.81 | 21.52 | 22.13 | 21.00 | 19.97 | 19.03 | 18.17 |
| Minimum S/V, (cm$^{-1}$) | 13.330 | 7.009 | 3.966 | 2.296 | 1.345 | 0.800 | 0.489 | 0.312 | 0.213 | 11.448 | 9.660 | 8.417 | 7.499 | 6.792 | 8.759 | 4.663 | 2.656 | 1.563 | 0.945 |
| Radius required (in)[n] | 13.275 | 8.547 | 5.841 | 4.100 | 2.928 | 2.125 | 1.573 | 1.197 | 0.945 | 12.302 | 12.628 | 13.435 | 14.915 | 17.698 | 11.745 | 7.780 | 5.415 | 3.873 | 2.833 |
| Reactor Selection | a | a | a | a | b | b | b | b | b | a | a | b | b | b | b | b | b | b | b |
| DeHCl conditions | a | a | a | a | a | c | d | d | d | a | a | a | a | a | a | a | a | a | a |
| Intrinsic Viscosity (dL/g) | | | | | | | | | | | | | | | | | | | |
| Monofunct. reactant (mol %)[k] | 18 | 20 | 23 | 8 | 8 | 8 | 8 | 8 | 8 | 18 | 23 | 27 | 27 | 23 | 18 | 18 | 22 | 8 | 8 |
| Polymerization conditions | 1.4 | 1.3 | 1.1 | 0 | 0 | 0 | 0 | 0 | 0 | 1.35 | 1.1 | 0.8 | 0.8 | 1.1 | 1.35 | 1.35 | 1.1 | 0 | 0 |
| Process | e | e | e | f | f | f | f | f | f | e | e | g | g | g | e | e | e | f | f |
| | j | j | j | j | j | j | j | j | j | j | j | j | j | j | j | j | j | j | j |

| | Examples | | | | | | | | | | | | | | | | | | |
|---|---|---|---|---|---|---|---|---|---|---|---|---|---|---|---|---|---|---|---|
| | 175 | 176 | 177 | 178 | 179 | 180 | 181 | 182 | 183 | 184 | 185 | 186 | 187 | 188 | 189 | 190 | 191 | 192 | 193 | 194 |
| $P_c$, wt fraction | 0.13 | 0.175 | 0.175 | 0.13 | 0.1 | 0.1 | 0.1 | 0.1 | 0.1 | 0.1 | 0.1 | 0.1 | 0.1 | 0.08 | 0.08 | 0.08 | 0.08 | 0.175 | 0.175 | 0.175 |
| $P_f$, wt fraction | 0.82 | 0.84 | 0.84 | 0.82 | 0.83 | 0.83 | 0.83 | 0.83 | 0.83 | 0.83 | 0.83 | 0.83 | 0.83 | 0.82 | 0.82 | 0.82 | 0.82 | 0.84 | 0.84 | 0.84 |
| $P_m$, wt fraction | 0.860 | 0.860 | 0.860 | 0.860 | 0.859 | 0.859 | 0.859 | 0.859 | 0.859 | 0.859 | 0.859 | 0.859 | 0.859 | 0.843 | 0.843 | 0.843 | 0.843 | 0.891 | 0.891 | 0.891 |
| $P_b$, wt fraction 0.831 | 0.710 | 0.680 | 0.650 | 0.620 | 0.859 | 0.829 | 0.799 | 0.769 | 0.739 | 0.709 | 0.679 | 0.649 | 0.619 | 0.843 | 0.813 | 0.783 | 0.753 | 0.891 | 0.861 | 0.891 |
| $a^*$, grams of PPA[l] | 308.757 | 279.854 | 255.899 | 235.721 | 869.224 | 716.382 | 609.253 | 529.997 | 468.987 | 420.573 | 381.220 | 348.601 | 321.124 | 1119.224 | 940.102 | 810.404 | 712.154 | 444.364 | 348.348 | 286.452 |
| $b^*$, grams of $P_2O_5$[l] | 329.698 | 358.601 | 382.556 | 402.734 | .000 | 152.842 | 259.971 | 339.227 | 400.237 | 448.651 | 488.004 | 520.623 | 548.100 | .000 | 179.122 | 308.820 | 407.070 | .000 | 96.017 | 157.912 |
| $a^*/(a^* + b^*)$ | 0.484 | 0.438 | 0.401 | 0.369 | 1.000 | 0.824 | 0.701 | 0.610 | 0.540 | 0.484 | 0.439 | 0.401 | 0.369 | 1.000 | 0.840 | 0.724 | 0.636 | 1.000 | 0.784 | 0.645 |
| First Monomer conc (wt %) | 22.757 | 24.531 | 26.225 | 27.845 | 9.474 | 11.267 | 12.991 | 14.649 | 16.245 | 17.783 | 19.265 | 20.694 | 22.074 | 7.517 | 8.823 | 10.092 | 11.327 | 17.162 | 20.904 | 24.322 |
| Maximum solubility[m] | 17.38 | 16.66 | 16.00 | 15.40 | 22.12 | 21.00 | 19.97 | 19.02 | 18.16 | 17.37 | 16.65 | 16.00 | 15.40 | 21.48 | 20.41 | 19.43 | 18.53 | 29.44 | 28.19 | 27.06 |
| Minimum S/V, (cm$^{-1}$) | 0.592 | 0.390 | 0.273 | 0.205 | 8.417 | 4.496 | 2.570 | 1.517 | 0.921 | 0.580 | 0.384 | 0.270 | 0.204 | 6.885 | 3.688 | 2.122 | 1.274 | 15.081 | 7.714 | 4.306 |
| Radius required (in)[n] | 2.124 | 1.641 | 1.314 | 1.093 | 13.435 | 8.914 | 6.215 | 4.454 | 3.264 | 2.453 | 1.899 | 1.524 | 1.271 | 13.788 | 9.248 | 6.513 | 4.730 | 12.857 | 8.142 | 5.516 |
| Reactor Selection | b | b | b | b | a | a | a | c | b | b | b | b | b | a | a | a | a | a | a | a |
| DeHCl conditions | d | d | d | d | d | d | d | d | d | d | d | d | d | d | d | d | d | d | d | d |
| Intrinsic Viscosity (dL/g) | | | | | | | | | | | | | | | | | | | | |
| Monofunct. reactant (mol %)[k] | 20 | 20 | 20 | 22 | 22 | 22 | 22 | 22 | 22 | 22 | 22 | 22 | 22 | 30 | 24 | 24 | 24 | 20 | 22 | 25 |
| Polymerization conditions | 1.3 | 1.3 | 1.1 | 1.1 | 1.1 | 1.1 | 1.1 | 1.1 | 1.1 | 1.1 | 1.1 | 1.1 | 0.2 | 0.9 | 0.9 | 0.9 | 1.4 | 1.3 | 1.1 | |
| Process | e | e | e | e | e | h | h | c | h | h | h | h | b | g | g | g | g | e | e | c |
| | j | j | j | j | j | j | j | j | j | j | j | j | j | j | j | j | j | j | j | j |

| | Examples | | | | | | | | | | | | | | | | | | |
|---|---|---|---|---|---|---|---|---|---|---|---|---|---|---|---|---|---|---|---|
| | 195 | 196 | 197 | 198 | 199 | 200 | 201 | 202 | 203 | 204 | 205 | 206 | 207 | 208 | 209 | 210 | 211 | 212 | 213 |
| $P_c$, wt fraction | 0.175 | 0.175 | 0.175 | 0.175 | 0.175 | 0.175 | 0.15 | 0.125 | 0.1 | 0.075 | 0.05 | 0.13 | 0.13 | 0.13 | 0.13 | 0.13 | 0.13 | 0.13 | 0.13 |
| $P_f$, wt fraction | 0.84 | 0.84 | 0.84 | 0.84 | 0.84 | 0.84 | 0.83 | 0.83 | 0.83 | 0.83 | 0.83 | 0.82 | 0.82 | 0.82 | 0.82 | 0.82 | 0.82 | 0.82 | 0.82 |
| $P_m$, wt fraction | 0.891 | 0.891 | 0.891 | 0.891 | 0.891 | 0.891 | 0.872 | 0.863 | 0.856 | 0.849 | 0.842 | 0.855 | 0.855 | 0.855 | 0.855 | 0.855 | 0.855 | 0.855 | 0.855 |
| $P_b$, wt fraction | 0.801 | 0.771 | 0.741 | 0.711 | 0.681 | 0.651 | 0.872 | 0.863 | 0.856 | 0.849 | 0.842 | 0.855 | 0.825 | 0.795 | 0.765 | 0.735 | 0.705 | 0.675 | 0.645 |
| $a^*$, grams of PPA[l] | 243.233 | 211.346 | 186.851 | 167.444 | 151.689 | 138.644 | 539.602 | 672.936 | 872.936 | 1206.269 | 1872.936 | 642.167 | 532.358 | 454.619 | 396.691 | 351.857 | 316.129 | 286.987 | 262.765 |
| $b^*$, grams of $P_2O_5$[l] | 201.131 | 233.018 | 257.513 | 276.921 | 292.676 | 305.721 | .000 | .000 | .000 | .000 | .000 | .000 | 109.809 | 187.548 | 245.475 | 290.309 | 326.038 | 355.180 | 379.402 |
| $a^*/(a^* + b^*)$ | 0.547 | 0.476 | 0.420 | 0.377 | 0.341 | 0.312 | 1.000 | 1.000 | 1.000 | 1.000 | 1.000 | 1.000 | 0.829 | 0.708 | 0.618 | 0.548 | 0.492 | 0.447 | 0.409 |
| First Monomer conc (wt %) | 27.457 | 30.343 | 33.008 | 35.476 | 37.769 | 39.905 | 14.575 | 12.034 | 9.540 | 7.091 | 4.685 | 12.539 | 14.744 | 16.840 | 18.836 | 20.739 | 22.554 | 24.288 | 25.946 |

-continued

| | | | | | | | | | | | | |
|---|---|---|---|---|---|---|---|---|---|---|---|---|
| Maximum solubility[m] | 26.02 | 25.08 | 24.21 | 23.42 | 22.70 | 22.03 | 28.61 | 28.28 | 27.98 | 27.71 | 27.46 | 27.94 |
| Minimum S/V (cm$^{-1}$) | 2.473 | 1.440 | 0.850 | 0.514 | 0.325 | 0.218 | 10.542 | 9.109 | 8.077 | 7.295 | 6.681 | 8.262 |
| Radius required (in)[n] | 3.852 | 2.740 | 1.979 | 1.458 | 1.102 | 0.863 | 11.846 | 12.297 | 13.189 | 14.734 | 17.570 | 11.441 |
| Reactor Selection | a | b | b | b | b | b | a | a | a | a | a | a |
| DeHCl conditions | d | d | d | d | d | d | d | d | d | d | d | d |
| Intrinsic Viscosity, dL/g | 10 | 10 | 10 | 10 | 10 | 10 | 20 | 25 | 30 | 30 | 25 | 20 |
| Monofunct. reactant, (mol %)[k] | 0 | 0 | 0 | 0 | 0 | 0 | 1.35 | 1.1 | 0.8 | 0.8 | 1.1 | 1.35 |
| Polymerization conditions | f | f | f | f | f | f | e | e | g | g | g | e |
| Process | hu f | | | | | | i | i | j | j | j | i |

| | | | | | | Examples | | | | | | | |
|---|---|---|---|---|---|---|---|---|---|---|---|---|---|
| | | 214 | 215 | 216 | 217 | 218 | 219 | 220 | 221 | 222 | 223 | 224 | 225 | 226 | 227 |
| $P_o$ wt fraction | | 0.13 | 0.1 | 0.1 | 0.1 | 0.1 | 0.1 | 0.1 | 0.1 | 0.1 | 0.1 | 0.08 | 0.08 | 0.08 | 0.08 |
| $P_j$ wt fraction | | 0.82 | 0.83 | 0.83 | 0.83 | 0.83 | 0.83 | 0.83 | 0.83 | 0.83 | 0.83 | 0.82 | 0.82 | 0.82 | 0.82 |
| $P_m$ wt fraction | | 0.855 | 0.856 | 0.856 | 0.856 | 0.856 | 0.856 | 0.856 | 0.856 | 0.856 | 0.856 | 0.840 | 0.840 | 0.840 | 0.840 |
| $P_i$ wt fraction | | 0.615 | 0.856 | 0.826 | 0.796 | 0.766 | 0.736 | 0.706 | 0.676 | 0.646 | 0.620 | 0.840 | 0.810 | 0.780 | 0.750 |
| a*, grams of PPA[l] | | 242.313 | 872.936 | 722.660 | 616.526 | 537.574 | 476.548 | 427.965 | 388.371 | 355.483 | 331.410 | 1122.936 | 945.851 | 817.010 | 719.062 |
| b*, grams of $P_2O_5$[l] | | 399.854 | .000 | 150.276 | 256.410 | 335.362 | 396.388 | 444.971 | 484.565 | 517.453 | 541.526 | .000 | 177.085 | 305.926 | 403.874 |
| a*/(a* + b*) | | 0.377 | 1.000 | 0.828 | 0.706 | 0.616 | 0.546 | 0.490 | 0.445 | 0.407 | 0.380 | 1.000 | 0.842 | 0.728 | 0.640 |
| First Monomer conc (wt %) | | 27.533 | 9.540 | 11.300 | 12.992 | 14.622 | 16.191 | 17.703 | 19.162 | 20.571 | 21.740 | 7.577 | 8.870 | 10.127 | 11.350 |
| Maximum solubility[m] | | 21.30 | 27.98 | 26.87 | 25.85 | 24.91 | 24.06 | 23.28 | 22.57 | 21.92 | 21.41 | 27.38 | 26.31 | 25.34 | 24.45 |
| Minimum S/V (cm$^{-1}$) | | 0.207 | 8.077 | 4.315 | 2.468 | 1.461 | 0.892 | 0.566 | 0.378 | 0.269 | 0.212 | 6.696 | 3.590 | 2.069 | 1.246 |
| Radius required (in)[n] | | 1.112 | 13.189 | 8.771 | 6.127 | 4.402 | 3.237 | 2.444 | 1.903 | 1.536 | 1.317 | 13.620 | 9.152 | 6.457 | 4.701 |
| Reactor Selection | | b | a | a | c | a | a | b | a | a | a | a | a | a | a |
| DeHCl conditions | | d | d | d | d | d | d | d | d | d | d | d | d | d | d |
| Intrinsic Viscosity, dL/g | | 25 | 25 | 25 | 25 | 25 | 25 | 25 | 25 | 25 | 25 | 36 | 28 | 28 | 28 |
| Monofunct. reactant, (mol %)[k] | | 1.1 | 1.1 | 1.1 | 1.1 | 1.1 | 1.1 | 1.1 | 1.1 | 1.1 | 1.1 | 0.5 | 1 | 1 | 1 |
| Polymerization conditions | | e | h | h | h | h | g | h | h | h | h | g | g | g | g |
| Process | | i | i | i | i | i | i | i | i | i | i | i | i | i | i |

[a]High surface to volume ratio reactor required for Dehydrochlorinatio
[b]6-inch diameter resin kettle is used
[c]8-inch diameter resin kettle is used
[d]Conduct dehydrochlorination at 100° C. and reduced pressure
[e]185° C. for 4 h
[f]185° C. for 1.5 h, the oligomer product obtained is used in a block polymerization
[g]185° C. for 10 h
[h]185° C. for 6h
[i]Dry-jet wet-spin into fiber
[j]Extrude into film
[k]Mole per cent (based on First Monomer) of benzoic acid; Second Monomer mole per cent is reduced by (Monofunctional reactant mole per cent)/2
[l]Determined from equations a* and b*
[m]Maximum solubility of First Monomer = 20 + 20exp$P_i$
[n]Minimum radius required to obtain desired S/V

EXAMPLE 228

A homogeneous solution is prepared by adding 10 wt% of $P_2O_5$ to freshly distilled methanesulfonic acid (MSA) and heating according to the procedure of Eaton et al (J. Org. Chem., 38, 4071, 1973). To a 100 mL resin kettle is added 24.28 grams of 3-amino-4-hydroxybenzoic acid hydrochloride and 38.36 grams of the above solution. The mixture is stirred at 50°-70° C. for 47 hours to effect dehydrochlorination. $P_2O_5$ (27.65 grams) is then added and the mixture is stirred for 64 hours at 100° C. The polymerization is then initiated by raising the temperature to 150° C. The reaction mixture is optically anisotropic during the polymerization and is highly birefringent when viewed under crossed polars at room temperature. The reaction product is removed from the reactor after 48.5 hours at 150° C. and can be stretched into white fibers that do not have noticeable microfibrillar morphology. The reaction product before coagulation is characterized as containing 17.52 wt% of homopolymer $-\{V\}_n$ and having a $P_2O_5$ content (i.e., total wt of $P_2O_5$/total wt of the solvent) of 44.6%. The isolated polymer has an intrinsic viscosity in MSA at 30° C. of 16.0 dL/g.

The above procedure is essentially repeated with the following modifications. The wt% of $P_2O_5$ in the dehydrochlorination solvent is 9.26% and the dehydrochlorination time at 50°-70° C. is 18 hours. The equilibration time at 100° C. is 5 hours. The polymerization time at 150° C. is 43 hours. The concentration of homopolymer $-\{V\}_n$ in the reaction product is 17.6 wt% and the $P_2O_5$ content is 35.7%. The isolated polymer has an intrinsic viscosity in MSA at 30° C. of 4.75 dL/g.

EXAMPLE 229

The procedure of Example 228 is essentially repeated with the following modifications. The wt% of $P_2O_5$ in the dehydrochlorination solvent is 9.11% and 4,6-diamino-1,3-benzenediol dihydrochloride is used as the first monomer. The dehydrochlorination time at 30° C. is 18 hours. The equilibration time at 100° C. is 1 hour. A stoichiometric amount of terephthalic acid is added and the polymerization time is 2.5 hours at 120° C. (at which time the reaction mixture is stir-opalescent) and then 15 hours at 140° C. The concentration of homopolymer $-\{BI\}_n$ in the reaction product is 13.0 wt% and the $P_2O_5$ content is 27.7%. The isolated polymer has an intrinsic viscosity in MSA at 30° C. of 4.12 dL/g.

EXAMPLE 230

When the procedure of Example 229 is followed except that the 4,6-diamino-1,3-benzenediol dihydrochloride is replaced by 2,5-diamino-1,4-benzenedithiol dihydrochloride polymerization does not proceed at 140° C., presumably owing to decomposition of the oxidatively sensitive monomer.

EXAMPLE 231

The procedure of Example 8 is essentially repeated using 1000 times the amounts of all of the reagents and monomers with the following modifications. The preliminary solvent is obtained by passing aqueous phosphoric acid through a Hastelloy Komax thin film evaporator heated at 100° C. under reduced pressure until the index of refraction of the concentrate is that of PPA having a $P_2O_5$ content of 77.2% ($n_D^{25}=1.4601$). The dehydrochlorination mixture is prepared in a corrosion-resistant, 200-gal Atlantic mixer (maintained at 60° C.) by adding the 2,5-diamino-1,4-benzenedithiol dihydrochloride (214.60 moles) and the appropriate amount of the above preliminary solvent and is then circulated through a Teflon-coated, 6-inch-diameter, Pope wiped-film evaporator at 100° C. (to effect the dehydrochlorination) and then is returned to the original mixer. Terephthalic acid (213.527 moles) and benzoic acid (2.146 moles) are then added and incorporated into the dehydrochlorinated mixture at 100° C. under reduced pressure. The mixer is then cooled to 50° C. and the appropriate amount of $P_2O_5$ is added under reduced pressure to give an intermediate $P_2O_5$ content of 86.4%. The mixture is then polymerized to give polymer $-\{AI\}_n$ with an intrinsic viscosity (in MSA at 30° C.) of approximately 21 dL/g by passing the reaction mixture through a static mixer of the Kenics type with a residence time at 185° C. of 2.0 hours.

EXAMPLE 232

The procedures of Examples 15 through 25 are essentially repeated using 1000 times the amounts of all of the reagents and monomers with the following modifications. The preliminary solvent is obtained by passing aqueous phosphoric acid through a Hastelloy Komax thin film evaporator heated at 100° C. under reduced pressure until the index of refraction of the concentrate is that of PPA having a $P_2O_5$ content of 77.2% ($n_D^{25}=1.4601$). The dehydrochlorination mixture is prepared in a corrosion-resistant, 200-gal Ross Kneader Extruder (maintained at 60° C.) by adding the appropriate amounts of the first monomer and the appropriate amount of the above preliminary solvent. The foamy mixture is then extruded and pumped through a Teflon-coated, 6-inch-diameter, Pope wiped-film evaporator at 100° C. (to effect the dehydrochlorination) and then is returned to the original mixer. The second monomer is then added and incorporated into the dehydrochlorinated mixture at 100° C. under reduced pressure. The mixer is then cooled to 50° C. and the appropriate amount of $P_2O_5$ is added according to the a* and b* equations under reduced pressure to give a final $P_2O_5$ content, $P_f$, of 82.2%. The mixture is then polymerized to give the Class 1 homopolymer with an intrinsic viscosity (in MSA at 30° C.) of 15–22 dL/g by passing the reaction mixture through a Hastelloy Komax static mixer with a residence time at 185° C. of 2.0 hours.

EXAMPLE 233

The procedure of Example 27 is essentially repeated using 1000 times the amount of all of the reagents and monomers with the following modifications. The preliminary PPA solvent is obtained by passing aqueous phosphoric acid through a Hastelloy Komax thin film evaporator heated at 100° C. under reduced pressure until the index of refraction of the concentrate is that of PPA having a $P_2O_5$ content of 83% ($n_D^{25}=1.4711$). The monomer/preliminary PPA mixture is prepared for dehydrochlorination in a corrosion-resistant, 200-gal Atlantic mixer (maintained at 60° C.) by adding the 4-amino-3-mercaptobenzoic acid hydrochloride and the appropriate amount of the above preliminary solvent and is then circulated through a Teflon-coated, 6-inch-diameter, Pope wiped-film evaporator at 90° C. under reduced pressure (to effect the dehydrochlorination) and then is returned to the original mixer. The mixer is then cooled to 50° C. and the appropriate amount of $P_2O_5$ is added under reduced pressure to give an intermediate $P_2O_5$ content of 88.5%. The mixture is then polymerized by passing the reaction mixture through a Hastelloy Komax static mixer with a residence time at 185° C. of 1.5 hours to give polymer —T—$_n$ with an intrinsic viscosity (in MSA at 30° C.) of approximately 16 dL/g as a dope that is characterized as having a final $P_2O_5$ content of 82.4% with the polymer —T—$_n$ concentration of 20.3 wt %.

EXAMPLE 234

The procedures of Examples 28 through 30 are essentially repeated using 1000 times the amounts of all of the reagents and monomers with the following modifications. The preliminary solvent is obtained by passing aqueous phosphoric acid through a Hastelloy Komax thin film evaporator heated at 100° C. under reduced pressure until the index of refraction of the concentrate is that of PPA having a $P_2O_5$ content of 77.2% ($n_D{}^{25}=1.4601$). The dehydrochlorination mixture is prepared in a corrosion-resistant, 200-gal Ros Kneader Extruder (maintained at 60° C.) by adding the appropriate amounts of the first monomer and the appropriate amount of the above preliminary solvent. The foamy mixture is then extruded and pumped through a Teflon-coated, 6-inch-diameter, Pope wiped-film evaporator at 100° C. (to effect the dehydrochlorination) and then is returned to the original mixer. The mixer is then cooled to 50° C. and the appropriate amount of $P_2O_5$ is added according to the a* and b* equations under reduced pressure to give a final $P_2O_5$ content, $P_f$, of 82.2%. The mixture is then polymerized to give the Type II homopolymer with an intrinsic viscosity (in MSA at 30° C.) of 12-18 dL/g by passing the reaction mixture through a Hastelloy Komax static mixer with a residence time at 185° C. of 3.0 hours.

As illustrated in the Examples above, the compositions of the invention are prepared in batch fashion but continuous procedures may be employed.

Some process and product benefits as a result of better control of certain process parameters such as shear and temperature in a continuous process are: (1) a more homogeneous products of reaction as a result of a much higher order of magnitude of mixing; (2) higher throughputs; (3) and improved economics.

Another advantage of continuous processing is that the resulting reaction products can be blended in essentially all portions with other reaction products of different polymer type and/or reaction products at different stages of reaction.

In a continuous process, the aforementioned dehydrochlorination step of "Stage One" and monomer-$P_2O_5$ addition of "Stage Two" are conducted at a temperature not to exceed about 100° C. in a batch reactor preferably of the type described in Example 131. "Stage Three" of the invention can be conducted in a motionless (static) mixer. Such mixers for paste and very viscous materials are described in "Chemical Engineers' Handbook", R. H. Perry et al., McGraw-Hill Kogakusha, LTD., International Student Edition, pp. 19–24, (1973); "Fluid Mixing Technology", by James Y. Oldshue, McGraw-Hill Publishing Company, pp. 431–438, (1983); and Grout et al., U.S. Pat. No. 3,800,985. These publications and patent are incorporated herein by reference. The reaction mixture of "Stage Two" is fed from an outlet of the batch reactor through a constant displacement pump to a static mixer (tubular reactor) preferably of the type described in U.S. Pat. No. 3,800,985 where the first mixing element is heated at a temperature between about 140° C. to about 185° C.

The second and subsequent intermediate mixing elements are heated at temperatures between about 165° C. and about 200° C. The last mixing elements are heated at temperatures between about 80° C. and about 200° C. depending on the desired temperature selected for spinning the particular extended chain polymer employed.

In order to avoid interruptions in the continuous process, two or more batch reactors (for conducting "Stage One" and "Stage Two") are connected to the static mixer (tubular reactor) in parallel array fashion so as to feed said tubular reactor in time-wise sequence. Preferably, "Stages One and "Stage Two" can be conducted in an emptied batch reactor without the need for clean-up. The volume requirement of the tubular reactor is a function of the size and number of the batch reactor array, the desired (mixing elements) residence time, and the desired flow rate.

Such a continuous process is especially suitable for the preparation of block copolymers of the present invention. Block copolymers can be made by admixing a second reaction mixture after the first reaction mixture has passed through an intermediate number of mixing elements.

A very important aspect of the continuous process as well as for the batch process which must be emphasized is that "Stage One", "Stage Two", and "Stage Three" of the invention must be conducted within the shaded phosphorus pentoxide content profile area bounded by ABCDEFGHI of FIG. 14. This is unrealized by the art.

APPENDIX

General Structure Reference

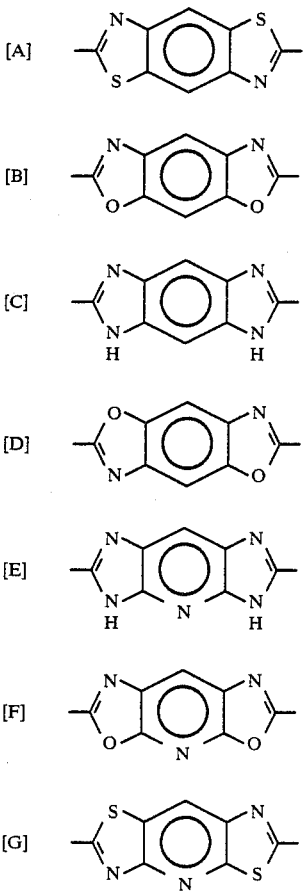

| APPENDIX-continued | APPENDIX-continued |
|---|---|
| General Structure Reference | General Structure Reference |
| [H] 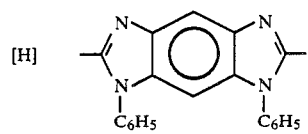 | [S] 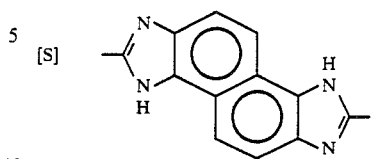 |
| [I] 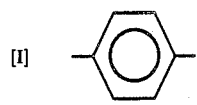 | [T] 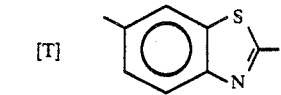 |
| [J] 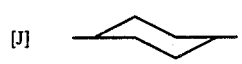 | [U] 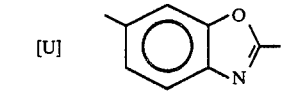 |
| [K] 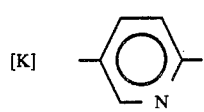 | [V] 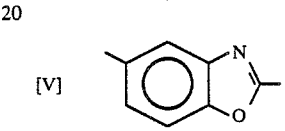 |
| [L]  | [W] 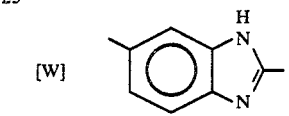 |
| [M]  | [X] 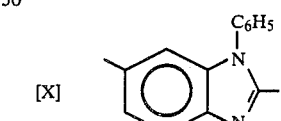 |
| [N]  | [Y] 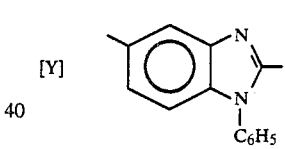 |
| [O] 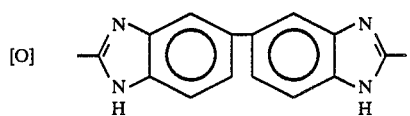 | [Z] 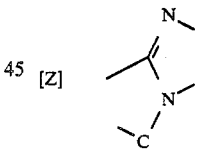 |
| [P] 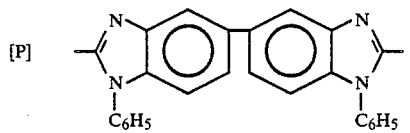 | [A'] 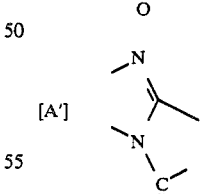 |
| [Q] 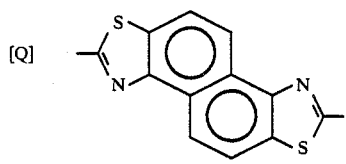 | [B'] 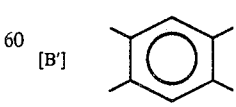 |
| [R] 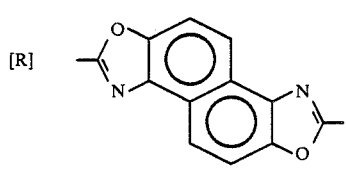 | [C'] 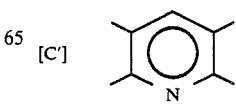 |

APPENDIX-continued
General Structure Reference
[D'] 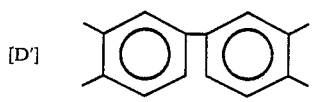
[E'] 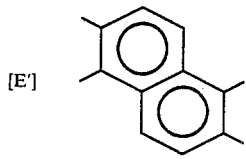
[F'] 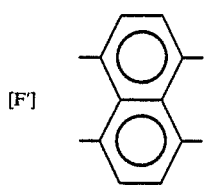
[G'] 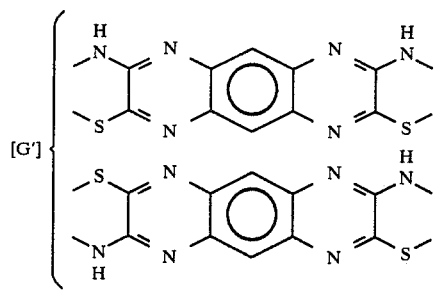
[H'] 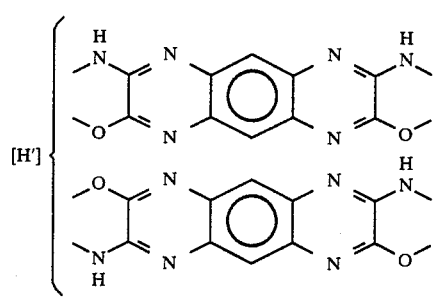
[I'] 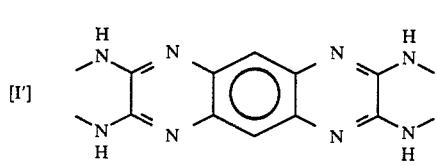
APPENDIX-continued
General Structure Reference
[J'] 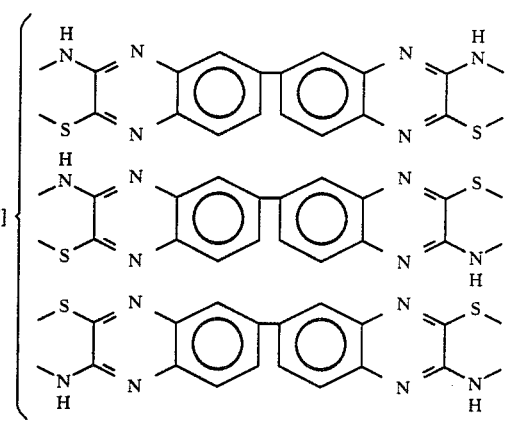
[K'] 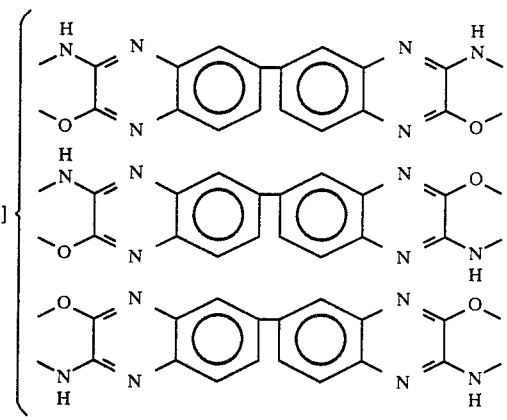
[L'] 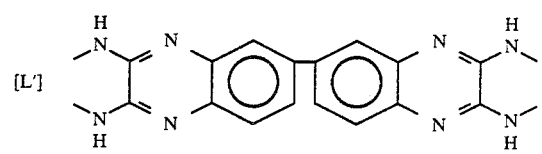
[M'] 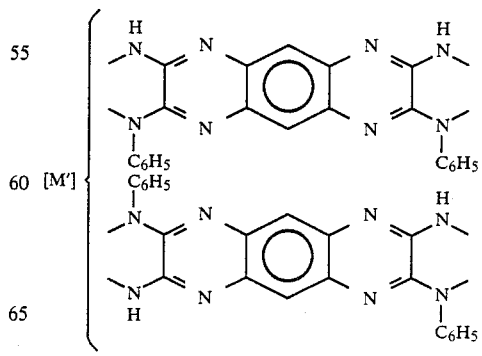

APPENDIX-continued
General Structure Reference
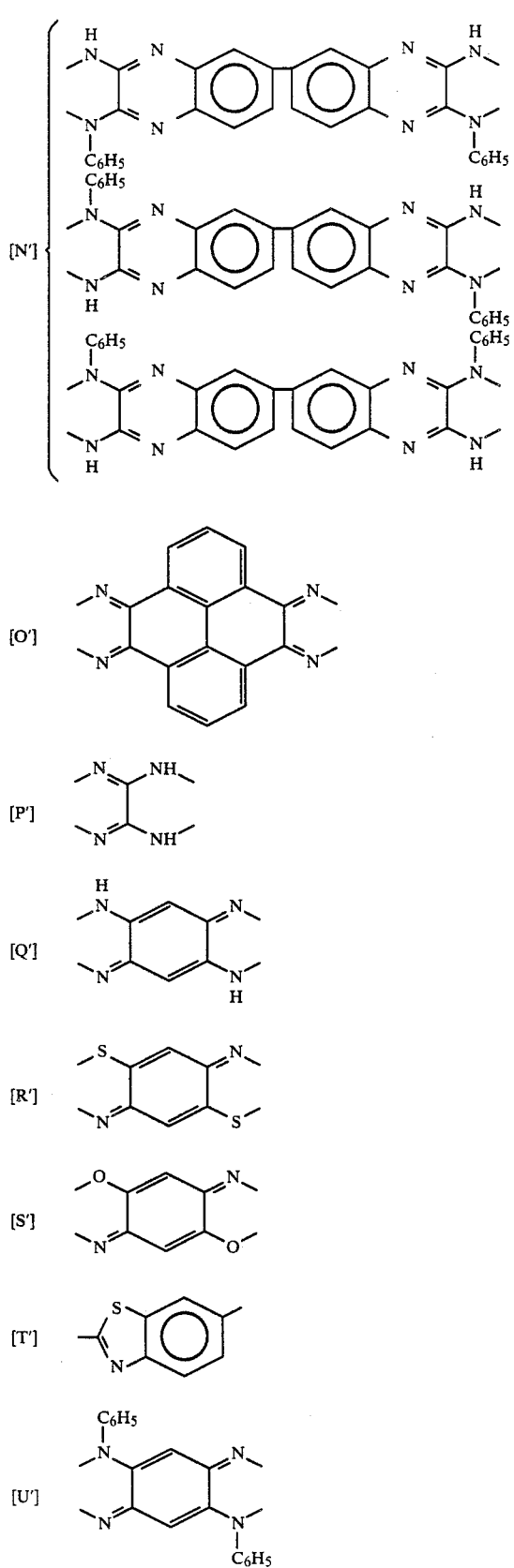
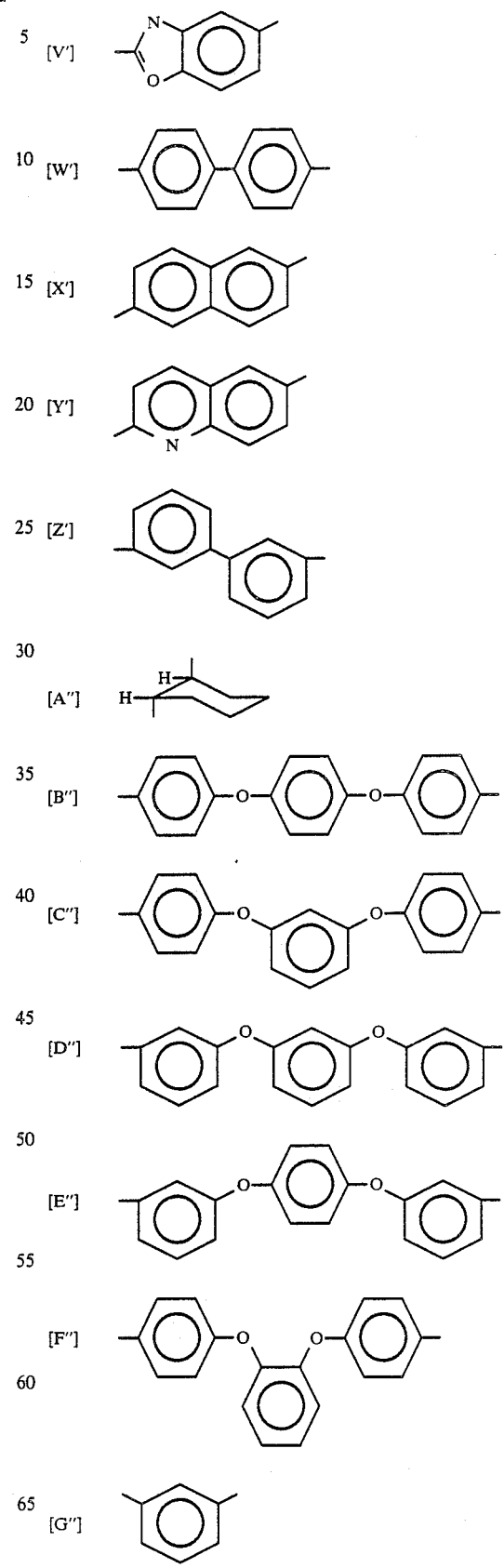

APPENDIX-continued
General Structure Reference

[H"] (phenyl-O-phenyl)

[I"] (phenyl-O-phenyl)

[J"] $-(CH_2)_2-$

[K"] $-(CH_2)_3-$

[L"] $-(CH_2)_4-$

[M"] $-(CH_2)_5-$

[N"] $-(CH_2)_8-$

[O"] (benzothiazole-O-benzothiazole)

[P"] (benzimidazole-O-benzimidazole)

[Q"] (benzoxazole-O-benzoxazole)

[R"] (benzoxazole-O-benzoxazole)

[S"] (benzimidazole-$SO_2$-benzimidazole)

[T"] (benzothiazole-$SO_2$-benzothiazole)

[U"] (benzoxazole-$SO_2$-benzoxazole)

[V"] (benzoxazole-$SO_2$-benzoxazole)

[W"] (benzimidazole-C(=O)-benzimidazole)

APPENDIX-continued
General Structure Reference

[X"] (phenyl-O-phenyl)

[Y"] (phenyl-$SO_2$-phenyl)

[Z"] (phenyl-C(=O)-phenyl)

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

What we claim is:

1. In a process for the production of a liquid crystalline extended chain polymer composition of workable viscosity which is useful in the production of polymer articles, the improvement comprises the following steps:
   (a) preparing a reaction medium suitable for polymerization by incorporating a high concentration of one or more of a selected monomer(s) in a substantially non-oxidizing strong acid, said reaction medium being prepared at a preselected surface-to-volume ratio greater than about 0.2 cm$^{-1}$ and substantially within the shaded phosphorus pentoxide content profile area bounded by ABEFG of FIG. 16, said concentration of monomer(s) being present in said reaction medium in sufficient amounts to achieve a polymer concentration greater than about 10 percent by weight based on the total weight of said composition;
   (b) conducting polymerization of said monomer(s) substantially within the shaded phosphorus pentoxide content profile area bounded by BCDE of FIG. 16.

2. In a process for the production of a liquid crystalline extended chain polymer composition of workable viscosity which is useful in the production of polymer articles, the improvement comprises the following steps:
   (a) preparing a reaction medium suitable for polymerization by incorporating a high concentration of one or more of a selected monomer(s) in a substantially non-oxidizing strong acid having a phosphorus pentoxide content of at least about 80 percent by weight based on the total weight of said strong acid, said reaction medium being prepared at a preselected surface-to-volume ratio greater than about 0.2 cm$^{-1}$ and substantially within the shaded phosphorus pentoxide content profile area bounded by ABEFG of FIG. 17, said concentration of monomer(s) in said reaction medium being present in sufficient amounts to achieve a polymer concentration greater than about 10 percent by weight based on the total weight of said composition;

(b) conducting polymerization of said monomer(s) substantially within the shaded phosphorus pentoxide content profile area bounded by BCDE of FIG. 17.

3. In a process for the production of a liquid crystalline extended chain polymer composition of workable viscosity which is useful in the production of polymer articles, the improvement comprises the following steps:

(a) preparing a reaction medium suitable for polymerization by incorporating a high concentration of one or more of a selected monomer(s) in a substantially non-oxidizing strong acid having a phosphorus pentoxide content of at least about 85 percent by weight based on the total weight of said strong acid, said reaction medium being prepared at a preselected surface-to-volume ratio greater than about 0.2 cm$^{-1}$ and substantially within the shaded phosphorus pentoxide content profile area bounded by ABFG of FIG. 18, said monomer(s) in said reaction medium being present in sufficient polymerizable concentration so as to produce a liquid crystalline polymer phase in said composition;

(b) conducting polymerization of said monomer(s) substantially within the shaded phosphorus pentoxide content profile area bounded by BCDE of FIG. 18.

4. A process according to claim 1 wherein said polymerization is conducted under conditions to exercise control of molecular weight (a) by the addition of one or more suitable monofunctional reactants in selected amounts and at a selected stage of polymerization, (b) by off-balancing the stoichiometric proportion of monomers at a selected stage of polymerization, or (c) by discontinuing said polymerization at a selected degree of polymerization.

5. A process according to claim 2 or 3, wherein said polymerization is conducted under conditions to exercise control of molecular weight (a) by the addition of one or more suitable monofunctional reactants in selected amounts and at a selected stage of polymerization, (b) by off-balancing the stoichiometric proportion of monomers at a selected stage of polymerization, or (c) by discontinuing said polymerization at a selected degree of polymerization.

6. In a process for the production of a liquid crystalline extended chain polymer composition of workable viscosity which is useful in the production of polymer articles, the improvement comprises the following steps:

(a) mixing at least one of a selected first homo- or hetero-bifunctional monomer(s) with or without oxidation protecting atoms or groups with a preliminary solvent of a substantially non-oxidizing strong acid having a preselected phosphorus pentoxide content, (b) heating and optionally placing the resulting mixture under reduced pressure to promote the removal of any volatilized protecting atoms or groups present and to provide a first mixture of the first monomer(s) in the preliminary solvent, said mixing and heating steps (a) and (b) being performed sequentially or simultaneously at a selected same or different surface-to-volume ratio(s), said steps (a) and (b) being performed under a selected same or different set of conditions of time, temperature, pressure, rate and amount of said monomer(s) addition, and rate and amount of phosphorus pentoxide addition, said temperature(s) of steps (a) and (b) being sufficient to maintain said mixture at a workable viscosity under said selected set of conditions, said selected surface-to-volume ratio(s) of steps (a) and (b) being sufficient to control the removal of said volatilized protecting atoms or groups under said selected set of conditions, said selected surface-to-volume ratio being greater than 0.2 cm$^{-1}$, said rate and amount of said monomer(s) addition of steps (a) and (b) being controlled to facilitate the removal of said volatilized protecting atoms or groups under said selected set of conditions, said rate and amount of phosphorus pentoxide addition being controlled to facilitate the removal of said volatilized protecting atoms or groups and prevent decomposition of said monomer(s) due to heating under said selected set of conditions, (c) adding at least one of a selected second monomer(s) in the resulting mixture of step (b) when said selected first monomer(s) is a homo-bifunctional monomer so as to provide a first mixture of the first and second monomers in the preliminary solvent while maintaining said first mixture of the first and second monomers at a workable viscosity, (d) then adjusting the phosphorus pentoxide content of the mixture resulting from step (b) or (c) as necessary to provide a first or a first and second monomer reaction medium of sufficient phosphorus pentoxide content suitable for polymerization and for achieving a degree of polymerization greater than about 40 while maintaining said reaction medium at a workable viscosity, (e) causing polymerization of the first or the first and second monomer(s) at a temperature sufficient to effect reaction at a rate to form a first homo-oligomeric product or a first co-oligomeric product having a preselected intrinsic viscosity, or (f) causing polymerization of the first or the first and second monomer(s) at a temperature sufficient to effect reaction at a rate to form a first homo-polymeric product or a first copolymeric product, (g) mixing a selected amount of the first homo-oligomeric product with a selected amount of at least one of a selected second homo-oligomeric product so as to form a first poly-oligomeric product, said second homo-oligomeric product being formed by like steps (a) and (b) followed by:

(1g) adding at least one of a selected second monomer(s) in the resulting mixture of step (b) when said selected first monomer is a homo-bifunctional monomer so as to provide a mixture of a first and second monomers in the preliminary solvent, (2g) then adjusting the phosphorus pentoxide content of the mixture resulting from step (b) or (1g) to provide a first or a first and second monomer reaction medium of sufficient phosphorus pentoxide content suitable for polymerization, (3g) causing polymerization of the first or first and second monomer(s) at a temperature sufficient to effect reaction at a rate to form said second homo-oligomeric product having a preselected intrinsic viscosity, with the overall proviso that at least one of the selected monomer(s) of step (a) or (1g) which forms the second homo-oligomeric product be different from at least one of the selected monomer(s) of step (a) or (c) which forms the first homo-oligomeric product, or (h) mixing a selected amount of the first homo-oligomeric product with a selected amount of a second mixture of at least one of a selected first monomer(s) or a first and second monomers in the preliminary solvent so as to form a monomer-oligomer mixture, and then adjusting the phosphorus pentoxide content of said monomer-oligomer mixture as necessary to provide a monomer-oligomer reaction medium of sufficient phosphorus pentoxide content suitable for polymerization, said first monomer of said second mixture being formed by like steps (a) and (b) and said first and second monomer of said second mixture being formed by like steps (a), (b) and (c), with the overall proviso that at least one of the selected monomer of step (a) or (c) which forms the first or first and second monomer(s) of said second mixture, be different from at least one of the selected monomer(s) of step (a) or (c) which forms the first homo-oligomeric product, (i) causing polymerization of the poly-oligomeric product resulting from step (g) or the monomer-oligomer resulting from step (h) at a temperature sufficient to effect reaction at a rate to form a first block-oligomeric product having a preselected intrinsic viscosity or a first blockpolymeric product.

7. A process according to claim 6 wherein said selected first monomer is selected from the group consisting of:
2,5-diamino-1,4-benzenedithiol dihydrochloride, 4,6-diamino-1,3-benzenediol dihydrochloride, 1,2,4,5-tetraaminobenzene tetrahydrochloride, 3,3'-dimercaptobenzidine dihydrochloride, 3,3'-dihydroxybenzidine dihydrochloride, 3,3'-diamino-4,4'-dihydroxybiphenyl dihydrochloride, 3,3'-diaminobenzidine tetrahydrochloride dihydrate, 2-(4-carboxyphenyl)-5,6-diaminobenzimidazole dihydrochloride, 3-hydroxy-4-aminobenzoic acid hydrochloride, 3-amino-4-hydroxybenzoic acid hydrochloride, 4,5-diaminonaphthalene-1,8-dicarboxylic anhydride, 2,3,7,8-tetrahydroxy-1,4,6,9-tetraazaanthracene, 2,2',3,3'-tetrahydroxy-6,6'-biquinoxaline, or 2,3-dihydroxy-6,7-diaminoquinoxaline dihydrochloride.

8. A process according to claim 6 wherein said selected second monomer is selected from the group consisting of:
terephthalic acid, terephthaloyl chloride, terephthalonitrile, or trans-1,4-cyclohexanedicarboxylic acid.

9. A process according to claim 6 wherein said selected first monomer is selected from the group consisting of:
2,5-diamino-1,4-benzenedithiol dihydrochloride, 4,6-diamino-1,3-benzenediol dihydrochloride, 1,2,4,5-tetraaminobenzene tetrahydrochloride, 3,3'-dimercaptobenzidine dihydrochloride, 3,3'-dihydroxybenzidine dihydrochloride, 3,3'-diamino-4,4'-dihydroxybiphenyl dihydrochloride, 3,3'-diaminobenzidine tetrahydrochloride dihydrate, 2-(4-carboxyphenyl)-5,6-diaminobenzimidazole dihydrochoride, 3-hydroxy-4-aminobenzoic acid hydrochloride, 3-amino-4-hydroxybenzoic acid hydrochloride, 3,3'-dimercapto-4,4'-diaminodiphenyl ether dihydrochloride, 3,3',4,4'-tetraaminodiphenyl ether tetrahydrochloride, 3,3'-dihydroxy-4,4'-diaminodiphenyl ether, 2,3,5,6-tetraaminopyridine trihydrochloride, 1,5-diamino-2,6-naphthalenedithiol dihydrochloride, 1,5-diamino-2,6-naphthalenediol dihydrochloride, 1,2,5,6-tetraminonaphthalene tetrahydrochloride, 3,3'-dimercapto-4,4'-diaminodiphenyl ether dihydrochloride, 3,3',4,4'-tetraaminodiphenyl ether tetrahydrochloride, 3,3'-dihydroxy-4,4'-diaminodiphenyl ether, 3,3'-diamino-4,4'-dihydroxydiphenyl ether, 3,3',4,4'-tetraaminodiphenyl sulfone, 3,3'-dimercapto-4,4'-diaminodiphenyl sulfone, 3,3'-diamino-4,4'-dihydroxydiphenyl sulfone, 3,3',4,4'-tetraaminobenzophenone, 3,6-diamino-1,2-benzenedithiol dihydrochloride, 3-mercapto-4-aminobenzoic acid hydrochloride, 3-mercapto-4-aminobenzoic acid, or 3,4-diaminobenzoic acid.

10. A process according to claim 6 wherein said selected second monomer is selected from the group consisting of:
terephthalic acid, terephthaloyl chloride, terephthalonitrile, trans-1,4-cyclohexanedicarboxylic acid, 2,5-pyridinedicarboxylic acid, 4,4'-biphenyldicarboxylic acid, 4,4'-biphenyldicarboxylic acid chloride, 2,6-naphthalenedicarboxylic acid, 3,3'-biphenyldicarboxylic acid, trans-1,2-cyclohexanedicarboxylic acid, 1,4-bis(5-carboxybenzoxazole-2-yl)benzene 2,5-bis(6-carboxybenzothiazole-2-yl)pyridine, isophthalic acid, 4,4'-dicarboxydiphenyl ether, 3,3'-dicarboxydiphenyl ether, succinic acid, glutaric acid, adipic acid, pimelic acid, sebacic acid, pyromellitic dianhydride, or 1,4,5,8-naphthalenetetracarboxylic dianhydride.

11. A process according to claim 6 wherein said selected first monomer is selected from the group consisting of:
2,5-diamino-1,4-benzenedithiol dihydrochloride, 4,6-diamino-1,3-benzenediol dihydrochloride, 1,2,4,5-tetraaminobenzene tetrahydrochloride, 3,3'-dimercaptobenzidine dihydrochloride, 3,3'-dihydroxybenzidine dihydrochloride, 3,3'-diamino-4,4'-dihydroxybiphenyl dihydrochloride, 3,3'-diaminobenzidine tetrahydrochloride dihydrate, 2-(4-carboxyphenyl)-5,6-diaminobenzimidazole dihydrochloride, 3-hydroxy-4-aminobenzoic acid hydrochloride, 3-amino-4-hydroxybenzoic acid hydrochloride, 4,5-diaminonaphthalene-1,8-dicarboxylic anhydride, 2,3,7,8-tetrahydroxy-1,4,6,9-tetraazaanthracene, 2,2',3,3'-tetrahydroxy-6,6'biquinoxaline, 3-mercapto-4-aminobenzoic acid hydrochloride, 3-mercapto-4-aminobenzoic acid, or 2,3-dihydroxy-6,7-diaminoquinoxaline dihydrochloride.

12. A process according to claim 6, wherein said phosphorus pentoxide in said preliminary solvent is present in an amount at least above about 80% by weight.

13. A process according to claim 6 wherein said selected first monomer of said second homo-oligomeric product is selected from the group consisting of:

2,5-diamino-1,4-benzenedithiol dihydrochloride, 4,6-diamino-1,3-benzenediol dihydrochloride, 1,2,4,5-tetraaminobenzene tetrahydrochloride, 3,3'-dimercaptobenzidine dihydrochloride, 3,3'-dihydroxybenzidine dihydrochloride, 3,3'-diamino-4,4'-dihydroxybiphenyl dihydrochloride, 3,3'-diaminobenzidine tetrahydrochloride dihydrate, 2-(4-carboxyphenyl)-5,6-diaminobenzimidazole dihydrochloride, 3-hydroxy-4-aminobenzoic acid hydrochloride, 3-amino-4-hydroxybenzoic acid hydrochloride, 3,3'-dimercapto-4,4'-diaminodiphenyl ether dihydrochloride, 3,3',4,4'-tetraaminodiphenyl ether tetrahydrochloride, 3,3'-dihydroxy-4,4'-diaminodiphenyl ether, 2,3,5,6-tetraaminopyridine trihydrochloride, 1,5-diamino-2,6-naphthalenedithiol dihydrochloride, 1,5-diamino-2,6-naphthalenediol dihydrochloride, 1,2,5,6-tetraminonaphthalene tetrahydrochloride, 3,3'-dimercapto-4,4'-diaminodiphenyl ether dihydrochloride, 3,3',4,4'-tetraaminodiphenyl ether tetrahydrochloride, 3,3'-dihydroxy-4,4'-diaminodiphenyl ether, 3,3'-diamino-4,4'-dihydroxydiphenyl ether, 3,3',4,4'-tetraaminodiphenyl sulfone, 3,3'-dimercapto-4,4'-diaminodiphenyl sulfone, 3,3'-diamino-4,4'-dihydroxydiphenyl sulfone, 3,3',4,4'-tetraaminobenzophenone, 3,6-diamino-1,2-benzenedithiol dihydrochloride, 3-mercapto-4-aminobenzoic acid hydrochloride, 3-mercapto-4-aminobenzoic acid, or 3,4-diaminobenzoic acid.

14. A process according to claim 6, wherein said selected second monomer of said second homo-oligomeric product is selected from the group consisting of: terephthalic acid, terephthaloyl chloride, trans-1,4-cyclohexanedicarboxylic acid, 2,5-pyridinedicarboxylic acid, 4,4'-biphenyldicarboxylic acid, 4,4'-biphenyldicarboxylic acid chloride, 2,6-naphthalenedicarboxylic acid, 3,3'-biphenyldicarboxylic acid, trans-1,2-cyclohexanedicarboxylic acid, 1,4-bis(5-carboxybenzoxazole-2-yl)benzene, 2,5-bis(6-carboxybenzothiazole-2-yl)pyridine, isophthalic acid, 4,4'-dicarboxydiphenyl ether, 3,3'-dicarboxydiphenyl ether, succinic acid, glutaric acid, adipic acid, pimelic acid, sebacic acid, pyromellitic dianhydride, or 1,4,5,8-naphthalenetetracarboxylic dianhydride.

15. A process according to claim 6, wherein said selected first monomer is 2,5-diamino-1,4-benzenedithiol dihydrochloride or 4,6-diamino-1,3-benzenediol dihydrochloride.

16. A process according to claim 6, wherein said selected first monomer is 3-amino-4-hydroxy benzoic acid hydrochloride or 3-mercapto-4-aminobenzoic acid hydrochloride.

17. A process according to claim 6, wherein said phosphorus pentoxide in said preliminary solvent is present in an amount between about 63% and 88% by weight.

18. A composition prepared by the process of claim 6, wherein said composition is characterized as having a total polymer concentration of at least about 10% by weight based on the total weight of said composition.

19. A process according to claim 6, wherein said phosphorus pentoxide content of said first homo-oligomeric product, said first co-oligomeric product, said second homo-oligomeric product, said second co-oligomeric product, said first block-oligomeric product, or said first blockpolymeric product formed by said polymerization reaction is between about 80.5% and about 86% by weight.

20. A process according to claim 6, wherein said phosphorus pentoxide content of said first homo-oligomeric product, said first co-oligomeric product, said second homo-oligomeric product, said second co-oligomeric product, said first block-oligomeric product, or said first blockpolymeric product formed by said polymerization reaction is between about 80.5% and about 84% by weight.

21. A process according to claim 6 further comprising spinning said first homo-oligomeric product, said first co-oligomeric product, said first homo-polymeric product, said first copolymeric product, said second homo-oligomeric product, said second co-oligomeric product, said poly-oligomeric product, said first block-oligomeric product or said first block-polymeric product through an air-gap and into a coagulation bath thereby forming a fiber.

22. A process according to claim 6, further comprising extruding said first homo-oligomeric product, said first co-oligomeric product, said first homopolymeric product, said first copolymeric product, said second homo-oligomeric product, said second co-oligomeric product, said poly-oligomeric product, said first block-oligomeric product or said first block-polymeric product into a coagulation bath thereby forming a film.

23. A process according to claim 6, further comprising extruding said first homo-oligomeric product, said first co-oligomeric product, said first homopolymeric product, said first copolymeric product, said second homo-oligomeric product, said second co-oligomeric product, said poly-oligomeric product, said first block-oligomeric product or said first block-polymeric product into a coagulation bath thereby forming an article.

24. A process according to claim 1 or 5 further comprising extruding said liquid crystalline extended chain polymer composition through an air-gap and into a coagulation bath thereby forming a film.

25. A process according to claim 21 wherein said spinning is conducted at an initial draw ratio of from about 5:1 to about 50:1.

26. A process according to claim 21, wherein said spinning is conducted at a temperature between about 60° C. to about 200° C.

27. A process according to claim 21, wherein said spinning is conducted through an air-gap separation distance of from about 1 cm to about 100 cm before allowing said fiber to enter into a coagulation bath.

28. A process according to claim 6, wherein said composition is characterized as having a total polymer concentration of at least about 14% by weight based on the total weight of said composition.

29. A process according to claim 6, wherein said composition is characterized as having a total polymer concentration of at least about 10% by weight based on the total weight of said composition.

30. A process according to claim 6, wherein said phosphorus pentoxide in said preliminary solvent is present in an amount between about 80% and 88% by weight.

31. A process according to claim 6, wherein said phosphorus pentoxide in said preliminary solvent is present in an amount at least about 85% by weight.

32. A process according to claim 6 further comprising spinning said first homo-oligomeric product, said first co-oligomeric product, said first homo-polymeric product, said first copolymeric product, said second homo-oligomeric product, said second co-oligomeric product, said poly-oligomeric product, said first block-oligomeric product or said first block-polymeric product through an air-gap and into a coagulation bath thereby forming a fiber.

33. A process according to claim 6, wherein a selected weight in grams, a* of said preliminary solvent of a substantially non-oxidizing strong acid having a substantially high phosphorus pentoxide content, $P_i$, is added in accordance with the empirical equation:

$$a^* = \{[1 - P_f]([P_y/P_c] - P_y) - [n_o(18.02)/M_w]P_y\}(1 - P_i)^{-1}$$

where $P_y$ = weight in grams of a predetermined theoretical yield of said extended chain homopolymer, copolymer, or blockpolymer;

$P_c$ = preselected weight fraction of said extended chain homopolymer, copolymer, or blockpolymer of the total weight of said first homopolymeric product, said first copolymeric product, or said first block-polymeric product following polymerization;

$n_o$ = integer number of moles of polycondensation by-product per moles of repeating unit of said extended chain homopolymer, copolymer, or blockpolymer;

18.02 = molecular weight of polycondensation by-product;

$M_w$ = molecular weight of said extended chain homopolymer, copolymer, or blockpolymer recurring unit; and $P_f$ = preselected phosphorus pentoxide content of said first homo-oligomeric product, said first co-oligomeric product, said first homopolymeric product, said first copolymeric product, said second homo-oligomeric product, said second co-oligomeric product, said poly-oligomeric product, said first block-oligomeric product or said first block-polymeric product, said $P_f$ being achieved by incorporating a selected intermediate weight in grams, b* of phosphorus pentoxide in said increasing phosphorus pentoxide content step forming said first monomer reaction medium, said first and second monomer reaction medium, said monomer-oligomer reaction medium, or said first oligomer-monomer reaction medium of greater phosphorus pentoxide content in accordance with the empirical equation:

$$b^* = [P_y/P_c] - P_y - [\{n_o(18.02)/M_w\}]P_y - a^*.$$

34. A crystalline polymer composition prepared by the process of claim 6, wherein said polymer composition is characterized as having a molecular weight with an n value corresponding to an intrinsic viscosity of at least about 7 dL/g as determined in methanesulfonic acid at 30° C.

35. An article formed from the liquid crystalline polymer composition prepared by the process of claim 6 in admixture with a flexible aromatic heterocyclic polymer.

36. A process according to claim 6 further comprising spinning said liquid crystalline extended chain polymer composition through an air-gap and into a coagulation bath thereby forming a fiber.

37. A process according to claim 6 further comprising extruding said liquid crystalline extended chain polymer composition through an air-gap and into a coagulation bath thereby forming a film.

38. A process according to claim 6, wherein said phosphorus pentoxide in said preliminary solvent is present in an amount at least about 85% by weight.

39. A process according to claim 6, wherein said removal of volatilized protecting atoms or groups is conducted at a temperature less than about 100° C.

40. A process according to claim 6, wherein said polymerization reaction is conducted at a temperature within the range of from about 100° C. to about 220° C.

41. A process according to claim 6, wherein said polymerization is conducted at a temperature of from about 100° C. to greater than about 185° C.

42. A process according to claim 6 wherein said polymerization is conducted under conditions to exercise control of molecular weight:

(j) by adding a preselected excess molar amount of said selected first monomer in step (a) thereby off-balancing the stoichiometry proportion of said selected first and second monomers in said first and second monomer reaction medium so as to provide said first homo-oligomeric product, said first co-oligomeric product, said first homopolymeric product, said first copolymeric product, or said second homo-oligomeric product following polymerization steps (e), (f) and (3g) having a predetermined intrinsic viscosity less than the maximum attainable for a stoichiometric equivalent amount of both said selected first and second monomers;

(k) by adding a preselected excess molar amount of said selected second monomer in step (c) thereby off-balancing the stoichiometry proportion of said selected first and second monomers in said first and second monomer reaction medium so as to provide said first homo-oligomeric product, said first co-oligomeric product, said first homopolymeric product, said first copolymeric product, or said second homo-oligomeric product following polymerization steps (e), (f) and (3g) having a predetermined intrinsic viscosity less than the maximum attainable for a stoichiometric equivalent amount of both said selected first and second monomers;

(l) by adding one or more of a selected mono-functional reactants at a selected step following step (b) or (d) and prior to forming said first homopolymeric product or said copolymeric product so as to provide said first homo-oligomeric product, said first co-oligomeric product, said first homo-polymeric product, said first copolymeric product, or said second homo-oligomeric product following polymerization steps (e), (f) and (3g) having a predetermined intrinsic viscosity less than the maximum attainable in the absence of said selected monofunctional reactants; or (m) by adding one or more of a selected mono-functional reactants prior to end of polymerization in step (i) so as to provide said poly-oligomeric product, said first block-oligomeric product or said first block-polymeric product having a predetermined intrinsic viscosity less than the maximum attainable in the absence of said selected monofunctional reactants;

(n) spinning said first homo-oligomeric product, said first co-oligomeric product, said first homopolymeric product, said first copolymeric product, said second homo-oligomeric product, said poly-oligomeric product, said first block-oligomeric product or said first block-polymeric product of step (j), (k), (l), or (m) through an air-gap and into a coagulation bath thereby forming a fiber.

43. A process according to claim 42 wherein said selected monofunctional reactant is selected from the group consisting of:
2-aminothiophenol, o-aminophenol, o-phenylenediamine, benzoic acid, acetic acid, phthalic anhydride, 2,3-diaminopyridine, 4-amino-3-mercaptobiphenyl, 3-amino-4-hydroxybiphenyl, 1-amino-2-naphthalenethiol, 1-amino-2-naphthol, 2,3-diaminonaphthalene, 3,4-diaminobenzophenone, benzoyl chloride, benzonitrile, cyclohexanecarboxylic acid, cyclohexanecarboxylic acid chloride, picolinic acid, 4-biphenylcarboxylic acid, 2-naphthoic acid, acetyl chloride, propionic acid, n-butyric acid, valeric acid, caproic acid, or 1,8-naphthalic anhydride.

44. A process according to claim 38 wherein said selected mono-functional reactant is selected from the group consisting of:
2-aminothiophenol, o-aminophenol, o-phenylenediamine, benzoic acid, acetic acid, or phthalic anhydride.

45. A crystalline polymer composition prepared by the process of claim 6 in the form of a fiber, film, or fibrids.

46. An article comprising a crystalline polymer composition prepared by the process of claim 6 in a resinous matrix.

47. A crystalline polymer made by the process of claim 6.

48. A composition article comprising a resinous matrix reinforced with the crystalline polymer of claim 47.

49. An extended chain crystalline polymer composition prepared by the process of claim 1, 5, or 6 selected from the group consisting of a homopolymer, a copolymer, or a block polymer, said homopolymer having the formulas:

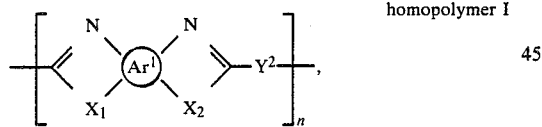

homopolymer I wherein $Ar^1$ is

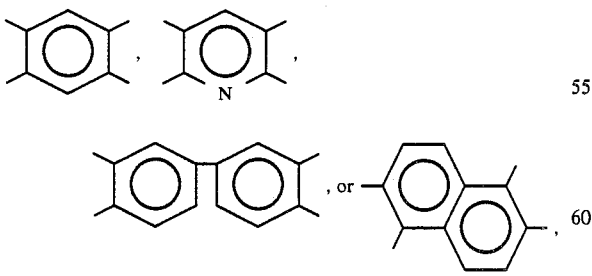

$X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or is

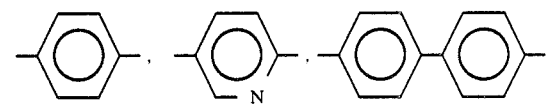

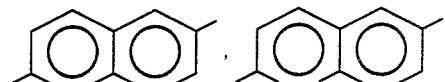

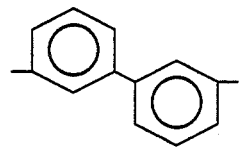

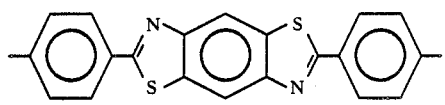

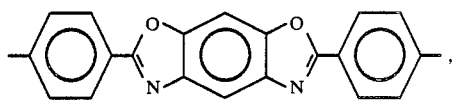

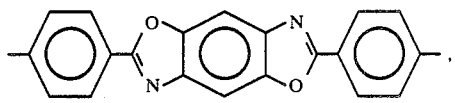

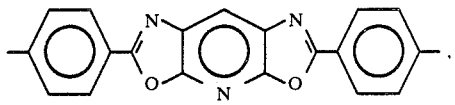

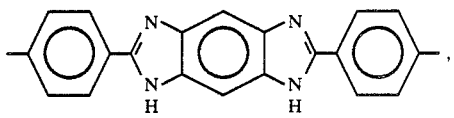

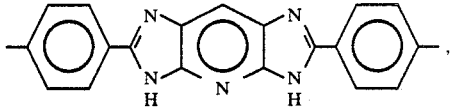

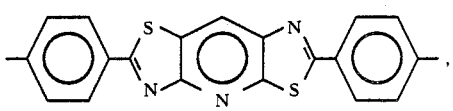

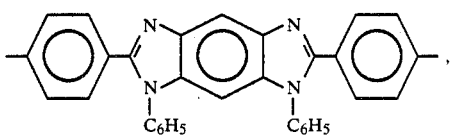

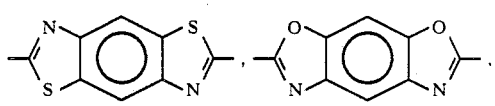

-continued

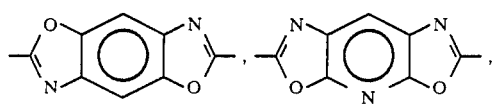 , 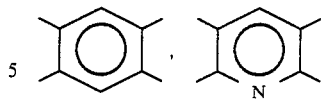 ,

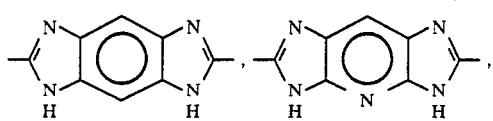 , 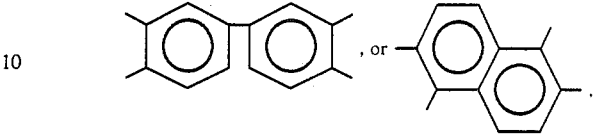 ,

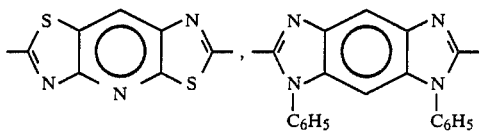

and Ar⁴ is

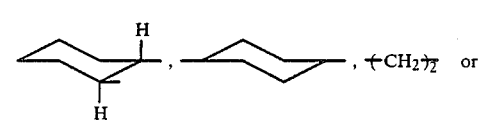 ,

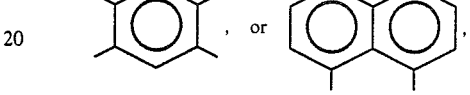 , +CH₂⟋₂ or the nitrogen atoms being bonded to aromatic carbon atoms of Ar¹ and the carbon atoms being bonded to aromatic carbon atoms of Ar⁴, n being a positive integer;

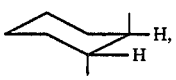

n being a positive integer;

homopolymer II

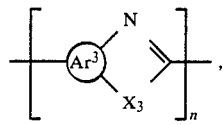

homopolymer IV

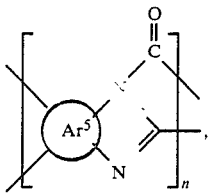

wherein Ar³ is wherein Ar⁵ is

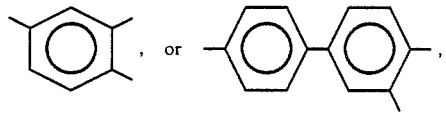 ,

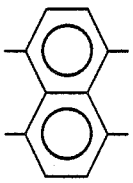

X₃ is sulfur, oxygen, or NR (R being hydrogen or an organic group), the nitrogen atom and X₃ being bonded to aromatic carbon atoms of Ar³, N and X₃ of each hetero ring are disposed ortho to one another, n being a positive integer;

the nitrogen atoms being bonded to Ar⁵, n being a positive integer;

homopolymer III

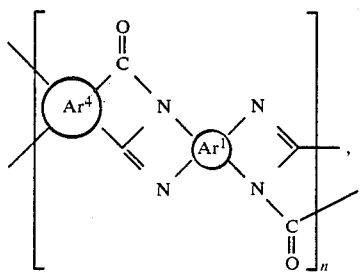

homopolymer V

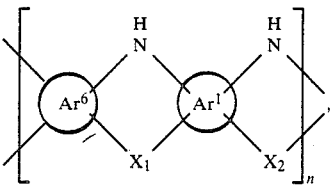

wherein Ar⁶ is

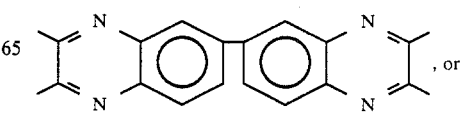 , or wherein Ar¹ is

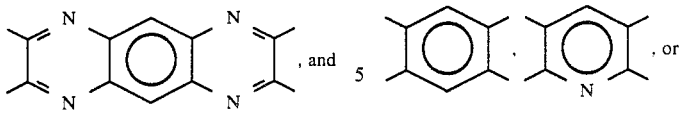, and

Ar¹ is

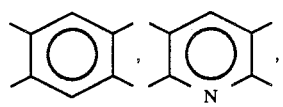,

, or

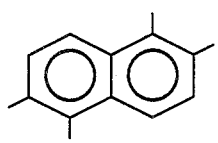,

X₁ and X₂ are the same or different and are sulfur, oxygen, or NR (R being hydrogen or an organic group), the NH groups and X₁ and X₂ being bonded to aromatic carbon atoms of Ar⁶ and Ar¹, NH and X₁ or X₂ of each hetero ring are disposed ortho to one another, n being a positive integer;

homopolymer VI

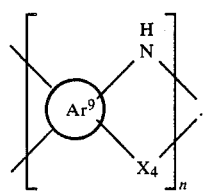

wherein Ar⁹ is

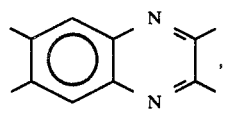,

X₄ is sulfur, oxygen, or NR (R being hydrogen or an aromatic group), the NH group and X₄ being bonded to aromatic carbon atoms of Ar⁹, n being a positive integer;

homopolymer VII

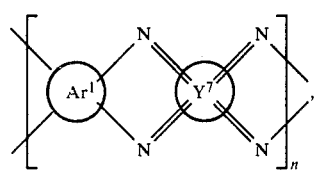

wherein Ar¹ is

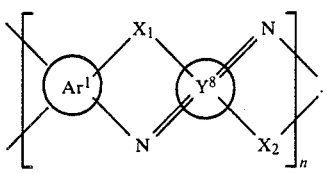, or

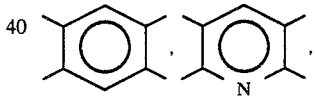

Y⁷ is

, the nitrogen atoms being bonded to aromatic carbon atoms of Ar¹ and bonded to adjacent carbon atoms of Y⁷, n being a positive integer; or homopolymer VIII

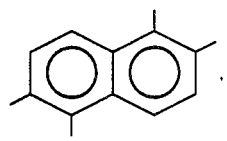

wherein Ar¹ is

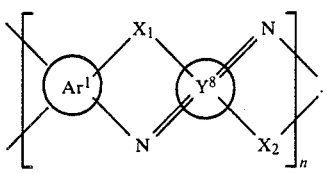, or

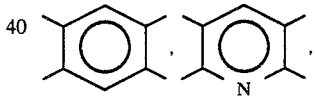

Y⁸ is

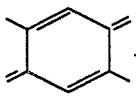.

X₁ and X₂ are the same or different and are sulfur, oxygen, or NR (R being hydrogen or an organic group), the nitrogen atoms and X₁ and X₂ being bonded to aromatic carbon atoms of Ar¹ and adjacent carbon atoms of Y⁸, N and X₁ or X₂ of each hetero ring are disposed ortho to one another, n being a positive integer; wherein said I, II, III, IV, V, VI, VII, and VIII polymers are characterized as having a molecular weight with an n value corresponding to an intrinsic viscosity of at least about 7 dL/g as determined in methanesulfonic acid at 30° C., with the proviso that when said polymer is poly([benzo-(1,2-d:4,5-d')bisthiazole-2,6-diyl]-1,4-phenylene) that the molecular weight of said poly([benzo-(1,2-d:4,5-d')bisthiazole-2,6-diyl]-1,4-phenylene correspond to an intrinsic viscosity greater than 30.3 dL/g as determined in methanesulfonic acid at 30° C.; said copolymer having the formulas:

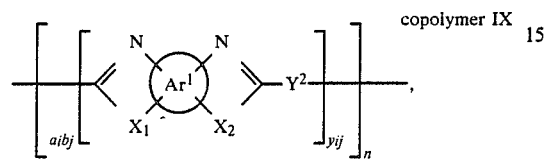

copolymer IX wherein Ar¹ is

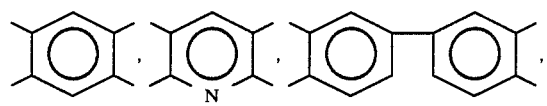

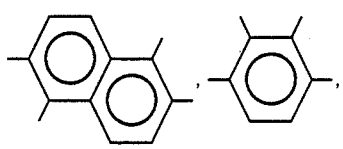

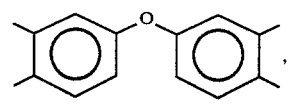

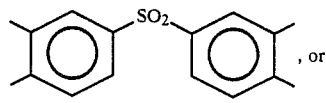

, or

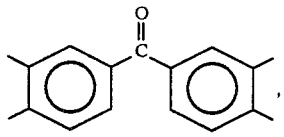

$X_1$ and $X_2$ are the same or different and are sulfur, oxygen, or NR (R being hydrogen or an organic group), the nitrogen atoms and $X_1$ and $X_2$ being bonded to aromatic carbon atoms of Ar¹, N and $X_1$ or $X_2$ of each hetero ring are disposed ortho to one another and $Y^2$ is nil or is

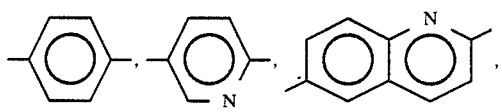

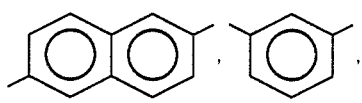

-continued

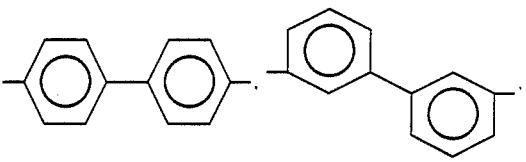

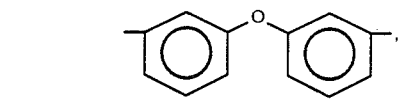

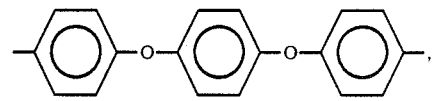

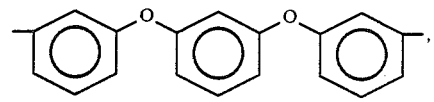

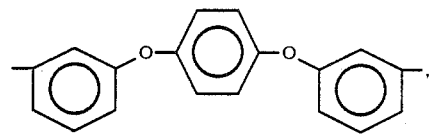

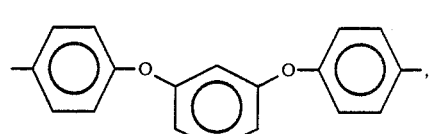

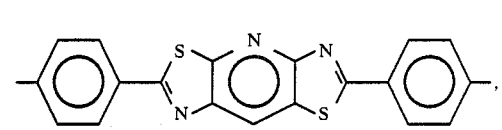

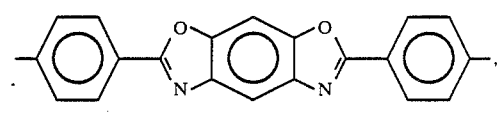

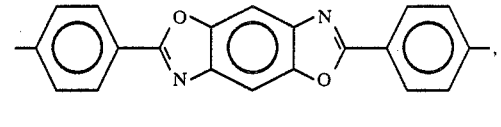

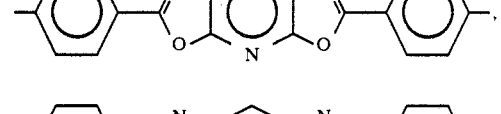

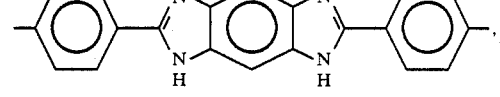

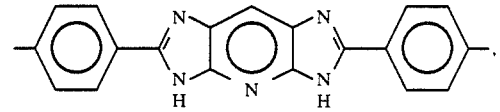

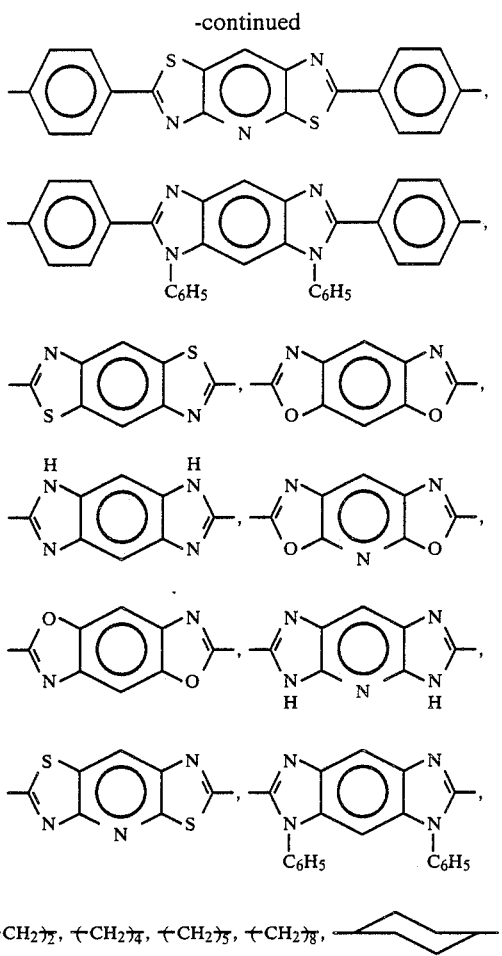

$+CH_2)_{\overline{2}}, +CH_2)_{\overline{4}}, +CH_2)_{\overline{5}}, +CH_2)_{\overline{8}},$ $a_ib_j$ represents the molar proportions of the respective different recurring units present in said copolymer, $y_{ij}$ represents an average number of the respective different sequential recurring units present in said copolymer, n being a positive integer;

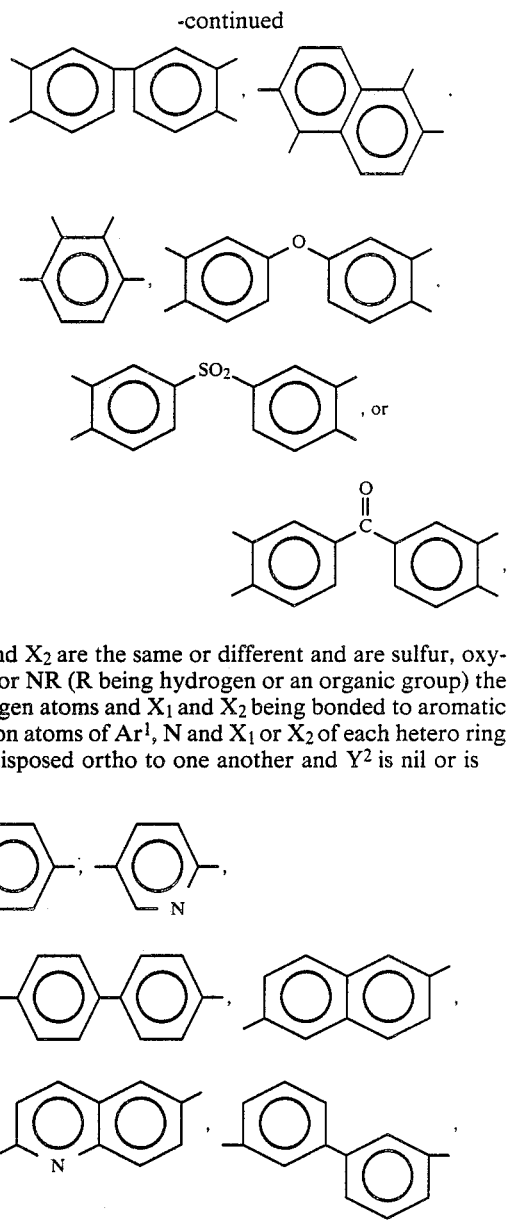

$X_1$ and $X_2$ are the same or different and are sulfur, oxygen, or NR (R being hydrogen or an organic group) the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or is

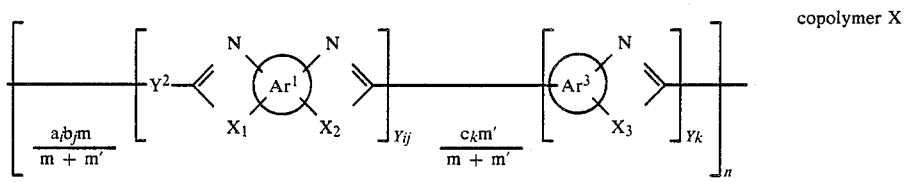

copolymer X wherein $Ar^1$ is

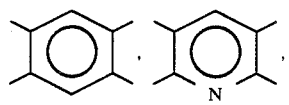

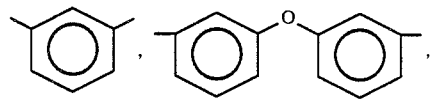

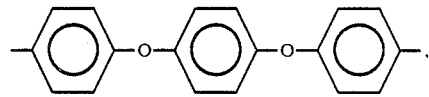

-continued

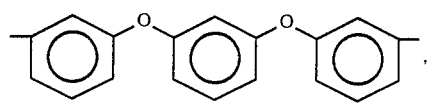

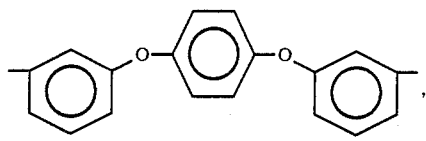

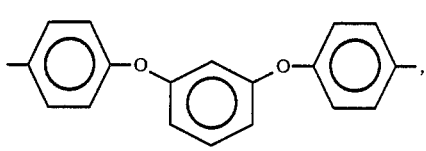

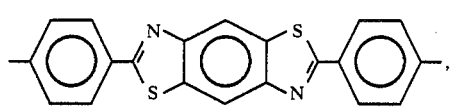

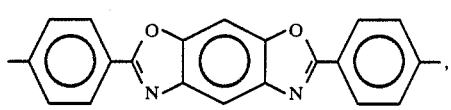

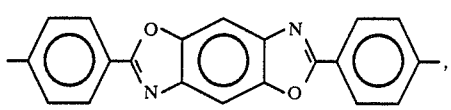

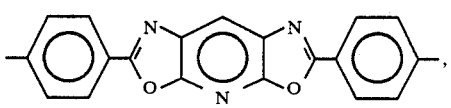

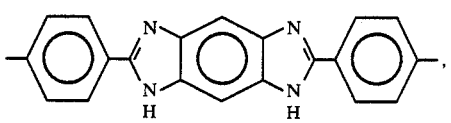

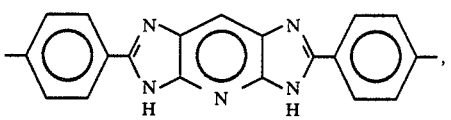

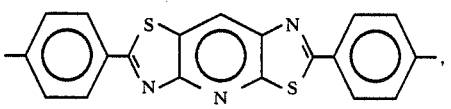

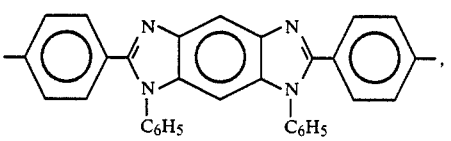

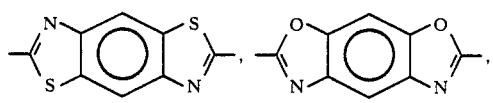

-continued

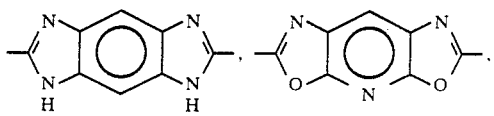

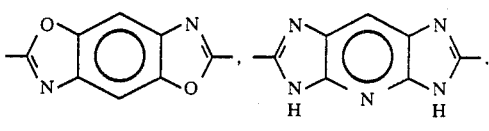

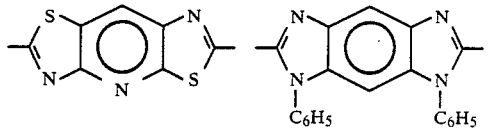

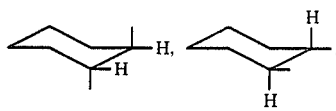

$a_ib_j/m+m'$ represents the molar proportions of the respective different recurring units present in said copolymer, $y_{ij}$ represents an average number of the respective different sequential recurring units present in said copolymer, $Ar^3$ is

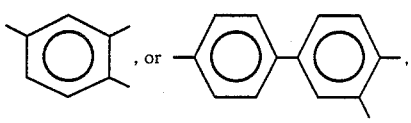

the nitrogen atom and $X_3$ being bonded to aromatic carbon atoms of $Ar^3$, $c_km'/m+m'$ represents the molar proportions of the respective different recurring units present in said copolymer, $y_k$ represents an average number of the respective different sequential recurring units present in said copolymer, n being a positive integer;

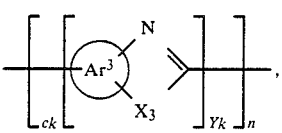

copolymer XI wherein $Ar^3$ is

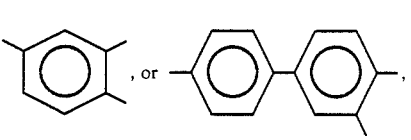

$X_3$ is sulfur, oxygen, or NR (R being hydrogen or an organic group), the nitrogen atom and $X_3$ being bonded to aromatic carbon atoms of $Ar^3$, N and $X_3$ of the hetero ring are disposed ortho to one another, $c_k$ represents the molar proportions of the respective different recurring units present in said copolymer, $y_k$ represents an average number of the respective different sequential recurring units present in said copolymer, n being a positive integer;

copolymer XII

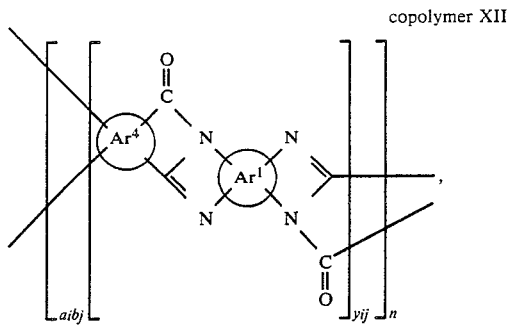

wherein $Ar^1$ is

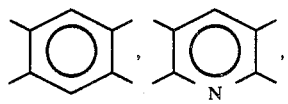

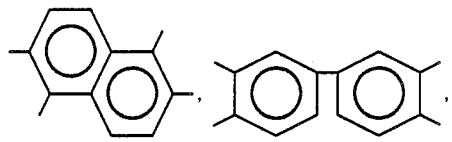

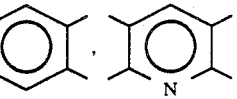

$Ar^4$ is

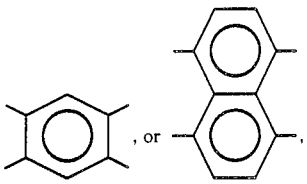

the nitrogen atoms being bonded to $Ar^1$ and the carbon atoms being bonded to $Ar^4$, $a_ib_j$ represents the molar proportions of the respective different recurring units present in said copolymer, $y_{ij}$ represents an average number of the respective different sequential recurring units present in said copolymer, n being a positive integer;

copolymer XV

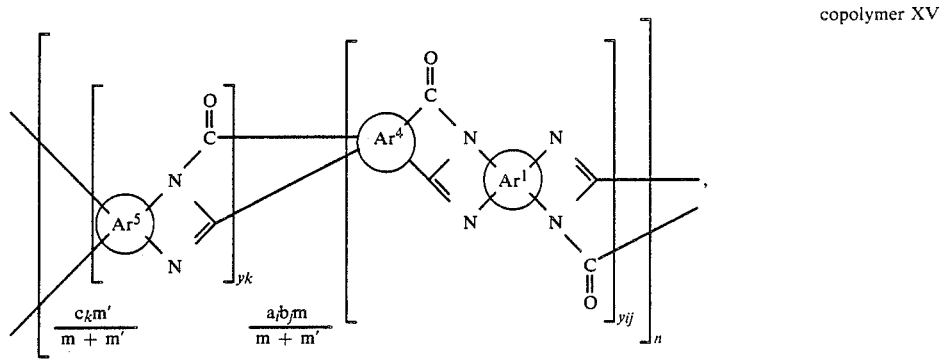

wherein $Ar^4$ is

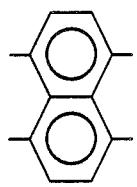

$Ar^1$ is

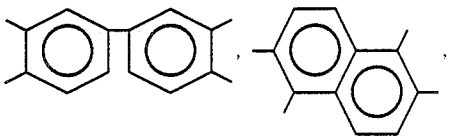

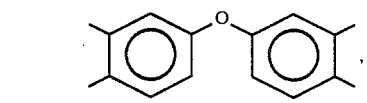

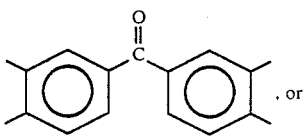, or

-continued

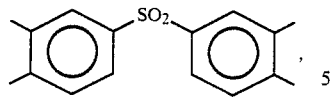

and Ar⁵ is

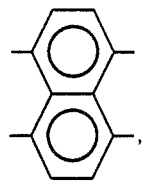

the carbon atoms being bonded to Ar⁴ and Ar⁵ and the nitrogen atoms being bonded to Ar¹ and Ar⁵, n being a positive integer; $c_k m'/m+m'$ represents the molar proportions of the respective different recurring units present in said copolymer, $y_k$ represents an average number of the respective different sequential recurring units present in said copolymer, $a_i b_j m/m+m'$ represents the molar proportions of the respective different recurring units present in said copolymer, $y_{ij}$ represents an average number of the respective different sequential recurring units present in said copolymer, n being a positive integer;

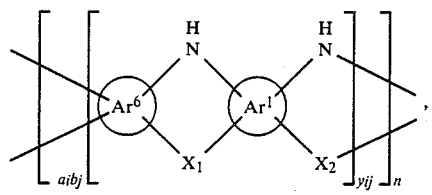

wherein Ar¹ is

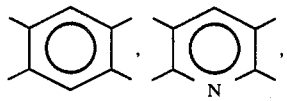

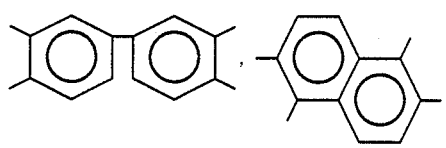

-continued

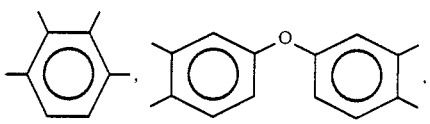

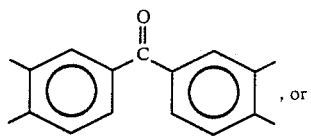

, or

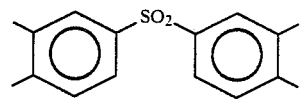

Ar⁶ is

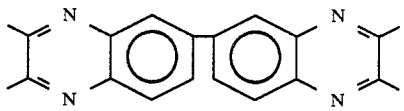

or

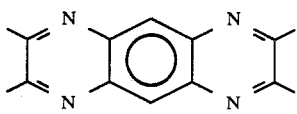

X₁ and X₂ are the same or different and are sulfur, oxygen, or NR (R being hydrogen or an oranic group), the NH groups and X₁ and X₂ being bonded to NH and X₁ or X₂ of each hetero ring are disposed ortho to one another, $a_i b_j$ represents the molar proportions of the respective different recurring units present in said copolymer, $y_{ij}$ represents an average number of the respective different sequential recurring units represent in said copolymer, n being a positive integer;

copolymer XVII

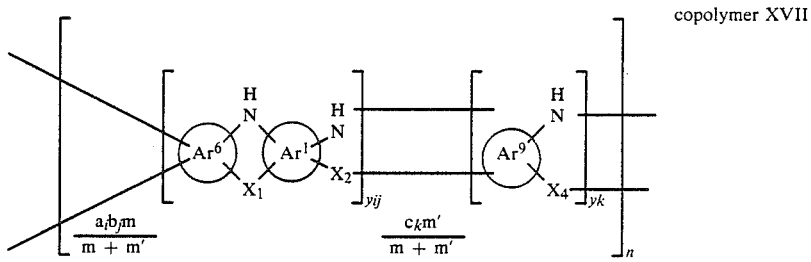

wherein Ar⁶ is

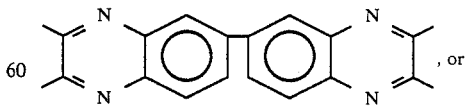

, or

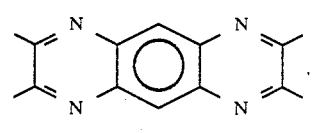

Ar¹ is

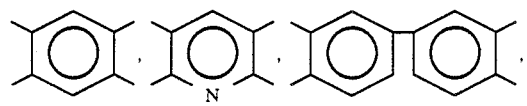

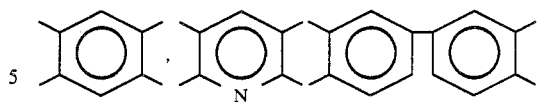

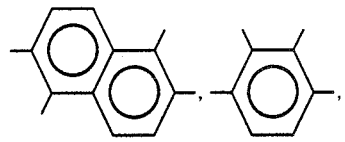

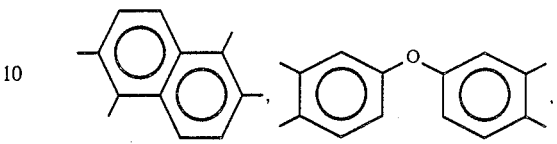

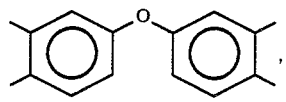

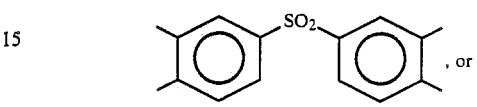

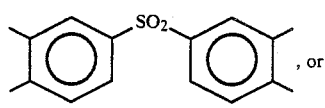

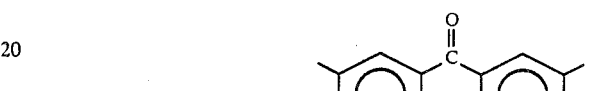

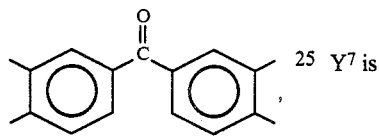

$X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hetero ring are disposed ortho to one another, $a_ib_jm/m+m'$ represents the molar proportions of the respective different recurring units present in said copolymer, $y_{ij}$ represents an average number of the respective different sequential recurring units present in said copolymer, $Ar^9$ is

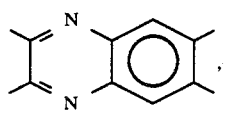

$X_4$ is sulfur, oxygen, or NR (R being hydrogen or an organic group), the NH group and $X_4$ being bonded to aromatic carbon atoms of $Ar^6$ and $Ar^9$, $c_km'/m+m'$ represents the molar proportions of the respective different recurring units present in said copolymer, $y_k$ represents an average number of the respective different sequential recurring units present in said copolymer, n being a positive integer; or $Y^7$ is

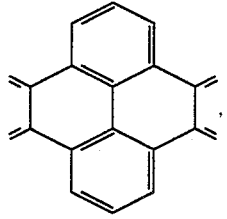

the nitrogen atoms being bonded to aromatic carbon atoms of $Ar^1$ and bonded to adjacent carbon atoms of $Y^7$, $a_ib_j$ represents the molar proportions of the respective different recurring units present in said copolymer, $y_{ij}$ represents an average number of the respective different sequential recurring units present in said copolymer, n being a positive integer; wherein said copolymers X, XI, XII, XV, XVI, XVII, and XVIII are characterized as having a molecular weight with an n value corresponding to an intrinsic viscosity of at least about 5 dL/g as determined in methanesulfonic acid at 30° C. with the proviso that when said copolymer is IX that the molecular weight of said copolymer IX corresponds to an intrinsic viscosity greater than 16 dL/g as determined in methanesulfonic acid at 30° C.; said block polymer having the formulas:

copolymer XVIII

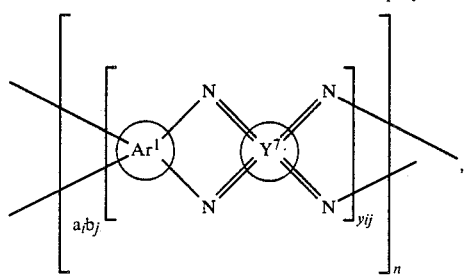

wherein $Ar^1$ is block polymer IX

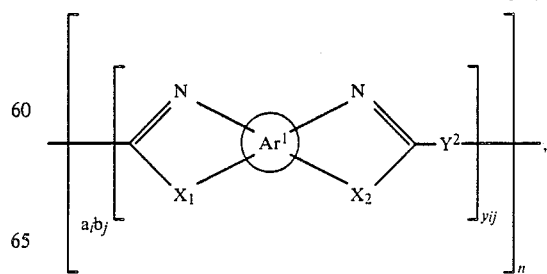

wherein $Ar^1$ is

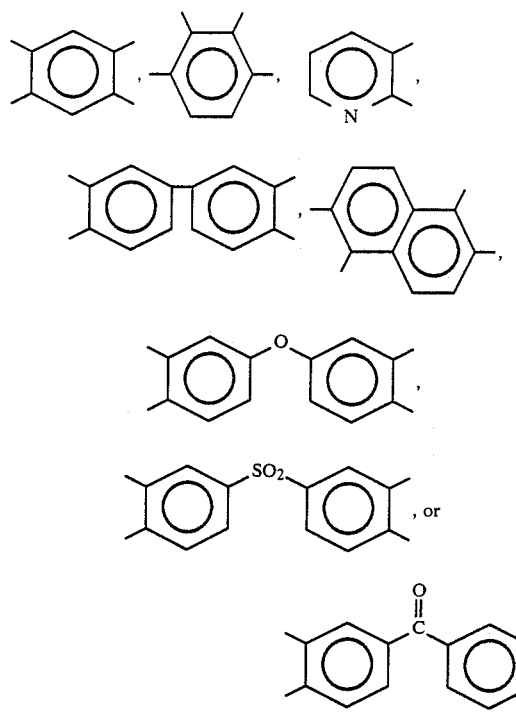
$X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or is
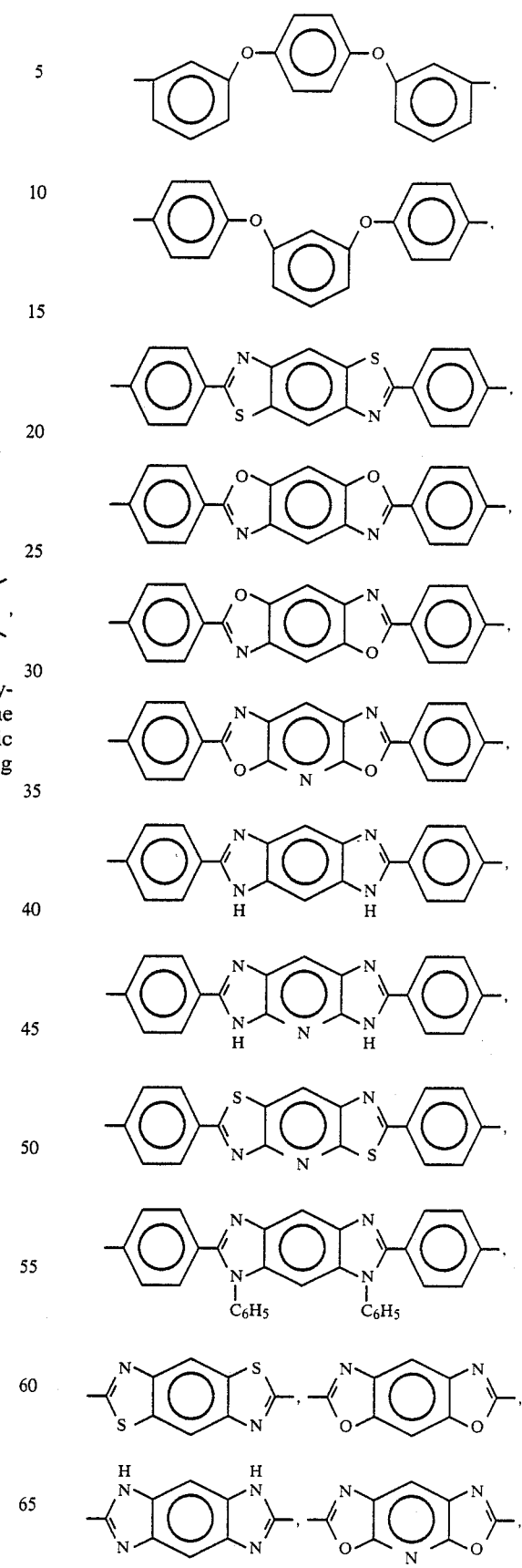

-continued

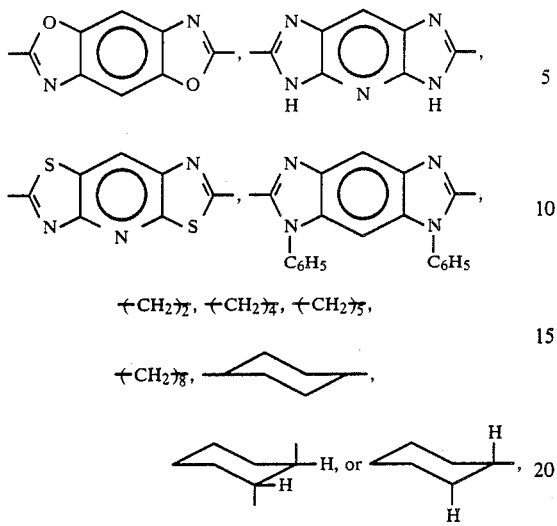

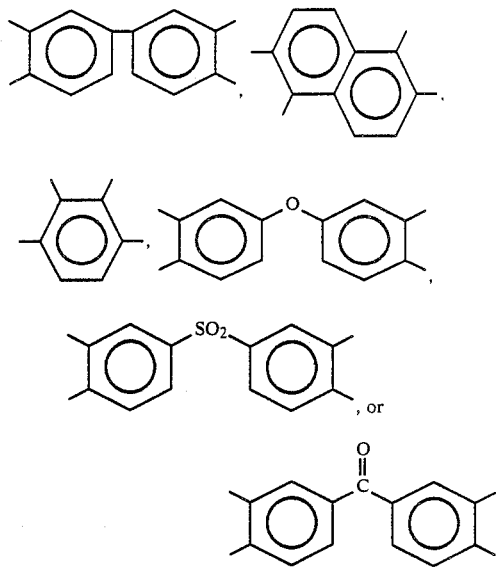

$a_i b_j$ reprersents the molar proportions of the respective different recurring units present in said block polymer, $y_{ij}$ represents an average number of the respective different sequential recurring units present in said block polymer, n being a positive integer;

block polymer XI

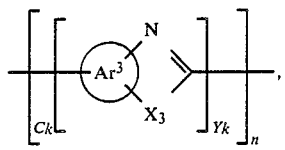

wherein $Ar^3$ is

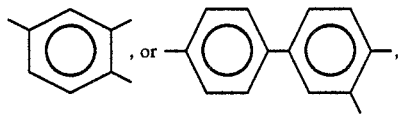

$X_3$ is sulfur, oxygen, or NR (R being hydrogen or an organic group), the nitrogen atom and $X_3$ being bonded to aromatic carbon atoms of $Ar^3$, N and $X_3$ of each hetero ring are disposed ortho to one another, $c_k$ represents the molar proportions of the respective different recurring units present in said block polymer, $y_k$ represents an average number of the respective different sequential recurring units present in said block polymer, n being a positive integer;

$X_1$ and $X_2$ are the same or different and are sulfur, oxygen, or NR (R being hydrogen or an organic group), the nitrogen atoms and $X_1$ and $X_2$ being bonded to aromatic carbon atoms of $Ar^1$, N and $X_1$ or $X_2$ of each hetero ring are disposed ortho to one another and $Y^2$ is nil or is

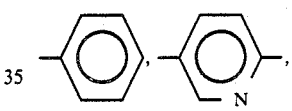

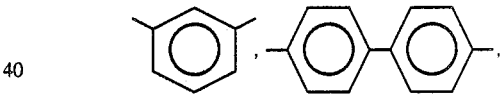

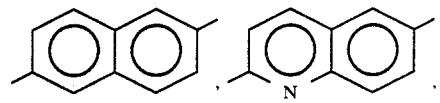

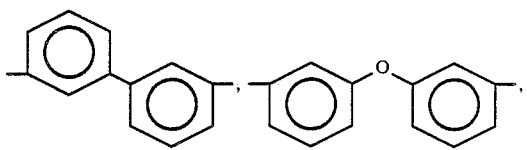

block polymer X

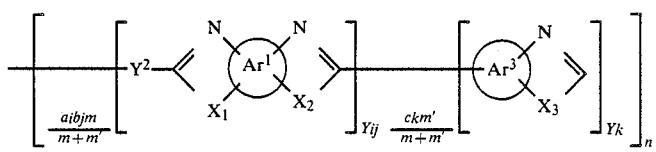

wherein $Ar^1$ is

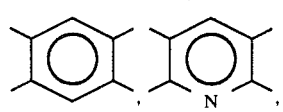

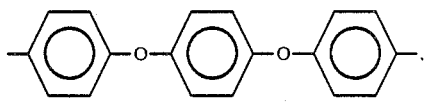

253
-continued

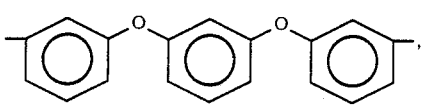,

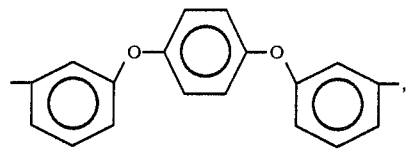,

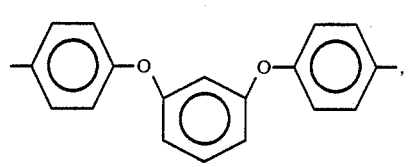,

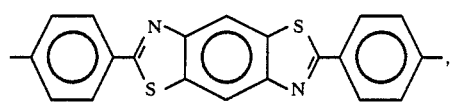,

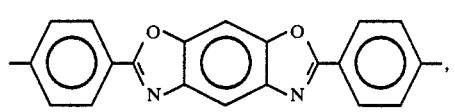,

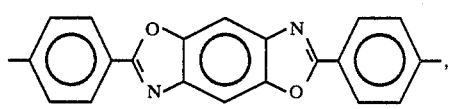,

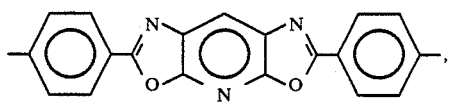,

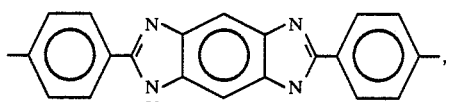,

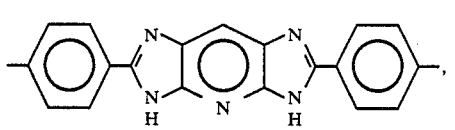,

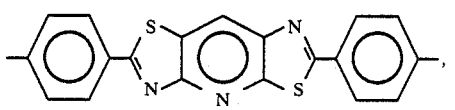,

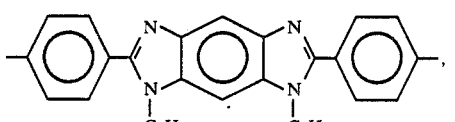,

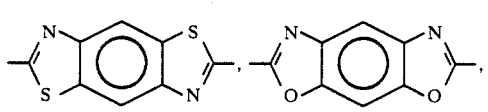,

254
-continued

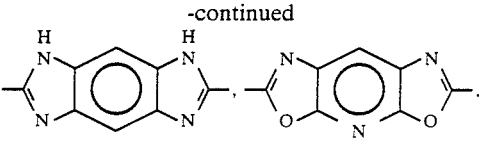,

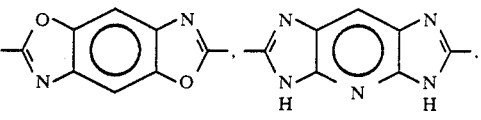,

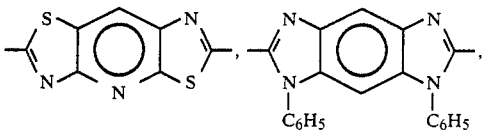,

$+CH_2\!\!+\!\!_2$, $+CH_2\!\!+\!\!_4$, $+CH_2\!\!+\!\!_5$, $+CH_2\!\!+\!\!_8$, 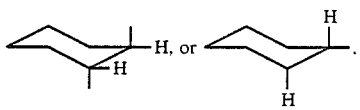

$a_ib_jm/m+m'$ represents the molar proportions of the respective different recurring units present in said block polymer, $y_{ij}$ represents an average number of the respective different sequential recurring units present in said block polymer, $Ar^3$ is

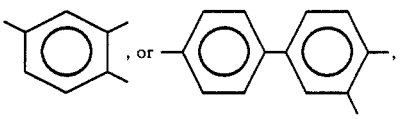

$X_3$ is sulfur, oxygen, or NR (R being hydrogen or an organic group), the nitrogen atom and $X_3$ being bonded to aromatic carbon atoms of $Ar^3$, N and $X_3$ of each hetero ring are disposed ortho to one another, $c_km'/m+m'$ represents the molar proportions of the respective different recurring units present in said block polymer, $y_k$ represents an average number of the respective different sequential recurring units present in said block polymer, n being a positive integer;

block polymer XII

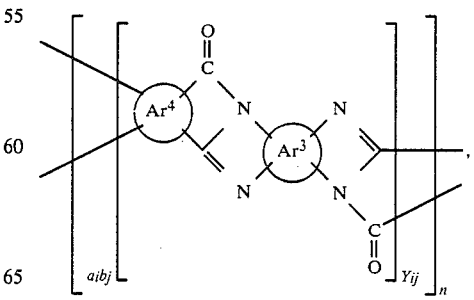

wherein $Ar^1$ is

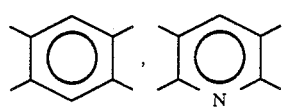

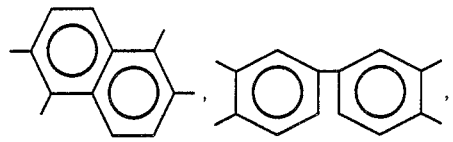

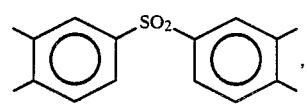

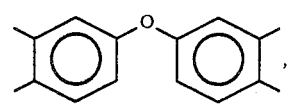

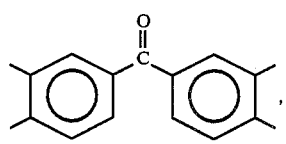

Ar⁴ is

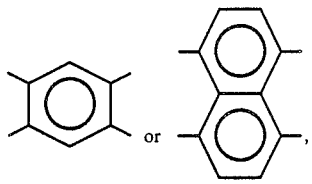

the nitrogen atoms being bonded to Ar¹ and the carbon atoms being bonded to Ar⁴, $a_i b_j$ represents the molar proportions of the respective different recurring units present in said block polymer, $y_{ij}$ represents an average number of the respective different sequential recurring units present in said block polymer, n being a positive integer;

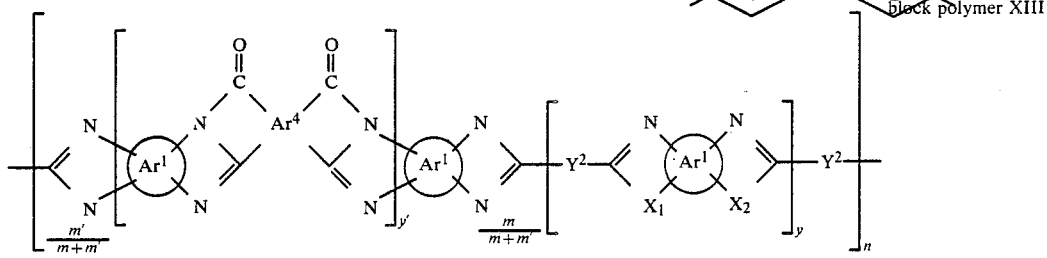

wherein Ar¹ is

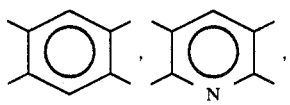

-continued

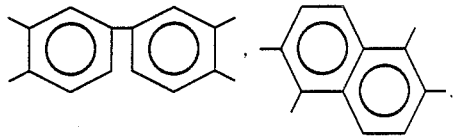

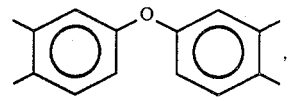

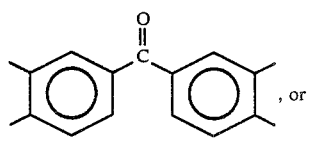

, or

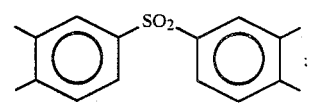

when bonded to nitrogen atoms; and when Ar¹ is bonded to both nitrogen atoms and X₁ and X₂, Ar¹ is

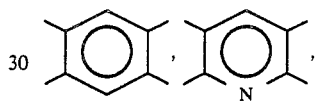

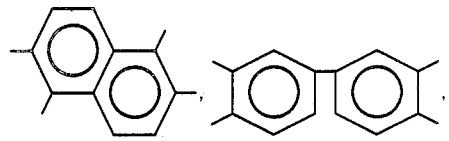

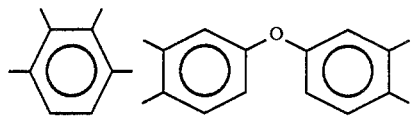

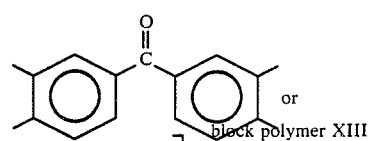

or block polymer XIII

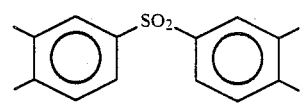

Ar⁴ is

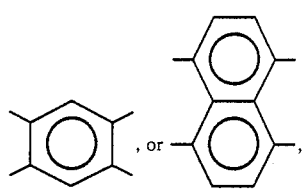

the nitrogen atoms being bonded to Ar¹ and the carbon atoms being bonded to Ar⁴, m'/m+m' represents the molar proportions of the respective different recurring units present in said block polymer, y' represents an average number of the respective different sequential recurring units present in said block polymer, $X_1$ and $X_2$ are the same or different and are sulfur, oxygen, or NR (R being hydrogen or an organic group), the nitrogen atoms and $X_1$ and $X_2$ being bonded to aromatic carbon atoms of Ar¹, N and $X_1$ or $X_2$ of each hetero ring are disposed ortho to one another and $Y^2$ is nil or is

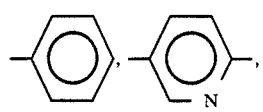

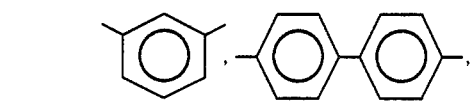

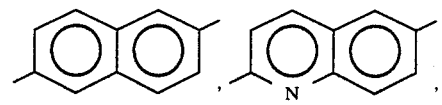

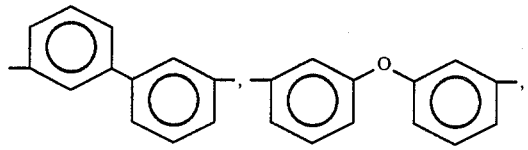

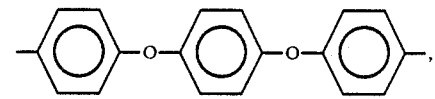

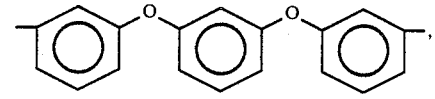

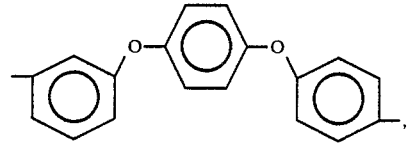

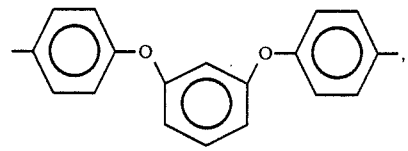

-continued

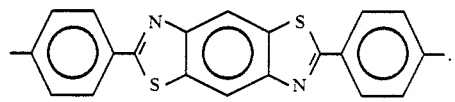

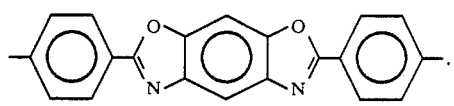

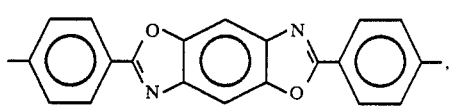

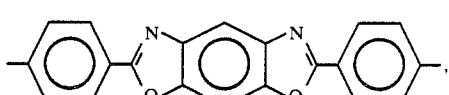

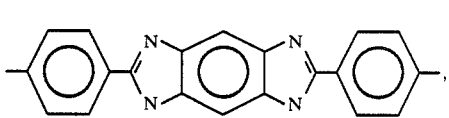

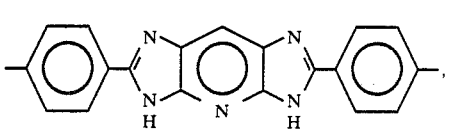

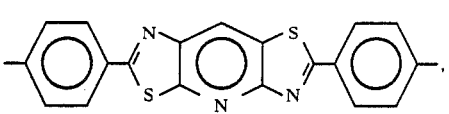

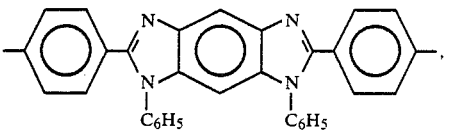

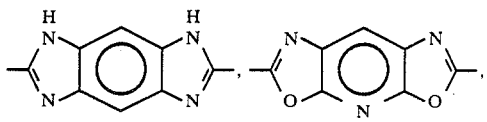

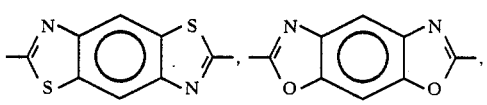

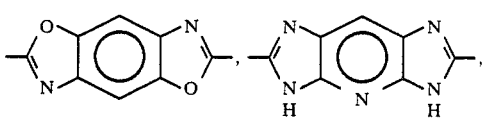

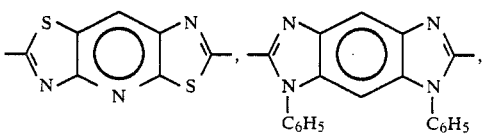

$+CH_2\!\!+_2$, $+CH_2\!\!+_4$, $+CH_2\!\!+_5$, $+CH_2\!\!+_8$,

-continued

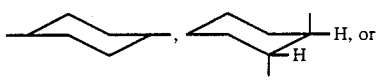, H, or

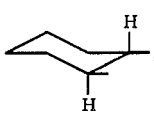

m/m+m' represents the molar proportions of the respective different recurring units present in said block polymer, y represents an average number of the respective different sequential recurring units present in said block polymer, n being a positive integer;

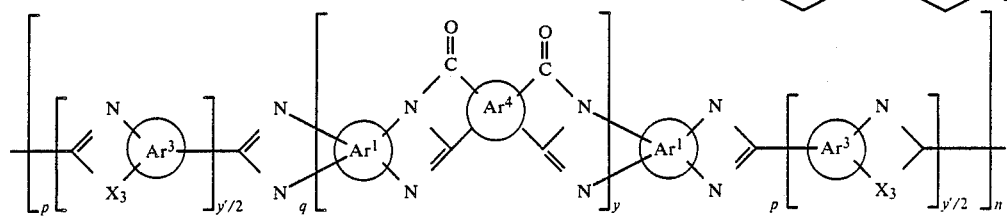

wherein $Ar^3$ is

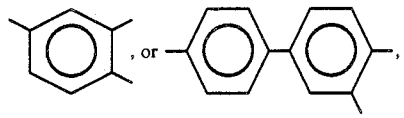

$X_3$ is sulfur, oxygen, or NR (R being hydrogen or an organic group), the nitrogen atom and $X_3$ being bonded to aromatic carbon atoms of $Ar^3$, N and $X_3$ of the hetero ring are disposed ortho to one another, p represents the molar proportions of the respective different recurring units present in said block polymer, y'/2 represents an average number of the respective different sequential recurring units present in said block polymer, $Ar^1$ is

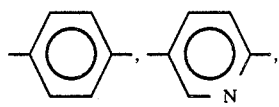

-continued

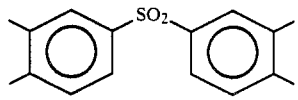, block polymer XIV $Ar^4$ is

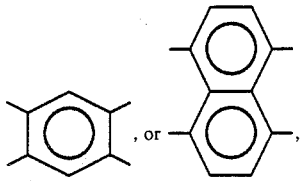

the nitrogen atoms being bonded to $Ar^1$ and the carbon atoms being bonded to $Ar^4$, q represents the molar proportions of the respective different recurring units present in said block polymer, y represents an average number of the respective different sequential recurring units present in said block polymer, n being a positive integer;

block polymer XV

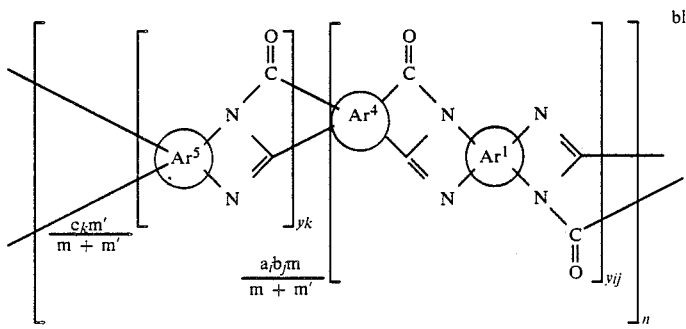

wherein $Ar^4$ is $Ar^1$ is

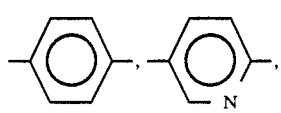

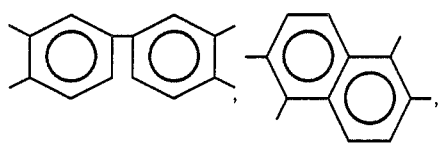

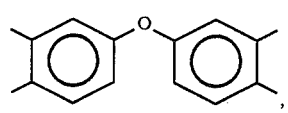

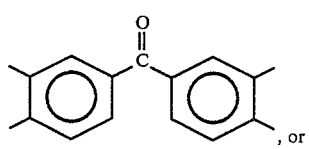

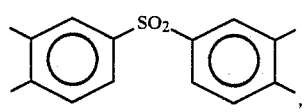

and $Ar^5$ is

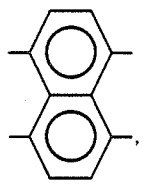

the carbon atoms being bonded to $Ar^4$ and $Ar^5$, and the nitrogen atoms being bonded to $Ar^1$ and $Ar^5$, n being a positive integer; $c_k m'/m+m'$ represents the molar proportions of the respective different recurring units present in said block polymer, $y_k$ represents an average number of the respective different sequential recurring units present in said block polymer, $a_i b_j m/m+m'$ represents the molar proportions of the respective different recurring units present in said block polymer, $y_{ij}$ represents an average number of the respective different sequential recurring units present in said block polymer, n being a positive integer;

block polymer XVI

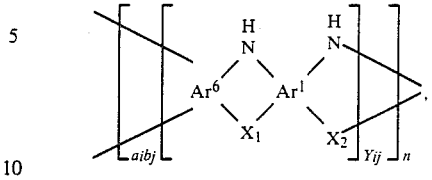

wherein $Ar^1$ is

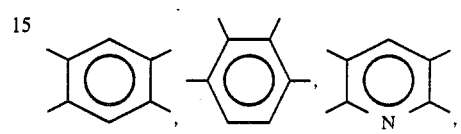

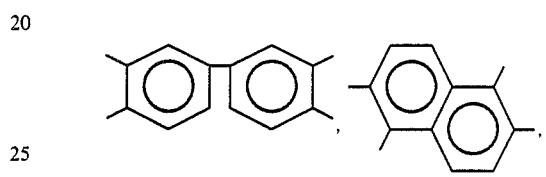

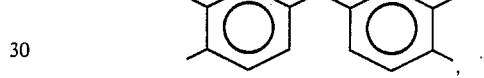

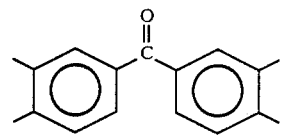

$Ar^6$ is

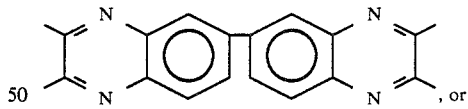

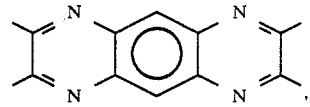

$X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hetero ring are disposed ortho to one another, $a_i b_j$ represents the molar proportions of the respective different recurring units present in said block polymer, $y_{ij}$ represents an average number of the respective different sequential recurring units present in said block polymer, n being a positive integer;

block polymer XVII

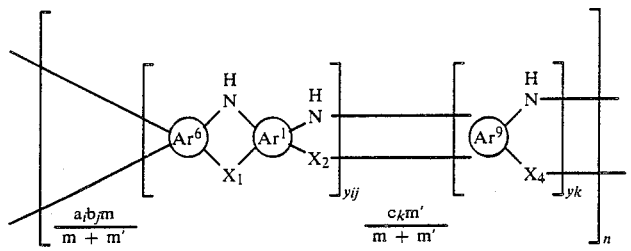

wherein Ar¹ is

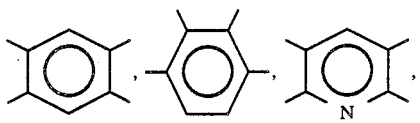

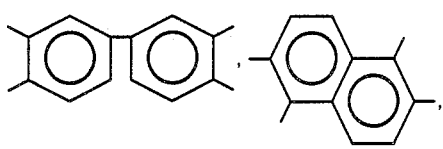

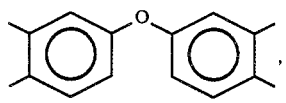

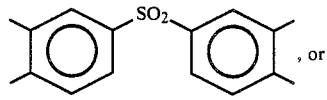

, or

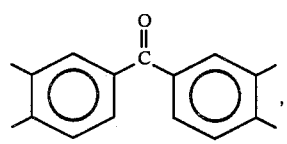

Ar⁶ is

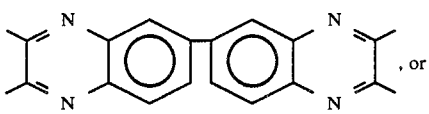

, or

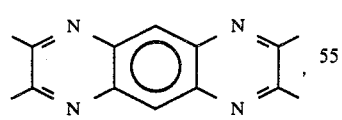

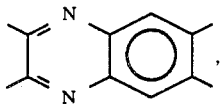

$X_4$ is sulfur, oxygen, or NR (R being hydrogen or an organic group), the NH groups and $X_4$ being bonded to aromatic carbon atoms of $Ar^6$ and $Ar^9$, $c_k m'/m+m'$ represents the molar proportions of the respective different recurring units present in said block polymer, $y_k$ represents an average number of the respective different sequential recurring units present in said block polymer, n being a positive integer; or block polymer XVIII

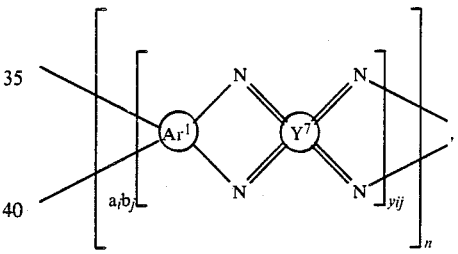

wherein Ar¹ is

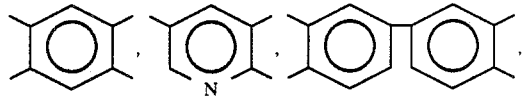

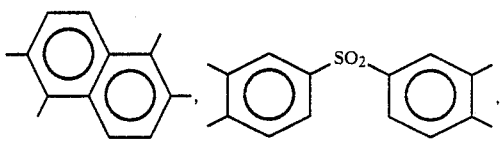

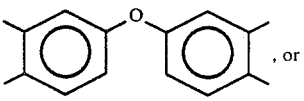

, or

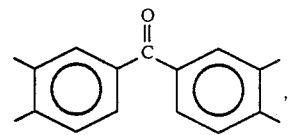

$X_1$ and $X_2$ are the same or different and are sulfur, oxygen, or NR (R being hydrogen or an organic group), the NH groups and $X_1$ and $X_2$ being bonded to aromatic carbon atoms of $Ar^6$ and $Ar^1$, NH and $X_1$ or $X_2$ of each hetero ring are disposed ortho to one another, $a_i b_j m/m+m'$ represents the molar proportions of the respective different recurring units present in said block polymer, $y_{ij}$ represents an average number of the respective different sequential recurring units present in said block polymer, $Ar^9$ is $Y^7$ is

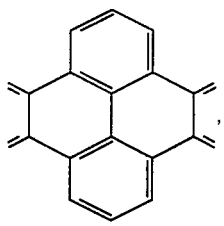

the nitrogen atoms being bonded to aromatic carbon atoms of $Ar^1$, and bonded to adjacent carbon atoms of $Y^7$, $a_ib_j$ represents the molar proportions of the respective different recurring units present in said block polymer, $y_{ij}$ represents an average number of the respective different sequential recurring units present in said block polymer, n being a positive integer.

50. A polymer composition prepared by the process of claim 7 wherein said polymer is

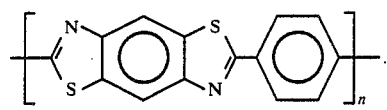

51. A polymer composition prepared by the process of claim 50 wherein said polymer has an intrinsic viscosity of from about 15 dL/g to about 48 dL/g.

52. A polymer composition prepared by the process of claim 7 wherein said polymer is

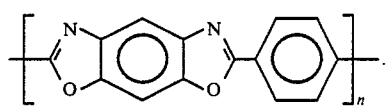

53. A polymer composition prepared by the process of claim 52 wherein said polymer has an intrinsic viscosity of from about 9 dL/g to about 24 dL/g.

54. A polymer composition prepared by the process of claim 7 wherein said polymer is

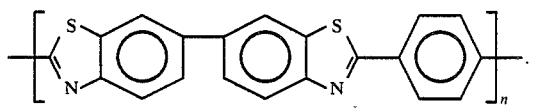

55. A polymer composition prepared by the process of claim 54 wherein said polymer has an intrinsic viscosity of about 15 dL/g.

56. A polymer composition prepared by the process of claim 7 wherein said polymer is

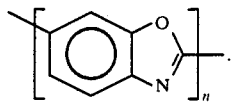

57. A polymer composition prepared by the process of claim 52 wherein said polymer has an intrinsic viscosity of about 12 dL/g.

58. A polymer composition prepared by the process of claim 7 wherein said polymer is

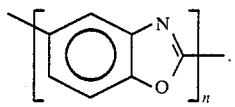

59. A polymer composition prepared by the process of claim 58 wherein said polymer has an intrinsic viscosity of about 12 dL/g.

60. A polymer composition prepared by the process of claim 9 wherein said polymer contains the moiety

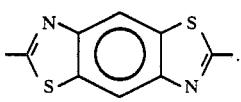

61. A polymer composition prepared by the process of claim 9 wherein said polymer contains the moiety

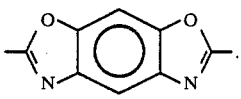

62. A polymer composition prepared by the process of claim 9 wherein said polymer contains the moiety

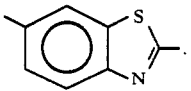

63. A polymer composition prepared by the process of claim 9 wherein said polymer contains the moiety

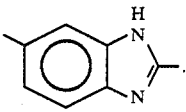

64. A polymer composition prepared by the process of claim 9 wherein said polymer contains the moiety

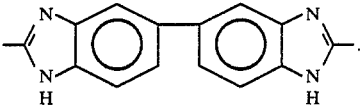

65. A polymer composition prepared by the process of claim 9 wherein said polymer contains the moiety

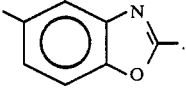

66. A polymer composition prepared by the process of claim 9 wherein said polymer contains the moiety

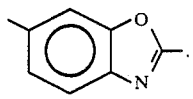

67. A polymer composition prepared by the process of claim 11 wherein said polymer contains the moiety

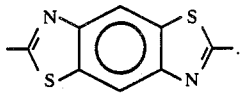

68. A polymer composition prepared by the process of claim 11 wherein said polymer contains the moiety

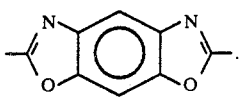

69. A polymer composition prepared by the process of claim 11 wherein said polymer contains the moiety

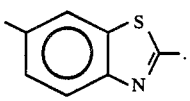

70. A polymer composition prepared by the process of claim 11 wherein said polymer contains the moiety

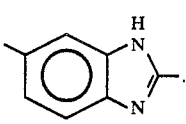

71. A polymer composition prepared by the process of claim 11 wherein said polymer contains the moiety

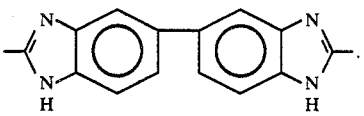

72. A polymer composition prepared by the process of claim 11 wherein said polymer contains the moiety

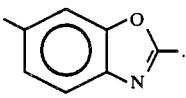

73. A polymer composition prepared by the process of claim 11 wherein said polymer contains the moiety

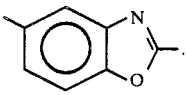

74. A composition prepared by the process of claim 49, wherein said extended chain polymer includes at least one homopolymer having the formula:

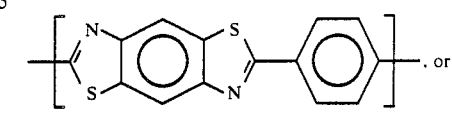

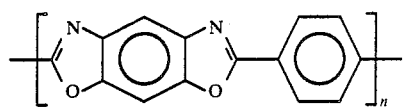

75. A composition prepared by the process of claim 49, wherein said extended chain polymer includes at least one homopolymer having the formula:

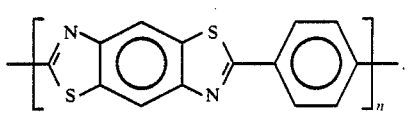

76. A composition prepared by the process of claim 49, wherein said extended chain polymer includes at least one homopolymer having the formula:

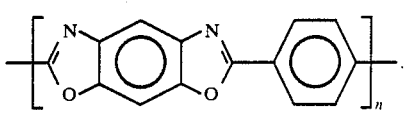

77. A composition prepared by the process of claim 49, wherein said extended chain polymer includes at least one homopolymer having the formula:

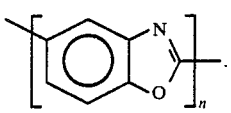

78. A composition prepared by the process of claim 49, wherein said extended chain polymer includes at least one homopolymer having the formula:

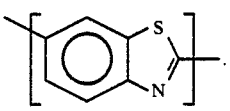

79. A composition prepared by the process of claim 49, wherein said extended chain polymer present is characterized as having a molecular weight corresponding to an intrinsic viscosity of at least about 12 dL/g as determined in methanesulfonic acid at 30° C.

80. A polymer composition prepared by the process of claim 53 wherein said polymer

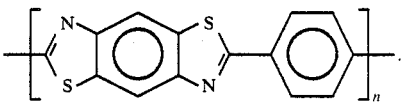

81. A polymer composition prepared by the process of claim 80 wherein said polymer has an intrinsic viscosity of from about 15 dL/g to about 42 dL/g.

82. The polymer of claim 80 having an intrinsic viscosity of from about 20 dL/g to about 25 dL/g.

83. A polymer composition prepared by the process of claim 49 wherein said polymer is

[structure]

84. A polymer according to claim 83 wherein said polymer has an intrinsic viscosity of from about 9 dL/g to about 24 dL/g.

85. The polymer of claim 83 having an intrinsic viscosity of from about 18 dL/g to about 23 dL/g.

86. A polymer composition prepared by the process of claim 49 wherein said polymer is

[structure]

87. A polymer composition according to claim 86 wherein said polymer has an intrinsic viscosity of about 12 dL/g.

88. A polymer composition according to claim 82 having an intrinsic viscosity of from about 13 dL/g to about 17 dL/g.

89. A polymer according to claim 49 wherein said polymer is

[structure]

90. A polymer composition according to claim 89 wherein said polymer has an intrinsic viscosity of about 12 dL/g.

91. A polymer composition prepared by the process of claim 49 wherein said polymer contains the moiety

[structure]

92. A polymer composition prepared by the process of claim 49 wherein said polymer contains the moiety

[structure]

93. A polymer composition prepared by the process of claim 49 wherein said polymer contains the moiety

[structure]

94. A polymer composition prepared by the process of claim 49 wherein said polymer contains the moiety

[structure]

95. A polymer composition prepared by the process of claim 49 wherein said polymer contains the moiety

[structure]

96. A polymer composition prepared by the process of claim 49 wherein said polymer contains the moiety

[structure]

97. A polymer composition prepared by the process of claim 49 wherein said polymer contains the moiety

[structure]

98. A polymer composition prepared by the process of claim 49 wherein said polymer contains the moiety

[structure]

99. A polymer composition prepared by the process of claim 49 wherein said polymer is

[structure]

100. A polymer polymerized in the presence of a selected monofunctional reactant composition prepared by the process of claim 99 wherein said polymer has an intrinsic viscosity of from about 11 dL/g to about 16 dL/g.

101. A crystalline polymer made by the process of claim 6 wherein said polymer contains one or more phenyl, pyridyl, or methyl organic substituent group.

102. A process according to claim 53 wherein said phosphorus pentoxide content of step (d) is increased by adding phosphorus pentoxide in two or more portions to provide said monomer reaction medium of greater phosphorus pentoxide content suitable for polymerization.

103. A process according to claim 6 wherein said strong acid is polyphosphoric acid.

104. A process according to claim 6 wherein said strong acid is methanesulfonic acid.

105. A process for preparing a liquid crystalline extended chain block polymer composition of workable viscosity which is useful in the production of fibers and films comprising the following steps:

(a) mixing at least one of a selected first homo- or hetero-bifunctional monomer with or without oxidation protecting atoms or groups with a preliminary solvent of a substantially non-oxidizing strong acid having a preselected phosphorus pentoxide content, (b) heating and optionally placing the resulting mixture under reduced pressure to promote the removal any volatilized protecting atoms or groups present and to provide a first mixture of the first monomer(s) in the preliminary solvent, said mixing and heating steps (a) and (b) being performed sequentially or simultanously at a selected same or different surface-to-volume ratio(s), said steps (a) and (b) being performed under a selected same or different set of conditions of time, temperature, pressure, rate and amount of said monomer(s) addition, and rate and amount of phosphorus pentoxide addition, said temperature(s) of steps (a) and (b) being sufficient to maintain said mixture at a workable viscosity under said selected set of conditions, said selected surface-to-volume ratio(s) of steps (a) and (b) being sufficient to control the removal of said volatilized protecting atoms or groups under said selected set of conditions, said selected surface-to-volume ratio being greater than 0.2 cm$^{-1}$ said rate and amount of said monomer(s) addition of steps (a) and (b) being controlled to facilitate the removal of said volatilized protecting atoms or groups under said selected set of conditions, said rate and amount of phosphorus pentoxide addition being controlled to facilitate the removal of said volatilized protecting atoms or groups and prevent decomposition of said monomer(s) due to heating under said selected set of conditions, (c) adding at least one of a selected second monomer(s) to the resulting mixture of step (b) when said selected first monomer(s) is a homo-bifunctional monomer so as to provide a first mixture of the first and second monomers in the preliminary solvent, while maintaining said mixture of the first and second monomers at a workable viscosity, (d) then adjusting the phosphorus pentoxide content of the mixture resulting from step (b) or (c) as necessary to provide a first or a first and second monomer reaction medium of sufficient phosphorus pentoxide content suitable for polymerization and for achieving a degree of polymerization greater than about 40, (e) causing polymerization of the first or the first and second monomer at a temperature sufficient to effect reaction at a rate to form a first homo-oligomeric product or a first co-oligomeric product having a preselected intrinsic viscosity, or (f) mixing a selected amount of the first homo-oligomeric product with a selected amount of at least one of a selected second homo-oligomeric product so as to form a first poly-oligomeric product, said second homo-oligomeric product being formed by like steps (a) and (b) followed by:

(1f) adding at least one of a selected second monomer in the resulting mixture of step (b) when said selected first monomer is a homo-bifunctional monomer so as to provide a mixture of a first and second monomer in the preliminary solvent, (2f) then adjusting the phosphorus pentoxide content of the mixture resulting from step (b) or (1f) to provide a first or a first and second monomer reaction medium of greater phosphorus pentoxide content suitable for polymerization, (3f) causing polymerization of the first or first and second monomer(s) at a temperature sufficient to effect reaction at a rate to form said second homo-oligomeric product having a preselected intrinsic viscosity, with the overall proviso that at least one of the selected monomer(s) of step (a) or (1f) which forms the second homo-oligomeric product be different from at least one of the selected monomer of step (a) or (c) which forms the first homo-oligomeric product, or (g) mixing a selected amount of the first homo-oligomeric product with a selected amount of a second mixture of at least one of a selected first monomer(s) or a first and second monomers in the preliminary solvent so as to form a monomer-oligomer mixture, and then adjusting the phosphorus pentoxide content of said monomer-oligomer mixture as necessary to provide a monomer-oligomer reaction medium of sufficient phosphorus pentoxide content suitable for polymerization, said first monomer of said second mixture being formed by like steps (a) and (b) and said first and second monomer of said second mixture being formed by like steps (a), (b) and (c), with the overall proviso that at least one of the selected monomer(s) of step (a) or (c) which forms the first or first and second monomer of said second mixture, be different from at least one of the selected monomer(s) of step (a) or (c) which forms the first homo-oligomeric product, (h) causing polymerization of the poly-oligomeric product resulting from step (f) or the monomer-oligomer resulting from step (g) at a temperature sufficient to effect reaction at a rate to form a first block-oligomeric product having a preselected intrinsic viscosity or a first block-polymeric product.

106. A process according to claim 1, 2, 3, 33 or 105 wherein said strong acid is polyphosphoric acid.

107. A process according to claim 1, 2, 3, 33 or 105 wherein said strong acid is methanesulfonic acid.

108. A process according to claim 1, 2, 3, 33 or 105 wherein said strong acid is methanesulfonic acid, polyphosphoric acid, or an admixture thereof.

109. A process according to claim 6 wherein said strong acid is methanesulfonic acid, polyphosphoric acid, or an admixture thereof.

110. An article made from the polymer composition prepared by the process of claim 6.

111. An article specified in claim 110 wherein said article is selected from the group consisting of flywheels, radomes, engine parts, housings, moldings, tires, belts, fishing rods, tennis racquets, skis, ski poles, bicycle frames, boat hulls, ropes, cloths, protective clothing, helmets, cables, and composites.

112. A fiber spun according to the process of claim 21.

113. The fiber of claim 112 being characterized as having a tensile strength greater than 1.37 GPa.

114. A crystalline polymer composition prepared by the process of claim 49 wherein said organic group is phenyl, pyridyl or methyl.

* * * * *